US012075471B2

United States Patent
Xia et al.

(10) Patent No.: US 12,075,471 B2
(45) Date of Patent: Aug. 27, 2024

(54) COORDINATED WIFI STATIONS WITH SHARED TXOP AMONG DL AND UL OVER TIME DOMAIN

(71) Applicants: SONY GROUP CORPORATION, Tokyo (JP); SONY CORPORATION OF AMERICA, New York, NY (US)

(72) Inventors: Qing Xia, San Jose, CA (US); Mohamed Abouelseoud, San Francisco, CA (US); Liangxiao Xin, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 399 days.

(21) Appl. No.: 17/390,979

(22) Filed: Aug. 1, 2021

(65) Prior Publication Data
US 2022/0174732 A1 Jun. 2, 2022

Related U.S. Application Data

(60) Provisional application No. 63/119,761, filed on Dec. 1, 2020.

(51) Int. Cl.
*H04W 74/0808* (2024.01)
*H04W 16/14* (2009.01)
*H04W 84/12* (2009.01)

(52) U.S. Cl.
CPC ....... *H04W 74/0808* (2013.01); *H04W 16/14* (2013.01); *H04W 84/12* (2013.01)

(58) Field of Classification Search
CPC . H04W 74/0808; H04W 16/14; H04W 84/12; H04W 74/0816; H04W 74/002; H04L 5/0037; H04L 5/0094
(Continued)

(56) References Cited

U.S. PATENT DOCUMENTS 10,425,826 B2  9/2019  Fakoorian
2013/0016710 A1  1/2013  Shinohara
(Continued)

FOREIGN PATENT DOCUMENTS

CN  109673028 A  4/2019
JP  2009528805 A  8/2009
(Continued)

OTHER PUBLICATIONS

Jonghun Han, et al (Samsung), "Coordinated SR for Uplink", IEEE 802.11-20/1040r1, IEEE mentor, Sep. 9, 2020. Pages 1-17.
(Continued)

*Primary Examiner* — Kwang B Yao
*Assistant Examiner* — Syed M Bokhari
(74) *Attorney, Agent, or Firm* — O'BANION & RITCHEY LLP; John P. O'Banion

(57) ABSTRACT

A wireless local area network (WLAN) protocol allowing a Transmit Opportunity (TXOP) holder, whether its an AP or non-AP STA, to share the TXOP with other stations, that are either AP or non-AP STAs. An intent to share the TXOP is communicated by the TXOP holder either directly or indirectly with other STAs and/or AP, after which scheduling information (time and duration) are shared with the STAs and/or AP. When the TXOP occurs, the STAs and/or AP can access the channel at the time and for the duration specified, thus providing increased use of the TXOP to improve efficiency.

34 Claims, 81 Drawing Sheets

(58) Field of Classification Search
USPC .......................................................... 370/329
See application file for complete search history.

(56) References Cited

U.S. PATENT DOCUMENTS

| | | |
|---|---|---|
| 2013/0155931 A1 | 6/2013 | Prajapati |
| 2014/0334387 A1* | 11/2014 | Doppler ............ H04W 74/0816 370/329 |
| 2015/0071051 A1* | 3/2015 | Zhu ..................... H04W 72/121 370/216 |
| 2016/0262173 A1* | 9/2016 | Josiam ................ H04W 72/543 |
| 2016/0345362 A1* | 11/2016 | Lee ................... H04W 74/0816 |
| 2020/0359230 A1 | 11/2020 | Yerramalli |
| 2021/0315010 A1* | 10/2021 | Hsu .................... H04W 74/008 |
| 2022/0095305 A1* | 3/2022 | Höhne ................ H04W 72/542 |
| 2022/0338251 A1* | 10/2022 | Hwang ................ H04B 7/0452 |

FOREIGN PATENT DOCUMENTS

| | | | |
|---|---|---|---|
| JP | 2018534862 A | 11/2018 | |
| WO | WO-2007103055 A2 | 9/2007 | |
| WO | WO-2011132761 A1 | 10/2011 | |
| WO | WO-2017070487 A1 | 4/2017 | |
| WO | 2017121404 | 7/2017 | |

OTHER PUBLICATIONS

Jonghun Han, et al (Samsung), "Shared TXOP Spatial Reuse Considerations", IEEE 802.11-20/0590r0, IEEE mentor, May 7, 2020, pp. 1-17.

* cited by examiner

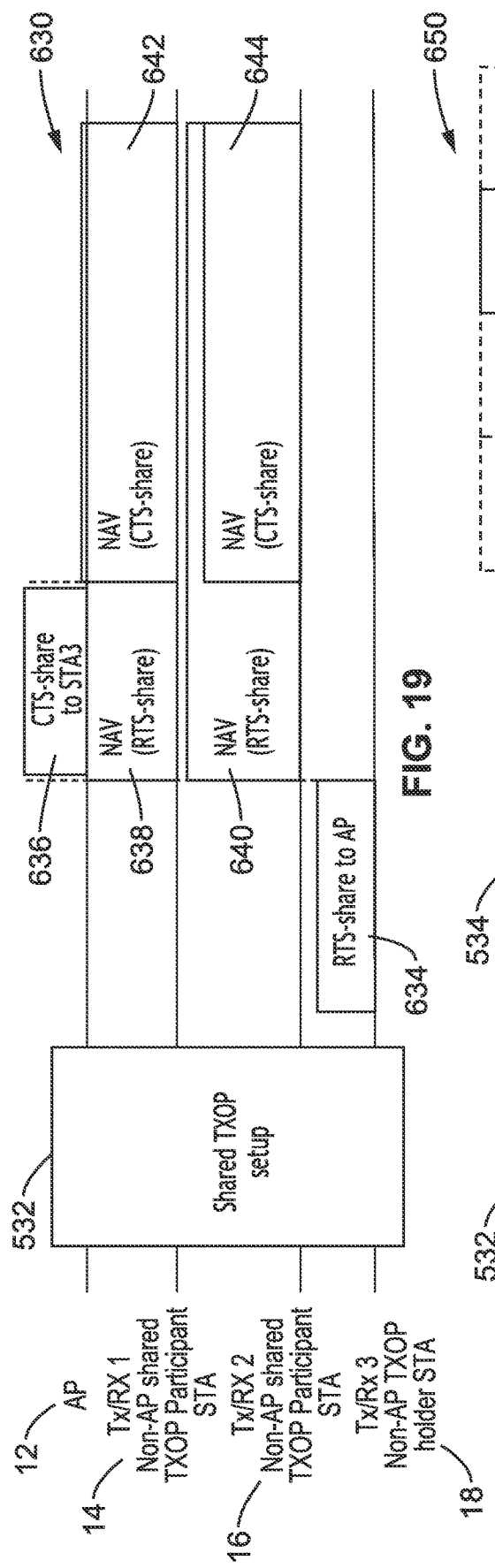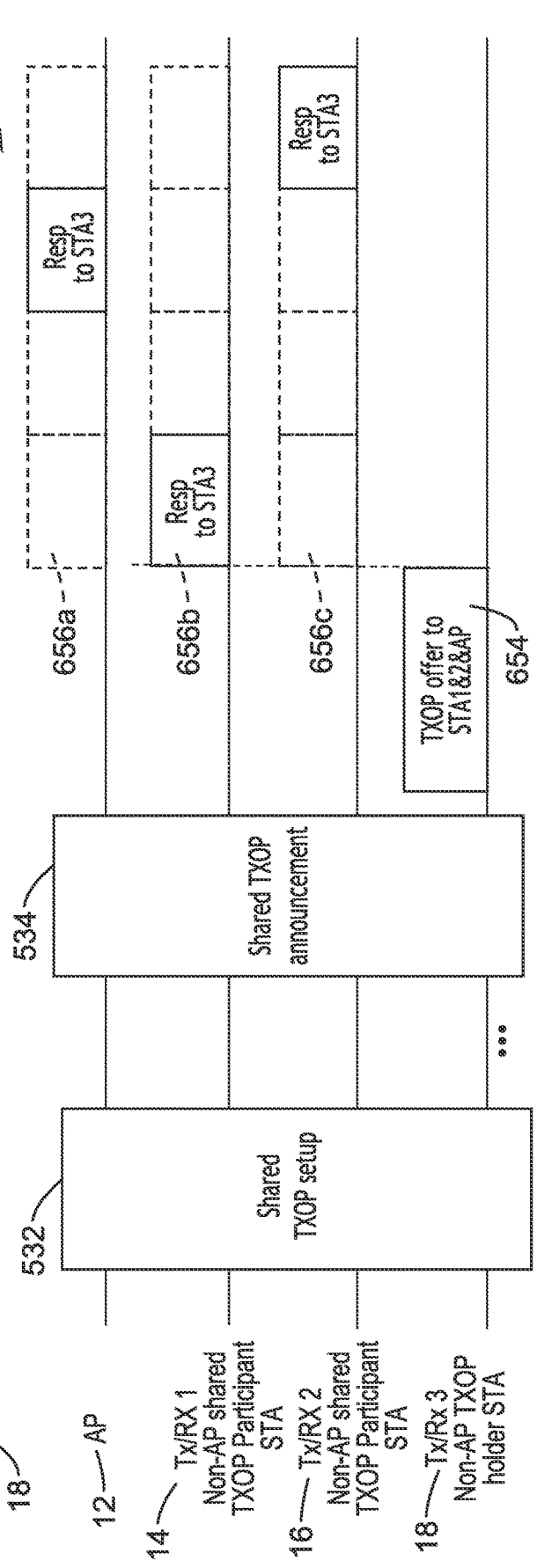
FIG. 19
FIG. 20

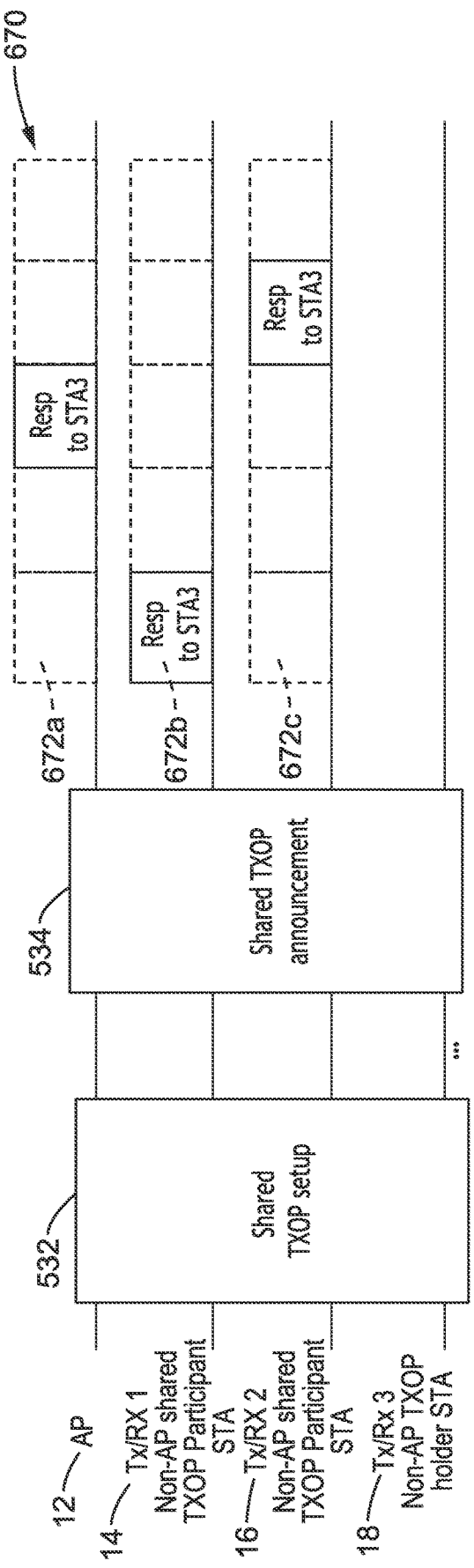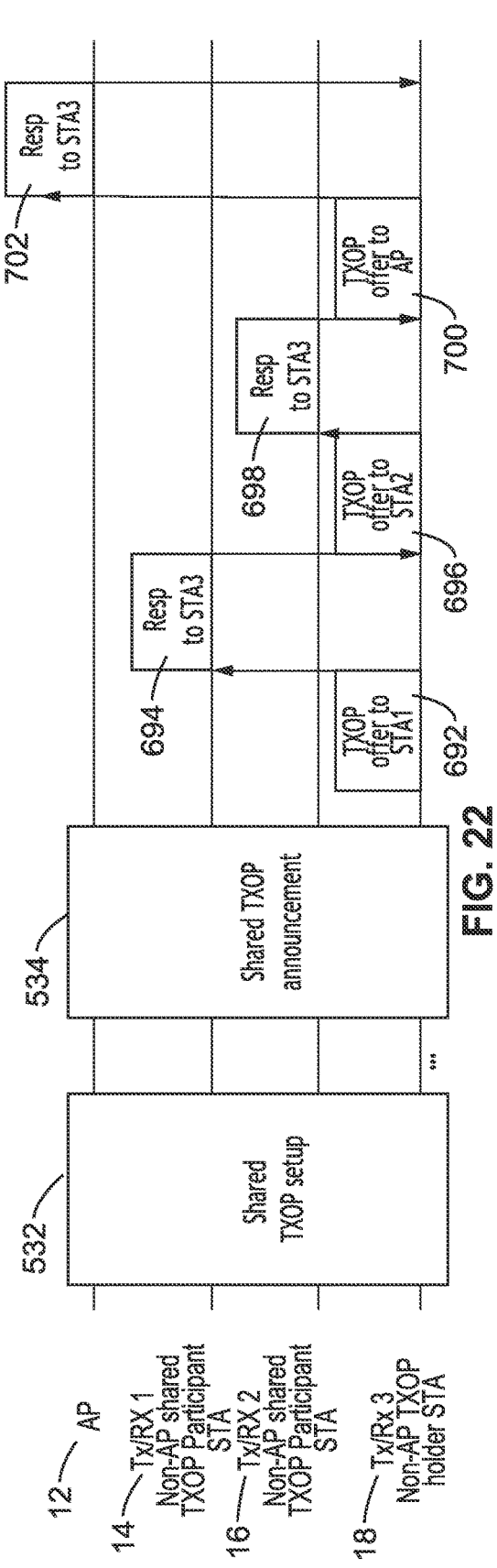

FIG. 63

| Element ID | Length | STA Info 1 | ... | STA Info n |
|---|---|---|---|---|
| 1 | 1 | 2 | ... | 2 |

Octets:

| AID | TXOP share holder | TXOP share participant | Reserved |
|---|---|---|---|
| 8 | 1 | 1 | 6 |

Bits: B0 B7 / B8 / B9 / B10 B15

| Element ID | Length | Allocation Control 1 | Allocation Control 2 | ... | Allocation Control n |
|---|---|---|---|---|---|
| 1 | 1 | 10 | 10 | ... | 10 |

Octets:

| Allocation Control | Source AID | Destination AID | Random Access Counter | Allocation Start | Allocation block duration |
|---|---|---|---|---|---|
| 1 | 1 | 1 | 1 | 4 | 2 |

Octets:

| Frame Control | Duration | RA | TA | STA TXOP participant 1 | ... | STA TXOP Participant n | FCS |
|---|---|---|---|---|---|---|---|
| 2 | 2 | 6 | 6 | 6 | ... | 6 | 4 |

Octets:

FIG. 81 (2870)

| B0 – B7 | B8 – B15 | B16 – B19 | B20 – B21 | B22 B23 | B24 B25 | B26 – B33 | B34 – B41 | B42 – B47 |
|---|---|---|---|---|---|---|---|---|
| Source AID | Destination AID | ACI Bitmap | Delta TID | ACI High | Scaling Factor | Queue Size High | Queue Size All | Reserved |
| 8 | 8 | 4 | 2 | 2 | 2 | 8 | 8 | 6 |

Bits:

FIG. 82 (2890)

| Frame Control | Duration /ID | RA | TA | TX Duration | FCS |
|---|---|---|---|---|---|
| 2 | 2 | 6 | 6 | 2 | 4 |

Octets:

FIG. 83

| Frame Control | Duration | RA | TA | STA TXOP Access Request 1 | ... | STA TXOP Access Request n | FCS |
|---|---|---|---|---|---|---|---|

Octets: 2, 2, 6, 6, 9, ..., 9, 4

FIG. 84

| Allocation Control | Source AID | Destination AID | Allocation Start | Allocation block duration |
|---|---|---|---|---|

Octets: 1, 1, 1, 4, 2

FIG. 85

| TID | Allocation Type | Reserved |
|---|---|---|
| B0 B3 | B4 B5 | B6 B7 |

Bits: 4, 2, 2

FIG. 86 — 2970

| Frame Control | Duration | RA | TA | Share offer/request Info | FCS |
|---|---|---|---|---|---|
| 2 | 2 | 6 | 6 | 5 | 4 |

Octets:

FIG. 87 — 2990

| Priority | TXOP Share Request | TXOP Duration Request | TXOP Share Offered | TX Duration Offered | Reserved |
|---|---|---|---|---|---|
| B0–B3 | B4 | B5–B20 | B21 | B22–B37 | B38 B39 |
| 4 | 1 | 16 | 1 | 16 | 2 |

Bits:

FIG. 88 — 3010

| Frame Control | Duration | RA | TA | STA Share Offer/Request 1 | ... | STA Share/Request n | FCS |
|---|---|---|---|---|---|---|---|
| 2 | 2 | 6 | 6 | 7 | ... | 7 | 4 |

Octets:

COORDINATED WIFI STATIONS WITH SHARED TXOP AMONG DL AND UL OVER TIME DOMAIN

This application claims priority to, and the benefit of, U.S. provisional patent application Ser. No. 63/119,761 filed on Dec. 1, 2020, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication networks, and more particularly to multiple-user transmissions in which a STA obtaining the Transmit Opportunity (TXOP) shares it with other stations in a single Basic Service Set (BSS).

2. Background Discussion

The use of Wi-Fi networks continues to grow at a very rapid pace. This growth is spurred by the fast development of novel applications and the increasing amount of smart-devices in the market which require access to the internet through Wi-Fi networks. With the growing number and the increasing demand of Wi-Fi users, there is significant impetus to achieve increased throughput, lower latency and higher efficiency.

Some applications, for example real time gaming, are very sensitive to delay, and thus have higher requirements for low latency in order to provide an enjoyable user experience, such as by supporting real time interaction between different game players.

The contention among stations, including the AP station and non-AP stations, for accessing the channel introduce contention delays when stations try to access the channel simultaneously. The contention delay largely affects the performance of traffic requiring low latency. The current 802.11 ax technique initiates UpLink (UL) and DownLink (DL) Multi-User (MU) transmissions at the AP level, meaning that for UL transmissions, the non-AP STAs shall send Trigger-Based (TB) UL Data to the AP. Although this rule reduces the contention from the non-AP STAs, it may not make the best use of the communication channel in cases in which non-AP STAs need to send UL Data and sense that the channel is free (not busy) but the AP hasn't sent trigger frame to the non-AP STA.

In this case, the present disclosure provides mechanisms in which the stations, including AP stations and non-AP stations, should cooperate with each other. This means, if any station obtains channel access and gains TXOP, it may share a portion of its Transmit opportunity (TXOP) with other stations. The cooperation scheme is configured to reduce contention among stations and thus to reduce contention delays.

Thus, the approaches utilized in current WLAN protocols are unable to provide the beneficial levels of performance which are increasing in demand.

Accordingly, a need exists for increasing performance of WLAN communications, including shared TXOP transmissions. The present disclosure fulfills that need and provides additional benefits over previous technologies.

BRIEF SUMMARY

In conventional 802.11 protocols, the Transmit Opportunity (TXOP) scheduling is performed on the AP level. A non-AP STA in a conventional wireless LAN network which senses that the channel is idle cannot send data without receiving a trigger frame from the AP, thus constraining channel utilization efficiency. Other than that, the TXOP holder, which is the station that obtained (gained) the TXOP, does not share a part of its TXOP with other stations; and thus every station must separately compete for the TXOP, even if it only has a meager amount of Data to transmit.

In the present disclosure the stations, including AP stations and non-AP stations, cooperate with each other, so that if any station obtains channel access and gains TXOP, it may share a portion of its Transmit opportunity (TXOP) with other stations. The cooperation scheme helps reduce contention among stations and thus, reduces contention delay. Both non-AP STAs and AP STA are allowed to perform shared TXOP scheduling in the time domain (time sharing the TXOP with other cooperative stations that willing to participate in this shared TXOP to transmit physical layer protocol data unit (PPDU) without channel contention). In this case, the TXOP holder STA, that obtains (grabs) the channel access and is aware of the shared TXOP participant STAs information, through either preconfigured sharing information or the collection of the shared TXOP participants' information, can schedule the TXOP sharing with other stations to improve channel utilization efficiency and achieve lower latency transmissions in the wireless LAN network.

In at least one embodiment of the disclosed technology the non-AP TXOP holder STA is able to start the coordination process and shares its TXOP with other STAs in the same BSS in the time domain without waiting for the trigger frame from the AP. Multiple different scenarios are described, including sharing the TXOP with or without the AP as the coordinator, and the use of semi-static TXOP sharing and simplified TXOP sharing.

In a scenario without AP coordination, a Station obtaining a TXOP in a wireless LAN network is able to communicate with every other stations in its BSS, shares its TXOP with other stations in the same BSS by: (a) exchanging messages with the AP to inform and/or gain approval of sharing its TXOP with other STAs; (b) broadcasting a message to other STAs in the BSS to indicate that the upcoming TXOP is available to be shared upon gaining access to the channel; (c) exchange messages with other STAs in the BSS to determine which STAs are requesting time in the TXOP which is open for sharing; (d) sending messages to STAs that will share the TXOP with the STA to inform them of the duration and time when channel access is to be performed.

In a scenario with AP coordination a STA obtaining a TXOP in a wireless LAN network could not communicate with all other stations in its BSS, shares its TXOP with other stations in the same BSS by: (a) exchanging messages with the AP to inform and/or gain approval for sharing its TXOP with other STAs; (b) unicasting a message to the AP requesting that it broadcasts a message to other STAs in the BSS to indicate that the upcoming TXOP is available to be shared; (c) letting the AP exchange messages with other STAs in the BSS and obtaining messages from the AP to determine which STAs are requesting time in the shared TXOP; (d) unicasting a message to the AP requesting it to send messages to STAs that will share the TXOP with the STA to inform them of the duration and time when channel access is to be performed.

In semi-static TXOP sharing the following takes place in the first (TXOP sharing setup) stage. (a) Each non-AP STA sends the Share offer/request information to the AP, with indicates the non-AP STA's capability of sharing or joining a shared TXOP. Then, the AP broadcasts this information to all stations. (b) Each station, that may be the TXOP holder in the future, configures the shared TXOP schedule among itself and other stations and sends this configuration information to the AP.

After receiving this configuration information, the AP broadcasts it to all stations; then, in the second (TXOP sharing) stage, the following takes place: (a) an exchange of Ready-To-Send-share (RTS-share) and Clear-To-Send-share (CTS-share) occurs between the sharing STA and the AP announcing that the upcoming TXOP is allowed to be shared according to the agreed on configuration; (b) once other STAs sharing the TXOP receive the RTS-share or CTS-share showing that the TXOP is to be shared and recognize that they are included in the sharing configuration, the STAs can determine when to access the channel; (c) the RTS-share/CTS-share messages being used in this disclosure are modified RTS/CTS with added fields containing information about sharing the TXOP; (d) different messages can be exchanged between the STA sharing its TXOP and the AP, so that other STAs can receive the messages and obtain information about the TXOP sharing.

In simplified TXOP sharing, the following takes place. (a) Once a station obtains channel access its sends an RTS and receives a CTS, then it can use the available TXOP time as much as its needs, only limited by the maximum TXOP duration. After finishing the complete transmission (transmit Data PPDU and receive ACK/Block ACK), it sends a CTS-Reject to the AP to allow the AP to loop through (sequence through) other stations to use the remaining time of the TXOP. (b) After receiving a CTS-Reject frame, the AP loops through the next station (non-AP STA) by sending a CTS to it if the current TXOP has not expired. The AP also assigns the limited shared TXOP time to the next station; thus when the AP is the next station to be looped through in the sequence, the AP can directly access the channel for transmission within the limited shared TXOP time remaining. (c) The non-AP STA that receives the CTS from the AP sends an SU PPDU to the AP within the limited shared TXOP time and sends a CTS-Reject to AP if: (i) the AP finishes transmission earlier than the assigned shared TXOP limitation time; (ii) the end of the assigned shared TXOP limitation time is approaching and the AP doesn't have an SU PPDU to transmit.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 19 is a communication sequence diagram of a shared TXOP announcement stage according to at least one embodiment of the present disclosure.

FIG. 20 is a flow diagram of a UL initiated TXOP participant acquirement showing a response after receiving a TXOP offer according to at least one embodiment of the present disclosure.

FIG. 21 is a flow diagram of a UL initiated TXOP participant acquirement stage showing a response after receiving a CTS according to at least one embodiment of the present disclosure.

FIG. 22 is a communication sequence diagram of a UL initiated TXOP participant acquirement stage showing a response after receiving a dedicated TXOP offer frame, according to at least one embodiment of the present disclosure.

FIG. 63 is a data field diagram of a STA TXOP shareability element format, according to at least one embodiment of the present disclosure.

FIG. 64 is a data field diagram of a STA Information field format, according to at least one embodiment of the present disclosure.

FIG. 65 is a data field diagram of an Access request information element format, according to at least one embodiment of the present disclosure.

FIG. 66 is a data field diagram of an Allocation Control subfield, according to at least one embodiment of the present disclosure.

FIG. 80 is a data field diagram of a Shared TXOP participant announcement frame format, according to at least one embodiment of the present disclosure.

FIG. 81 is a data field diagram of a STA TXOP participant field format, according to at least one embodiment of the present disclosure.

FIG. 82 is a data field diagram of a Request TXOP offer frame format, according to at least one embodiment of the present disclosure.

FIG. 83 is a data field diagram of a Request TXOP access scheduler frame format, according to at least one embodiment of the present disclosure.

FIG. 84 is a data field diagram of a STA TXOP Access Request field format, according to at least one embodiment of the present disclosure.

FIG. 85 is a data field diagram of an Allocation Control subfield format, according to at least one embodiment of the present disclosure.

FIG. 86 is a data field diagram of a Share offer/request frame format, according to at least one embodiment of the present disclosure.

FIG. 87 is a data field diagram of a Share offer/request info field format, according to at least one embodiment of the present disclosure.

FIG. 88 is a data field diagram of a Sharing offers/request frame format, according to at least one embodiment of the present disclosure.

DETAILED DESCRIPTION

1. Introduction

Figure 1:
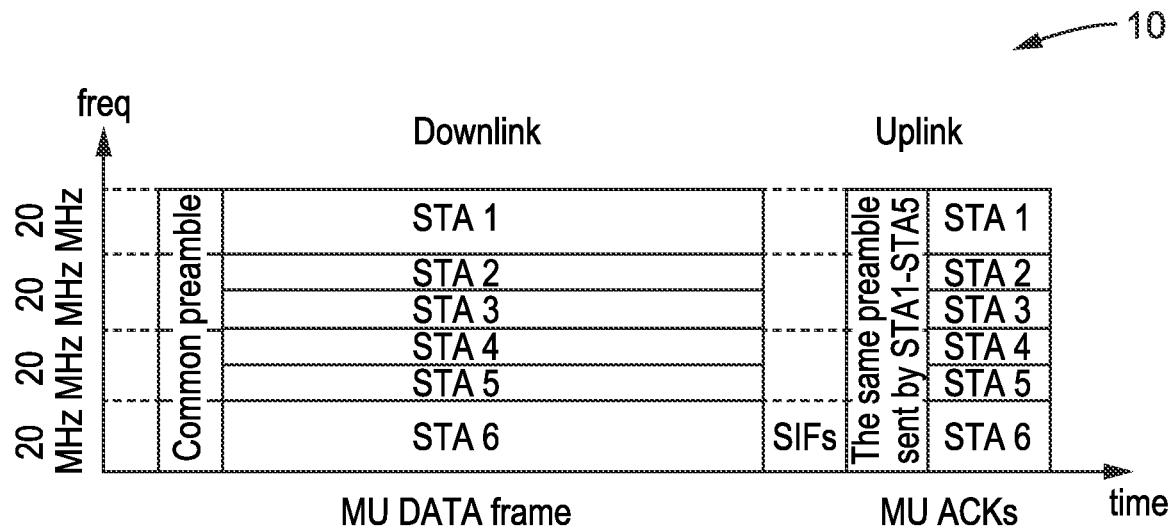
FIG. 1 is a slotted transmission diagram for an MU Data frame in a DownLink (DL) Orthogonal Frequency Division Multiple Access (OFDMA) Multiple Input Multiple Output (MIMO) transmission.

Numerous protocol amendments have been proposed for improving the performance of 802.11 WLANs, and most specifically for systems which communicate over the 2.4 GHz and 5 GHz bands. The majority of these techniques target data rate improvements from the perspective of the PHYsical (PHY) layer, such as increasing bandwidth from 20 MHz to 160 MHz, proposing new modulation and coding schemes and improving MIMO system operation.

Other MAC layer improvements have been introduced to reduce the overhead of transmission and hence increase data throughput. This can be accomplished for example by reducing the interframe spacing, aggregating and segmenting packets, and applying power consumption protocols to alternate between an awake state and a doze (sleep) state for STAs to save their power consumption.

IEEE 802.11ax introduced a technique of Orthogonal Frequency Division Multiple Access (OFDMA), where adjacent subcarriers are grouped into resource units (RUs). By assigning RUs for Multi-users (MU) up link (UL) and down link (DL) DATA transmission, the technique maximizes transmission rate.

Orthogonal Frequency Division Multiple Access (OFDMA) allows many users to use the same time resources at the same time and splits the frequency domain among them. This results in improved use of channel resources and allows latency reduction since more users can be scheduled at the same time.

2.1. WLAN Features Affecting Delay
2.1.1. Channel Access and Delay Tolerance

Both contention-based and contention-free access is allowed in WLAN devices. The contention based access requires the device to sense the channel and contend for the channel if it is busy in order to gain access to the channel. This mechanism introduces additional transmission delays which were necessary for providing collision avoidance. Contention-free channel access allows the AP to gain access to the channel without contention. This is allowed in the Hybrid Controlled Channel Access where channel access coordination is accomplished by using a shorter inter-frame spacing equal to PIFs (PCF Inter-Frame spacing) compared to the DIFS (Distributed Inter-Frame spacing) used by other STAs. Although contention free access appears to be a good solution to avoid contention delay, it is not widely deployed and the majority of Wi-Fi devices are using contention based access.

For a STA to access the channel it is required to sense the channel and find that it is not busy prior to obtaining and utilizing the channel. This channel is considered busy when: (a) the STA detects a preamble of a frame, wherein the channel is considered busy for the length of the detected frame; (b) the STA detects in-band energy at more than 20 dB of the minimum sensitivity; or (c) the STA detects that the channel is virtually busy by reading the NAV of a detected frame.

802.11ax introduced two NAVs to avoid collision that might arise by faulty resetting of the NAV timer. It will be appreciated that one Network Allocation Vector (NAV) is for the BSS STAs and the other NAV is for the non-BSS STAs. The STA maintains the two NAVs separately.

802.11ax uses Carrier Sense Multiple Access/Collision Avoidance (CSMA/CA) for channel access for all legacy 802.11 WLAN devices. Accordingly, for an AP to send a trigger frame for an UpLink Multiple-Input Multiple-Output (UL MIMO) transmission it still needs to contend for channel access. In order to enable the AP to win (obtain) channel access over any STA in its BSS, 802.11ax introduced a second set of Enhanced Distributed Channel Access (EDCA) for 802.11ax devices only, which allows legacy non 802.11ax devices to access the channel freely with EDCA and increase the chance of the AP gaining access to the channel in order to schedule UpLink (UL) or DownLink (DL) OFDMA MIMO data transmission.

2.1.2. Multi-user Transmission and Reception 802.11 WLAN devices allow the use of a MIMO antenna for transmission and reception as well as for OFDMA channel access. IEEE 802.11ax supports multi-user transmission in both uplink and downlink directions.

MIMO allows multi-stream transmission to one or more users through up to 8 streams for example in SU-MIMO DL in 802.11ac or through multi-user transmission to more than one user through MU-MIMO DL transmission as defined in 802.11ac. This allows the AP to assign one or more streams to STAs in its BSS.

With the use of wide channels for data transmission, up to 160 MHz, the channel is expected to be interference frequency selective where some frequencies experience different interference levels than others. This affects the expected achievable rate and degrades the performance. To solve this problem 802.11ax introduced OFDMA where adjacent subcarriers are grouped into resource units (RUs). These RUs can be assigned to different receivers to maximize transmission rates. This scheduling can result in maximizing the Signal to Interference and Noise Ratio (SINR) for each receiver and hence allows selecting a higher Modulation and Coding Scheme (MCS) and therefore increases achieved throughput.

OFDMA allows many users to use the same time resources at the same time and split the frequency domain among them. The result is an improved use of resources and allows latency reduction since more users can be scheduled at the same time. This also allows STAs needing to communicate small amounts of data to occupy narrow RUs making scheduling very efficient and providing improved distribution of resources among applications that require access to the channel, while reducing channel access time and the overhead of frame headers and preambles.

OFDMA can be more efficient when it is combined with MIMO transmission. An RU can be used to send multiple spatial streams to a STA depending on the MIMO capacities of the STAs. Also, one RU can be assigned to more than one STA to share where each can have one or more spatial streams depending on the MIMO capacities of the STAs. Packing more STAs in the same resource can also help with improving latency for the STAs and APs.

FIG. 1 shows an example 10 of DL OFDMA MIMO transmission. The AP is sending a PHY preamble to all STAs to specify the frequency/RUs mapping and RUs assignment for STAs. Following the preamble, the AP sends DL DATA to the specific STA (e.g., STA 1-STA 6) using the RU assignment for this STA. The Multi-user ACK transmission should be synchronized to the reception of the DL DATA frame where STAs start transmission of a SIFS after reception of the DL trigger frame.

Figure 2:
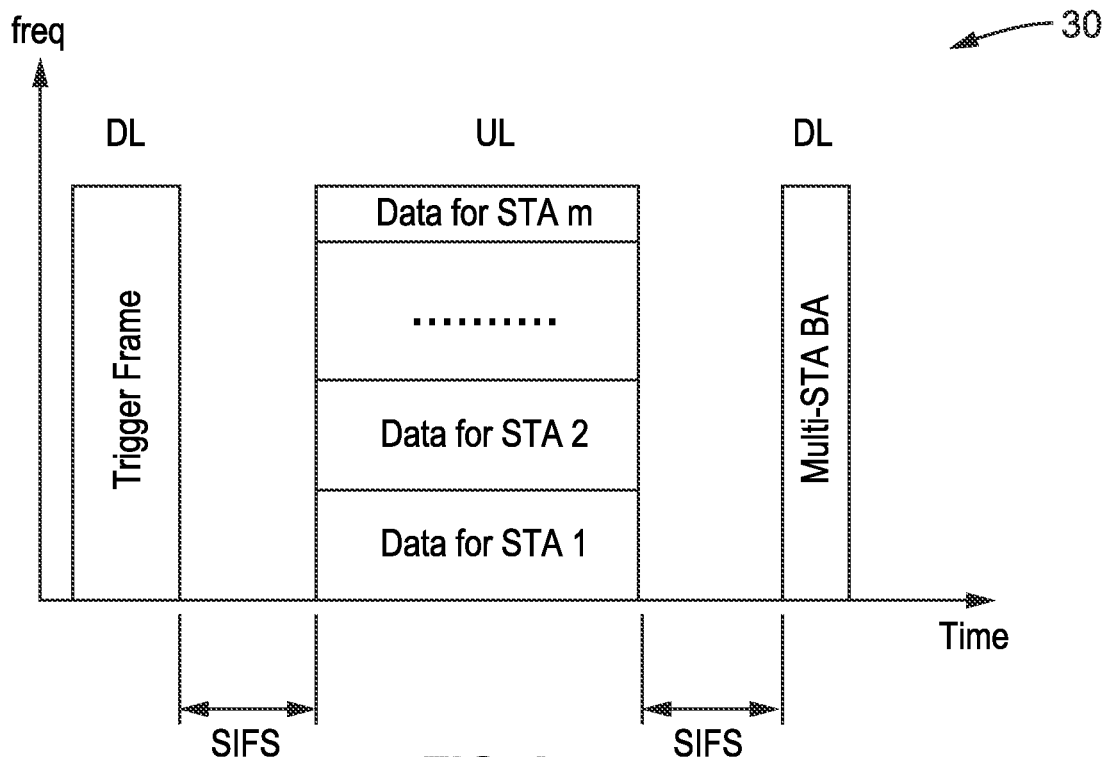
FIG. 2 is a slotted transmission diagram of an UpLink (UL) Orthogonal Frequency Division Multiple Access (OFDMA) Multiple Input Multiple Output (MIMO).

FIG. 2 shows an example 30 of a UL OFDMA MIMO transmission. The AP is sending a trigger frame to all STAs containing the frequency and/or RU mapping and RU assignments for the STAs. The UL MIMO transmission is preferably synchronized to the reception of that frame where STAs start transmission with a SIFS after the reception of the DL trigger frame.

2.1.3. Retransmission

Figure 3:
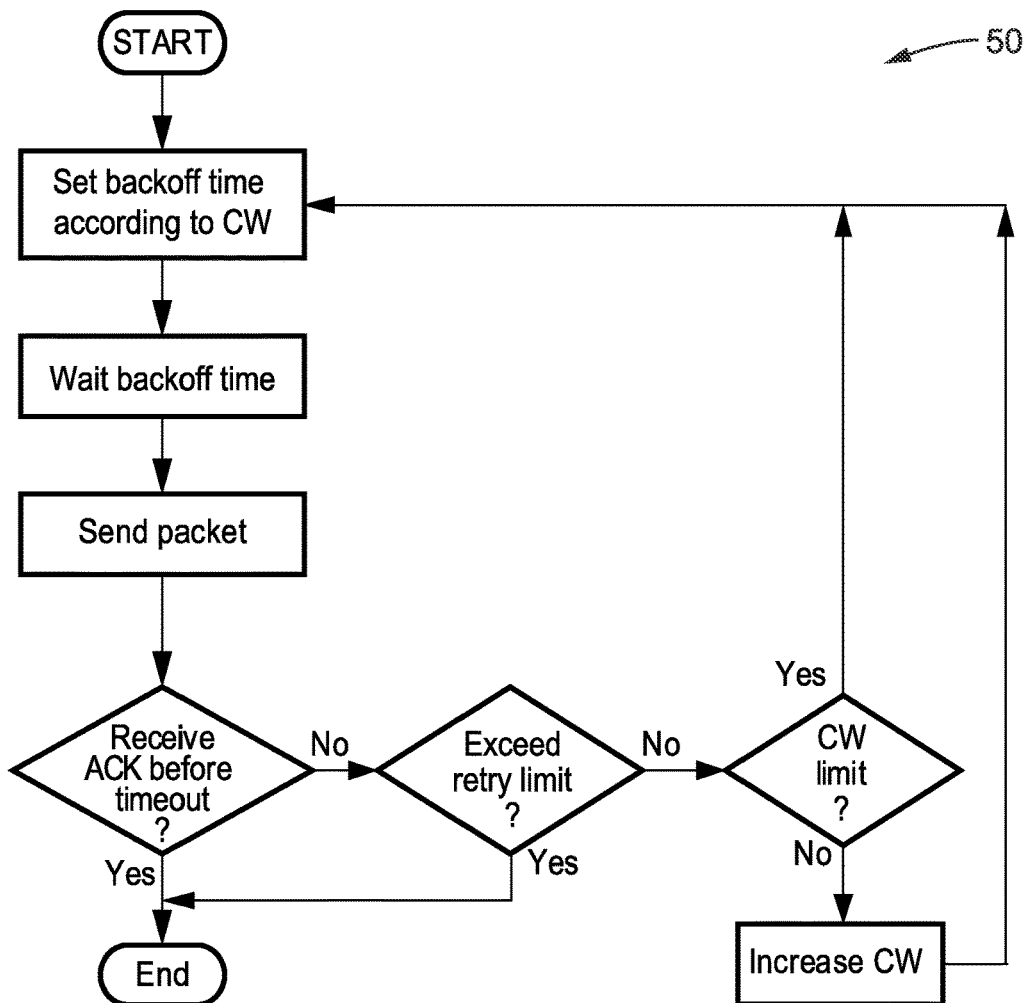
FIG. 3 is a flow diagram of a conventional retransmission scheme in CSMA/CA.

FIG. 3 illustrates the retransmission scheme 50 in CSMA/CA. WLAN systems of IEEE 802.11 use CSMA/CA to allow STAs to have access to the channel for packet transmission and retransmission. In CSMA/CA systems, before each transmission and retransmission, the STA is required to sense the channel state and if it does not appear busy to set a backoff time to contend for channel access. The backoff time is decided by a uniform random variable between 0 and the size of contention window. After the STA waits for the backoff time and senses that the channel is idle, the STA sends a packet. The retransmission is required if the STA does not receive an ACK before timeout. Otherwise, the transmission succeeds.

When the retransmission is required, the STA checks the number of retransmissions of the packet. If the number of retransmissions exceeds the retry limit, then the packet is dropped and no retransmissions are scheduled. Otherwise, the retransmission is scheduled. If the retransmission is scheduled, then another back off time is needed to contend for channel access for the retransmission. If the size of the contention window does not reach its upper limit, then the STA increases it. The STA sets another back off time depending on the new size of the contention window. The STA waits the back off time for retransmission and so on so forth.

Figure 4:
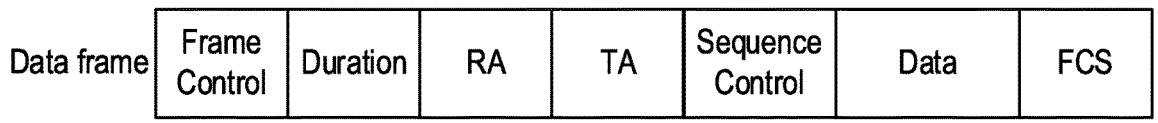
FIG. 4 is a data field diagram of a packet frame format for carrying Data in a regular WLAN system.

FIG. 4 illustrates the data frame format 90 in the regular WLAN system. A Frame Control field indicates the type of frame. A Duration field contains NAV information used for CSMA/CA channel access. An RA field contains an address for the recipient of the frame. A TA field contains the address of the STA that transmitted the frame. A Sequence control field contains the fragment number and the sequence number of the packet. A Data field is shown for conveying the data to be communicated. A Frame Check Sequence (FCS) is seen here, and in many other data formats described in the present disclosure, it provides an error-detecting code added to a frame in a communications protocol.

Figure 5:
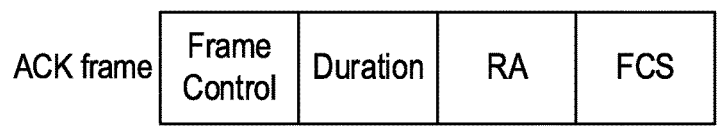
FIG. 5 is a data field diagram of an ACK packet frame format in a regular WLAN system.

FIG. 5 illustrates an ACK frame format 110 in a regular WLAN system. A Frame Control field indicates the type of the frame. A Duration field contains NAV information used for CSMA/CA channel access. An RA field contains an address for the recipient of the frame. A Frame Check Sequence (FCS) is seen here and in many other data format described in the present disclosure and provides an error-detecting code added to a frame in a communications protocol.

Figure 6:
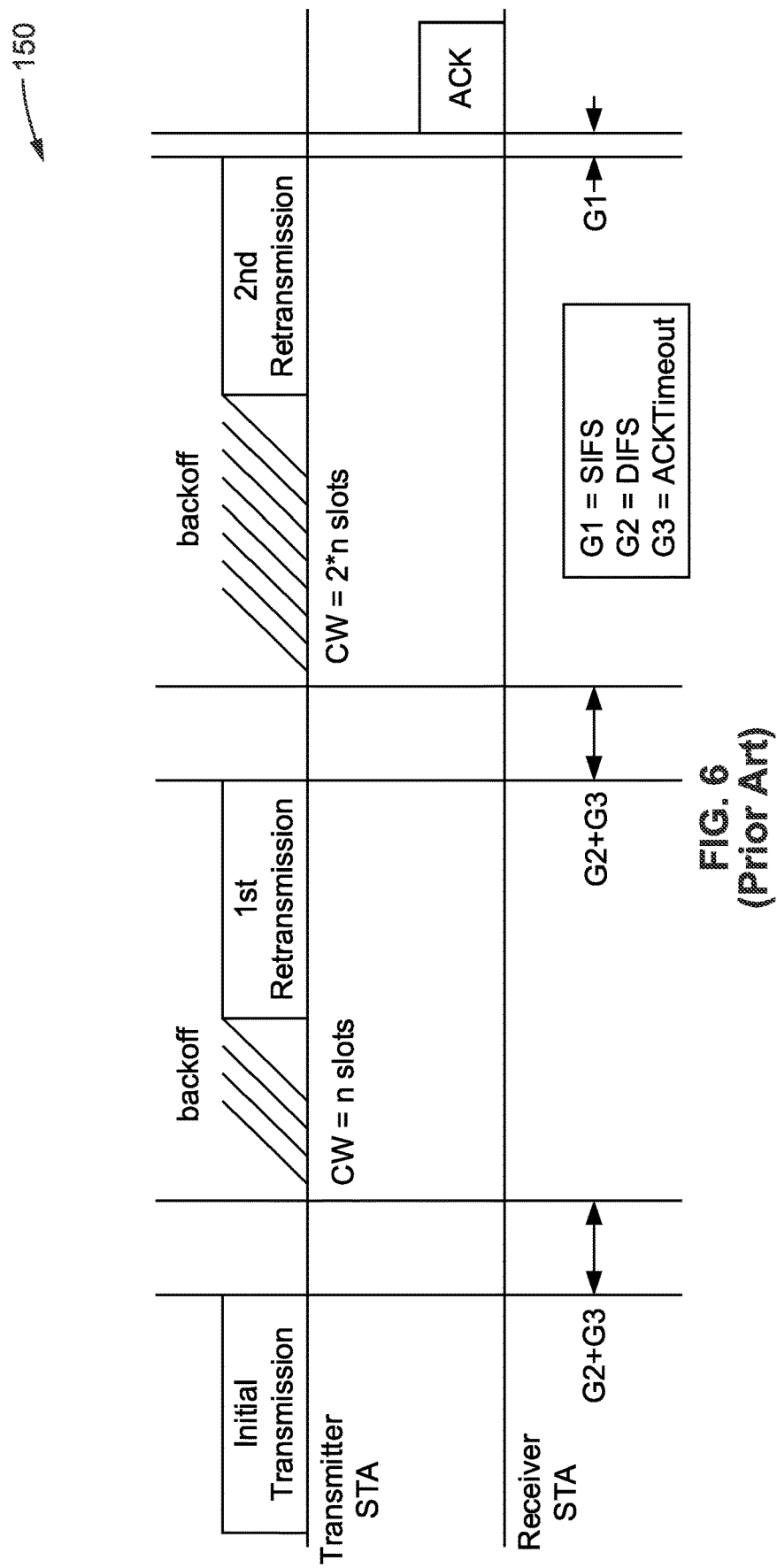
FIG. 6 is a communication sequence diagram of a double sized contention window when performing retransmission in CSMA/CA.

FIG. 6 illustrates a double sized contention window 150 utilized in an example of retransmission under CSMA/CA where the backoff time is increased for each retransmission. The data packet frame and the ACK frame use the formats as shown in FIG. 4 and FIG. 5, respectively. After the transmitter transmits the initial transmission of a packet, it does not receive the ACK before timeout. Then, it sets another backoff time, whereby the size of contention window is "n" slots. After waiting the backoff time, the transmitter STA retransmits the packet for the first time. However, the retransmission also fails. The transmitter STA needs to retransmit the packet and sets the backoff time again to contend for channel access. This time, the size of the contention window is doubled, which is 2*n slots, due to the retransmission. The expected backoff time is also doubled by the contention window size. The second retransmission succeeds since it receives an ACK before timeout.

Figure 7:
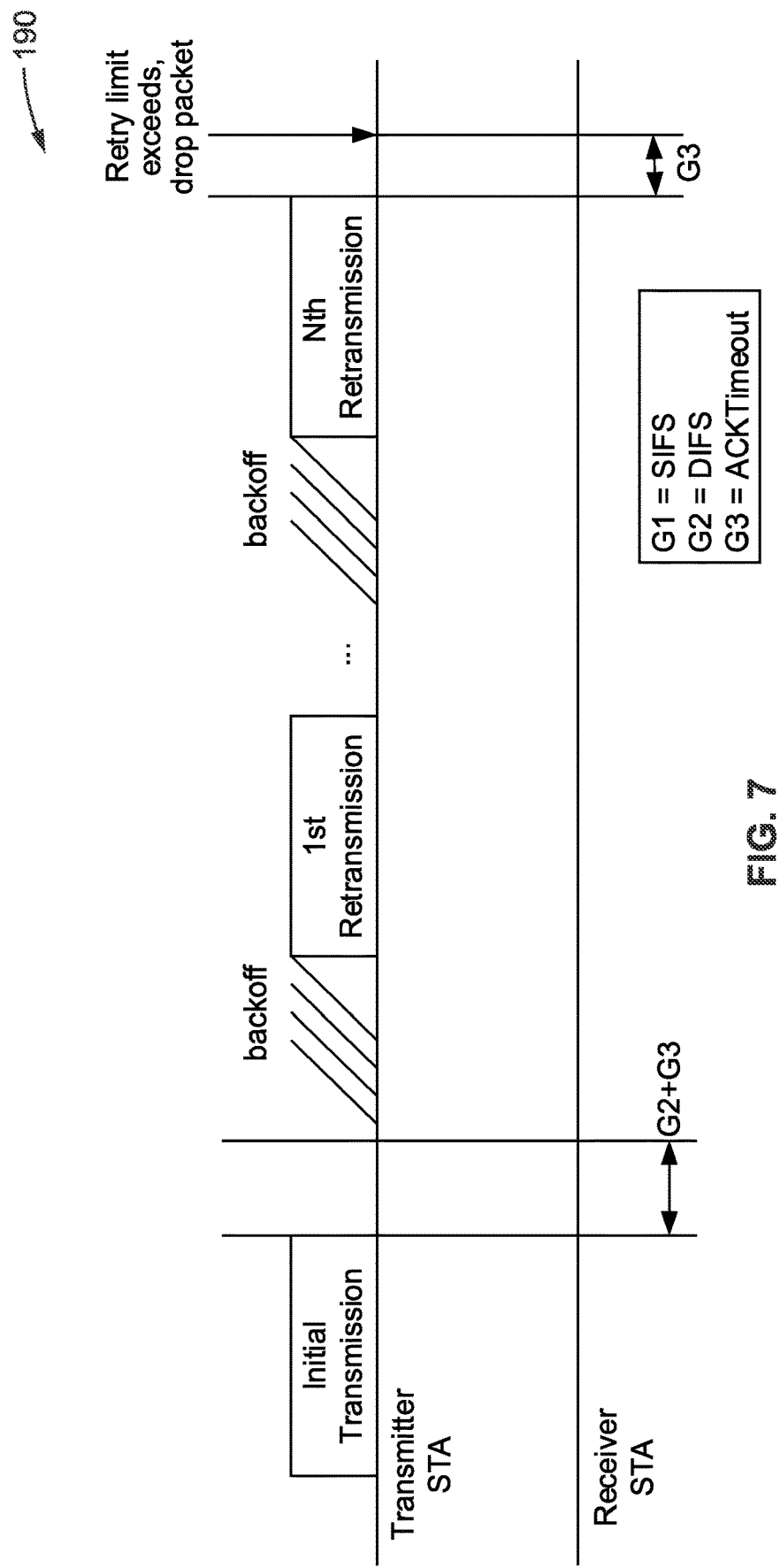
FIG. 7 is a communication sequence diagram of a packet dropped due to the retry limit in CSMA/CA.

FIG. 7 depicts an example 190 of a packet dropped due to the retry limit in CSMA/CA being exceeded. The data packet frame and the ACK frame use the formats as shown in FIG. 4 and FIG. 5, respectively. As shown in the figure, after the initial transmission of a packet fails, the transmitter STA retransmits that packet multiple times. However, none of the retransmissions succeed. After retransmitting N times, the number of retransmission exceeds the retry limit. The transmitter STA stops retransmitting that packet and that packet is dropped.

Figure 8:
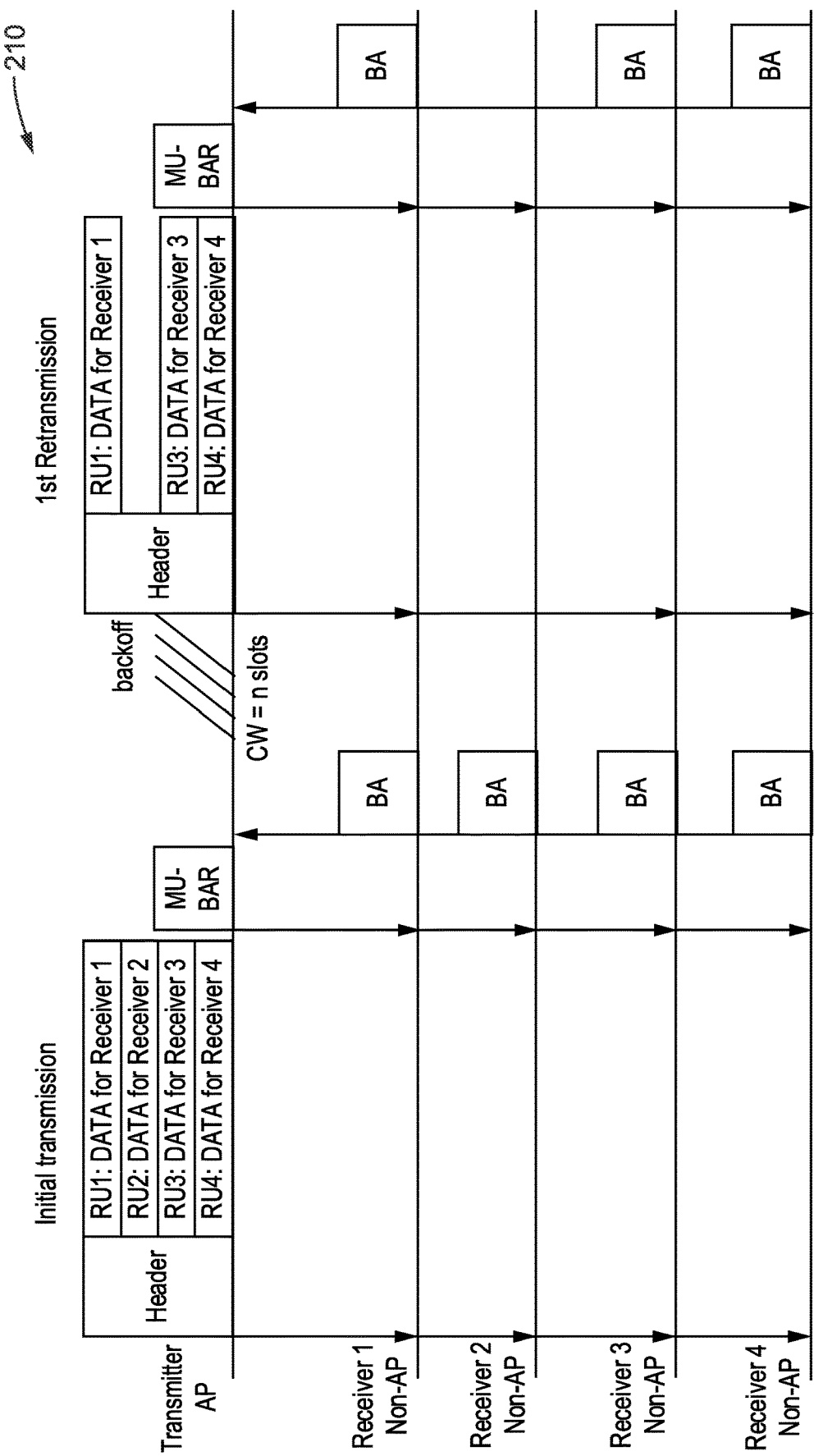
FIG. 8 is a communication sequence diagram of a legacy retransmission scheme in the downlink of an OFDMA system.

FIG. 8 depicts a legacy retransmission scheme 210 showing an example of downlink multi-user (DL MU) transmission using OFDMA. The transmitter AP transmits data packets to its receivers 1, 2, 3, and 4. The data packet could use the HE MU PPDU format. After finishing the initial transmission, the AP sends a multi-user Block ACK request (MU-BAR) to all the receivers. The receivers then send block ACK (BA) back to the AP. According to the content in the BAs, the AP decides to retransmit the packets to receivers 1, 3, and 4. It contends for the channel and waits the backoff time, with the first retransmission occurring after the AP gains channel access.

Figure 9:
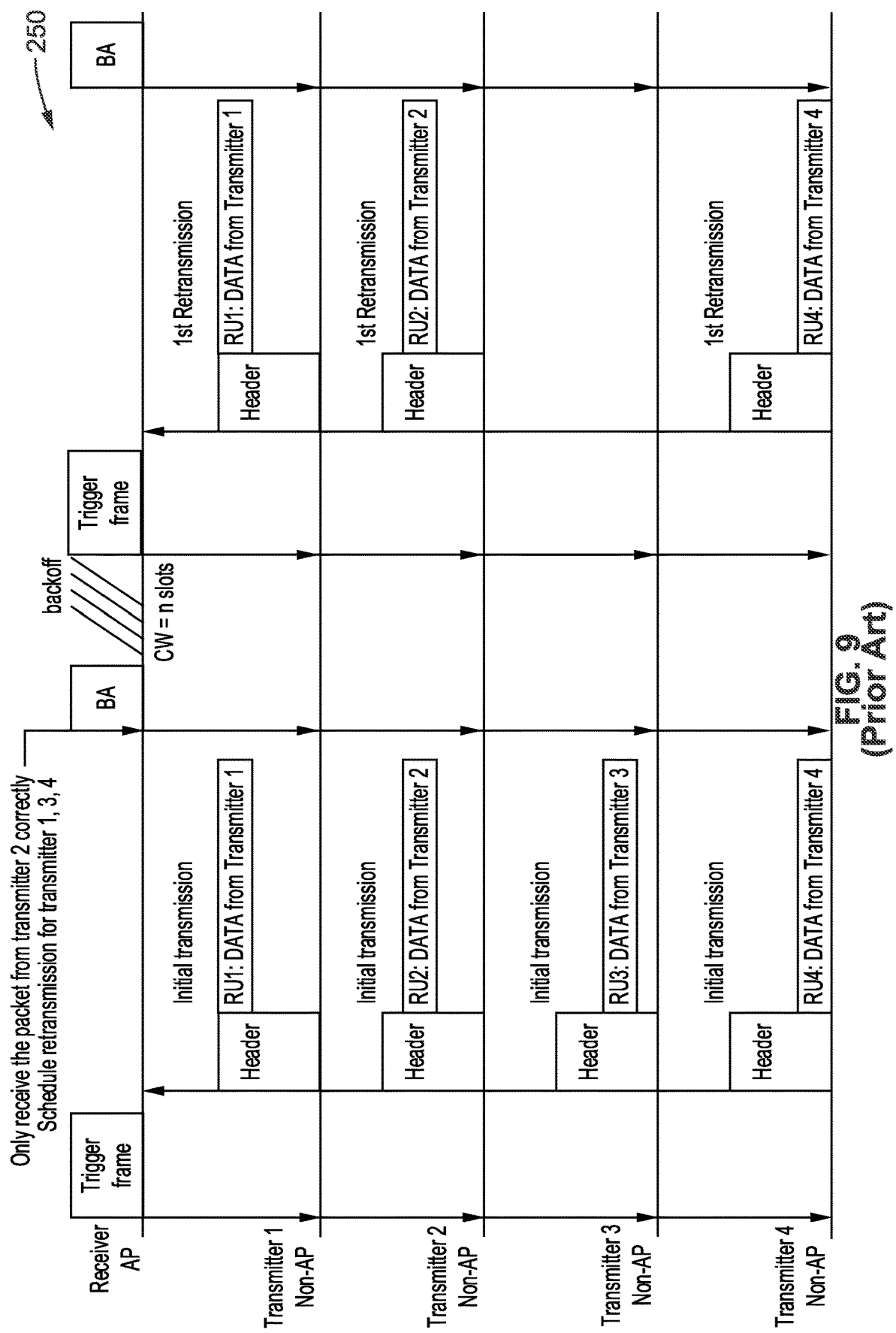
FIG. 9 is a communication sequence diagram of a legacy retransmission scheme in the uplink of an OFDMA system.

FIG. 9 depicts a legacy retransmission scheme 250 showing an example of uplink multi-user (UL MU) transmission using OFDMA. The AP first sends a trigger frame to all the transmitters 1, 2, 3, and 4. The transmitters receive the trigger frame and start the initial transmission using the channel resource allocated by the trigger frame. The data packets could use the High Efficiency (HE) trigger based (TB) PPDU format. It will be noted that a PPDU is a Physical Layer Conformance Procedure (PLCP) Protocol Data Unit (PPDU). The AP receives the data packets from the transmitters and sends a BA frame to report the correctness of the transmission. In this example, only the packet from transmitter 3 was received correctly and a retransmission needs to be scheduled for transmitters 1, 2, and 4. The AP contends for the channel and waits a backoff time to gain channel access, after which retransmission proceeds in the same manner as the initial transmission.

3. Problem Statement

For the MU UL transmission, previous techniques, such as 802.11n/ac implements Request-To-Send/Clear-To-Send (RTS/CTS) or RTS/CTS with extensions of the channel access scheme to help avoid collisions. However, this scheme only allows one user to occupy the channel at one time. In addition, there are issues with a long delay being introduced by the overhead of RTS/CTS frame exchange.

As a comparison, the 802.11ax technique implements an OFDMA scheme, which allows different users to access the channel simultaneously by using different resource units (RUs). This improves channel utilization efficiency and reduces average delay. However, current 802.11ax techniques rely on the AP to initiate UL transmission for a shared TXOP. Meaning that if a non-AP STA senses the channel is ideal (not occupied) and the STA has DATA to transmit to the AP, it is required to wait until receiving a trigger frame from the associated AP to join the shared TXOP for UL DATA transmission. Also, the STA has to rely on the AP to schedule and distribute available channel resources between this non-AP STA who grabs (obtains) the channel and the other non-AP STAs. In this case, the protocol does not capture the dynamic needs from the non-AP STA and it introduces several problems including low channel utilization efficiency and, thus, increased delay.

Besides, the TXOP gained from one TXOP holder cannot be shared among several cooperative stations. In this case, each station needs to compete for the TXOP for itself.

In a previous disclosure by the inventors, the non-AP STAs can share TXOP with other non-AP STAs spontaneously, meaning the TXOP holder STA can schedule and distribute the channel access time slot to the shared TXOP participant STAs; however, the sharing scheme is only implemented for UL transmission.

4. Contribution of the Invention

The present disclosure provides a solution to enable multi-user UL and DL transmission in the time domain over the shared TXOP in a single BSS, which can be initiated by UL or DL transmission. In this disclosure STAs share TXOPs with other STAs in the BSS in the time domain. This can beneficially reduce channel contention and channel access latency, once any STA gains access it shares its TXOP with other STAs. STAs do not necessarily need to wait for the AP to allow access to the channel through trigger based (TB) access.

The present disclosure provides three different TXOP sharing scenarios, which includes dynamic shared TXOP, semi-static shared TXOP and simplified shared TXOP. In dynamic shared TXOP, the TXOP holder station collects the current shared TXOP participant information with or without the coordination of the AP once it obtains channel access. The TXOP holder schedules the shared TXOP and assigns channel access duration and access time based on the collected information.

In the semi-static shared TXOP scenario, the shared TXOP is configured to be used with preconfigured schedules and access time allocations among all cooperative stations sharing the TXOP. Thus, once a TXOP holder obtains channel access, it broadcasts a signal to indicate the starting of the shared TXOP. Other stations that receive this signal access the channel in the shared TXOP based on the preconfigured sharing schedule.

In the simplified shared TXOP scenario, there is neither a preconfigured schedule nor a timely schedule for the shared TXOP. The TXOP holder gains the channel access and use the TXOP as much as it needed. If the TXOP holder doesn't use up the TXOP, it lets AP to loop through the other stations to share the remaining of the TXOP with indicating a limitation of sharing time for each of the station being shared. In this case, AP simply loops through each station one by one without knowing if the station is willing to participant in the shared TXOP or not.

4.1. Dynamic Scenario of Shared TXOP

A brief summary is provided below of the dynamic scenario shared TXOP protocol showing four stages, including (a) Shared TXOP setup stage, (b) Share TXOP announcement stage, (c) TXOP participant acquirement stage and (d) TXOP schedule and access stage.

In the shared TXOP setup stage, the stations (non-AP STA and AP STA) exchange their TXOP shareability information through the coordination of the AP. The shareability information indicates the station's capability of sharing or joining a shared TXOP, which could be embedded in the authentication request/response frames, association request/response frames or any other frames that are exchangeable between non-AP STAs and the AP.

In the Shared TXOP announcement stage, the TXOP holder station announces the start of a new shared TXOP after it successfully obtains (gains) channel access, with sending a signal (e.g., RTS-share) and receiving the corresponding feedback frame (e.g., CTS-share).

In the TXOP participant acquirement stage, the TXOP holder acquires the other stations to identify if they will join the shared TXOP, which is processed with or without AP coordination.

In the TXOP schedule and access stage, the shared TXOP holder schedules the shared TXOP among itself and other stations that will join the shared TXOP. The TXOP holder sends the scheduling information with/without AP coordination. Each shared TXOP participant STA shall access the channel for PPDU transmissions in the assigned time slot.

4.2. Semi-static Scenario of Shared TXOP

Figure 10:
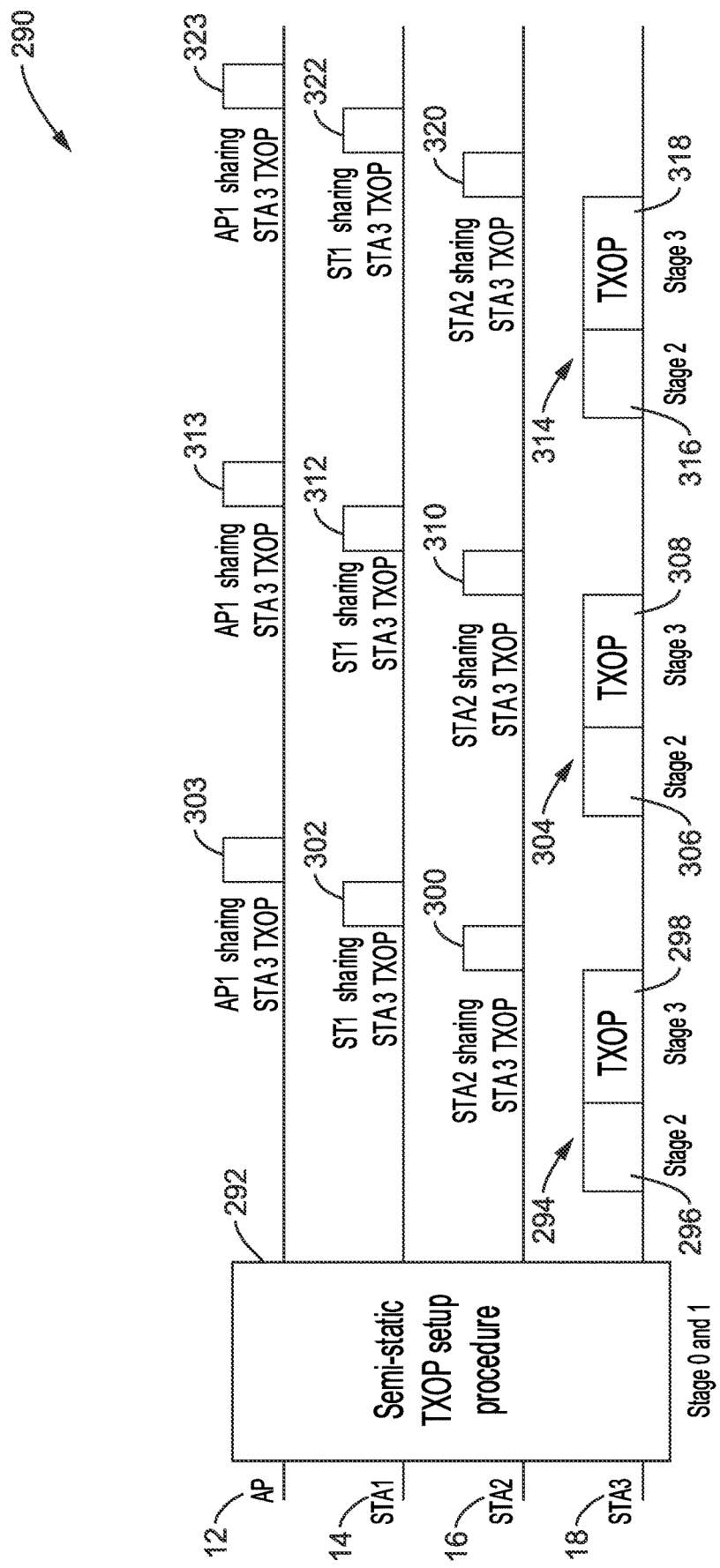
FIG. 10 is a communication sequence diagram of a semi-static scenario in the time domain, with or without the AP as coordinator, according to at least one embodiment of the present disclosure.

FIG. 10 illustrates a semi-static overview example Scenario 3 290 depicting interactions between AP 12, STA1 14, STA2 16 and STA3 18. Shown combined here is Stage 0 and Stage 1 292 which includes both a share offer/request setup stage and a TXOP holder configuration setup stage. Stage 2 represents a TXOP sharing announcement stage and Stage 3 represents a TXOP sharing phase.

The STA can set a configuration for TXOP sharing at some point through a setup procedure (with STAs or with the AP) and every time a TXOP is gained in the channel, the STA shares this TXOP with a preset number of STAs for a preset duration of time.

In the example multiple TXOP are seen 294, 304 and 314, each showing a Stage 2 TXOP sharing announcement phase 296, 306 and 316, each followed by Stage 3 TXOP sharing phase, starting the TXOP portion used by the TXOP holder STA3 298, 308 and 318. As a result recurrent sharing of the TXOP held by STA3 is performed seen with STA2 sharing 300, 310 and 320, and STA1 sharing 302, 312 and 322, and AP sharing 303, 313 and 323.

Figure 11A:
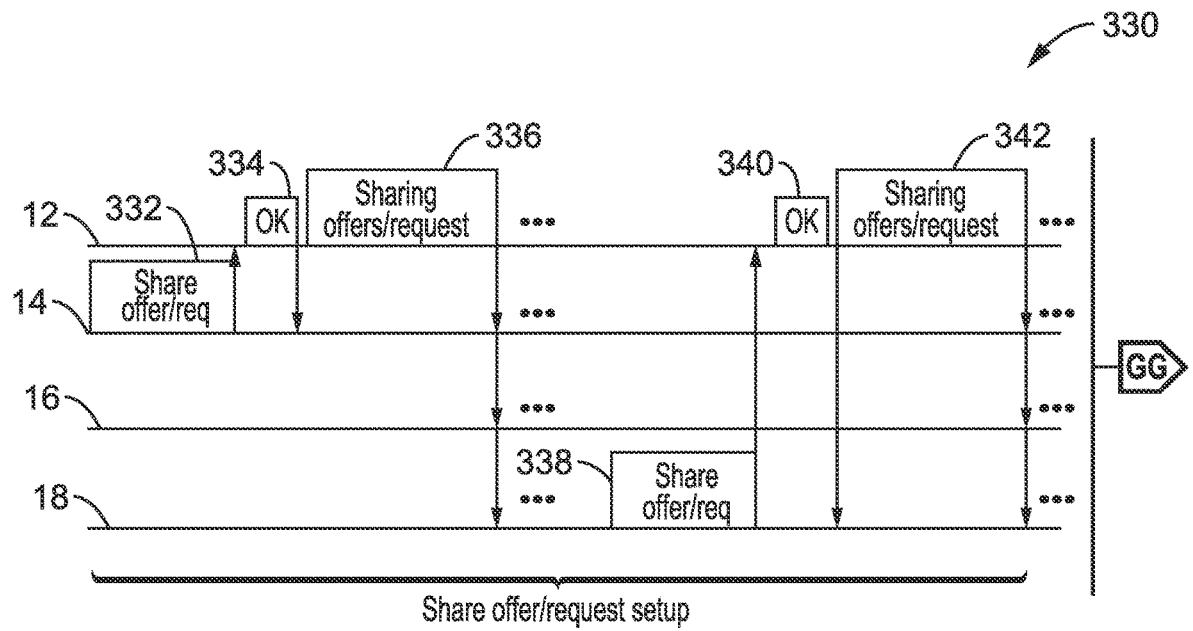
FIG. 11A through FIG. 11C is a communication sequence diagram providing a more in depth example of the semi-static scenario in the time domain according to at least one embodiment of the present disclosure.
Figure 11B:
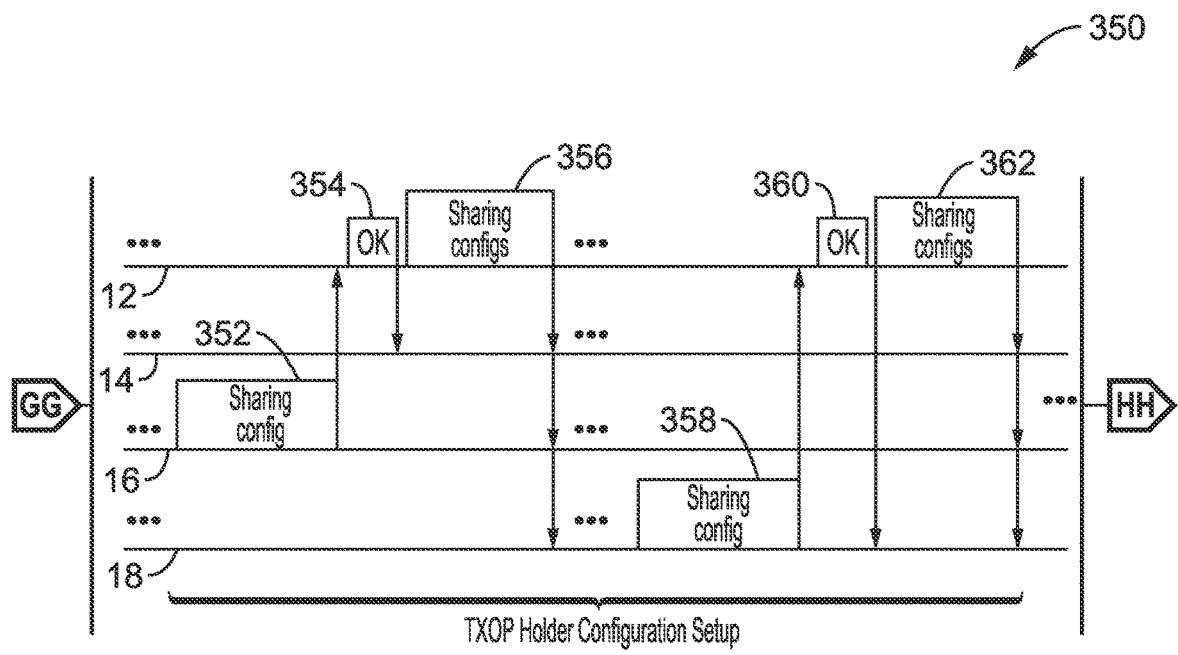
Figure 11C:
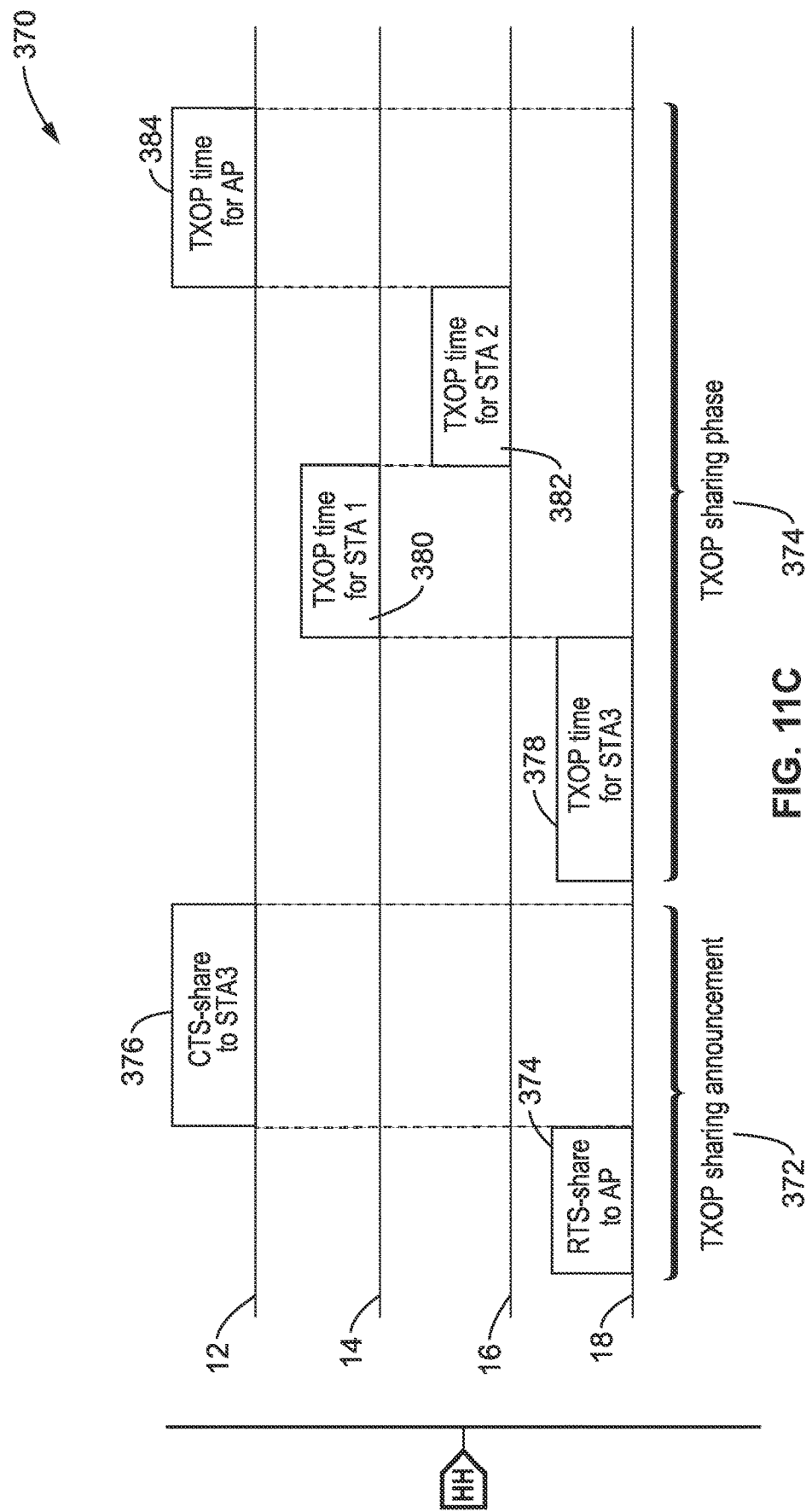

FIG. 11A through FIG. 11C illustrate an example embodiment 330, 350, 370 showing communications according to the protocol for the semi-static scenario having four stages, which was previously summarized in FIG. 10. As in the previous examples interactions are shown by way of example and not limitation between AP 12, STA1 14, STA2 16 and STA3 18.

In FIG. 11A is seen an embodiment 330 of a stage performing a share offer/request setup in which non-AP STAs exchange the share offer/request information with each other. In this example STA1 sends a share offer/request 332 to the AP, which the AP acknowledges 334 and the AP then shares 336 this information with the other STAs. Similarly, STA3 is seen sending a share offer/request 338 to the AP, which the AP acknowledges 340 and the AP then shares 342 this information with the other STAs.

In FIG. 11B is illustrated an embodiment 350 of performing a TXOP holder configuration setup stage in which a potential TXOP holder STA exchanges the configuration, semi-static TXOP sharing schedule with all STAs. In this example, STA2 sends TXOP holder configuration information 352 to the AP, which acknowledges (OKs) receipt 354, and then the AP broadcasts a sharing configuration frame to indicate the latest TXOP access configuration 356 to the other STAs. Similarly, STA3 sends TXOP holder configuration information 358 to the AP, which acknowledges (OKs) receipt 360, and then the AP broadcasts Sharing Configuration frame 362 to the other STAs.

In FIG. 11C is illustrated an embodiment 370 of a stage performing TXOP sharing announcements and TXOP sharing. In the TXOP sharing announcement stage 372 the TXOP holder STA announces that the coming TXOP is allowed to be shared according to the agreed on configuration. The TXOP holder (STA3) is seen sending an RTS-share 376 to the AP. The AP responds to STA3 with a CTS-share 376, STA1 and STA2 receive the CTS-share and thus are made aware of the NAV set in the CTS-share.

In the TXOP sharing phase 374 each station (non-AP STA and AP STA) accesses the shared TXOP according to the agreed on configuration. In response to the CTS-share, the TXOP holder (STA3) uses its portion 378 of the shared TXOP interval, after which the other stations share the TXOP, exemplified with STA 1 and STA 2 utilizing their portions 380 and 382 of the TXOP, followed by the AP using portion 384; thus all of these STAs are sharing the TXOP.

5. Non-AP STA Hardware Setup

Figure 12:
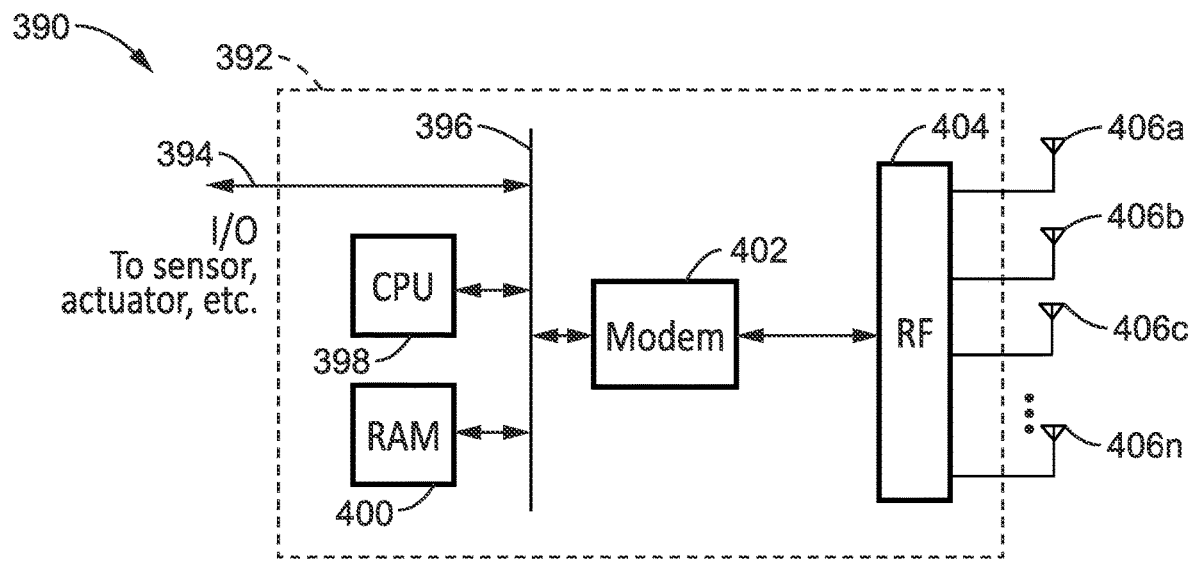
FIG. 12 is a hardware block diagram of wireless station hardware according to at least one embodiment of the present disclosure.

FIG. 12 illustrates an example embodiment 390 of a non-AP STA hardware setup, with external I/O 394 into circuitry 392 having a CPU 398 and RAM 400 for executing a program(s) which implement the communication protocol. The host machine accommodates at least one modem to support communications coupled to an RF module connected to multiple antennas for performing beamforming for transmission and reception. In this way, the STA can transmit signals using multiple sets of beam patterns.

Specifically, a WLAN station according to the present disclosure is shown with an I/O path 394 is shown into circuit block 392 which has a bus 396 connected to at least one computer processor (CPU) 398, memory (RAM) 400, and at least one modem 402. Bus 394 allows connecting various devices to the CPU, such as to sensors, actuators and so forth. Instructions from memory 400 are executed on processor 398 to execute a program which implements the communication protocol, which are executed to allow the STA to perform the functions of an access point (AP) station or a regular station (STA). It should also be appreciated that the programming is configured to operate in different modes (source, intermediate, destination, first AP, other AP, stations associated with the first AP, stations associated with other AP, coordinator, coordinatee and so forth), depending on what role it is playing in the current communication context.

This host machine is shown configured with at least one modem and RF circuit. By way of example and not limitation, a mmW modem 402 is coupled to at least one radio-frequency (RF) circuit 404 which connects to a plurality of antennas 406a, 406b, 406c through 406n (e.g., antenna array) to transmit and receive frames with neighboring STAs. The combination of processor, modem and RF circuits, allow beamformed (directional) communications to be supported, as well as for supporting quasi-omni (referred to herein simply as omni) mode transmissions from the antenna array. In addition, in at least one preferred embodiment nulls can be generated in directional patterns created by the antenna array to shield select directions (sectors) and thus reduce interference between stations.

Thus, the STA HW is shown configured with at least one modem, and associated RF circuitry for providing communication on at least one band. By way of example and not limitation the intended directional communication band is implemented with a mmW band modem and its associated RF circuitries for transmitting and receiving data in the mmW band. In some implementations another band can be supported in hardware, generally referred to as a discovery band, which by way of example and not limitation may comprise a sub-6 GHz modem and its associated RF circuitry for transmitting and receiving data in the sub-6 GHz band.

It should be appreciated that the present disclosure can be configured with multiple modems 402, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

6. Topology and Scenario Description 6.1. Topology Under Study

Figure 13:
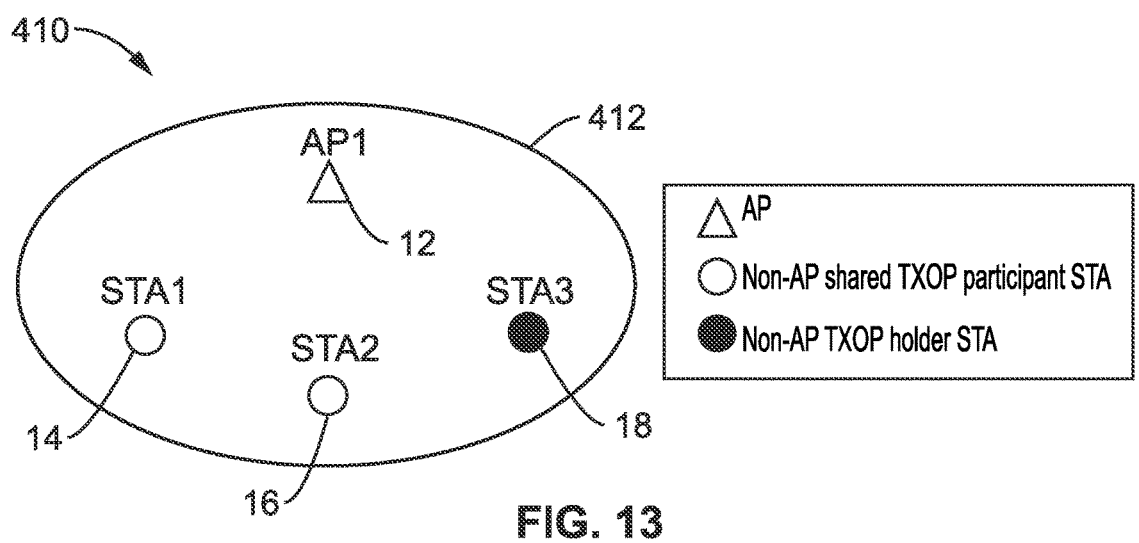
FIG. 13 is a network topology diagram shown by way of example and not limitation as a single BSS scenario, which consists of one AP and three STAs.

FIG. 13 illustrates an example topology 410 of a single Basic Service Set (BSS) scenario, which consists of one AP 12 and three STAs 14, 16 and 18, which are shown by way of example and not limitation, as the present disclosure can support any topology arising between a number of stations which may comprise APs and non-AP STAs. Among them, the station which obtains channel access is the TXOP holder, which could be an AP or non-AP STA. As shown in this present example, the TXOP holder is a non-AP STA. The stations that will join the shared TXOP and use a portion of the TXOP transmit are shared TXOP participants, and may comprise AP and/or non-AP STAs, which are denoted as AP and non-AP shared TXOP participant STAs, respectively.

However, for the sake of fostering understanding the examples given herein for illustrative purposes of interactions between only a few stations each described with their specific roles for the example; the non-AP STA initiated shared TXOP, STA3 will be generally considered the non-AP TXOP holder STA, and the other two STAs considered as non-AP shared TXOP participant STAs, while the AP may also join the shared TXOP and perform as another shared TXOP participant STAs. It will be noted that a holder STA obtains (grabs) the channel and is willing to share the TXOP with other stations. A TXOP participant station doesn't itself obtain (grab) the channel but is willing to join a TXOP shared by the TXOP holder STA. For the sake of simplifying the illustration of an AP initiated shared TXOP, the AP will be generally considered as the TXOP holder, and the rest of the stations are non-AP shared TXOP participant STAs. The AP may share a portion of its TXOP with the non-AP shared TXOP participant STAs for UL Data transmission.

6.2. Scenario Description.

The exemplified BSS contains one AP and multiple non-AP STAs. Each non-AP STA can have packets generated at different rates and in different pattern (e.g., constant, burst or periodical) that need to be transmitted to the AP. The AP also generates packets to each STA with possible different traffic rates and patterns.

This disclosure is focusing on UL/DL OFDMA transmission, for which the latency is always a critical issue due to the complex scheduling between each non-AP STA and the AP.

In 802.11ax technology, multiple non-AP STAs can send UL DATA sequences or receive DL DATA sequences simultaneously within a shared TXOP, which improves TXOP utilization efficiency.

However, in 802.11ax, the AP initiates the UL data transmission; usually by sending a trigger frame (e.g., BSRP) to the non-AP STAs to inquire on their buffer status and traffic priorities. Upon receiving a response frame (e.g., BSR) from those non-AP STAs, the AP sends another trigger frame (e.g., Basic Trigger) with resource allocation information to those non-AP STAs for them to use in sending their UL data sequence.

The AP initiated TXOP cannot capture the dynamic needs from the non-AP STAs side, especially for those non-AP STAs which have RTA (Real Time Application) packets to transmit. It will be noted that RTA packets usually are of a smaller size (fewer bytes), however, RTA packets require more expedient transmission.

In previous work by the inventors of this disclosure, once a non-AP STA obtained the channel, the non-AP STA could initiate and schedule MU-UL DATA transmission by sharing its TXOP with other non-AP STAs; but the sharing scheme was only implemented for UL transmissions.

TXOP sharing among UL and DL transmissions is implemented in the present disclosure to further increase channel utilization efficiency and to reduce delay.

In particular, the present disclosure provides the following primary attributes. (a) Once any non-AP STA gains channel access, it can initiate the shared TXOP immediately. By way of example, the non-AP STAs that obtain channel access are referred to herein as non-AP TXOP holder STAs. The TXOP holder can also be the AP if the AP obtains the channel and is willing to share its TXOP. (b) Those non-AP STAs that are willing to participate in the shared TXOP, are referred to herein as non-AP shared TXOP participant STAs. The AP can also be a shared TXOP participant in this proposal. (c) The TXOP holder shares the TXOP duration in the time domain with other shared TXOP participants in the same BSS. (d) The non-AP TXOP holder STA does not need to wait for the AP to initiate the shared TXOP access. (e) The non-AP TXOP holder STAs are capable of scheduling and distributing the available channel access time resources to other shared TXOP participant STAs. (f) The non-AP TXOP holder STA can provide scheduling information to the AP once the TXOP is reserved. (g) The potential TXOP holder can use a predetermined scheduling to allocate channel access resources. (h) If the TXOP duration allows, the TXOP is shared among UL and DL transmissions and can be initiated by either UL transmission or DL transmission.

It should be noted that the RTS-share and CTS-share frames utilized in the present disclosure are exemplified as modified RTS and CTS frames which are utilized herein for different purpose than for which they were created in IEEE 802.11 standards. Any other new (same purposed) frames can also be utilized in the same location to replace RTS-share and CTS-share to carry the same tasks. Similarly, for other frames in the present disclosure, they can be replaced by new frames or be added with new elements to carry the same tasks.

The present disclosure aids in reducing latency for accessing the channel and also increases channel utilization efficiency.

Figure 14:
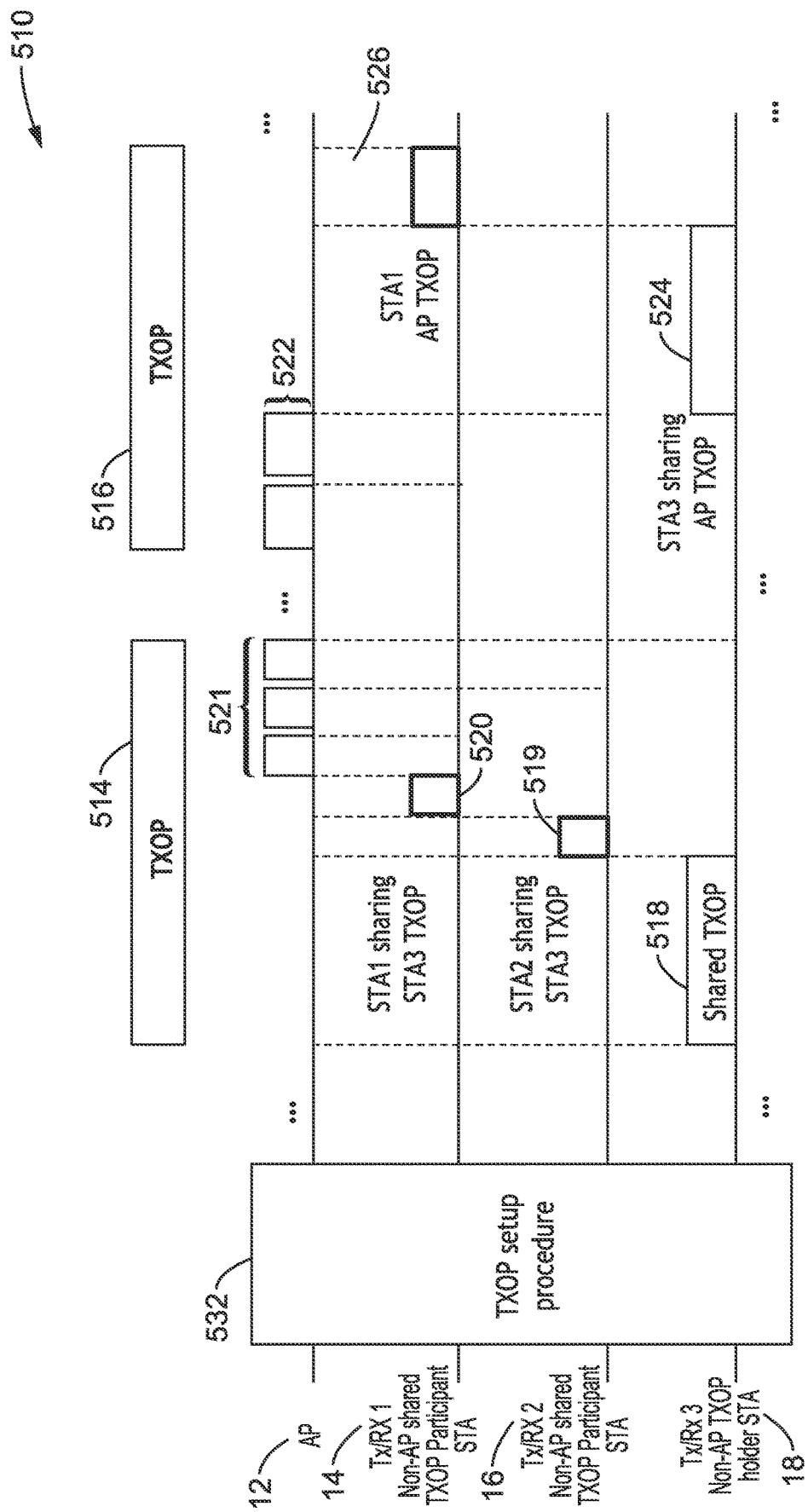
FIG. 14 is a communication sequence diagram of a shared TXOP initiated by the non-AP TXOP holder STA, according to at least one embodiment of the present disclosure.

FIG. 14 illustrates an example embodiment 510 of shared TXOPs among multiple stations, including AP and non-AP stations, for transmitting both Up Link (UL) and Down Link (DL) PPDUs. The shared TXOP is exemplified as between AP 12, STA1 14, STA2 16 and STA3 18. In the figure is seen a high-level example of the shared TXOP protocol initiated by the non-AP TXOP holder STA.

In the TXOP setup procedure 532, AP and non-AP STAs exchange the TXOP shareability information with or without the coordination of the AP.

There are two TXOPs 514, 516 shown in this figure. The TXOP holder may need to confirm which non-AP STA or AP is willing to participate in its shared TXOP and schedule channel access time and duration for each of them accordingly.

In the first shared TXOP, the TXOP holder performs a UL transmission initiated shared TXOP 518. After the other non-AP STAs (in this case, STA1 and STA2) complete their UL SU PPDU transmissions 519 and 520, the AP sends DL DATA 521 to each STA (e.g., STA1, STA2 and STA3) in the assigned shared TXOP time slot.

A second shared TXOP is performed with a DL transmission initiated shared TXOP. After the AP send its DL PPDU 522 to STA1 and STA2, the non-AP STAs (STA3 and STA1) start UL SU PPDU transmissions 524 and 526, respectively using the assigned time duration.

6.3. Scenario Classification

The present disclosure includes different solutions regarding three different scenarios: (1) Dynamic scenarios: (A) Scheduling without an AP as coordinator; (i) UL initiated sharing scheme; (B) Scheduling with an AP as coordinator: (i) UL initiated sharing scheme, (ii) DL initiated sharing scheme; (2) Semi-static scenarios: (i) UL initiated sharing scheme, (ii) DL initiated sharing scheme; and (3) Simplified scenarios: (i) UL initiated sharing scheme, (ii) DL initiated sharing scheme.

These solutions for the single BSS scenario are analyzed with the described frame format.

7. Protocol Design 7.1. Overview of the Protocol Design

Figure 15:
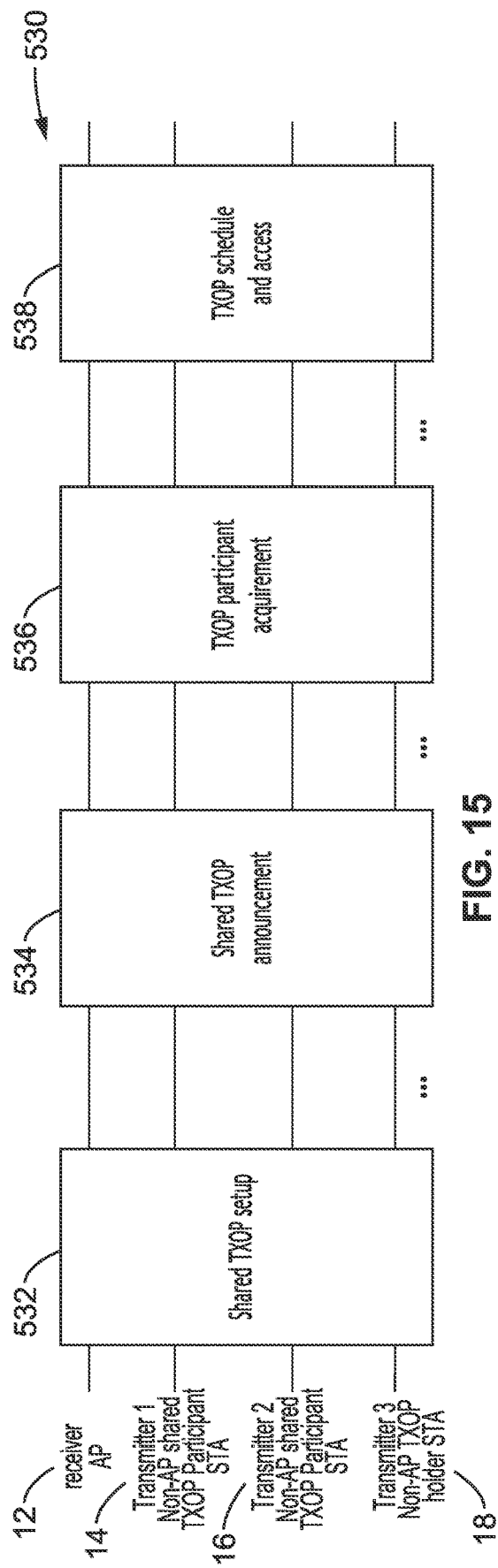
FIG. 15 is a communication sequence/protocol diagram of an overview of general steps performed in the TXOP sharing protocol according to at least one embodiment of the present disclosure.

FIG. 15 illustrates an example embodiment 530 of a general overview of the proposed protocol (for example, a TXOP holder (STA/AP)) which senses that the channel is idle and obtains (grabs) the channel and shares this channel access in the time domain with other devices in the following TXOP. If other STAs also have UL DATA to transmit or if the AP has DL DATA to send, they will access the channel following the schedule as determined by the shared TXOP holder or based on the predetermined semi-static scheduling scheme. The proposed protocol is exemplified to include four stages and can be applied to different channel access designs such as random access and scheduled access.

In the first stage of shared TXOP setup 532, the non-AP STAs and the AP exchange the TXOP shareability information (that indicates if the STAs or AP is willing to share offer/request of the TXOP by embedded this information in the authentication request, authentication response, association request, association response or any other frames that exchanges) through the coordination of AP.

In the second stage of shared TXOP announcement, the non-AP TXOP holder STA/AP gains channel access and announces it is willing to share the TXOP with other devices. By way of example and not limitation this process is achieved by sending an RTS-share frame to indicate the following TXOP is shareable and receive a feedback CTS-share frame to confirm the successful reception.

In the third stage of TXOP participant acquirement 536, the TXOP holder inquires on the other devices (for example by unicasting or broadcasting a TXOP offer frame) to identify the shared TXOP participant stations that will join the shared TXOP, such as by receiving the access request frame from shared TXOP participant STAs/AP.

In the fourth stage of TXOP schedule and access 538, the TXOP holder and the shared TXOP participants access the channel at the reserved and scheduled time, respectively. The non-AP TXOP holder STA transmits UL DATA using the reserved time slot. The AP transmits DL DATA using the assigned time slot.

It should be appreciated that an operational protocol can be implemented which incorporates a subset (or superset) of these stages, wherein all stages are not mandatory, nor limited to these stages.

7.2. Dynamic Scenario without the AP as Coordinator

For UL initiated shared TXOP, the non-AP TXOP holder STA can directly coordinate with the AP and other non-AP STAs that are willing to participate in the shared TXOP. For DL initiated shared TXOP, the AP is the TXOP holder and can directly coordinate with other non-AP STAs that are willing to participate in the shared TXOP.

7.2.1 Shared TXOP Setup Stage

Figure 16:
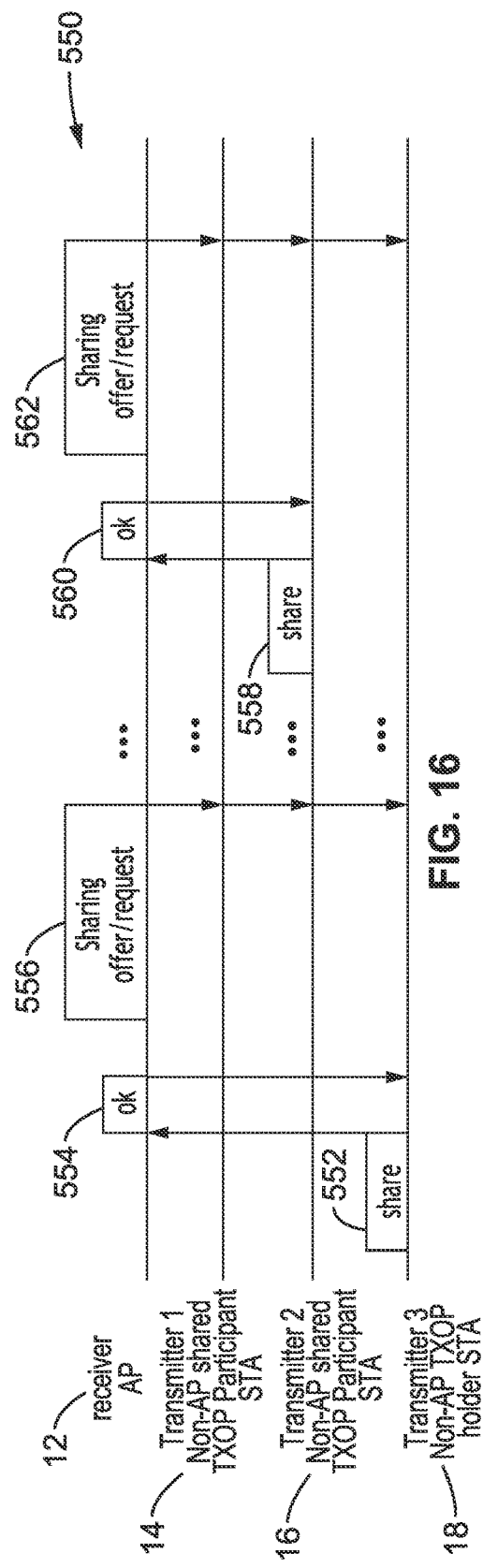
FIG. 16 is a communication sequence diagram of a shared TXOP setup stage, according to at least one embodiment of the present disclosure.

FIG. 16 illustrates an example embodiment 550 of a shared TXOP setup stage with interactions depicted between AP 12, STA1 14, STA2 16 and STA3 18. In the figure the procedure is shown of a shared information exchange in the shared TXOP setup stage.

New elements are proposed including (a) a STA TXOP Shareability Element, which is designed for exchanging sharing information; and (b) an Access Request Information Element, which is designed for exchanging access time slot information and transmission request information. The new elements can be embedded in the authentication request/response frame, association request/response frame, the beacon frame or any frames that can be exchanged between non-AP STA and AP.

The non-AP STAs indicate their shareability 552 in a frame exchanged with the AP, such as for example an element can be attached to the authentication request frame, association request frame or any other frame can be exchanged with the AP, which is sent to the associated AP. Once the AP receives the authentication request or the association request frame, it checks the share information and responds with a frame 554 to confirm (ACK) successful reception. Then the AP broadcasts the shareability 556 of all the associated non-AP STAs with a sharing offer/request frame. In this case, once a non-AP STA receives a sharing offer/request frame, it is thus made aware of shareability, that is to say it can determine which STAs are willing to share and/or is requesting TXOP time of other stations. Another share 558 is also seen from non-AP STA 2 to the AP, and the AP acknowledges 560 and broadcasts a sharing offer/request 562.

The shared TXOP setup stage is a common stage for the dynamic scenarios with or without using the AP as coordinator. The shareability information is implemented in management frames using a new element designed as STA TXOP Shareability Element.

In addition to the above the AP also needs to indicate its shareability when transmitting the sharing offer/request frames 556 and 562.

Figure 17:
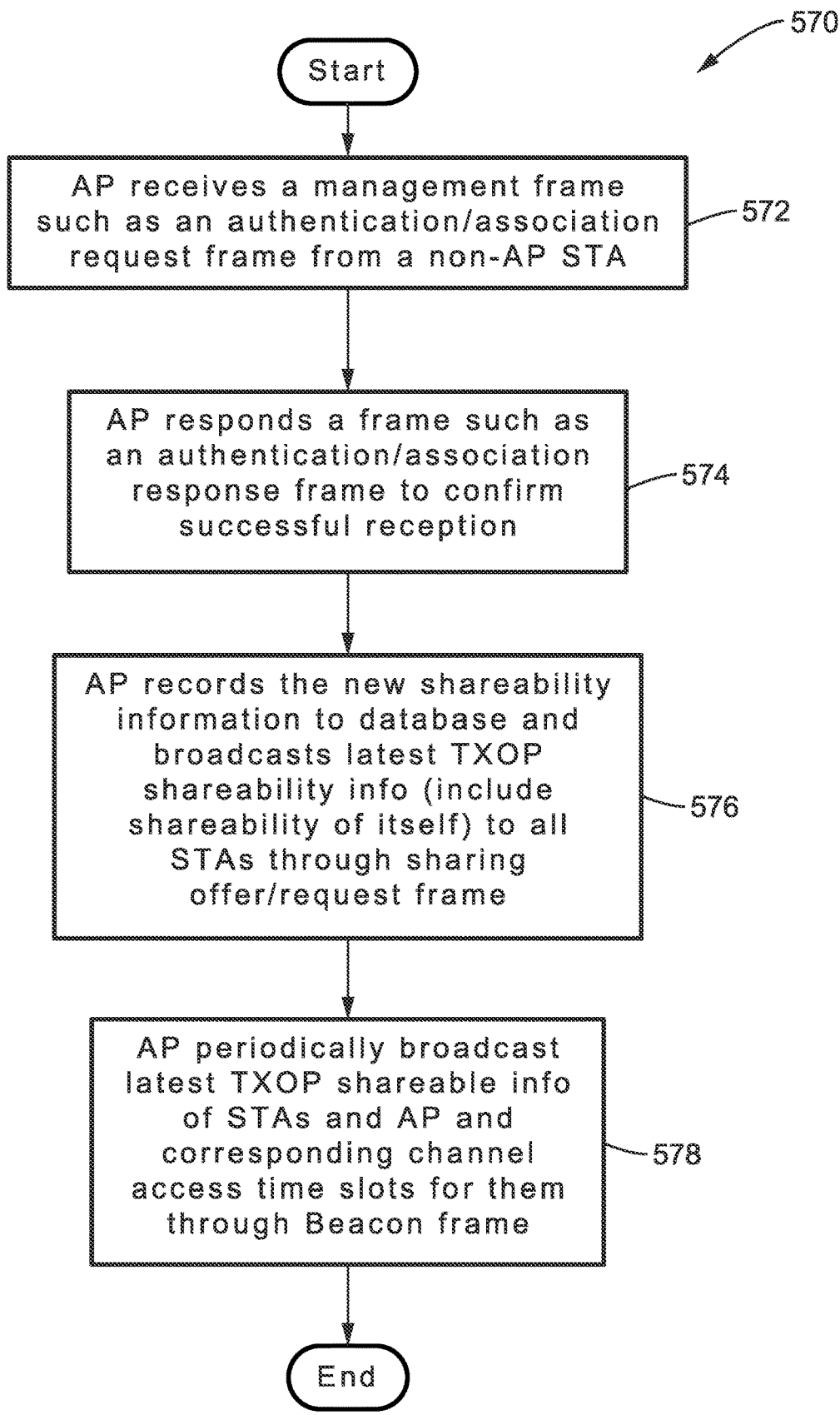
FIG. 17 is a flow diagram of a shared TXOP setup stage performed on the AP level, according to at least one embodiment of the present disclosure.

FIG. 17 illustrates an example embodiment 570 of a shared TXOP setup stage at the AP level. In the shared TXOP setup stage the AP receives 572 a management frame such as an authentication request frame or association request frame from a non-AP STA that indicates if it is willing to offer/request a shared TXOP with other non-AP STAs. The AP retains information on this non-AP STA's shareability and responds back by sending 574 an authentication/association response frame to confirm successful reception. Then the AP preferably first records 576 the latest shareability information to its database and then rebroadcasts the latest shareability information to all the associated non-AP STAs, including the shareability of itself with a sharing offer/request frame. The AP also periodically broadcasts 578 the latest TXOP shareable information of the STAs and the AP as well as channel access time slot assignments through a transmission, such as a Beacon frame.

Figure 18A:
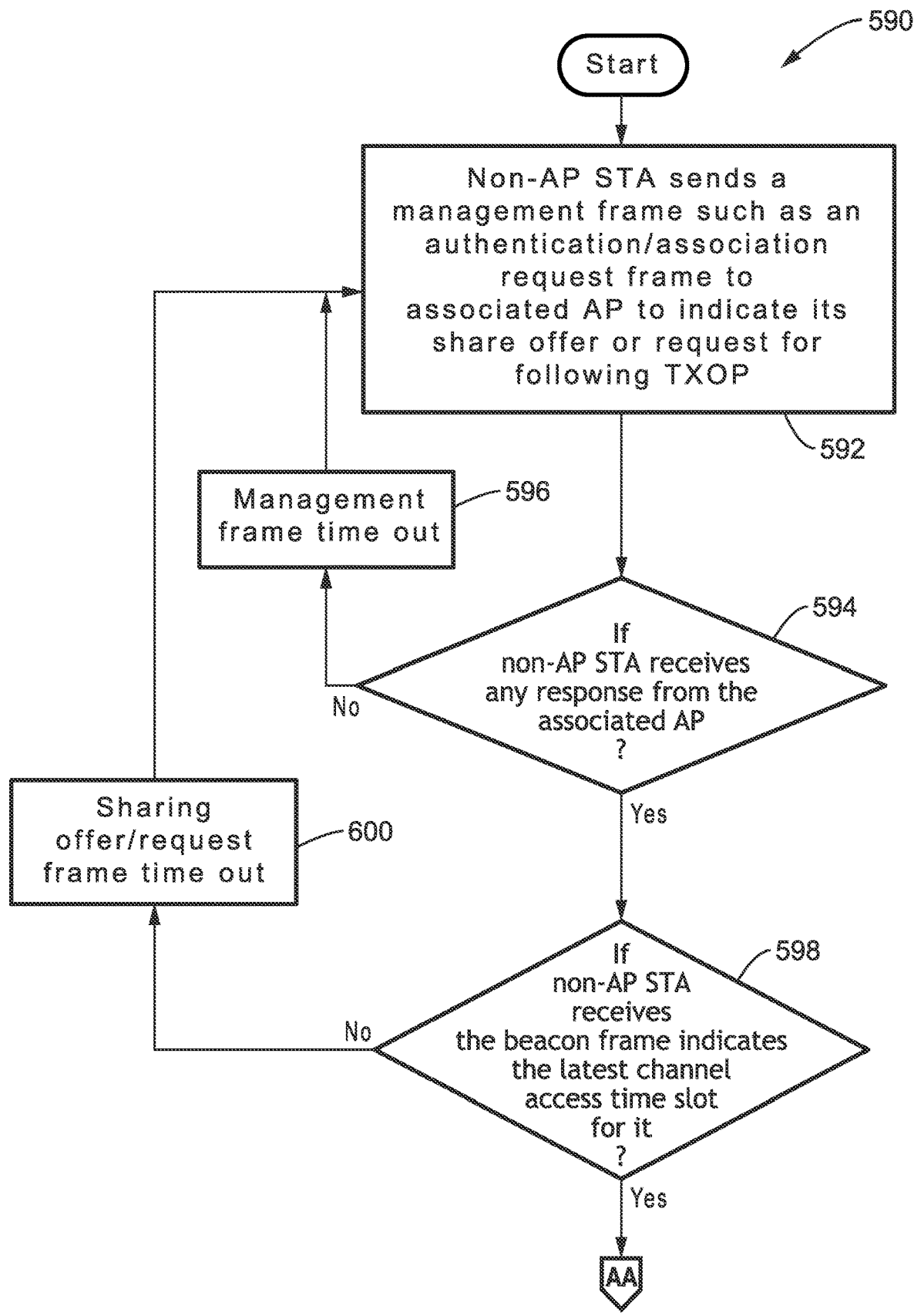
FIG. 18A through FIG. 18B is a flow diagram of a shared TXOP setup stage performed on the non-AP STAs level according to at least one embodiment of the present disclosure.
Figure 18B:
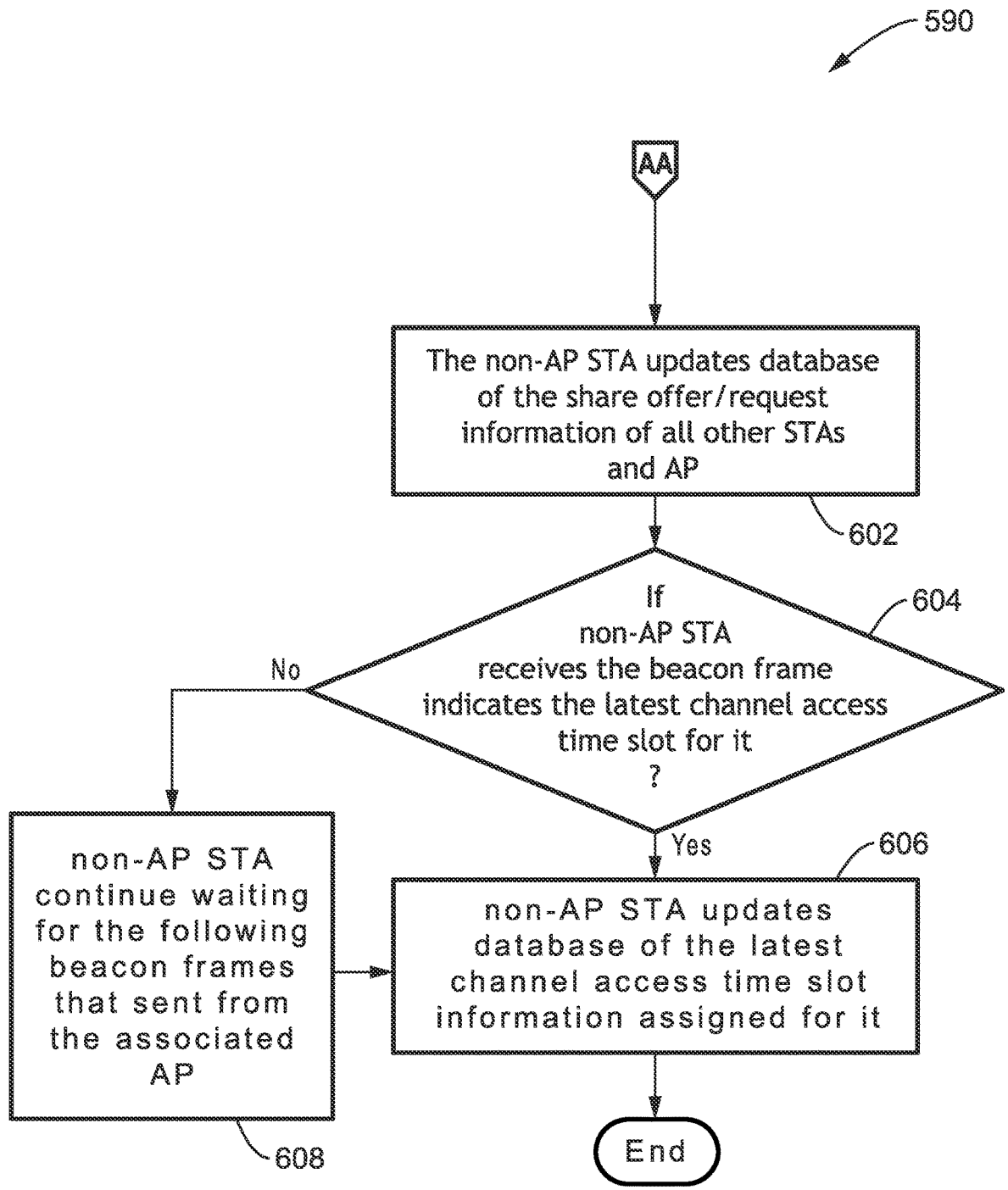

FIG. 18A and FIG. 18B illustrate an example embodiment 590 of the shared TXOP setup stage that is handled on a non-AP STAs level. In the figure the non-AP STA sends 592 a management frame, such as an authentication/association request frame to the associated AP to indicate its share offer/request information of the shared TXOP. A check 594 determines if the non-AP STA receives feedback from the associated AP before the management frame times out, after it has sent an authentication frame or the association frame that contains the share offer/request information. If no response is received, then a management frame time out 596 has occurred, and the non-AP STA should retransmit 592 the management frame to the associated AP to indicate its shareability.

If at block 594 if it is determined that the non-AP STA receives a response then block 598 is reached which determines if the response is a sharing offer/request frame from the associated AP indicating the latest TXOP shareability information of all associated non-AP STAs. If the non-AP STA cannot receive the latest channel access time slot assigned for it through sharing offer/request frame or beacon before the sharing offer/request frame timeout, then block 600 is reached as the sharing offer/request has timed out, and the non-AP STA should send another frame 592.

Otherwise, if the shareability information is received, then block 602 is reached in FIG. 18B and the non-AP STA updates its database of the share offer/request information for all other STAs and the AP.

A decision is then made 604 to determine if the non-AP STA received the beacon frame or a sharing offer/request frame indicating the latest channel access time slot for it. If it receives this beacon frame or sharing offer/request frame, then at block 606, the non-AP STA updates the database of its latest channel access time slot. Otherwise, if it did not receive this beacon frame or a sharing offer/request frame at block 604, then the non-AP STA should keep waiting 608 for the following beacon frames or sharing offer/request frames sent from the associated AP, and keep updating 606 the database based on the latest channel access time slot information assigned for it.

7.2.2. Shared TXOP Announcement Stage

FIG. 19 illustrates an example embodiment 630 of a shared TXOP announcement stage being performed after the shared TXOP setup stage 532 with interactions depicted between AP 12, STA1 14, STA2 16 and STA3 18. The non-AP TXOP holder STA senses that the channel is free (available) and it obtains the channel, and announces its willingness to share the TXOP by sending an RTS-share frame 634 to the AP, the other non-AP stations receive the RTS-share frame and are made aware of the NAV 638, 640

(set in RTS-share). After the AP receives the RTS-share frame 634 from a non-AP TXOP holder STA, it responds with a CTS-share frame 636 to STA3 indicating successful reception and that it is aware that the TXOP is a shared TXOP. The other non-AP stations receive the CTS-share then check the NAV 642, 644 (set in CTS-share).

Other than the above example, it should be appreciated that the AP can be the shared TXOP holder as well. When AP is the TXOP holder, the AP may send an RTS-share to the destination station of its buffered Data and receive a CTS-share frame to indicate successful transmission.

7.2.3. A UL initiated TXOP Participant Acquirement Stage
7.2.3.1. UL initiated TXOP Participant Acquirement with Response after Receiving TXOP Offer FIG. 20 illustrates an example embodiment 650 of a TXOP participant acquirement stage with response after receiving a TXOP offer with interactions depicted between AP 12, STA1 14, STA2 16 and STA3 18. A shared TXOP setup is performed 532 followed by shared TXOP announcement 534. Then the non-AP TXOP holder STA broadcasts 654 a new frame TXOP Offer frame to the STAs and the AP, indicating that it is willing to share its TXOP, and inquiring if other STAs are willing to join the shared TXOP.

Once STA1, STA2 and the AP receive this TXOP Offer frame, they respond 656*a*, 656*b* and 656*c* with a new Access Request frame to indicate that they are willing to join the following shared TXOP with the non-AP TXOP holder STA.

In order to avoid collision of the Access request frames, slot design is implemented for Random access or Dedicated access, which is implemented in the shared TXOP setup stage. Slots are seen into which responses are sent in specific slots to STA 3 about the sharing offer.

7.2.3.2. UL initiated TXOP Participant Acquirement Stage with Response after Receiving CTS FIG. 21 illustrates an example embodiment 670 of a TXOP Participant Acquirement (PA) stage with response after receiving CTS-share with interactions depicted between AP 12, STA1 14, STA2 16 and STA3 18. A shared TXOP setup 532 is seen followed by a shared TXOP announcement 534. Once the AP sends out the CTS-share frame (not shown) in the previous shared TXOP announcement stage, it sends an Access request frame in slots 672*a* to STA3 through random access or dedicated access to indicate it is willing to join the shared TXOP with the non-AP TXOP holder STA. Once STA1 and STA2, which are non-AP shared TXOP participant STAs, receive the CTS-share from AP to STA3 which is a non-AP TXOP holder STA, then STA1 and STA2 send an Access Request frame in slots 672*b*, 672*c* to STA3 through random access or dedicated access to indicate that they are willing to join the following shared TXOP by the non-AP TXOP holder STA.

7.2.3.3. UL initiated TXOP Participant Acquirement Stage with Response after Receiving Dedicated TXOP Offer Frame FIG. 22 illustrates an example embodiment 690 of a TXOP Participant Acquirement (PA) stage with response after receiving a dedicated TXOP offer. Interactions are depicted between AP 12, STA1 14, STA2 16 and STA3 18. A shared TXOP setup phase 532 is performed followed by a shared TXOP announcement phase 534. Then instead of broadcasting the TXOP Offer frame, STA3 unicasts the offer frame to inquire on potential shared TXOP participant STAs and the AP one by one. First the offer 692 is sent from STA3 to STA 1, which responds 694, then the offer is made 696 to STA2 and a response 698 is sent back. In addition, the offer 700 is sent to the AP, which responds 702.

Thus, once STA1, STA2 or the AP receive the TXOP Offer frame, then they need to respond with an Access Request frame to the non-AP TXOP holder STA within a given time period (offset) if they are willing to join the following shared TXOP.

Figure 23:
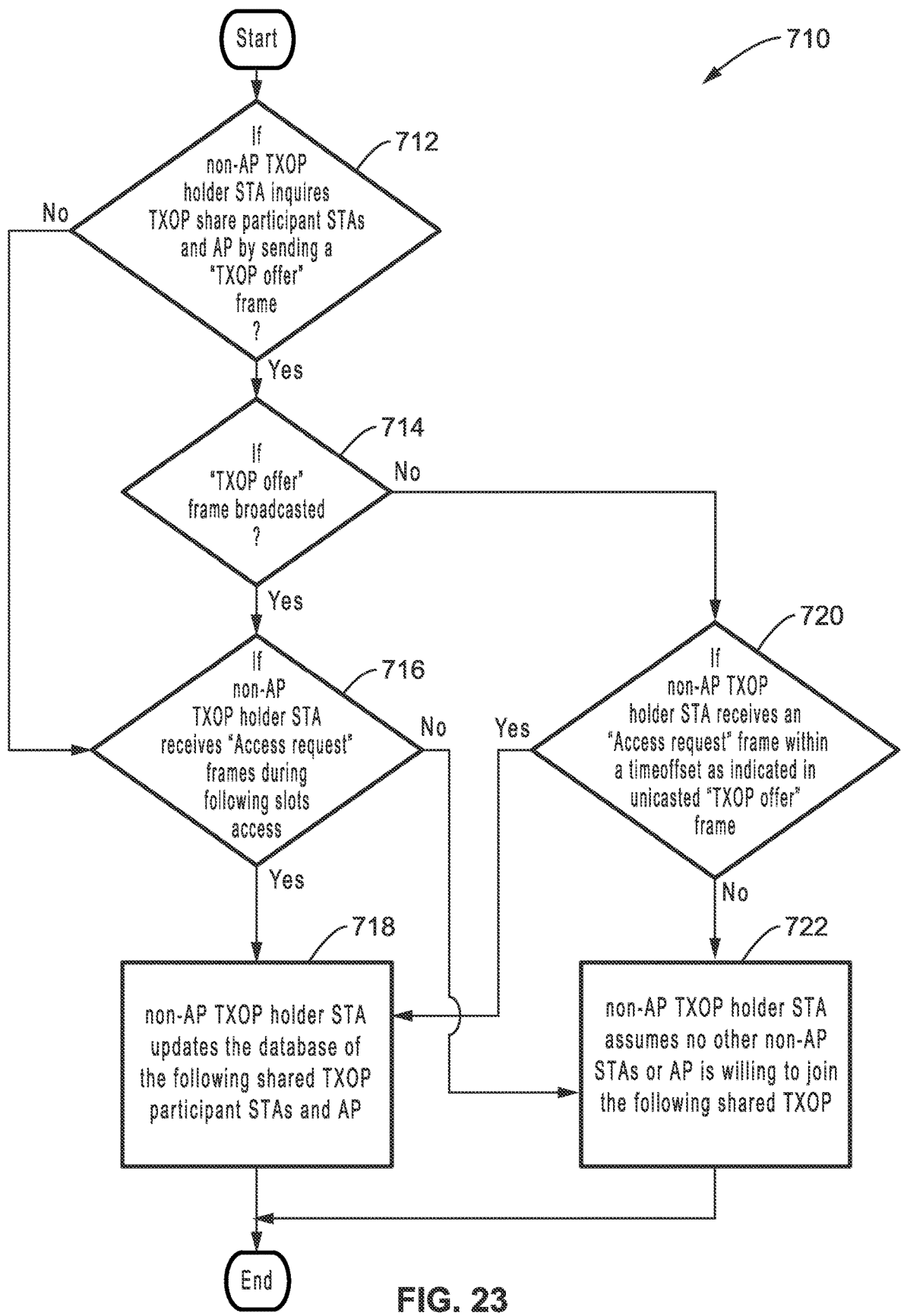
FIG. 23 is a flow diagram of a UL initiated TXOP participant acquirement stage, processed at the non-AP TXOP holder STA, according to at least one embodiment of the present disclosure.

FIG. 23 illustrates an example embodiment 710 of a TXOP participant acquirement stage, processed at the non-AP TXOP holder STA. A check is made 712 if a non-AP TXOP holder has inquired for TXOP share participant STAs and the AP. If no inquiry is detected in block 712 then execution moves to block 716. However, if inquiry is detected at block 712, then at block 714 a check is made if the TXOP Offer frame has been broadcast. If the TXOP offer has been broadcast then execution reaches block 716, otherwise execution moves to block 720.

It should be noted that once STA1 or STA2 (the non-AP shared TXOP participant STAs) or AP (shared TXOP participant) receive the TXOP offer frame, if they are willing to join the following shared TXOP, they need to respond with an Access Request frame to the non-AP TXOP holder STA within a time offset.

In block 716 a check is made if the non-AP TXOP holder STA has received an Access Request frame within a given time offset during the following slot accesses. If a proper request frame has not been received, then execution reaches block 722 and the non-AP TXOP holder STA assumes that no other non-AP STAs or AP are willing to join the following shared TXOP. Otherwise, if a proper access request frame was received at block 716, then execution moves to block 718 and the non-AP TXOP holder STA updates the database of the following shared TXOP participant STAs.

Returning to decision block 714, if non-AP TXOP holder STA doesn't send a TXOP offer frame; then execution moves to block 720 which determines if the non-AP TXOP holder STA has received a proper access request frame within the given time offset as indicated in the unicasted TXOP Offer frame. If the condition is met, then having received the access request, execution reaches block 718, otherwise execution moves to block 722.

Figure 24:
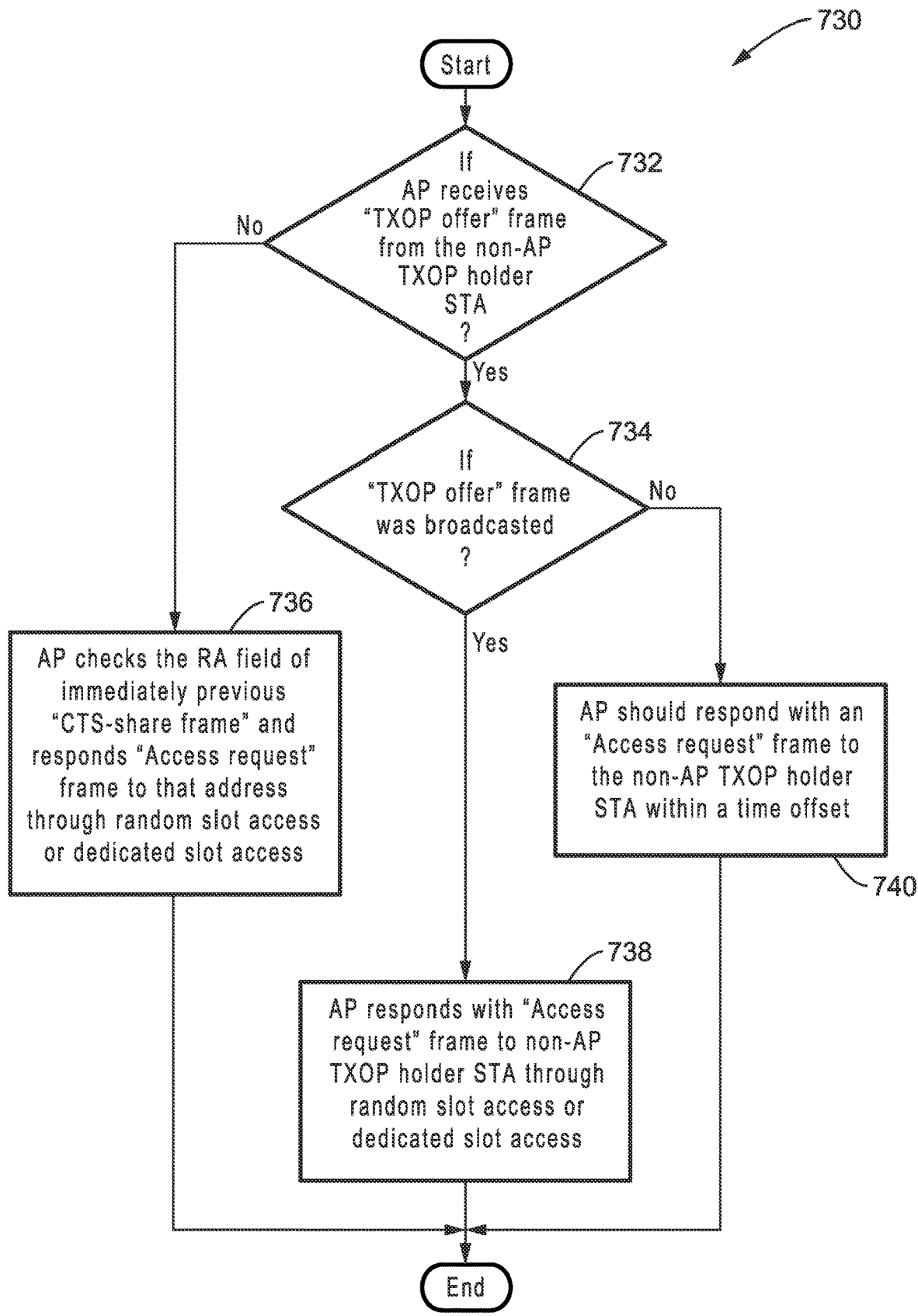
FIG. 24 is a flow diagram of a UL initiated TXOP participant acquirement stage, processed at the AP, according to at least one embodiment of the present disclosure.

FIG. 24 illustrates an example embodiment 730 of a TXOP participant acquirement stage, processed at the AP. A check is made 732 if the AP received a TXOP Offer frame from the non-AP TXOP holder STA.

If the AP does not receive a TXOP Offer frame from the non-AP TXOP holder STA, then at block 736 the AP checks the RA field of the immediately previous CTS-Share frame and responds with an Access Request frame to that address through random slot access or dedicated slot access.

Otherwise, if the TXOP offer was received at block 732, then a check is made at block 734 to determine if the TXOP Offer frame was broadcast. If the frame was broadcast, then at block 738 the AP responds with an Access Request frame to the non-AP TXOP holder STA through random slot access or dedicated slot access.

However, if the TXOP offer was not broadcast at block 734, then block 740 is reached and the AP responds with an Access Request frame to the non-AP TXOP holder STA within given a time offset.

It should be noted that the dedicated slot duration is indicated by the Allocation Block Duration subfield of the Access request information element of the previously exchanged management frames in the shared TXOP setup stage.

Figure 25:
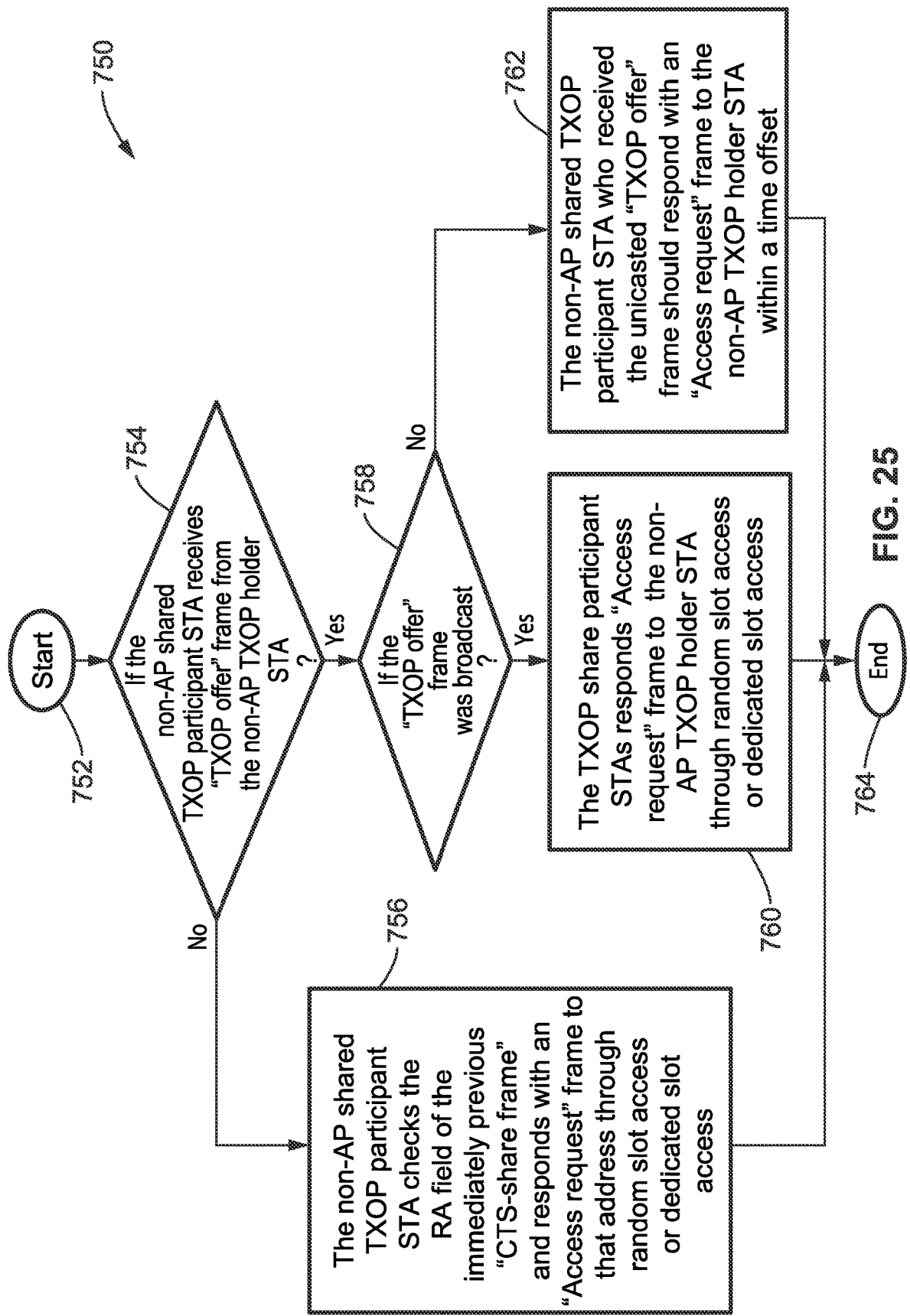
FIG. 25 is a flow diagram of a UL initiated TXOP participant acquirement stage, processed at the non-AP shared TXOP participant STA, according to at least one embodiment of the present disclosure.

FIG. 25 illustrates an example embodiment 730 of a TXOP participant acquirement stage, processed at the non-AP shared TXOP participant STA side. Processing starts 752, then a check is made 754 if the non-AP shared TXOP participant STA has received a TXOP Offer frame from the non-AP TXOP holder STA.

If the non-AP shared TXOP participant STA does not receive a TXOP Offer frame from the non-AP TXOP holder STA, then at block 756 the STA checks the RA field of the immediately previous CTS-Share frame and responds with an Access Request frame to that address through random slot access or dedicated slot access, before the process ends 764.

If the TXOP offer was received at block 754, then a check is made at block 758 to determine if the TXOP Offer frame was broadcast. If the frame was broadcast, then at block 760 the non-AP shared TXOP participant STA responds with an Access Request frame to the non-AP TXOP holder STA through random slot access or dedicated slot access, before the process ends 764.

Otherwise, if the TXOP offer was not broadcast at block 758, then block 762 is reached and the non-AP shared TXOP participant STA which received the unicasted TXOP Offer frame responds with an Access Request frame to the non-AP TXOP holder STA within a time offset, before the process ends.

Figure 26:
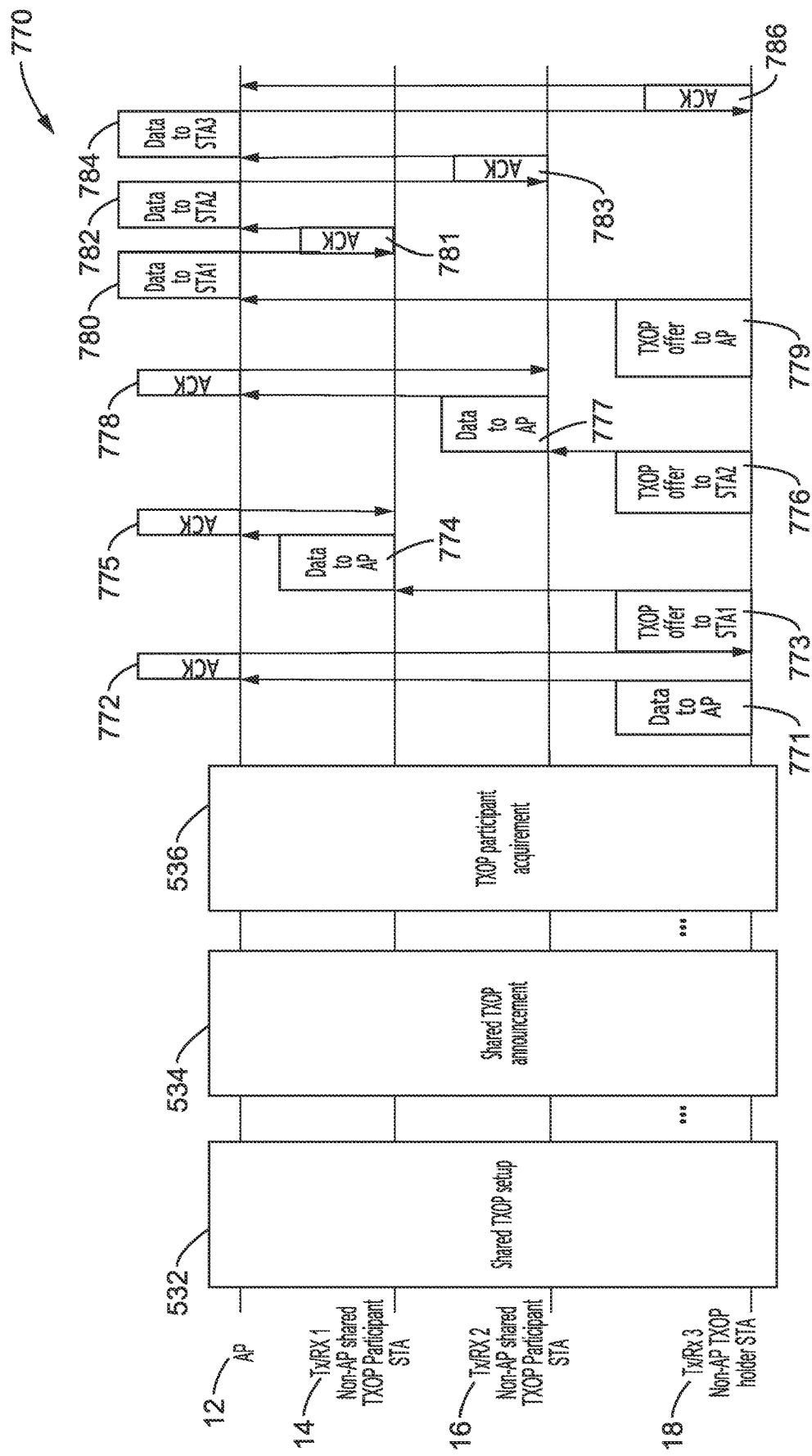
FIG. 26 is a communication sequence diagram of a UL initiated TXOP schedule and access with unicast TXOP offer frame, according to at least one embodiment of the present disclosure.

7.2.4. UL initiated TXOP Schedule and Access
7.2.4.1. UL initiated TXOP Schedule and Access with Unicast TXOP Offer Frame FIG. 26 illustrates an example embodiment 770 of TXOP schedule and access with unicast TXOP offer frame. Interactions are exemplified between AP 12, STA1 14, STA2 16 and STA3 18.

A shared TXOP setup phase 532, shared TXOP announcement phase 534, and TXOP participant acquirement 536 stage are first performed.

The non-AP TXOP holder STA sends Data to the associated AP, it should receive an ACK from AP to indicate successful transmission, after which it unicasts TXOP offer frames to each of the next TXOP share participant STAs indicating the transmission duration for the next TXOP share participant STA. In particular this is exemplified in the figure as follows.

The non-AP TXOP holder STA sends Data 771 to the associated AP (AP12), which the AP acknowledges 772. STA3 then unicasts 773 a TXOP Offer frame to the next TXOP share participant STA (STA1), indicating the transmission duration for the next TXOP share participant STA. In response to the TXOP offer 773 to STA1, STA1 sends Data 774 to the AP, which the AP ACKs 775. After this STA3 unicasts the TXOP offer 776 to STA2, in response to which STA2 sends Data 777 to the AP, which the AP ACKs 778. Thus it is seen that each participating non-AP TXOP holder STA sends Data to the associated AP and receives an ACK from the AP to indicate successful transmission, then the non-AP TXOP holder STA unicasts the TXOP offer frame to the next TXOP share participant STA, indicating the transmission duration for the next TXOP share participant STA.

Then, after looping through the non-AP shared participant STAs the TXOP holder unicasts a TXOP Offer frame 779 to the associated AP. Once it has received the TXOP offer frame, the AP transmits (Down Link) DL DATA 780, 782 and 784 to the destination STAs in the scheduled time and waits for the respective ACKs 781, 783 and 786.

Figure 27:
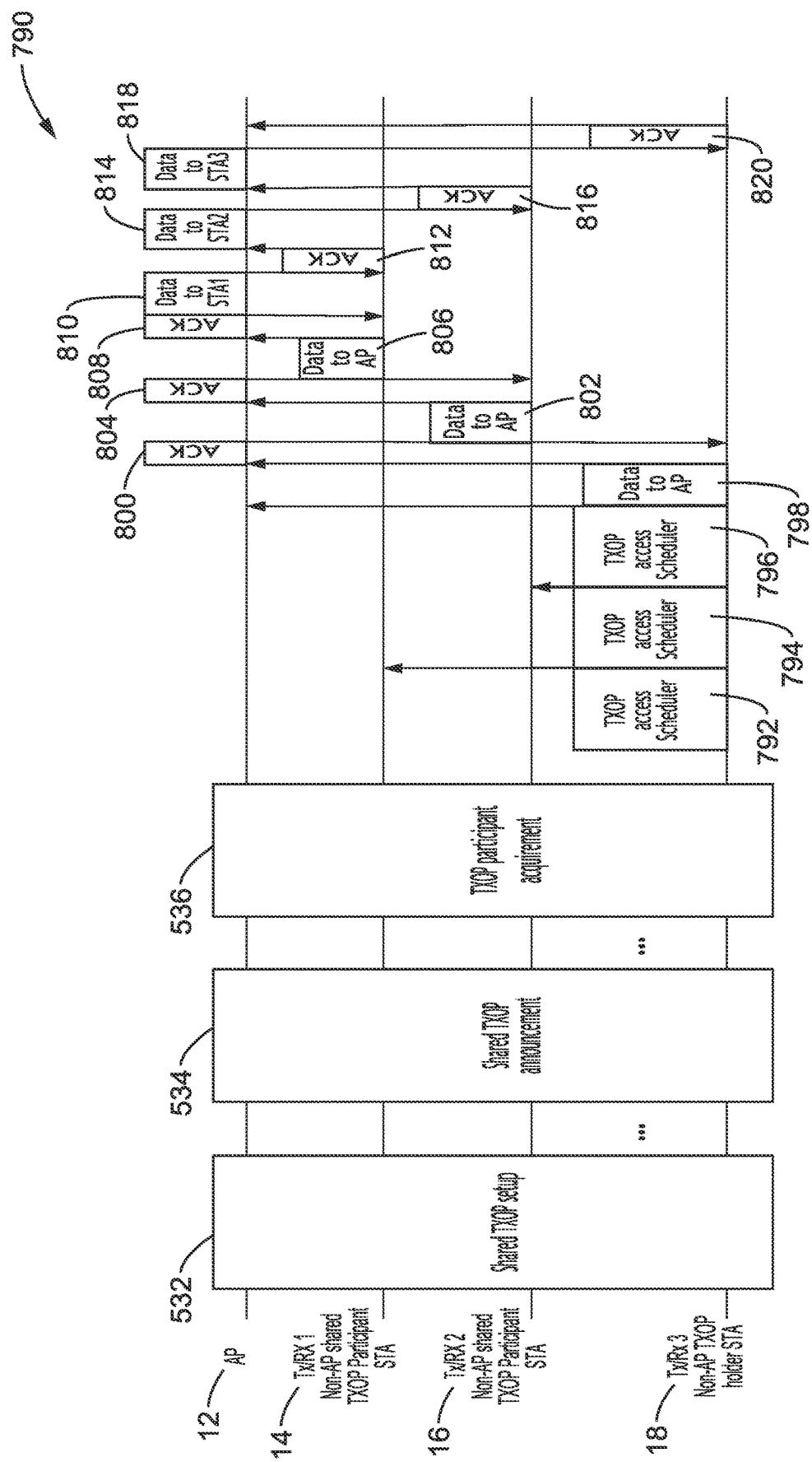
FIG. 27 is a communication sequence diagram of a UL initiated TXOP schedule and access with unicast TXOP access scheduler, according to at least one embodiment of the present disclosure.

7.2.4.2. UL Initiated TXOP Schedule and Access with Unicast TXOP Access Scheduler FIG. 27 illustrates an example embodiment 790 of a UL initiated TXOP schedule and access with unicast TXOP access scheduler. Interactions are shown in this process by way of example and not limitation as is the case for all these examples between AP 12, STA1 14, STA2 16 and STA3 18.

A shared TXOP setup stage 532, shared TXOP announcement stage 534, and TXOP participant acquirement 536 stage are first performed.

Then the non-AP TXOP holder STA unicasts 792, 794 and 796 TXOP Access Schedule frames to the non-AP shared TXOP participant STAs (STA1 and STA2), as well as to the AP, indicating the TX Duration for each of the STAs. STA 3 then sends its Data 798 to the AP which responds with ACK 800.

Once the STAs receive the TXOP access scheduler frame, they send Data to the associated AP in different time slots as indicated in the Allocation Control field in the Access request information element as embedded in the beacon frame and they wait for an ACK from the AP. This process is shown as STA2 sending Data 802 to the AP and receiving an ACK 804 from the AP, and then STA1 sending Data 806 to AP1 which responds with an ACK 808. Once the AP receives the TXOP access scheduler frame, it will send DL Data 810, 814 and 818 to each destination STA in the assigned time slots and wait for associated ACKs 812, 816 and 820.

7.2.4.3. UL Initiated TXOP Schedule and Access with Broadcast TXOP Scheduler

Figure 28:
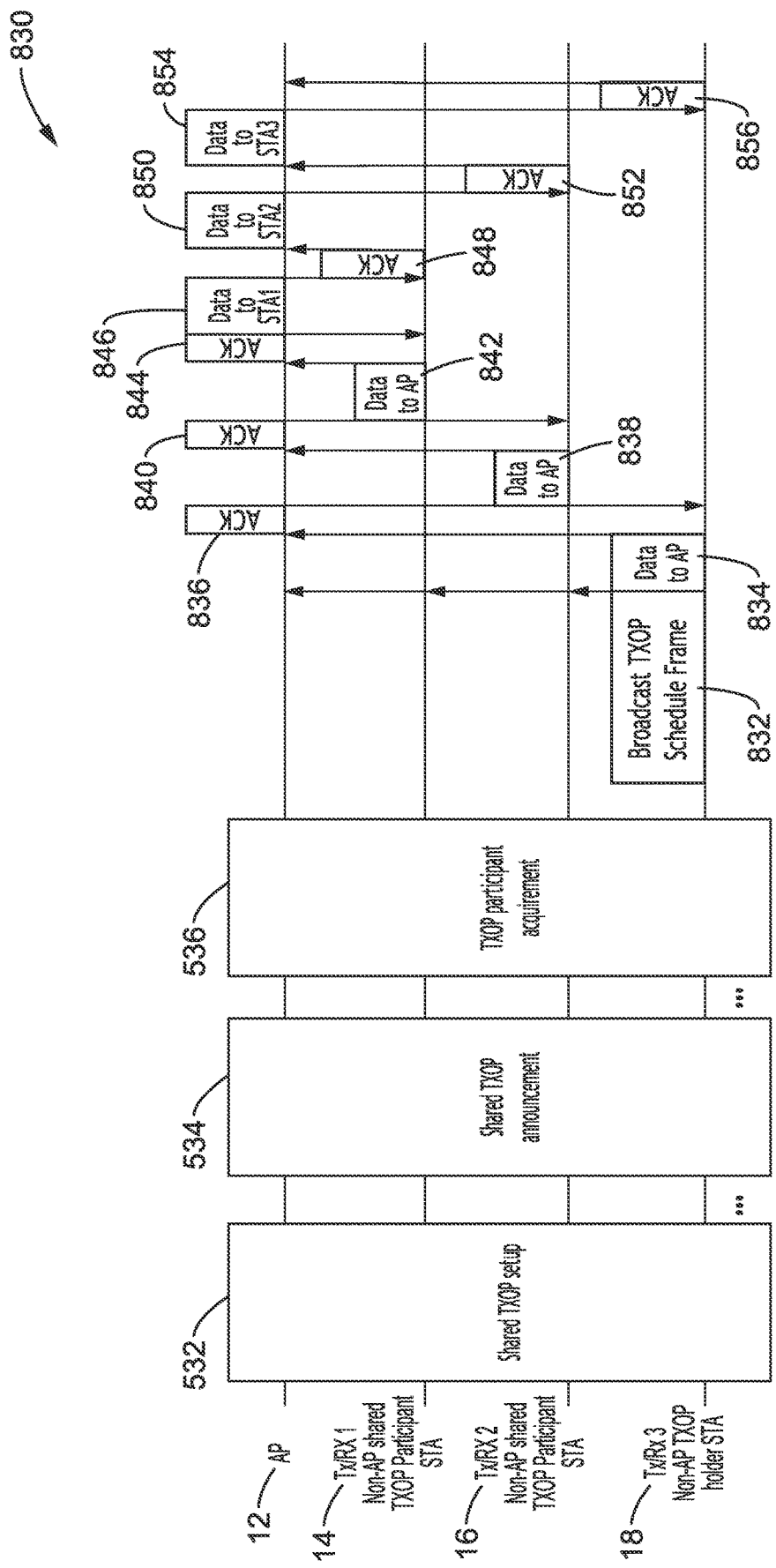
FIG. 28 is a communication sequence diagram of a UL initiated TXOP schedule and access with broadcast TXOP scheduler, according to at least one embodiment of the present disclosure.

FIG. 28 illustrates an example embodiment 830 of a TXOP schedule and access with a broadcast TXOP scheduler frame. Interactions are shown between AP 12, STA1 14, STA2 16 and STA3 18.

A shared TXOP setup phase 532, shared TXOP announcement phase 534, and TXOP participant acquirement 536 stage are first performed.

Then the non-AP TXOP holder STA broadcasts 832 a Broadcast TXOP Schedule frame to the TXOP share participant STAs and AP, indicating the transmit (TX) Duration for each of the STAs and the AP. After which STA3 is seen sending Data 834 to the associated AP, which responds with ACK 836.

Once the STAs receive the Broadcast TXOP Scheduler frame, they also send Data 838, 842 to the associated AP in different time slots as indicated in the Broadcast TXOP Scheduler frame, to which the AP responds with ACKs 840 and 844.

Thus it is seen that first the non-AP TXOP holder STA broadcasts a Broadcast TXOP scheduler frame, indicating the TX Duration for each non-AP shared TXOP participant STA and the AP. Once the STAs receive the Broadcast TXOP scheduler frame, they send Data to the associated AP in different time slots as indicated in the Broadcast TXOP scheduler frame and wait for an ACK.

Then once the AP receives the Broadcast TXOP scheduler frame, it sends DL Data 846, 850 and 854 to each destination STA in the assigned time slots and waits for the associated ACKs 848, 852 and 856.

Figure 29A:
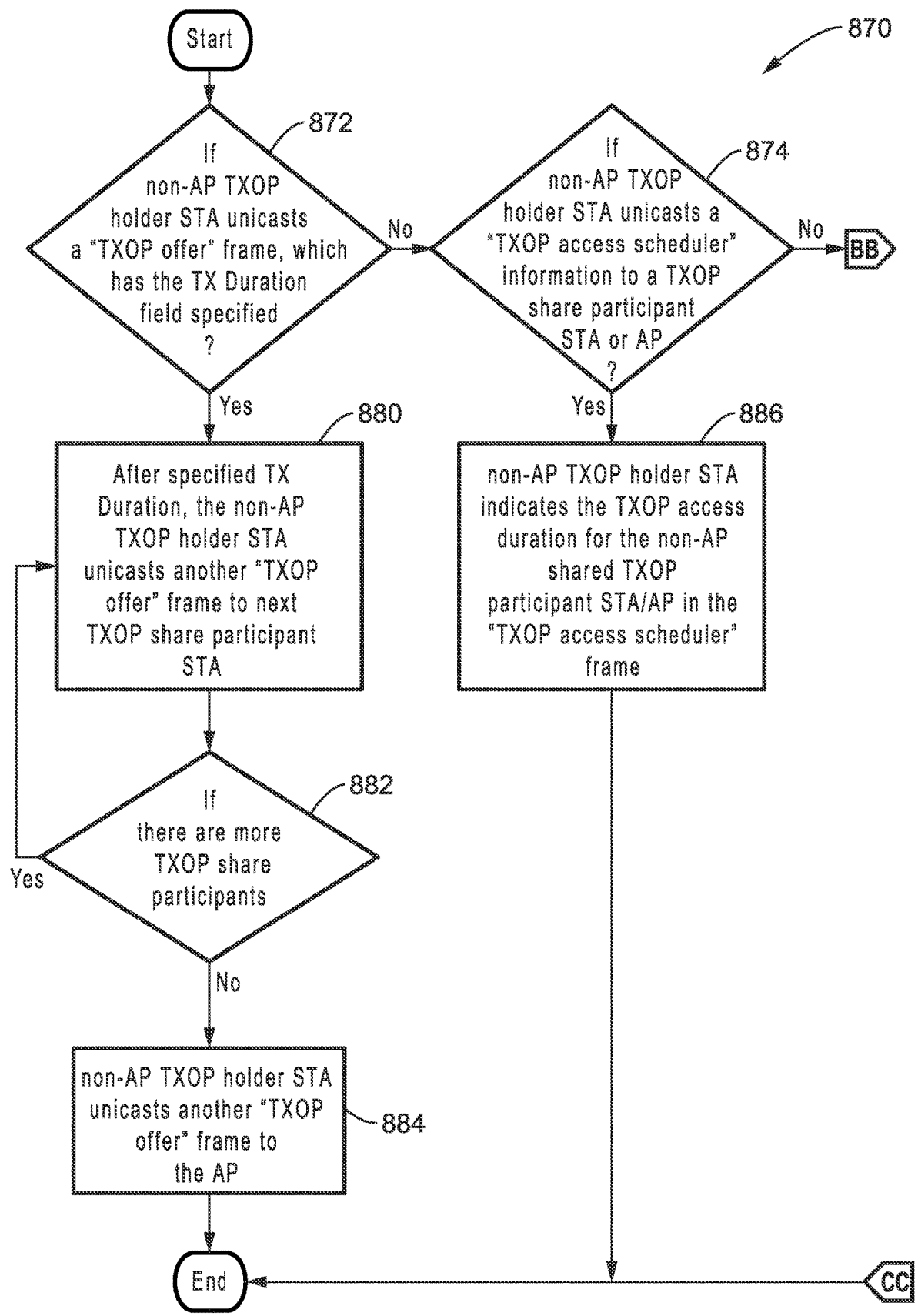
FIG. 29A through FIG. 29B is a flow diagram of a UL initiated TXOP schedule and access stage, processed at the non-AP TXOP holder STA level, according to at least one embodiment of the present disclosure.
Figure 29B:
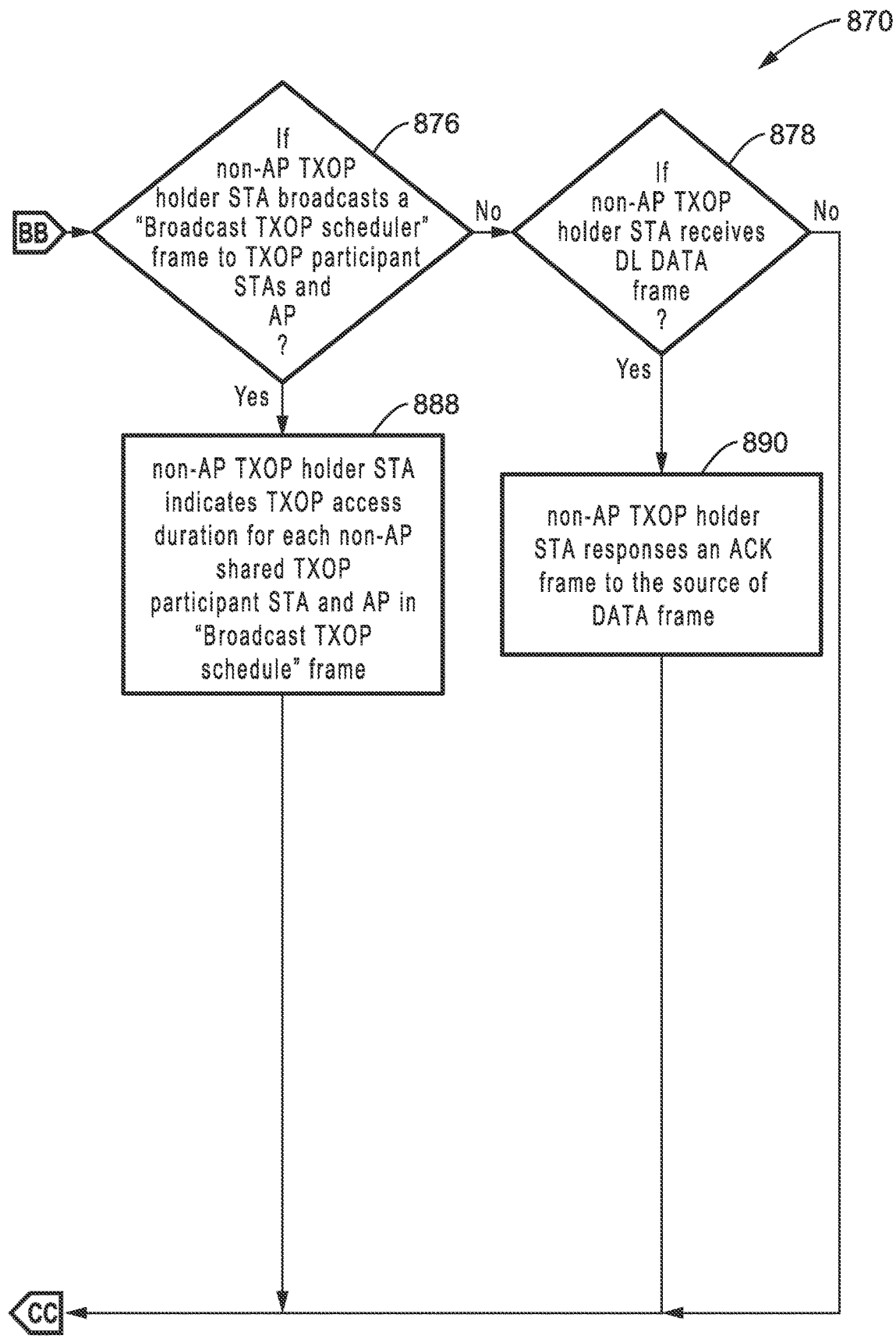

FIG. 29A and FIG. 29B illustrates an example embodiment 870 of a UL initiated TXOP schedule and access stage, processed at the non-AP TXOP holder STA level.

A check is made 872 if the non-AP TXOP holder STA has unicast a TXOP Offer frame with the TX Duration field specified.

If it has unicast the TXOP Offer frame, then execution reaches block 880 wherein after a specified TX Duration, the non-AP TXOP holder STA unicasts another TXOP Offer frame to the next TXOP share participant STA.

Then in block 882 a check is made if there are more TXOP share participants. If there are more participants then execution returns to block 880 to continue processing, otherwise execution reaches block 884 with the non-AP TXOP holder STA unicasting another TXOP offer frame to the AP.

If however, it was determined at block 872 that the test for unicasting a TXOP Offer was not unicast, then execution moves to block 874, where a check is made to determine if the non-AP TXOP holder STA has unicast TXOP Access Scheduler information to a TXOP share participant STA. If it is determined that the scheduler information was unicast, then at block 886 the non-AP TXOP holder STA indicates the TXOP access duration for the shared TXOP participants in the TXOP Access Scheduler frame before processing ends.

Figure 30A:
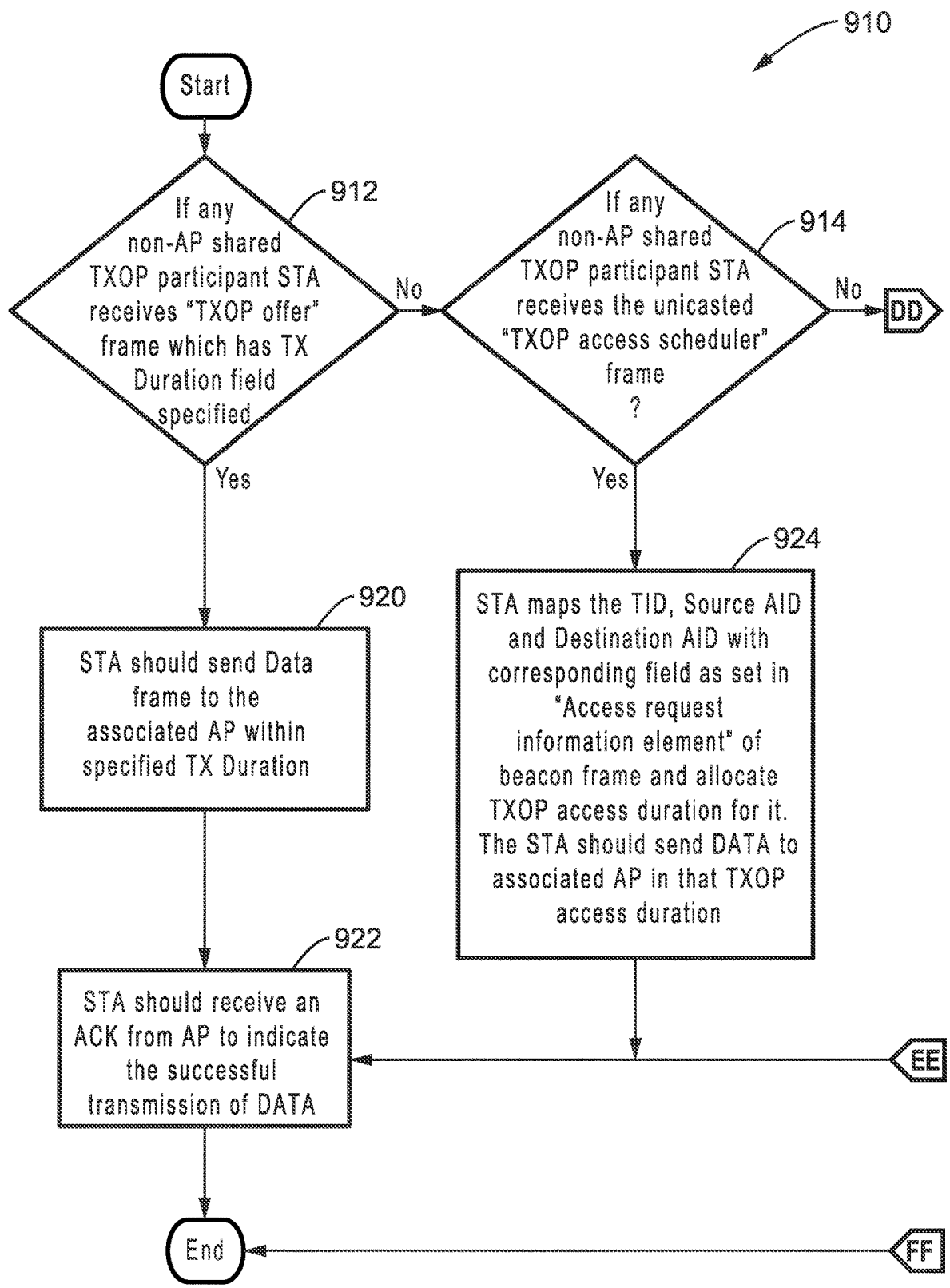
FIG. 30A through FIG. 30B is a flow diagram of a UL initiated TXOP schedule and access stage, processed at the non-AP shared TXOP participant STA level, according to at least one embodiment of the present disclosure.
Figure 30B:
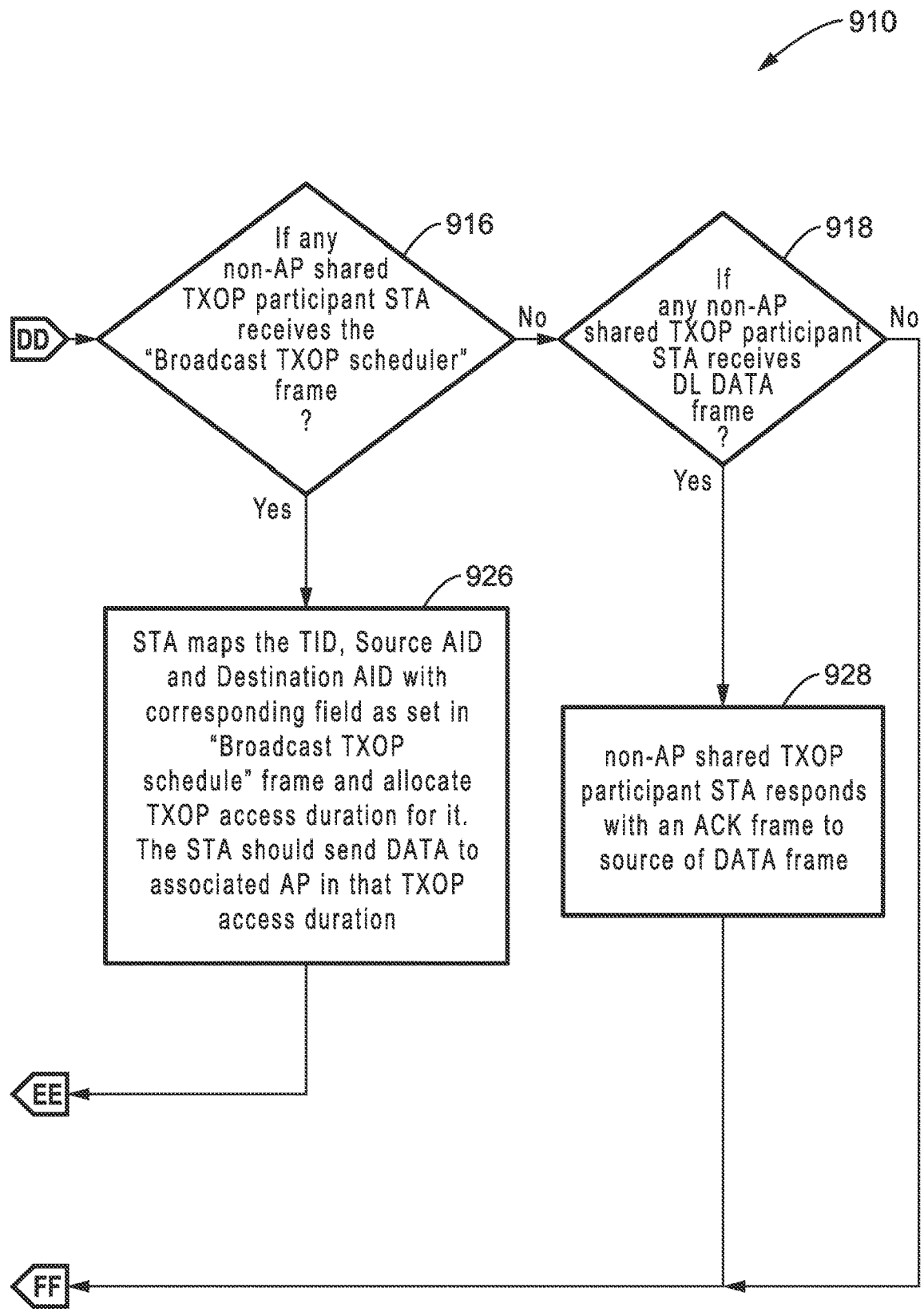

However, if at block 874 the STA did not unicast a TXOP Access Scheduler, then block 876 is reached in FIG. 30B which checks if the non-AP TXOP holder STA has broadcast a Broadcast TXOP Scheduler frame to TXOP participant STAs. If it was determined that the broadcast was performed, then block 888 is performed in which the non-AP TXOP holder STA indicates the TXOP access duration for each shared TXOP participant STA in the Broadcast TXOP schedule frame.

However, if at block 876 the STA did not broadcast a broadcast TXOP schedule frame, then execution reaches block 878 in which a check determines if the non-AP TXOP holder STA received a DL DATA frame. If it received the DL DATA frame then at block 890 the non-AP TXOP holder STA responds with an ACK frame to the source of the DATA frame, otherwise processing simply ends.

FIG. 30A and FIG. 30B illustrate an example embodiment 910 of a UL initiated TXOP schedule and access stage, processed at the non-AP shared TXOP participant STA level. A check 912 determines if any non-AP shared TXOP participant STA received the TXOP Offer frame which has the TX Duration field specified. If this was received, then at block 920, a Data frame is sent to the associated AP within the specified TX Duration, and then at block 922 the STA awaits an ACK from the AP to indicate a successful transmission of DATA, and the process ends.

Otherwise, if at block 912 it was found that the TXOP Offer frame was not received, then execution moves to block 914 which checks if any non-AP shared TXOP participant STAs received the unicasted TXOP Access Scheduler frame. If it was received, then at block 924 the STA maps the TID, Source Association ID (AID) and Destination AID with the corresponding field as set in the Access Request Information element of the beacon frame, and allocates the TXOP access duration for it. The STA then sends Data to the associated AP in that TXOP access duration, and then block 922 is executed before processing ends.

However, if at block 914 there was no unicasted TXOP access scheduler frame, then execution moves to block 916 of FIG. 30B which checks if any non-AP shared TXOP participant STA received the Broadcast TXOP Scheduler frame. If it was received, then at block 926 the STA maps the TID, Source AID and Destination AID with the corresponding field as set in the Broadcast TXOP schedule frame and allocates the TXOP access duration for it. The STA then sends Data to the associated AP in that TXOP access duration, then block 922 is executed before processing ends.

If at block 916, the non-AP shared TXOP participant STA did not receive the Broadcast TXOP scheduler frame, then execution moves to block 918 which determines if any non-AP shared TXOP participant STA received a DL DATA frame. If it did not receive the DL DATA frame then processing ends. Otherwise, block 928 is executed with the non-AP shared TXOP participant STA responding with an ACK frame to the source of the DATA frame, before processing reaches block 922 in FIG. 30A and is then completed.

Figure 31A:
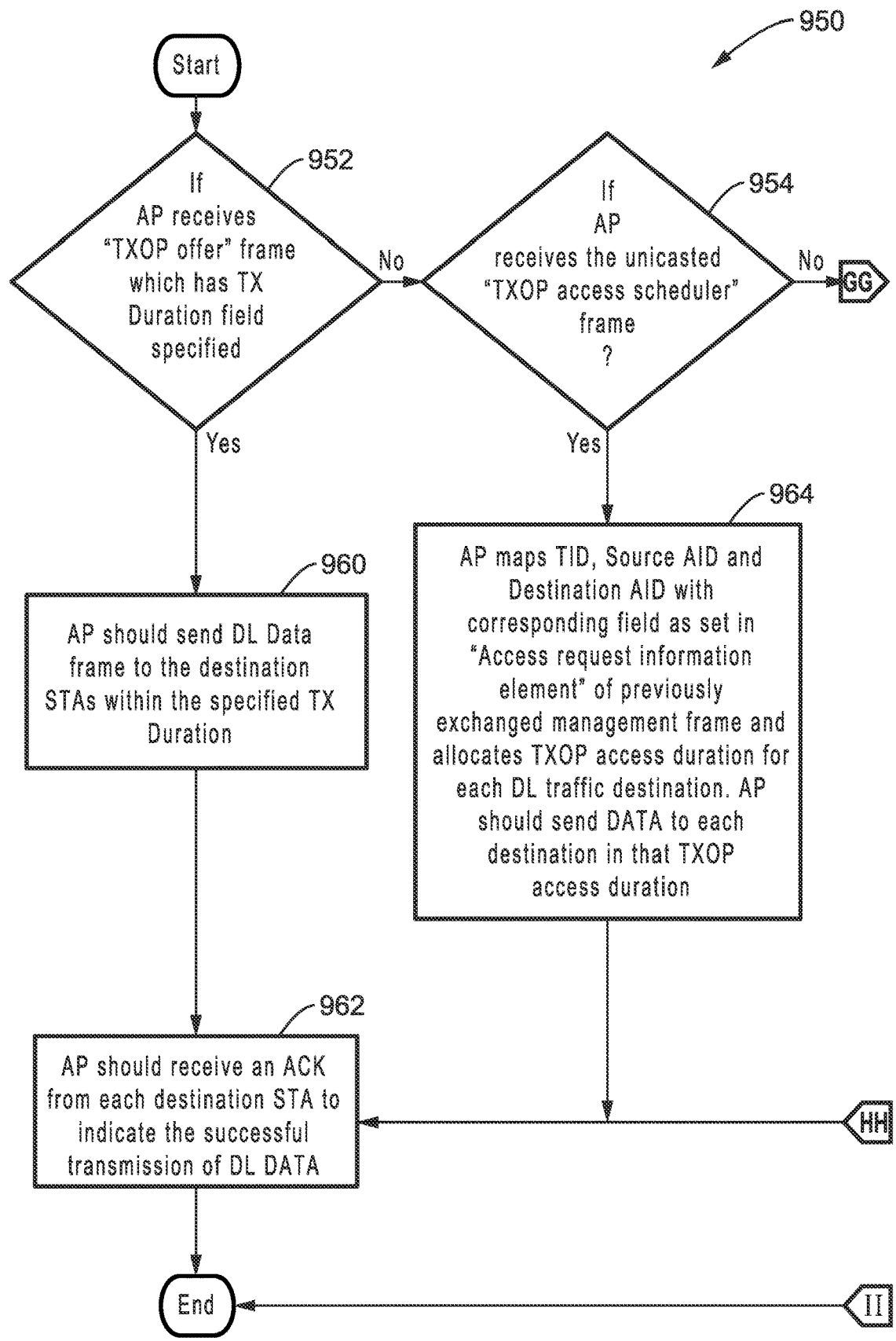
FIG. 31A through FIG. 31B is a flow diagram of a UL initiated TXOP schedule and access stage, processed at the AP level, according to at least one embodiment of the present disclosure.
Figure 31B:
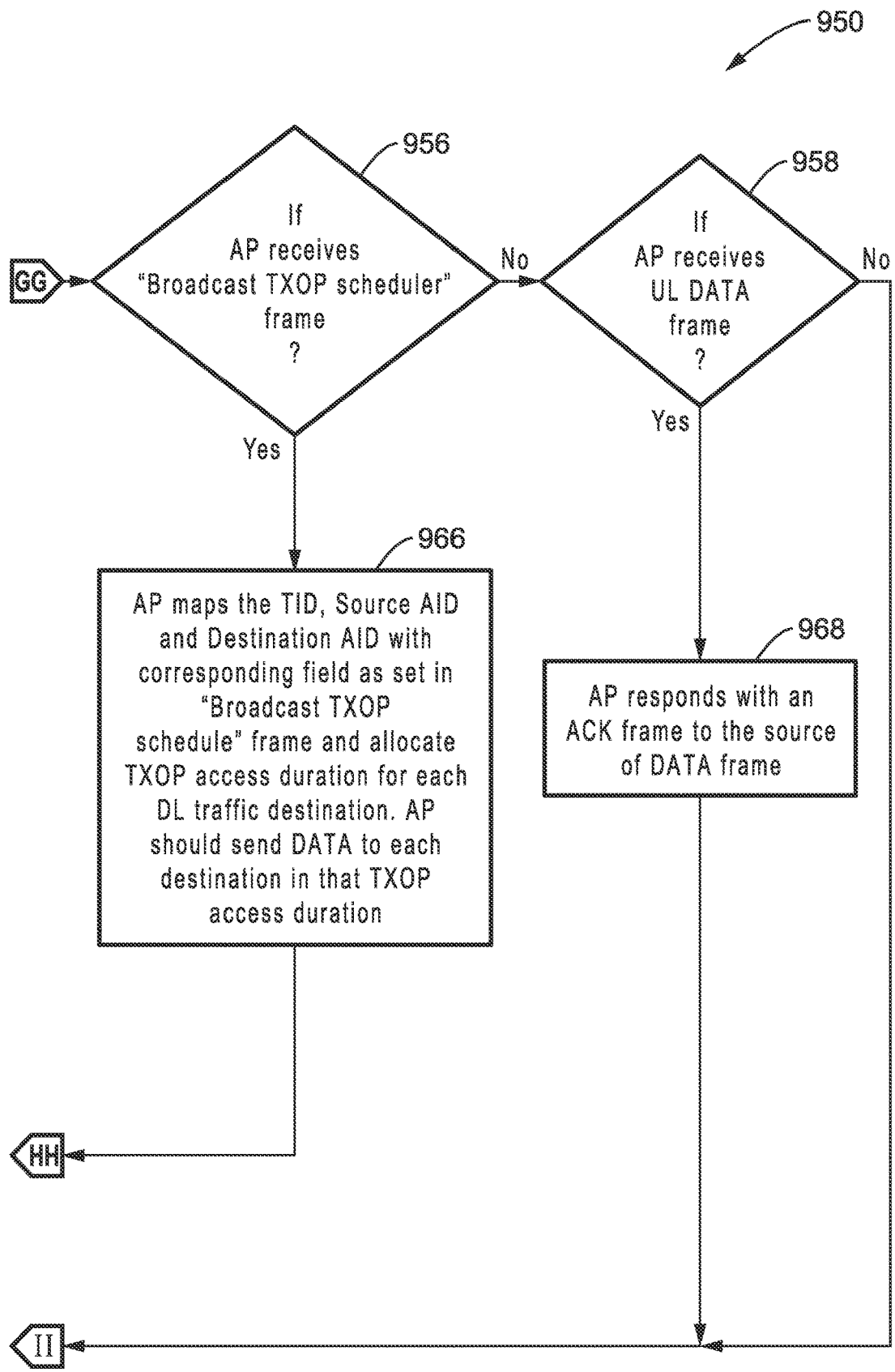

FIG. 31A and FIG. 31B illustrate an example embodiment 950 of a UL initiated TXOP schedule and access stage, processed at the AP level. A check is made 952 to determine if the AP received the TXOP Offer frame which has the TX Duration field specified. If this was received, then at block 960, a DATA frame is sent to the destination station within the specified TX Duration, after which at block 962 the AP awaits an ACK from each destination STA to indicate successful transmission of DL DATA.

Otherwise, if at block 952 it was found that the TXOP Offer frame was not received by the AP, then execution moves to block 954 which determines if the AP received a unicasted TXOP Access Scheduler frame. If it was received, then at block 964 the AP maps the TID, Source Association ID (AID) and Destination AID with the corresponding field as set in the Access Request Information element of previously exchanged management frame, and allocates the TXOP access duration for each DL traffic destination. The AP then sends DATA to each destination within the duration of the TXOP access, after which block 962 is executed, with the AP awaiting an ACK, before processing ends.

However, if at block 954 the AP did not receive a unicasted TXOP access scheduler frame, then execution moves to block 956 in FIG. 31B which checks if the AP has received the Broadcast TXOP Scheduler frame. If it was received, then at block 966 the AP maps the TID, Source AID and Destination AID with the corresponding field as set in the Broadcast TXOP schedule frame and allocates the TXOP access duration for each DL traffic destination. The AP sends DATA to each destination during TXOP access duration, before execution moves to block 962 of FIG. 31A before the process ends.

However, if at block 956 the AP did not receive the broadcast TXOP scheduler frame, then execution moves to block 958 which determines if the AP received a UL DATA frame. If the frame was not received then processing ends. Otherwise, at block 968 the AP responds with an ACK frame to the source of the DATA frame.

7.3. Dynamic Scenario with AP as Coordinator

For UL initiated shared TXOP, the non-AP TXOP holder STA cannot directly communication with other non-AP STAs who are willing to participate in the shared TXOP. In this case, the AP needs to be involved to coordinate between the non-AP TXOP holder STA and the other non-AP shared TXOP participant STAs.

For DL initiated shared TXOP, the AP obtain (gains) the channel and is the TXOP holder. The AP can directly communicate with other non-AP STAs and share its TXOP with other non-AP STAs who are willing to participate in the shared TXOP.

The Shared TXOP setup stage for the Dynamic Scenario with AP as Coordinator is the same as that described above in Section 7.2.1.

7.3.1. Shared TXOP Announcement Stage

It should be noted that the UL initiated shared TXOP announcement stage in the scenario with AP as the coordinator is the same as was introduced above in Section 7.2.2.

Figure 32:
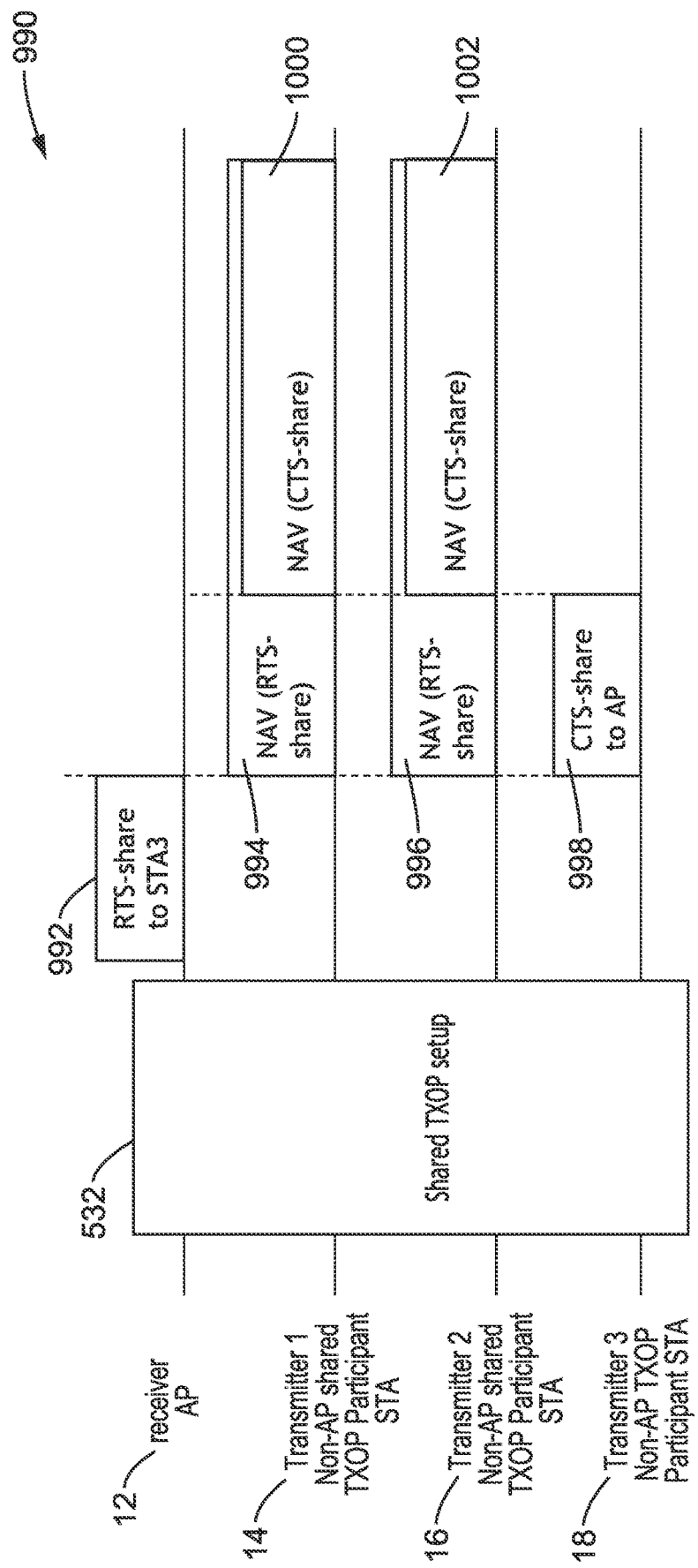
FIG. 32 is a communication sequence diagram of a DL initiated Shared TXOP announcement stage, according to at least one embodiment of the present disclosure.

FIG. 32 illustrates an example embodiment 990 of a DL initiated shared TXOP announcement stage. Interactions are exemplified between AP 12, and non-AP shared STAs exemplified as STA1 14, STA2 16 and STA3 18.

A shared TXOP setup phase 532, is performed followed by this shared TXOP announcement phase.

In this case, the shared TXOP announcement stage is initiated by a DL transmission in which the AP obtains the channel and sends RTS-share 992 to STA3, which is the destination of the DL traffic. STA3 receives the RTS-share and responds with a CTS-share frame 998, while STA1 and STA2 become aware of the NAV RTS-Share 994 and 996. Upon sending the CTS-share to the AP, STA1 and STA2 become aware of the NAV (CTS-share) 1000 and 1002 and are made aware of the updated NAV value set by CTS-share frame. The AP receives the CTS-share from STA3 and is aware that the RTS-share was successfully sent to STA3.

Figure 33:
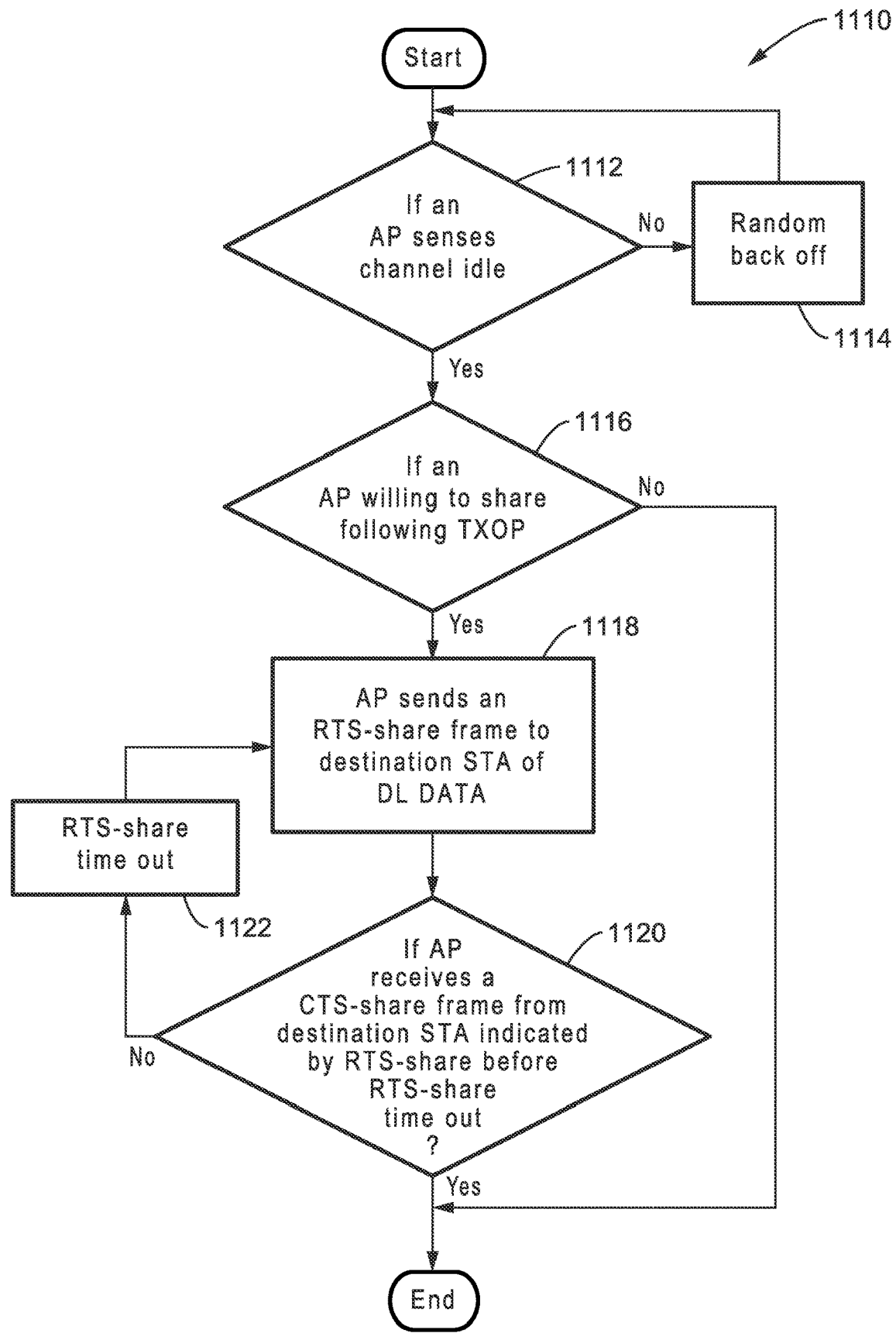
FIG. 33 is a flow diagram of a Shared TXOP announcement stage, processed at AP, according to at least one embodiment of the present disclosure.

FIG. 33 illustrates an example embodiment 1110 of a Shared TXOP announcement stage, processed at the AP. A check 1112 is made by the AP to determine if the channel is idle. If the channel is not idle then the AP takes a random backoff 1114 and returns to block 1112 to sense the channel again.

However, if the channel is found idle at block 1112, then at block 1116 a check is made to determine if the AP is willing to share the following TXOP. If the AP has DL DATA to transmit and is willing to share the TXOP, then at block 1118 the AP TXOP sends an RTS-share frame to the destination STA of the DL DATA. Execution then moves to block 1120 to determine if the AP received a CTS-share frame from the destination STA as indicated by the RTS-share before the RTS times out. If the CTS-share is not received, then at block 1122 an RTS-share timeout occurs and execution returns to block 1118 to send another RTS-share. Otherwise, if the CTS-share is received, then the process ends.

Returning to decision block 1116, if the AP is not willing to share the channel then the process ends.

Figure 34:
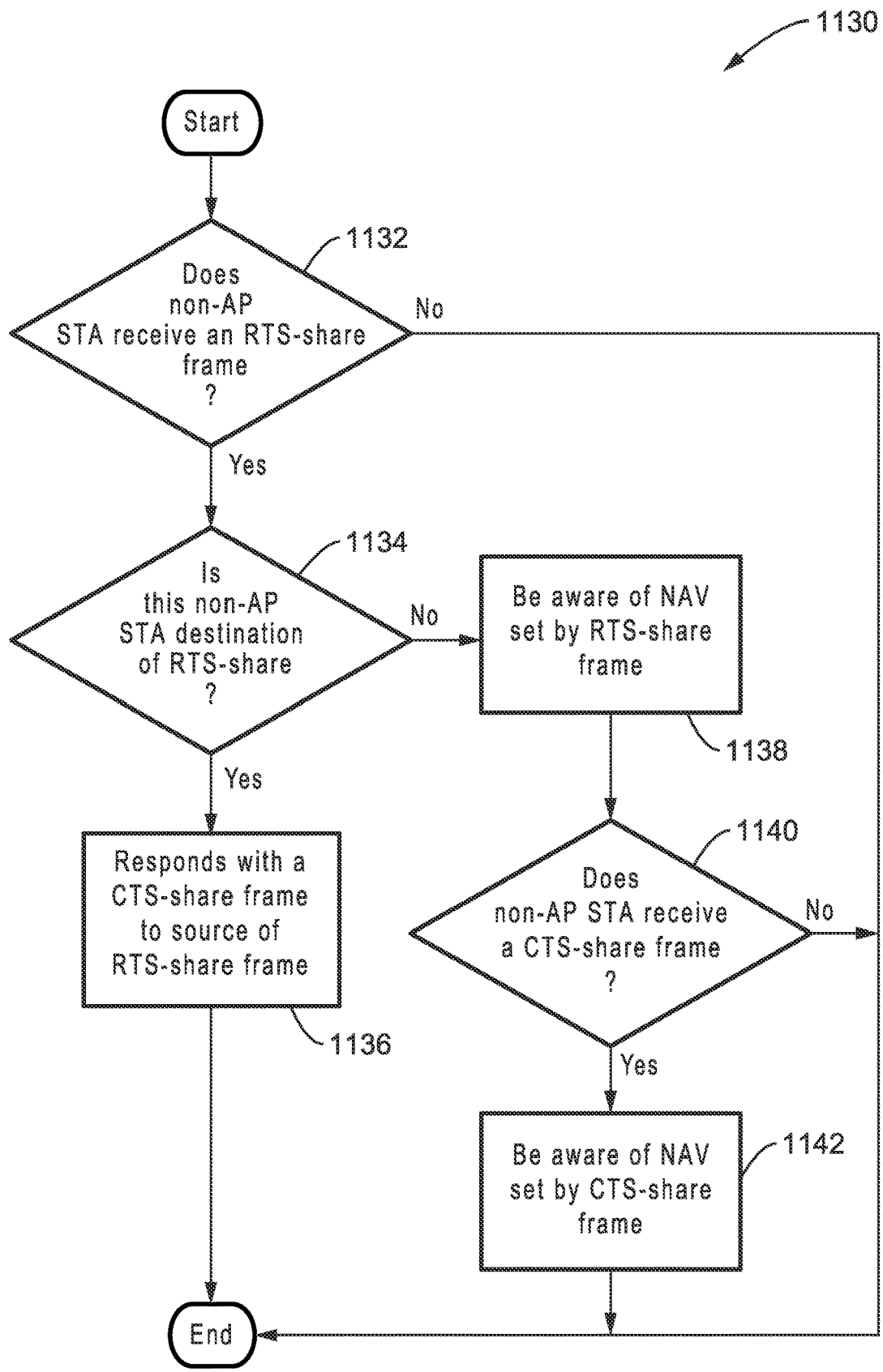
FIG. 34 is a flow diagram of a Shared TXOP announcement stage, processed at non-AP STA level, according to at least one embodiment of the present disclosure.

FIG. 34 illustrates an example embodiment 1130 of the Shared TXOP announcement stage, processed at the non-AP STA level. A check 1132 determines if the non-AP STA has received an RTS-share frame. If it has not received an RTS-share frame, then processing in this routine ends. Otherwise, if the RTS-share frame was received, then block 1134 determines if this non-AP STA is the destination of the RTS-share. If the condition is met, then at block 1136 the non-AP STA responds to the RTS-share by sending a CTS-share frame to the source of the RTS-share frame; which is the STA/AP which sent the RTS-share frame. After which the process ends.

Otherwise, if it is determined in block 1134 that the non-AP STA is not the destination of the RTS-share, then block 1138 is reached which makes the non-AP STA aware of the NAV set by the RTS-share frame. Then a check 1140 determines if the non-AP STA has received a CTS-share frame. If it has not received the CTS-share frame, then execution ends. Otherwise, upon receiving the CTS-share frame then block 1142 assures that the non-AP STA is made aware of the NAV set by the CTS-share frame, after which this process ends.

7.3.2. TXOP Participant Acquirement Stage w/AP Coordinator 7.3.2.1. TXOP Participant Acquirement Stage w/response after Receiving TXOP Offer (with AP)

Figure 35:
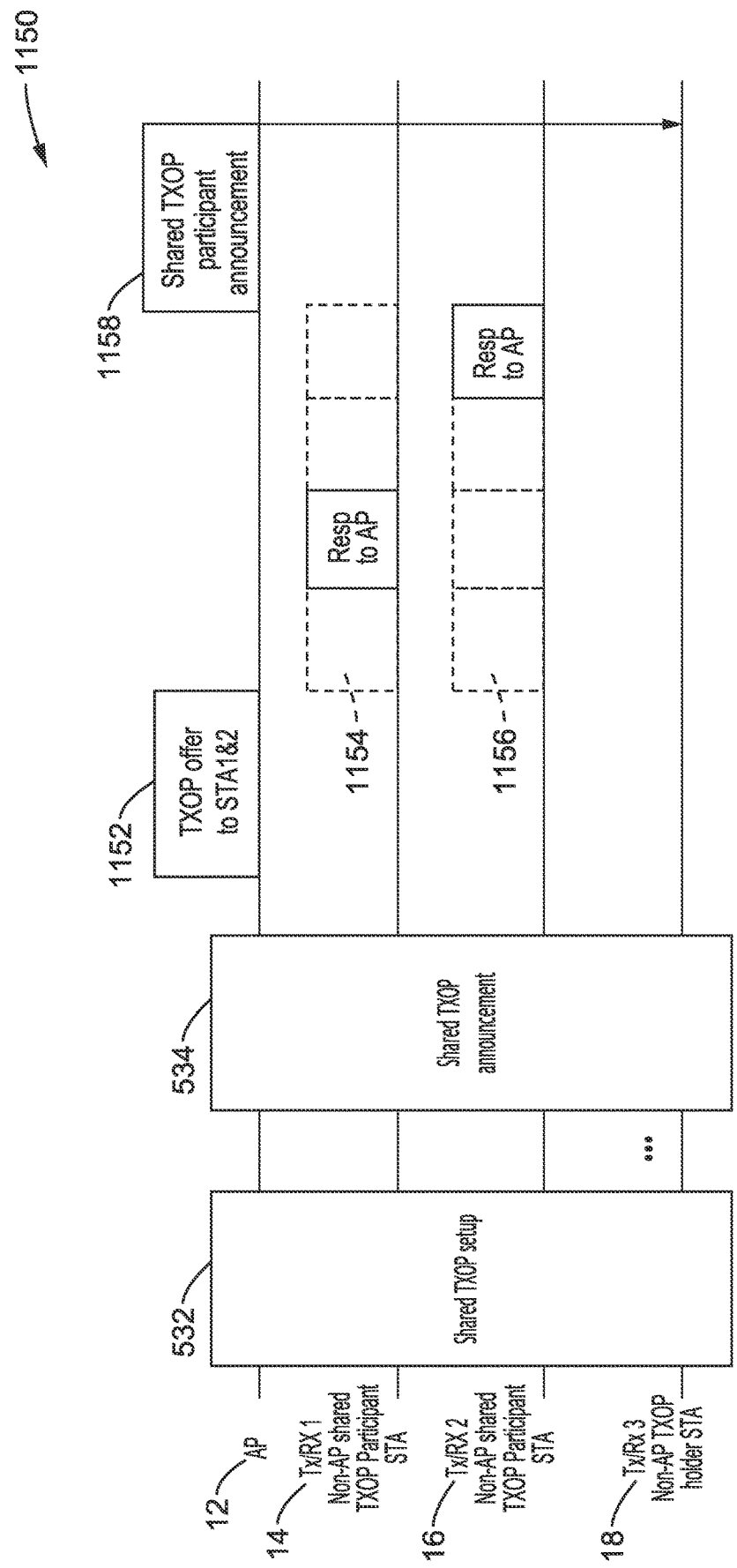
FIG. 35 is a communication sequence diagram of a UL initiated TXOP participant acquirement stage with response after receiving TXOP offer (with AP), according to at least one embodiment of the present disclosure.

FIG. 35 illustrates an example embodiment 1150 of a UL initiated TXOP participant acquirement stage with response after receiving TXOP offer (with AP as the coordinator). Interactions are depicted between AP 12, STA1 14, STA2 16 and STA3 18.

A shared TXOP setup phase 532 and shared TXOP announcement phase 534 are first performed. Then the AP broadcasts 1152 a TXOP Offer frame which indicates that the non-AP TXOP holder STA is willing to share its TXOP, and inquires if there are other non-AP STAs that are willing to join the shared TXOP.

Once other non-AP STAs receive this TXOP Offer frame, if they are willing to participate in the following shared TXOP, they respond to the AP with a new Access Request frame which is transmitted in a time slot of slots 1154 and 1156. It should be noted that in order to avoid collision of the Access Request frames, the access to the slot could be implemented based on Random access or Dedicated access.

The AP then unicasts 1158 a Shared TXOP Participant Announcement frame to the non-AP TXOP holder STA to announce the shared TXOP participants' information, including the participant information of itself as the AP.

Figure 36:
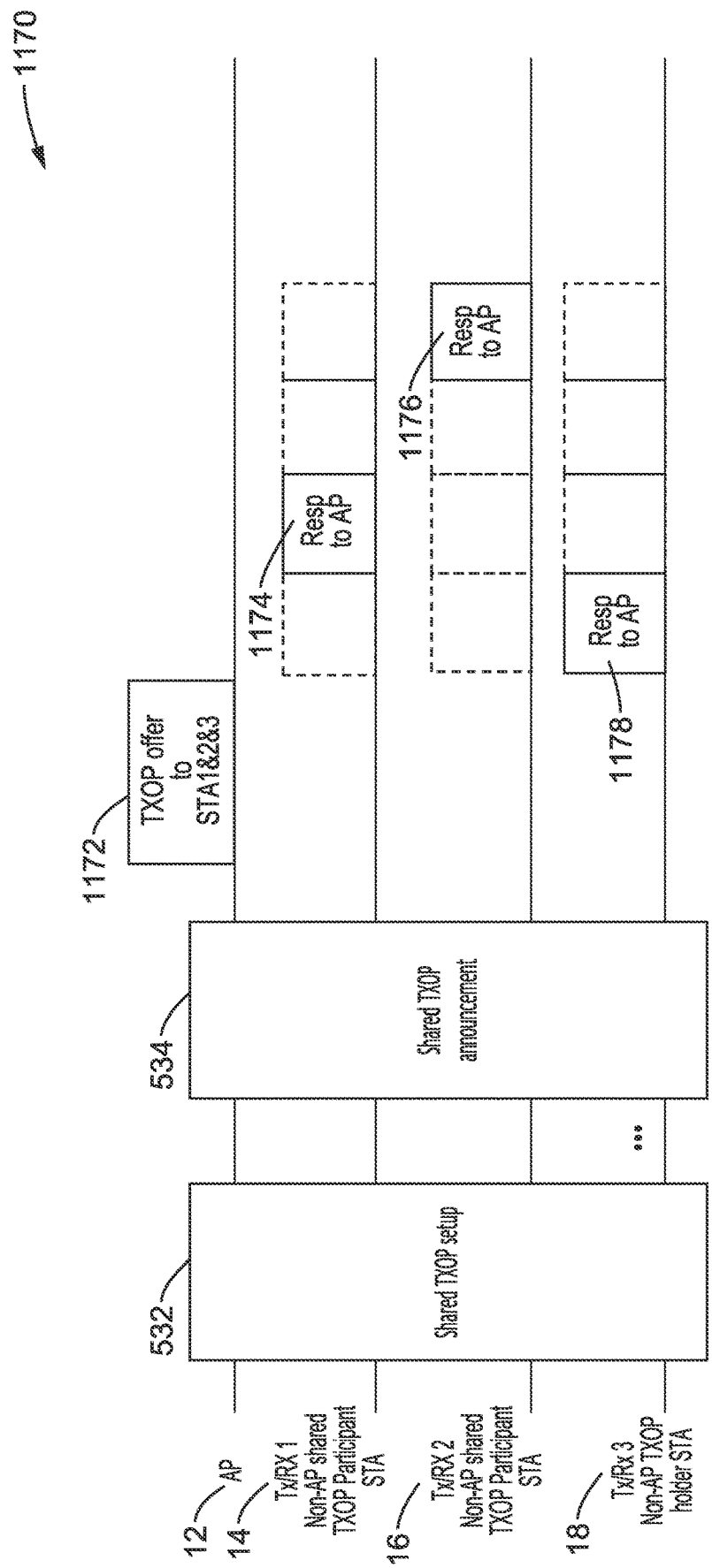
FIG. 36 is a communication sequence diagram of a DL initiated TXOP participant acquirement stage with response after receiving TXOP offer, according to at least one embodiment of the present disclosure.

FIG. 36 illustrates an example embodiment 1170 is a (DL initiated) TXOP participant acquirement stage with response after receiving the TXOP offer.

Interactions are depicted between AP 12, STA1 14, STA2 16 and STA3 18. A shared TXOP setup is performed 532 followed by a shared TXOP announcement 534.

Then the AP broadcasts 1172 a TXOP offer frame, indicating that it is willing to share its TXOP, and inquiring about other STAs that are willing to join the shared TXOP.

Once the STAs receive this TXOP offer frame, they respond with Access request frames 1174, 1176 and 1178 to indicate they are willing to join the shared TXOP. In order to avoid collision of the Access request frames, the non-AP shared TXOP participant STAs send the frames through randomly accessing time slots or dedicatedly accessing specific time slots. The slot access rule is implemented in the shared TXOP setup stage.

7.3.2.2. TXOP Participant Acquirement Stage w/Response after CTS (with AP as the Coordinator)

Figure 37:
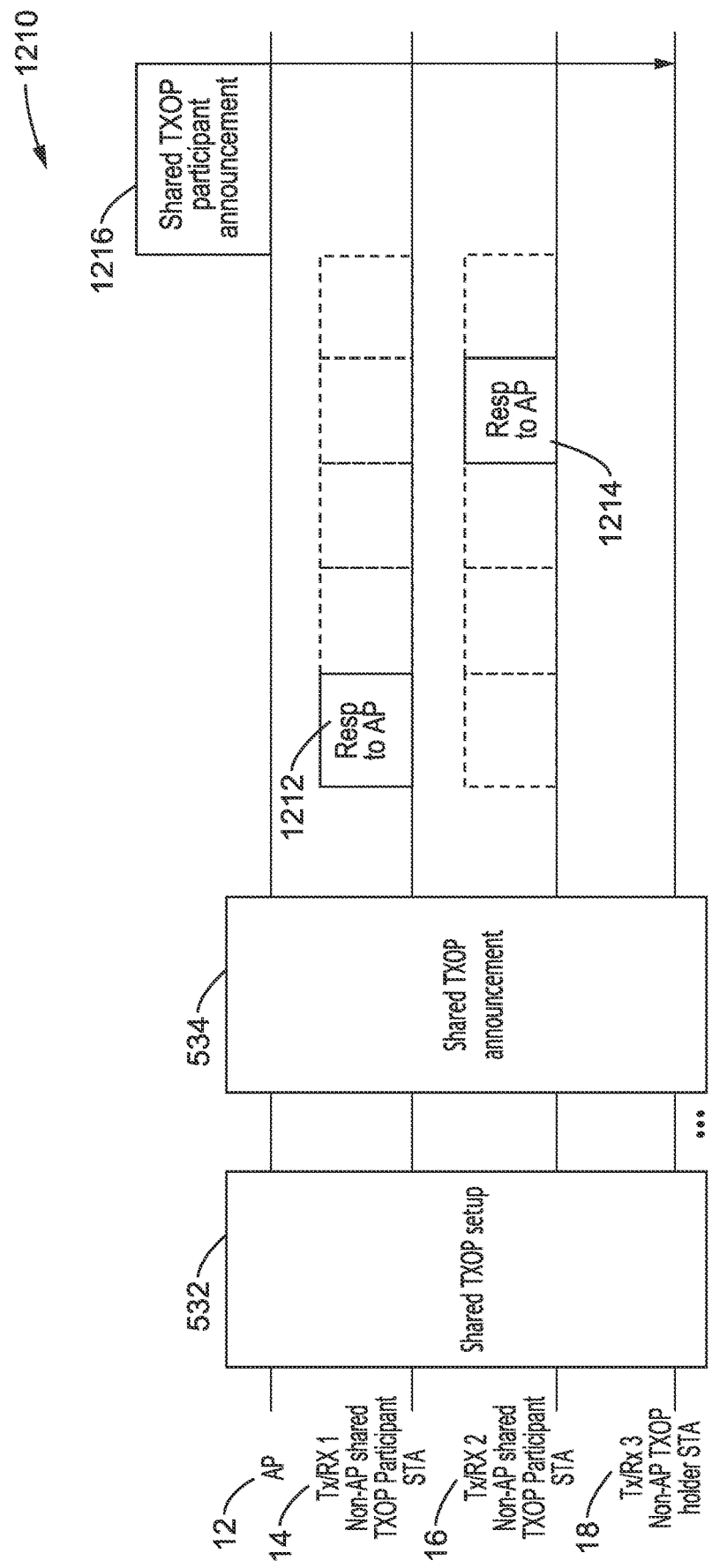
FIG. 37 is a communication sequence diagram of a UL initiated TXOP participant acquirement stage with response after receiving CTS (with AP), according to at least one embodiment of the present disclosure.

FIG. 37 illustrates an example embodiment 1210 of a UL initiated TXOP participant acquirement stage with response after receiving CTS (with AP as the coordinator).

Interactions are depicted between AP 12, STA1 14, STA2 16 and STA3 18. A shared TXOP setup is performed 532 followed by a shared TXOP announcement 534.

Once the non-AP STA receives the CTS-share frame (from previous Shared TXOP announcement stage, not shown in this stage) sent from the AP to the non-AP TXOP holder STA, if the non-AP STA is willing to join the following shared TXOP, and it doesn't receive the TXOP offer frame as seen in FIG. 36, it can send an Access request frame 1212, 1214 to the AP through random access or dedicated access. After the access slots time expires, the AP unicasts a Shared TXOP participant announcement frame 1216 to the non-AP TXOP holder STAs to announce the TXOP share participant information, including the participant information about the AP itself.

Figure 38:
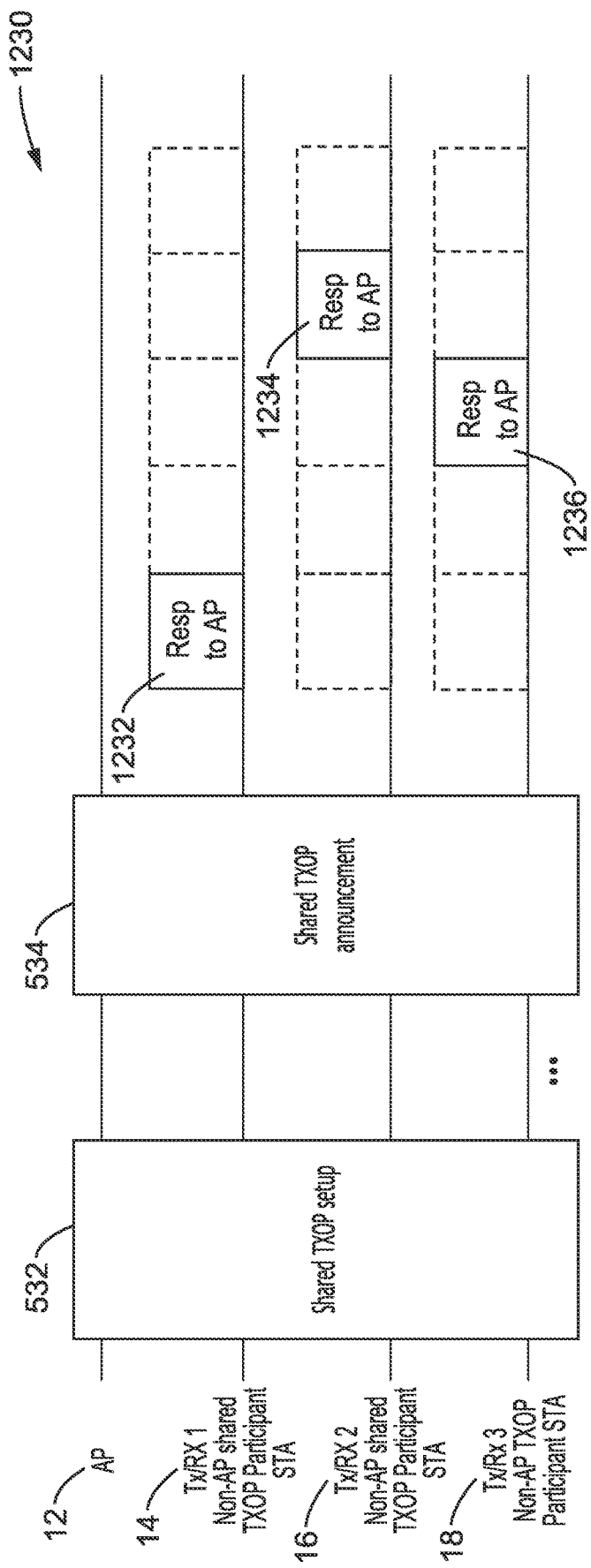
FIG. 38 is a communication sequence diagram of a DL initiated TXOP participant acquirement stage with response after receiving CTS, according to at least one embodiment of the present disclosure.

FIG. 38 illustrates an example embodiment 1230 of a DL initiated TXOP participant acquirement stage with response after receiving CTS.

Interactions are depicted between AP 12, STA1 14, STA2 16 and STA3 18. A shared TXOP setup is performed 532 followed by a shared TXOP announcement 534.

STA3 in this example was the destination of the RTS-share frame sent by the AP. Then once STA3 sends out the corresponding CTS-share frame, it sends an Access request frame 1236 to the AP through random access or dedicated access to indicate it is willing to join the shared TXOP with the AP.

Once STA1 & STA2 receive the shared-CTS (which was sent from STA3 to the AP), STA1 and STA2 each send an Access request frames 1232, 1234 to the AP through random access or dedicated access to indicate they are willing to join the shared TXOP with the TXOP holder.

7.3.2.3 TXOP Participant Acquirement Stage with Response after Dedicated TXOP Offer Frame (with AP as the coordinator)

Figure 39:
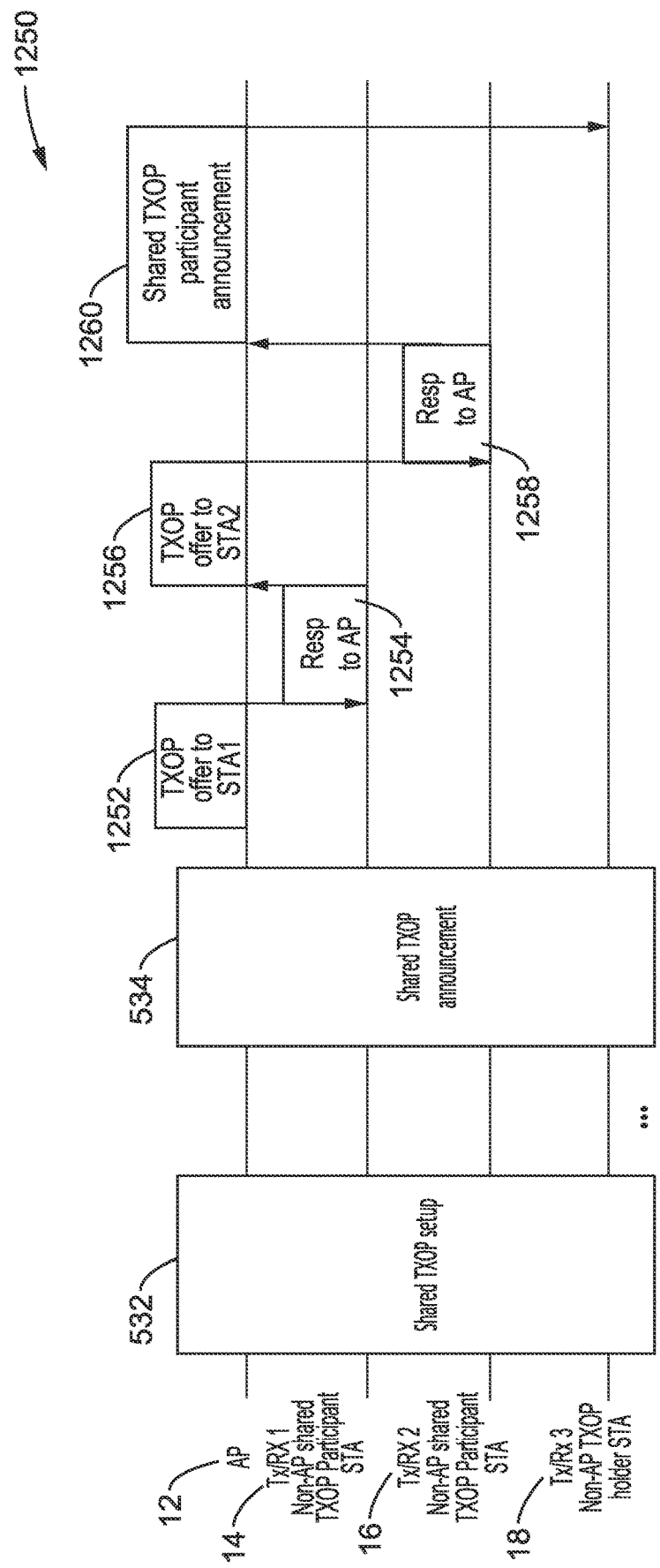
FIG. 39 is a communication sequence diagram of a UL initiated TXOP participant acquirement stage with response after receiving dedicated TXOP offer (with AP), according to at least one embodiment of the present disclosure.

FIG. 39 illustrates an example embodiment 1250 of a UL initiated TXOP participant acquirement stage with response after receiving dedicated TXOP offer, with the AP as coordinator.

Interactions are depicted between AP 12, STA1 14, STA2 16 and STA3 18. A shared TXOP setup is performed 532 followed by a shared TXOP announcement 534.

The AP unicasts the TXOP offer frame 1252, 1256 to inquire on non-AP STAs (other than the non-AP TXOP holder STA) one by one, which in this example are STA1 and STA2. Once the non-AP STAs, e.g., STA1 and STA2 receive the TXOP offer frame they respond with Access request frames 1254 and 1258 to the associated AP within a specified time offset, if they are willing to join the shared TXOP.

Then, the AP unicasts a Shared TXOP participant announcement frame 1260 to the non-AP TXOP holder STA, which in this example is STA3, to announce the TXOP share participant information, including the participant information of itself.

Figure 40:
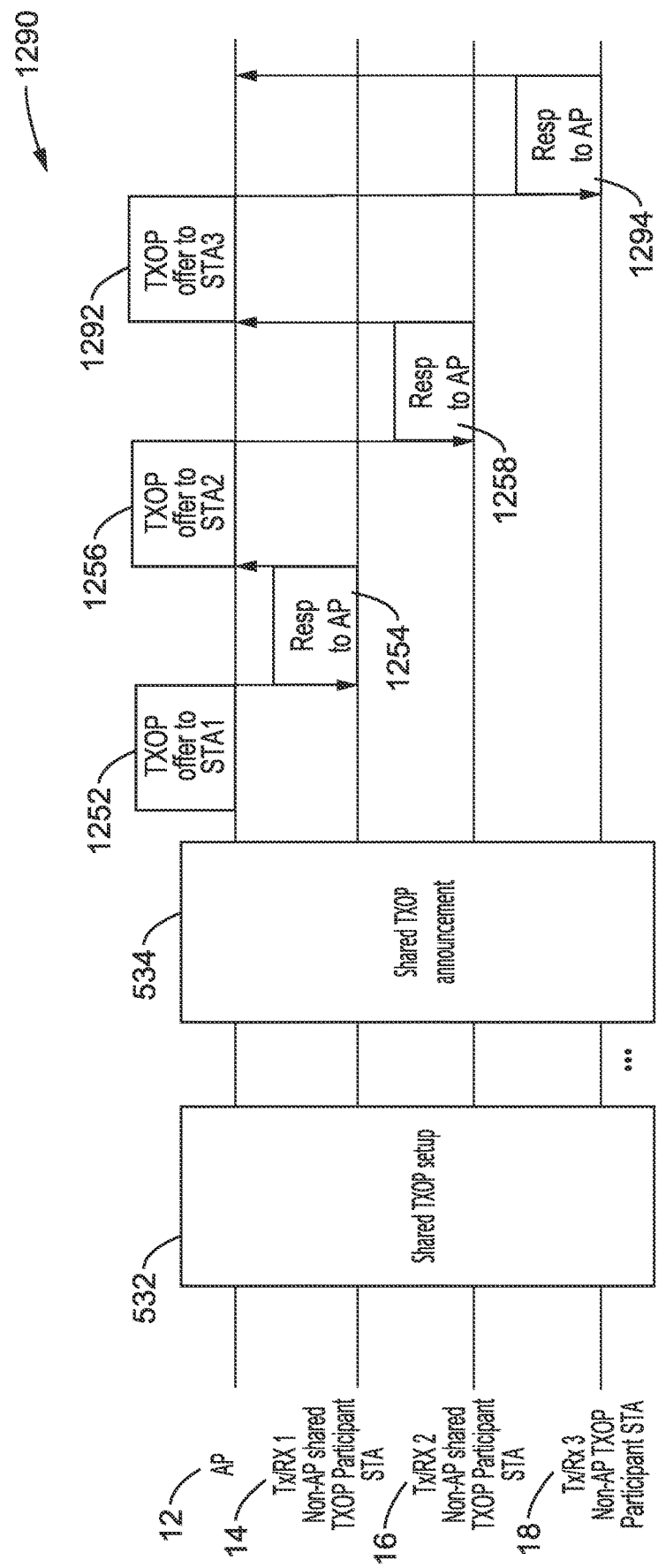
FIG. 40 is a communication sequence diagram of a DL initiated TXOP participant acquirement stage with response after receiving dedicated TXOP offer, according to at least one embodiment of the present disclosure.

FIG. 40 illustrates an example embodiment 1290 of a DL initiated TXOP participant acquirement stage with response after receiving a dedicated TXOP offer.

Interactions are depicted between AP 12, STA1 14, STA2 16 and STA3 18. A shared TXOP setup is performed 532 followed by a shared TXOP announcement 534.

The AP unicasts a TXOP offer frame 1252, 1256 and 1292 to inquire upon non-AP STAs one by one. Once the non-AP STAs receive the TXOP offer frame they respond with an Access request frame 1254, 1258 and 1294 to the associated AP within a time offset, if they are willing to join the shared TXOP.

Figure 41:
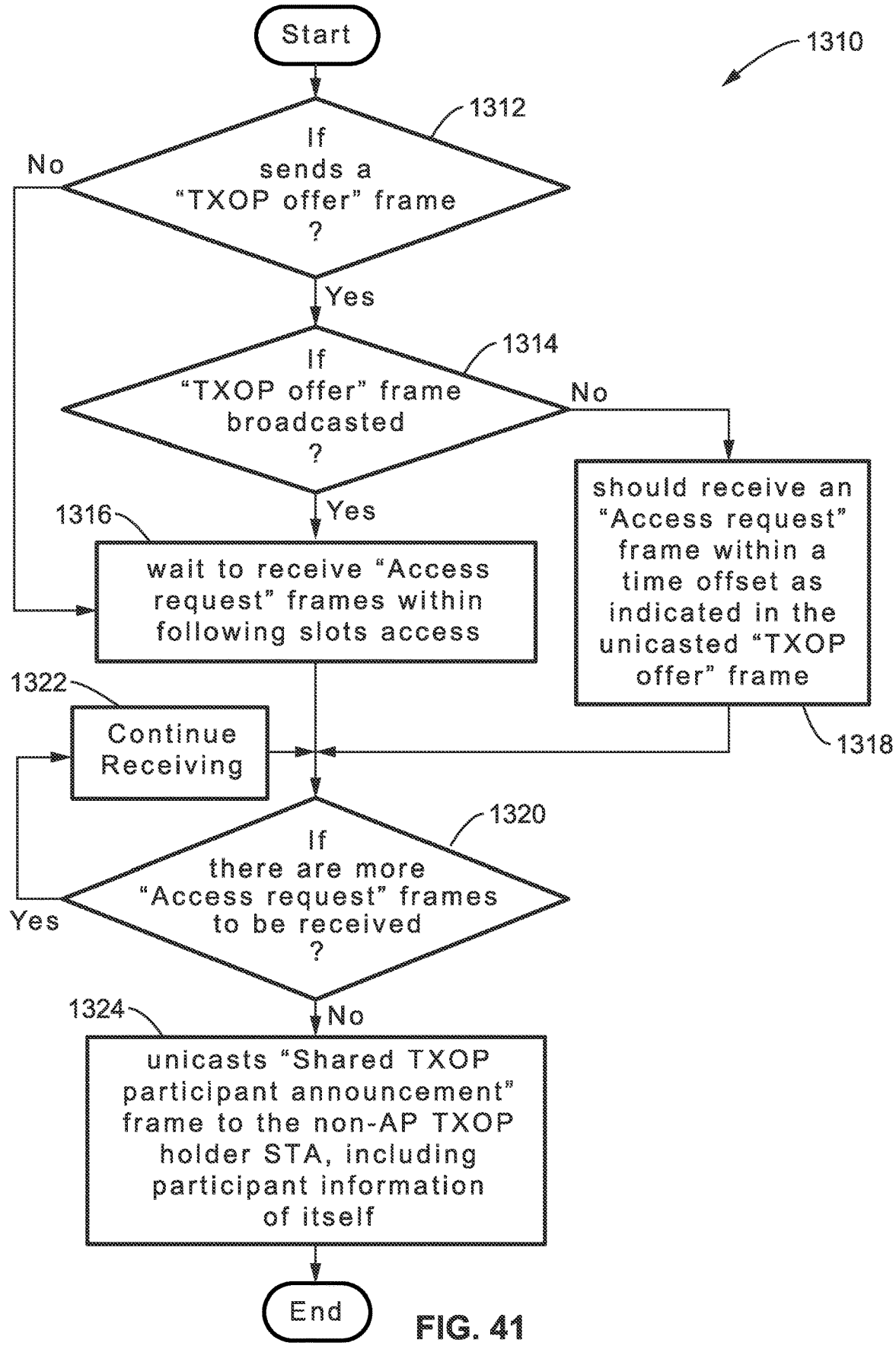
FIG. 41 is a flow diagram of a UL initiated TXOP participant acquirement stage, processed at the AP level, according to at least one embodiment of the present disclosure.

FIG. 41 illustrates an example embodiment 1310 of a UL initiated TXOP participant acquirement stage, processed at the AP level.

A check 1312 determines if the AP has inquired of TXOP share participant STAs by sending a TXOP Offer frame. If a TXOP Offer frame has not been sent, then execution moves forward to block 1316 since non-AP shared TXOP participants may transmit Access request frames to the AP after receiving a CTS-share frame that was sent during the shared TXOP announcement stage. Otherwise, a check is made 1314 to determine if this TXOP Offer frame was broadcast. If it was broadcast, then at block 1316 the AP waits to receive one or more Access Request frames within the period of slot accesses.

If the TXOP Offer was not broadcast then at block 1318 the AP should receive an Access Request frame within a time offset as indicated in the unicasted TXOP Offer frame.

Execution from either block 1316 or 1318 reaches decision block 1320, which determines if there are more access requests to be received. If there are more expected access requests then execution moves to block 1322 where it continues receiving after which it returns to block 1320.

Otherwise, with access requests received from all the TXOP share participant STAs, then execution reaches block 1324 in which the AP unicasts a Shared TXOP Participant Announcement frame to the non-AP TXOP holder STA.

Figure 42:
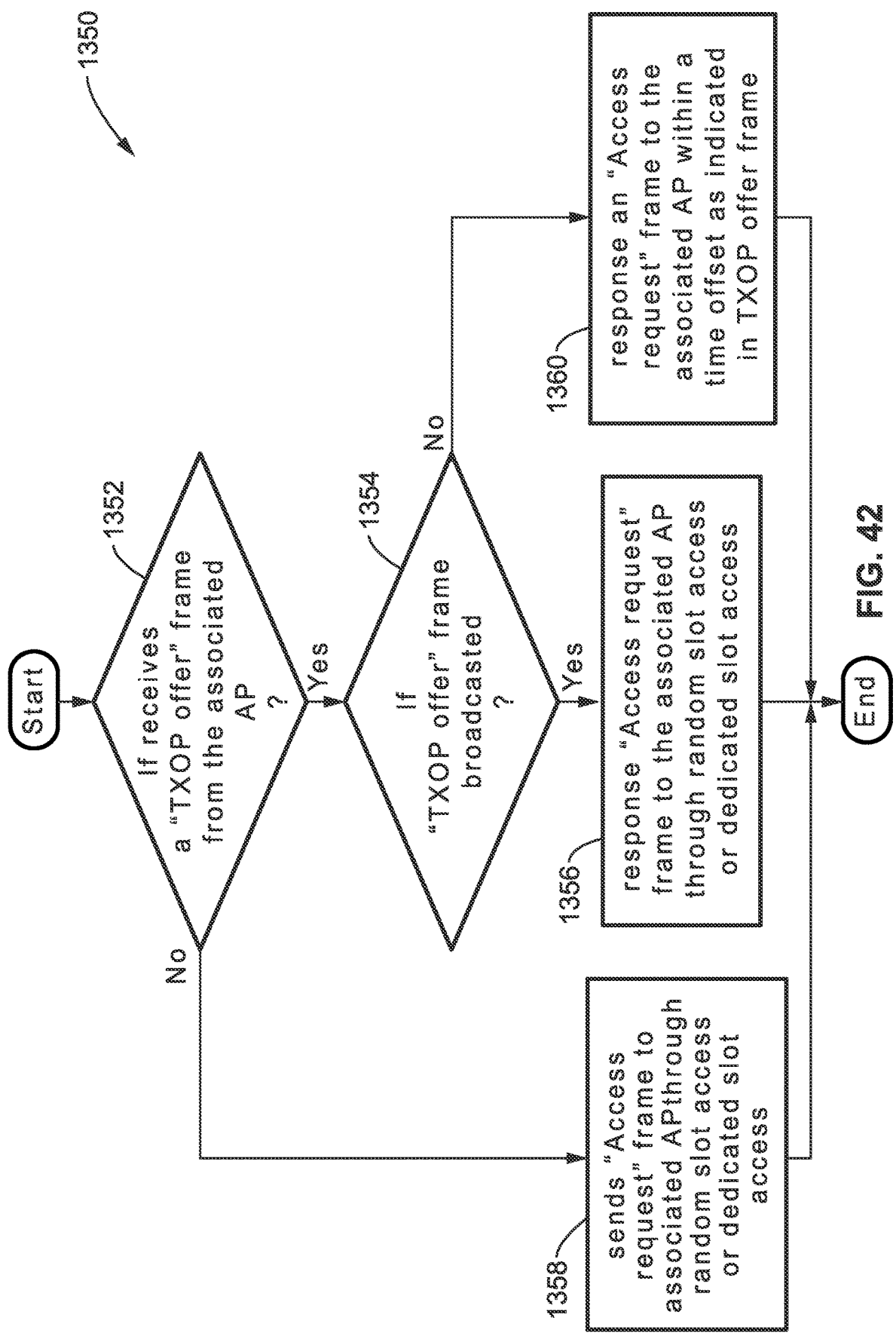
FIG. 42 is a flow diagram of a UL initiated TXOP participant acquirement stage, processed at the non-AP shared TXOP participant STA level, according to at least one embodiment of the present disclosure.

FIG. 42 illustrates an example embodiment 1350 of a UL initiated TXOP participant acquirement stage, performing processing at the non-AP shared TXOP participant STA level.

A check 1352 determines if the non-AP shared TXOP participant STA has received a broadcast TXOP Offer frame from the associated AP. If the participant STA has received the TXOP offer frame, it checks 1354 if the TXOP offer frame was broadcast. If the frame was found to be broadcast, then at block 1356 the STA responds with an Access Request frame to the associated AP through random slot access or dedicated slot access.

If at block 1354 it is determined that the TXOP offer frame was not broadcast, then block 1360 is reached and the non-AP shared TXOP participant STA responds with an Access Request frame to the associated AP within a time offset as indicated in the TXOP offer frame.

If at block 1352, it is determined that a TXOP Offer was not received, then block 1358 is reached and the non-AP shared TXOP participant STA sends an Access Request frame to the associated AP through random slot access or dedicated slot access.

Figure 43:
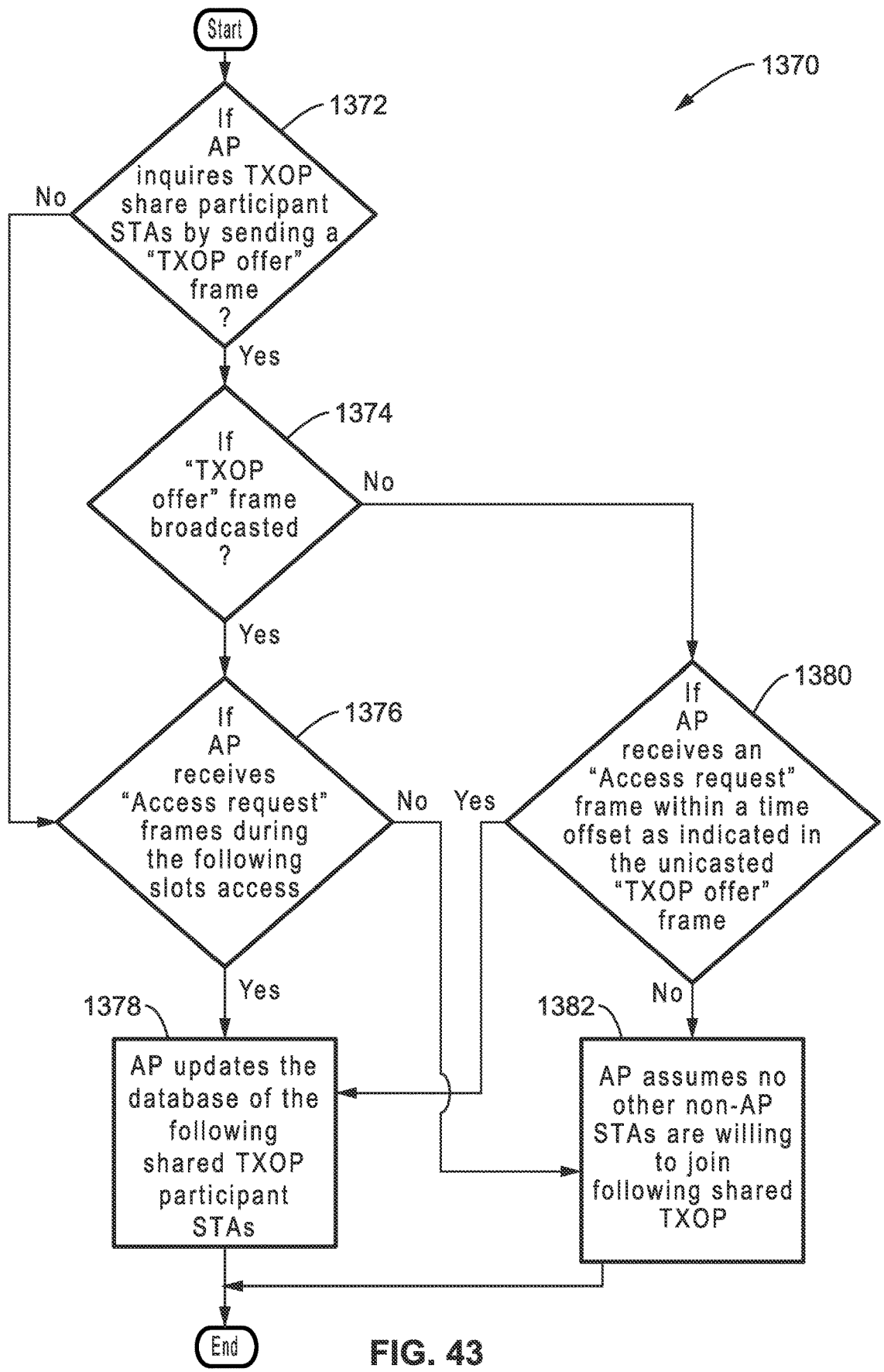
FIG. 43 is a flow diagram of a DL initiated TXOP participant acquirement stage, processed at the AP level, according to at least one embodiment of the present disclosure.

FIG. 43 illustrates an example embodiment 1370 of a DL initiated TXOP participant acquirement stage, processed at the AP.

A check 1372 determines if the AP has inquired on non-AP TXOP share participants by sending a TXOP offer frame. If no inquiry is detected in block 1372 then execution moves to block 1376. However, if inquiry is detected at block 1372, then at block 1374 a check is made to determine if the TXOP Offer frame has been broadcast. If the TXOP offer has not been broadcast then execution reaches block 1380, otherwise execution moves to block 1376.

It should be noted that once STA1 or STA2 (the non-AP shared TXOP participant STAs) receive the TXOP offer frame, if they are willing to join the following shared TXOP, they need to respond with an Access Request frame to the non-AP TXOP holder STA within a time offset.

In block 1380 a check is made if the AP has received an Access Request frame within a time and offset as indicated in the unicasted TXOP Offer frame. If a proper request frame has not been received in block 1380, then execution reaches block 1382 and the AP assumes that no other non-AP STAs are willing to join the following shared TXOP. Otherwise, if a proper request frame was received at block 1380, then execution moves to block 1378 and the AP updates the database of the following shared TXOP participant STAs. In block 1376 a check is made if the AP has received Access request frames during the following slots access. If a proper Access request frame has been received, then execution moves to block 1378 and the AP updates the database of the following shared TXOP participant STAs. Otherwise, since it was determined in block 1376 that the AP did not receive access request frames, then execution moves to block 1382, which was already described.

It should be noted that the flowchart of the DL initiated TXOP participant acquirement stage, process at non-AP shared TXOP participant STA level is the same as was shown in FIG. 43.

7.3.3. TXOP Schedule and Access (w/AP as coordinator)
7.3.3.1. TXOP Schedule and Access w/unicast TXOP Offer Frame (with AP)

Figure 44:
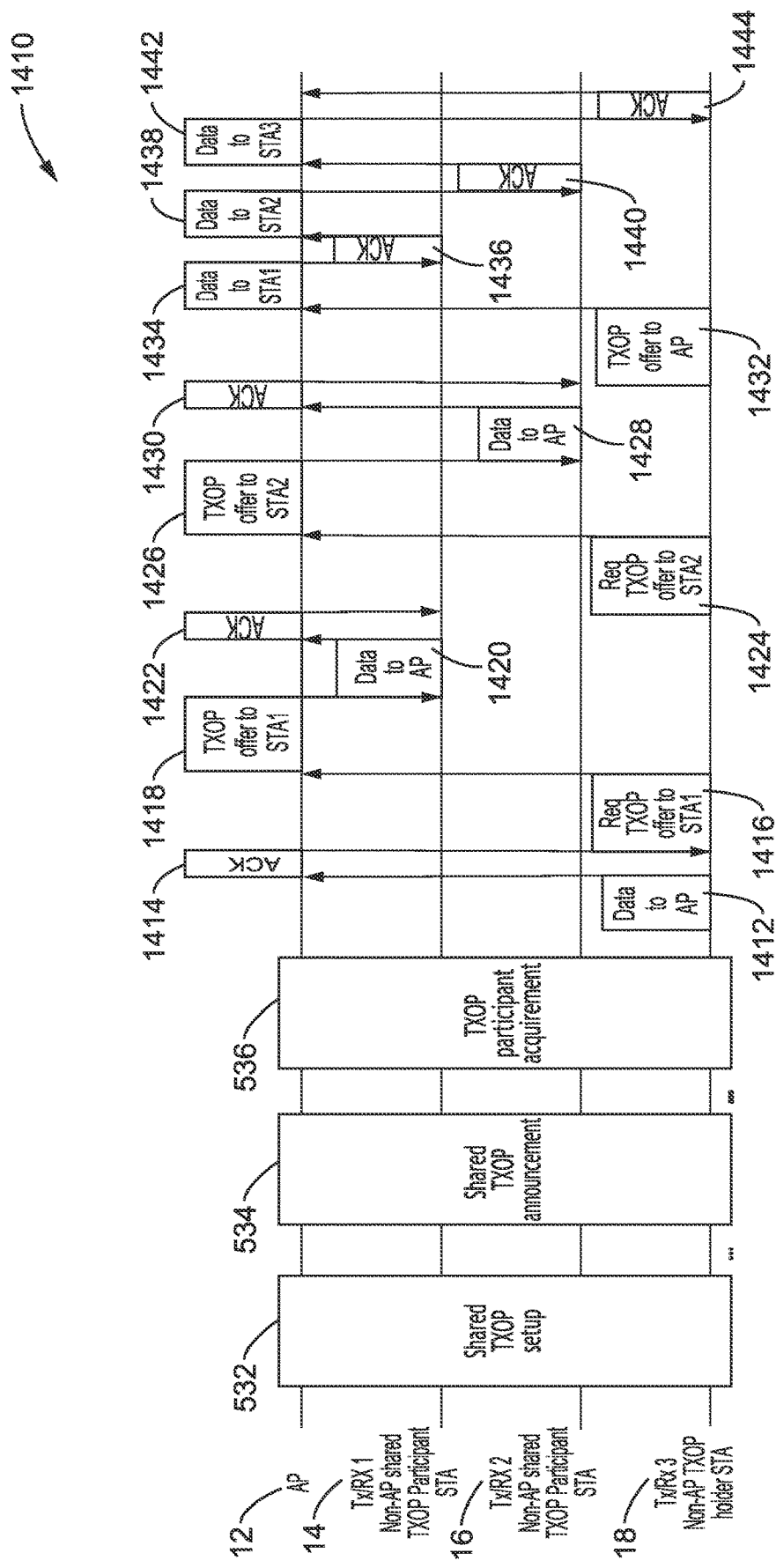
FIG. 44 is a communication sequence diagram of a UL initiated TXOP schedule and access stage with unicast TXOP offer frame, with AP coordination, according to at least one embodiment of the present disclosure.

FIG. 44 illustrates an example embodiment 1410 of a UL initiated TXOP schedule and access stage with unicast TXOP offer frame (with AP as the coordinator).

Interactions are depicted between AP 12, STA1 14, STA2 16 and STA3 18. A shared TXOP setup is performed 532 followed by a shared TXOP announcement 534, and then a TXOP participant acquirement stage 536. The non-AP TXOP holder STA, exemplified as STA3, sends DATA 1412 to the associated AP, and it should receive an ACK 1414 to indicate successful transmission of DATA. Then, the non-AP TXOP holder STA sends a Request TXOP offer frame 1416 for STA1 to the associated AP; the request includes an indication on the start of the shared TXOP access for the next TXOP share participant STA.

After receiving the Request TXOP offer frame, the AP unicasts TXOP offer frame 1418 to the TXOP share participant STA1 which includes an indication of the TX Duration for it. Upon receiving this TXOP offer frame, the non-AP shared TXOP participant STA1 sends UL DATA 1420 to the associated AP with a transmission Duration as indicated in the TXOP offer frame, to which the AP responds with ACK 1422.

The above is repeated in regard to STA2, with STA3 sending a Request TXOP offer frame 1424 for STA2 to the associated AP; the request includes an indication on the start of the shared TXOP access for the TXOP share participant STA2.

After receiving the Request TXOP offer frame, the AP unicasts TXOP offer frame 1426 to TXOP share participant STA2 which includes an indication of the transmission Duration for it.

Upon receiving this TXOP offer frame, the non-AP shared TXOP participant STA2 sends UL DATA 1428 to the associated AP with a transmit Duration as indicated in the TXOP offer frame, to which the AP responds with ACK 1430.

After looping through all the non-AP shared TXOP participant STAs, The non-AP TXOP holder STA unicasts a TXOP offer frame 1432 to the AP.

Having received the TXOP offer frame, the AP transmits DL DATA 1434, 1438 and 1442 to the destination STAs in the assigned time slots and waits for an ACK 1436, 1440 and 1444, from each destination STA.

Figure 45:
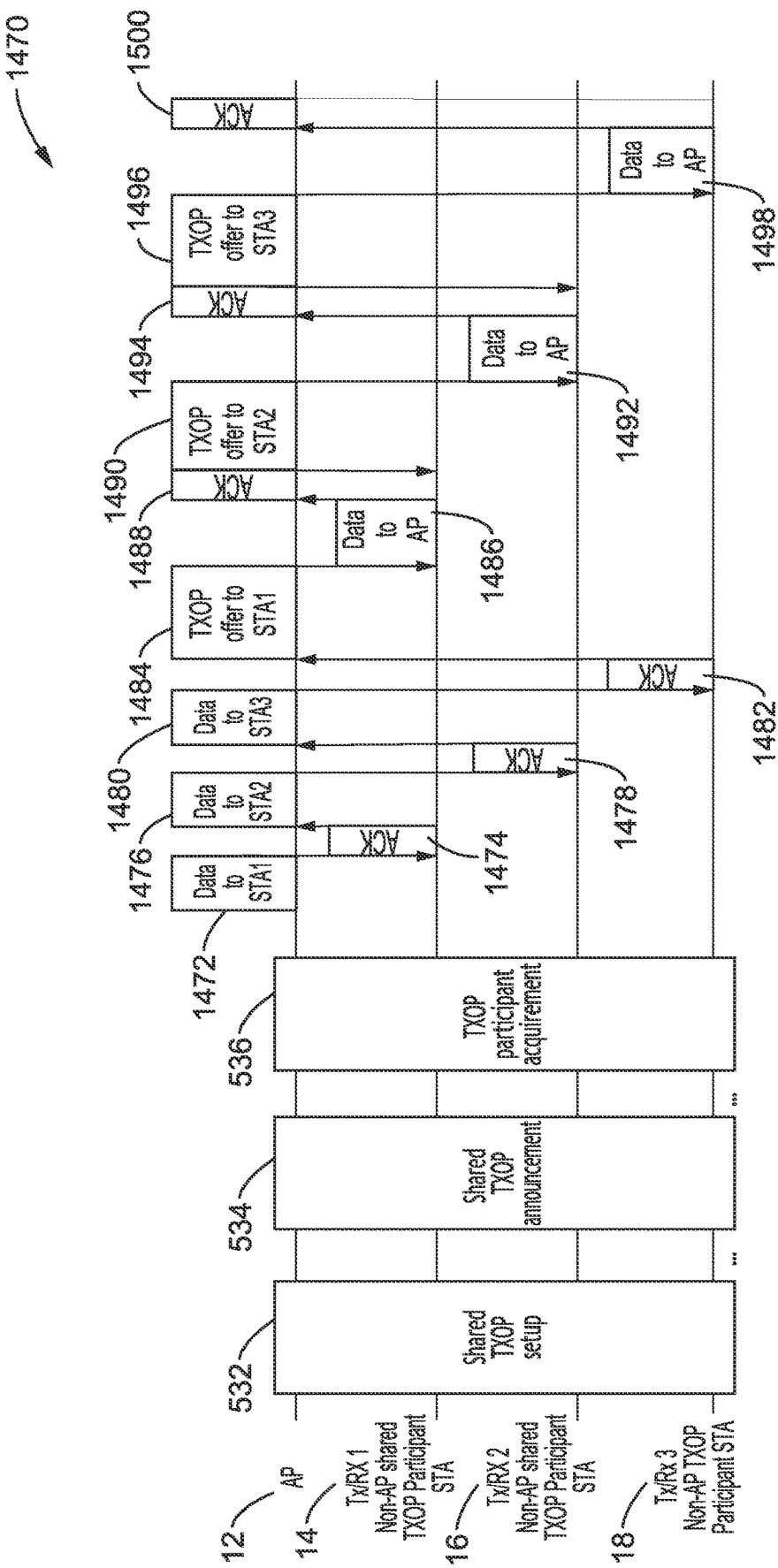
FIG. 45 is a communication sequence diagram of a DL initiated TXOP schedule and access with unicast TXOP offer frame, according to at least one embodiment of the present disclosure.

FIG. 45 illustrates an example embodiment 1470 of a DL initiated TXOP schedule and access with unicast TXOP offer frame.

Interactions are depicted between AP 12, STA1 14, STA2 16 and STA3 18. A shared TXOP setup is performed 532 followed by a shared TXOP announcement 534, and then a TXOP participant acquirement stage 536.

First, the AP sends DL Data 1472, 1476 and 1480 to the destination STAs (STA1, STA2 and STA3), in response to which it should receive an ACK 1474, 1478 and 1482 from each of the destination STAs that indicate successful transmission.

Then, the AP unicasts a TXOP offer frame to each STA as it loops through all TXOP share participant STAs, indicating the transmission duration for the next TXOP share participant STA. This is exemplified as TXOP offer frames 1484, 1490 and 1496 being sent to STA1, STA2 and STA3, respectively.

Upon receiving the TXOP offer frame, each of the non-AP shared TXOP participant STAs receiving the frame send back UL Data 1486, 1492 and 1498, respectively, to the associated AP within the transmission duration as indicated in the TXOP offer frame and waits to receive an ACK 1488, 1494 and 1500 from the AP to indicate successful transmission.

7.3.3.2. TXOP Schedule and Access with Unicast TXOP Access Scheduler (with AP as the Coordinator)

Figure 46:
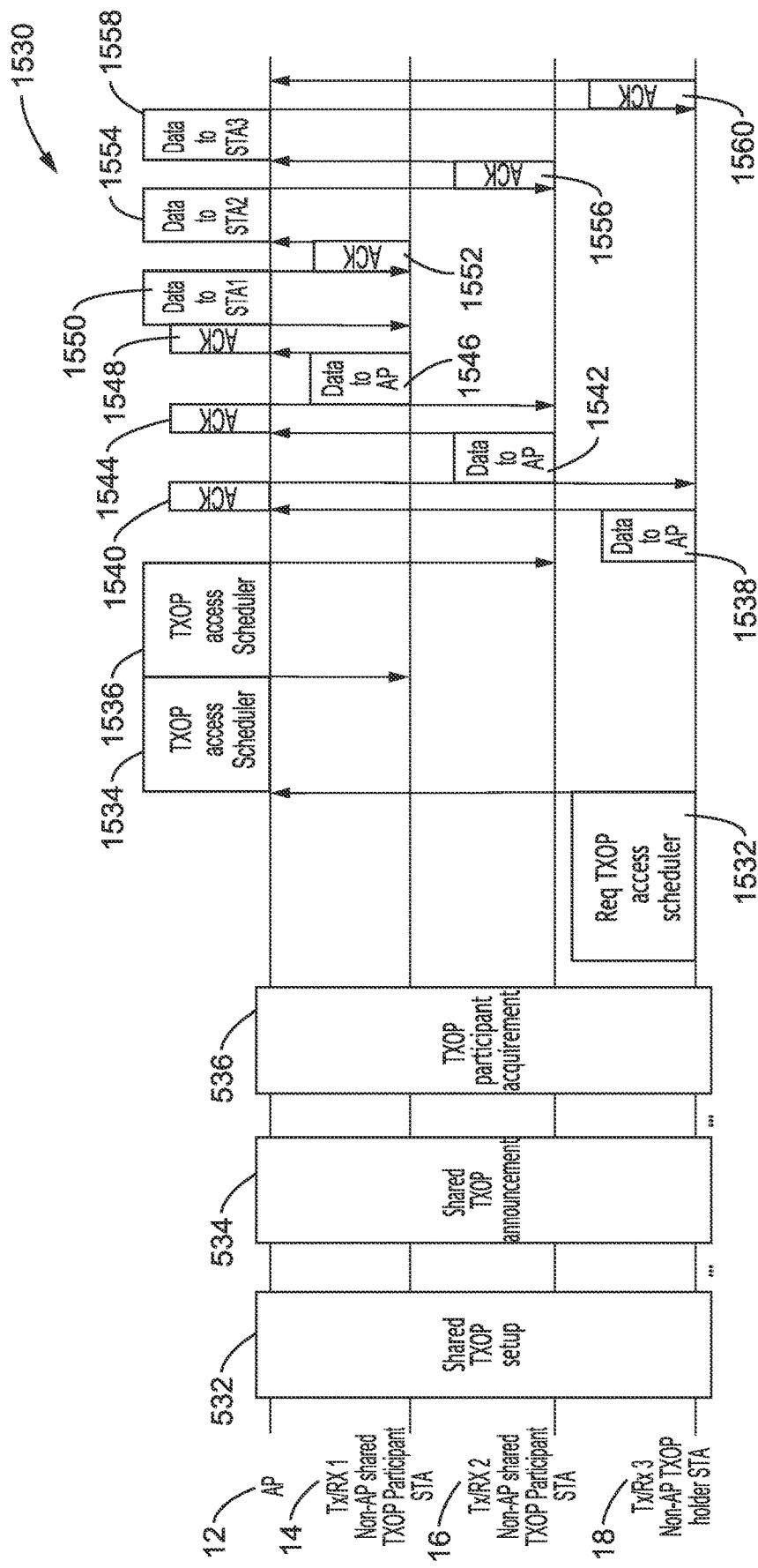
FIG. 46 is a communication sequence diagram of a UL initiated TXOP schedule and access stage with unicast TXOP access scheduler frame, with AP coordination, according to at least one embodiment of the present disclosure.

FIG. 46 illustrates an example embodiment 1530 of a UL initiated TXOP schedule and access stage with unicast TXOP access scheduler frame (with AP as the coordinator).

Interactions are depicted between AP 12, STA1 14, STA2 16 and STA3 18. A shared TXOP setup is performed 532 followed by a shared TXOP announcement 534, and then a TXOP participant acquirement stage 536.

Before the non-AP TXOP holder STA sends Data to the associated AP, it first sends a Request TXOP access scheduler frame 1532 to the associated AP, which indicates the shared TXOP access for all other non-AP shared TXOP participant STAs and the AP.

After receiving the Request TXOP access scheduler frame, the AP unicasts a TXOP access scheduler frame to each of the non-AP shared TXOP participant STAs indicating the TX Duration for each of them. In the example these scheduler frames 1534 and 1536 are sent to STA1 and STA2.

Once the non-AP shared TXOP participant STAs receive the TXOP access scheduler frame, they will send Data 1538, 1542 and 1546 to the associated AP in the time slots as indicated in the Allocation Control field of the Access request information element as embedded in the beacon frame, and wait for an ACK 1540, 1544 and 1548.

After this the AP is seen transmitting DL DATA 1550, 1554 and 1558 to the destination STAs in the assigned time slots and waiting for an ACK 1552, 1556 and 1560.

Figure 47:
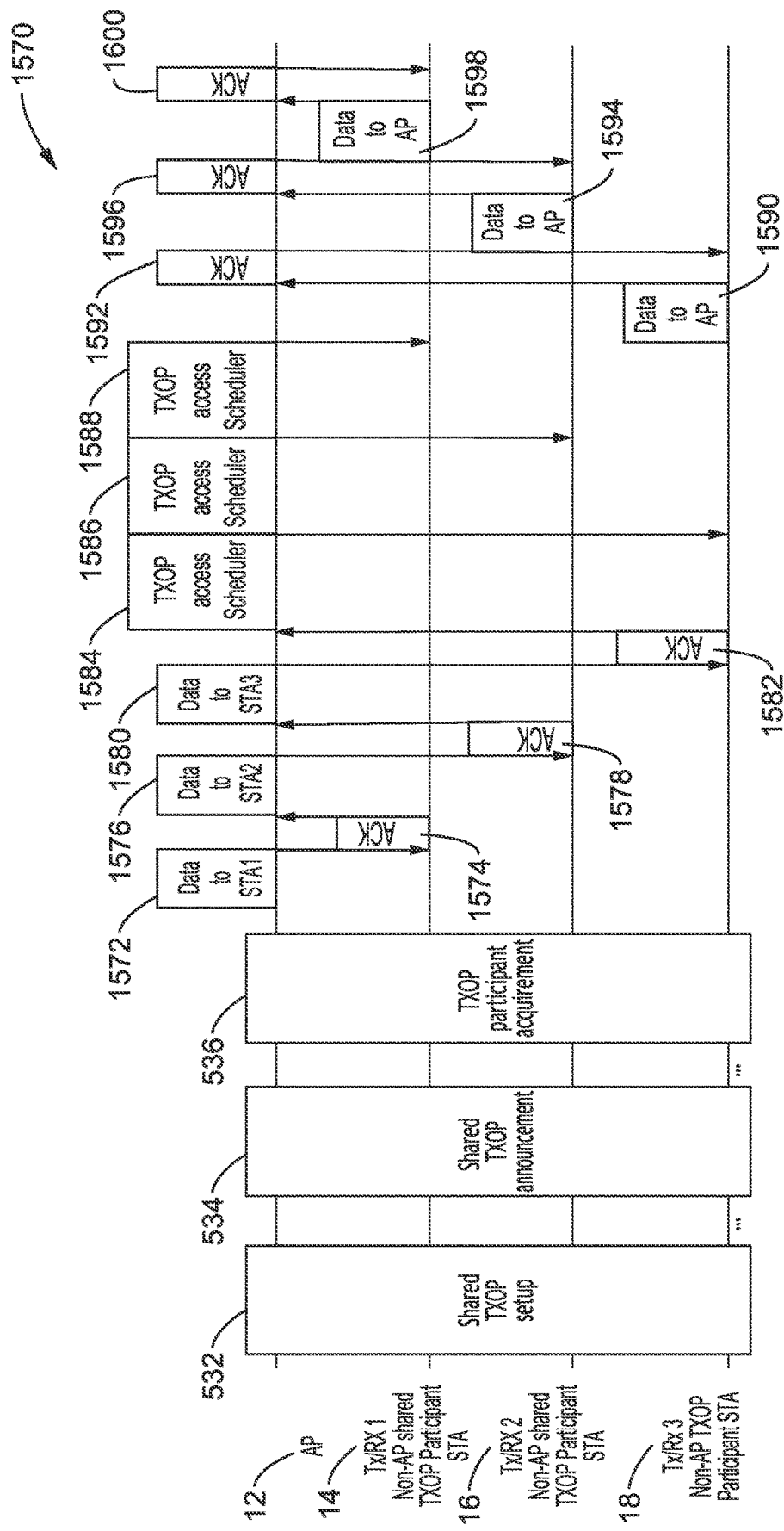
FIG. 47 is a communication sequence diagram of a DL initiated TXOP schedule and access with unicast TXOP access scheduler, according to at least one embodiment of the present disclosure.

FIG. 47 illustrates an example embodiment 1570 of a DL initiated TXOP schedule and access with unicast TXOP access scheduler.

Interactions are depicted between AP 12, STA1 14, STA2 16 and STA3 18. A shared TXOP setup is performed 532 followed by a shared TXOP announcement 534, and then a TXOP participant acquirement stage 536.

First, the AP sends DL Data 1572, 1576 and 1580 to the destination STAs, and should receive an ACK 1574, 1578 and 1582 from each of the destination STAs indicating successful transmission. Then, the AP unicasts a TXOP access scheduler frame 1584, 1586 and 1588 to each of the non-AP shared TXOP participant STAs, indicating the TX Duration for each of the STAs. Once the STAs receive the TXOP access scheduler frame, they will send Data 1590, 1594 and 1598 to the associated AP in the assigned time slots and wait for ACK 1592, 1596 and 1600.

7.3.3.3. TXOP Schedule and Access with Broadcast TXOP Scheduler (with AP as the coordinator)

Figure 48:
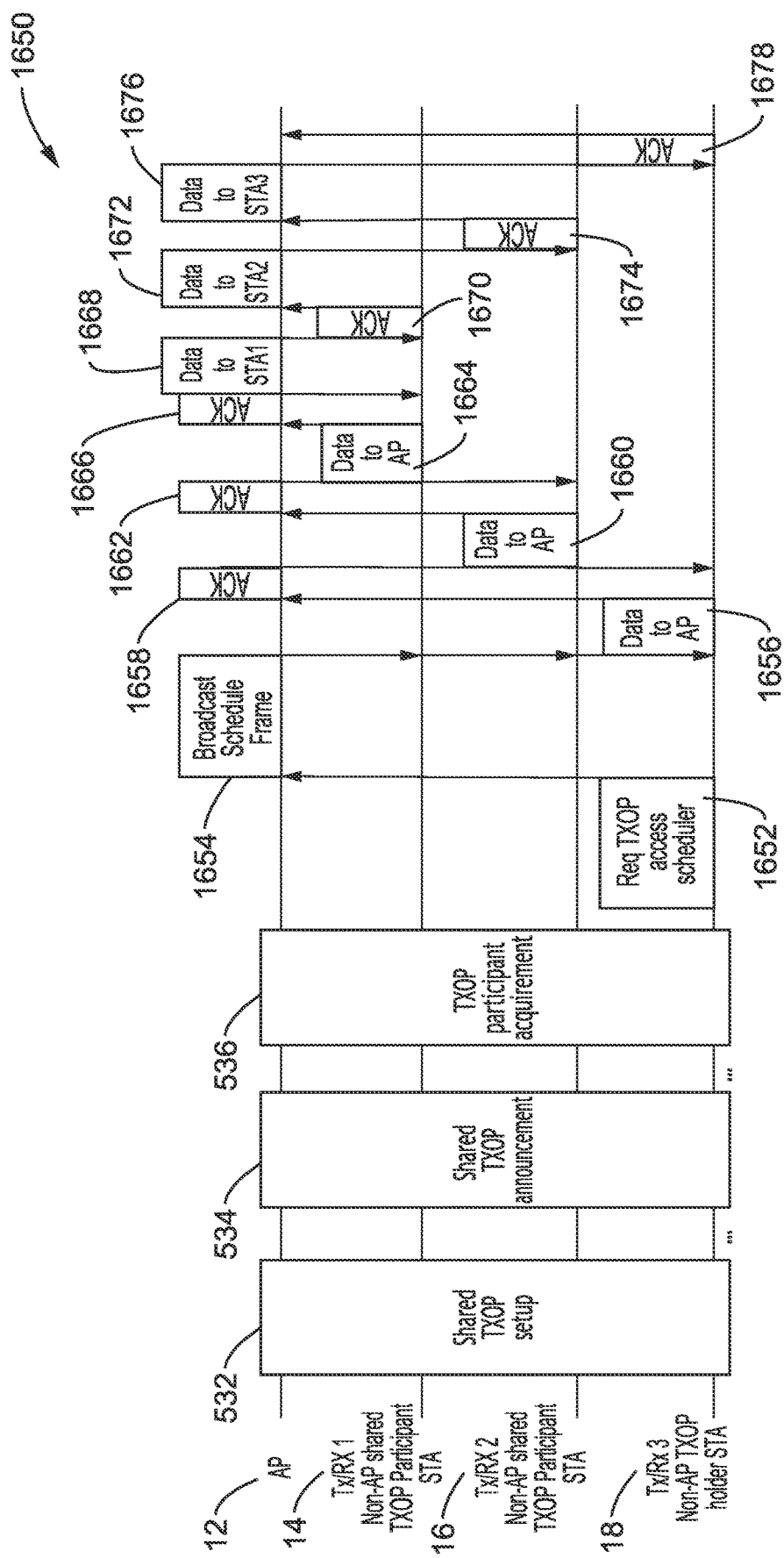
FIG. 48 is a communication sequence diagram of a UL initiated TXOP schedule and access stage with broadcast TXOP scheduler frame, with AP coordination, according to at least one embodiment of the present disclosure.

FIG. 48 illustrates an example embodiment 1650 of a UL initiated TXOP schedule and access stage with broadcast TXOP scheduler frame (with AP as the coordinator).

Interactions are depicted between AP 12, STA1 14, STA2 16 and STA3 18. A shared TXOP setup is performed 532 followed by a shared TXOP announcement 534, and then a TXOP participant acquirement stage 536.

Before the non-AP TXOP holder sends Data to the associated AP, it first sends a Request TXOP access scheduler frame 1652 to the AP, which indicates the shared TXOP access for all other non-AP shared TXOP participant STAs and the AP.

After receiving the Request TXOP access scheduler frame, the AP broadcasts a Broadcast TXOP scheduler frame 1654 to the non-AP shared TXOP participant STAs (shown here as STA1, STA2 and the TXOP holder STA3), indicating the TX Duration for each of the shared TXOP participants. Once the non-AP shared TXOP participant STAs receive the Broadcast TXOP scheduler frame, they respond by sending UL Data 1656, 1660 and 1664 to the associated AP in the time slot as indicated in the Broadcast TXOP scheduler frame, and await an ACK 1658, 1662, and 1666. After finishing receiving all the UL DATA, the AP then transmits DL DATA 1668, 1672 and 1676 to the destination STAs in the assigned time slots and wait for an ACK 1670, 1674 and 1678.

Figure 49:
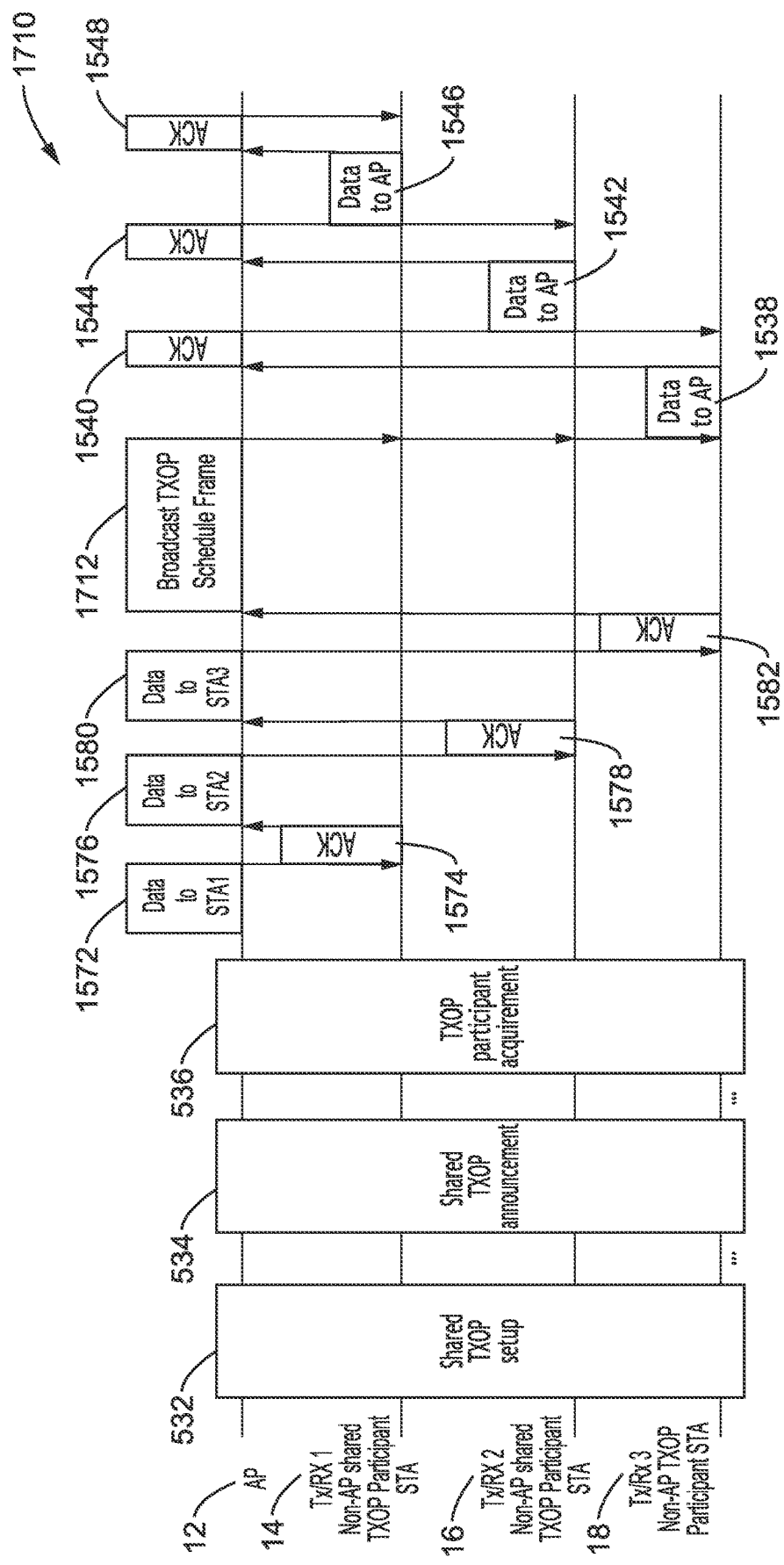
FIG. 49 is a communication sequence diagram of a DL initiated TXOP schedule and access with broadcast TXOP scheduler frame, according to at least one embodiment of the present disclosure.

FIG. 49 illustrates an example embodiment 1710 of a DL initiated TXOP schedule and access with broadcast TXOP scheduler frame.

Interactions are depicted between AP 12, STA1 14, STA2 16 and STA3 18. A shared TXOP setup is performed 532 followed by a shared TXOP announcement 534, and then a TXOP participant acquirement stage 536.

First the AP sends DL Data 1572, 1576 and 1580 to each destination STA in the assigned time slots and waits for an associated ACK 1574, 1578 and 1582. Then, the AP broadcasts a Broadcast TXOP scheduler frame 1712, indicating the TX Duration for each non-AP shared TXOP participant STA. Once the STAs receive the Broadcast TXOP scheduler frame, they will send UL Data 1538, 1542 and 1546 to the associated AP in different time slots as indicated in the Broadcast TXOP scheduler frame, and await the associated ACKs 1540, 1544 and 1548.

7.3.4. UL initiated TXOP schedule and access stage, processed at the non-AP TXOP holder STA level (with AP as the coordinator)

Figure 50A:
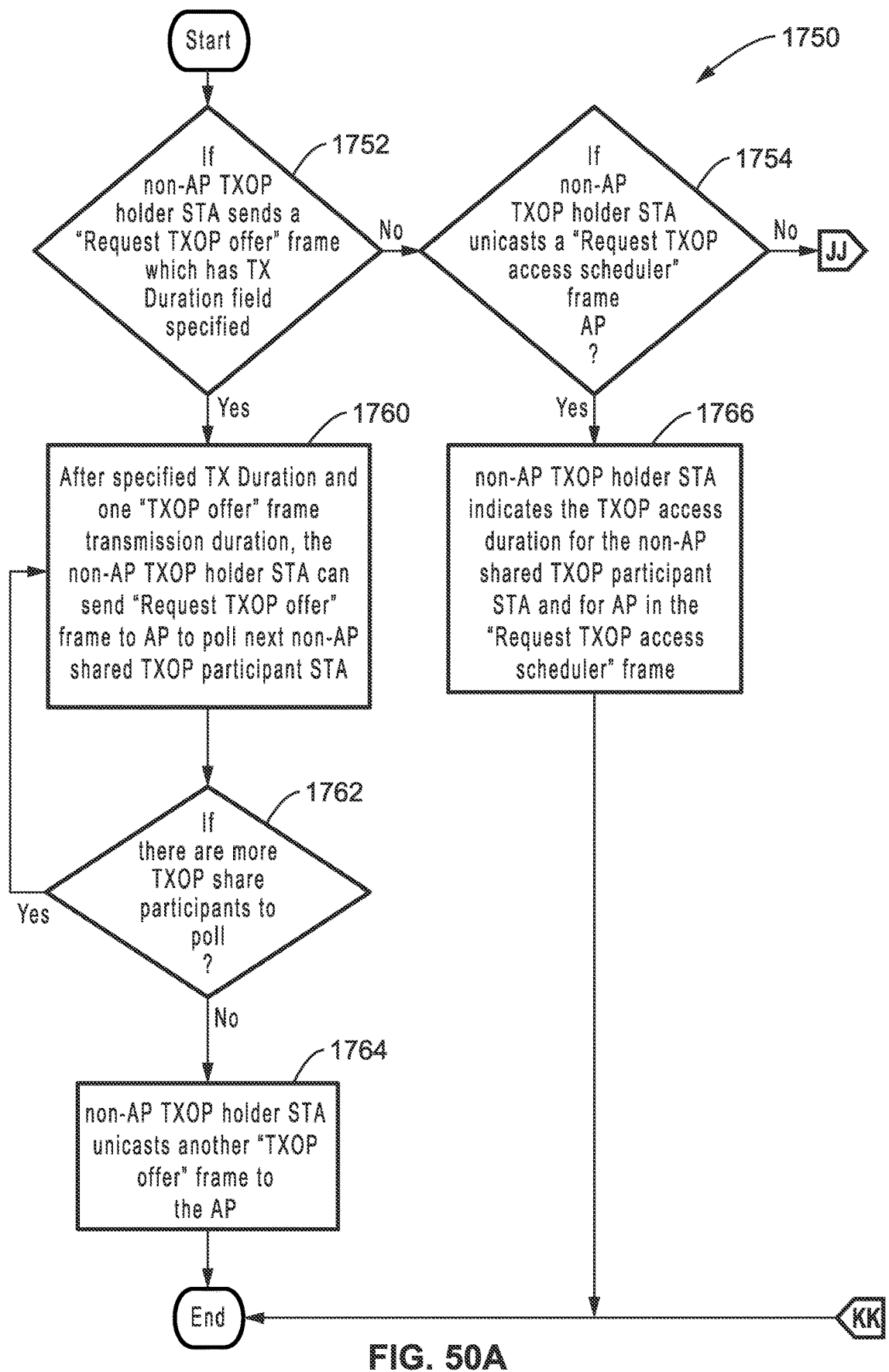
FIG. 50A through FIG. 50B is a flow diagram of a UL initiated TXOP schedule and access stage, processed at the non-AP TXOP holder STA level with AP coordination, according to at least one embodiment of the present disclosure.
Figure 50B:
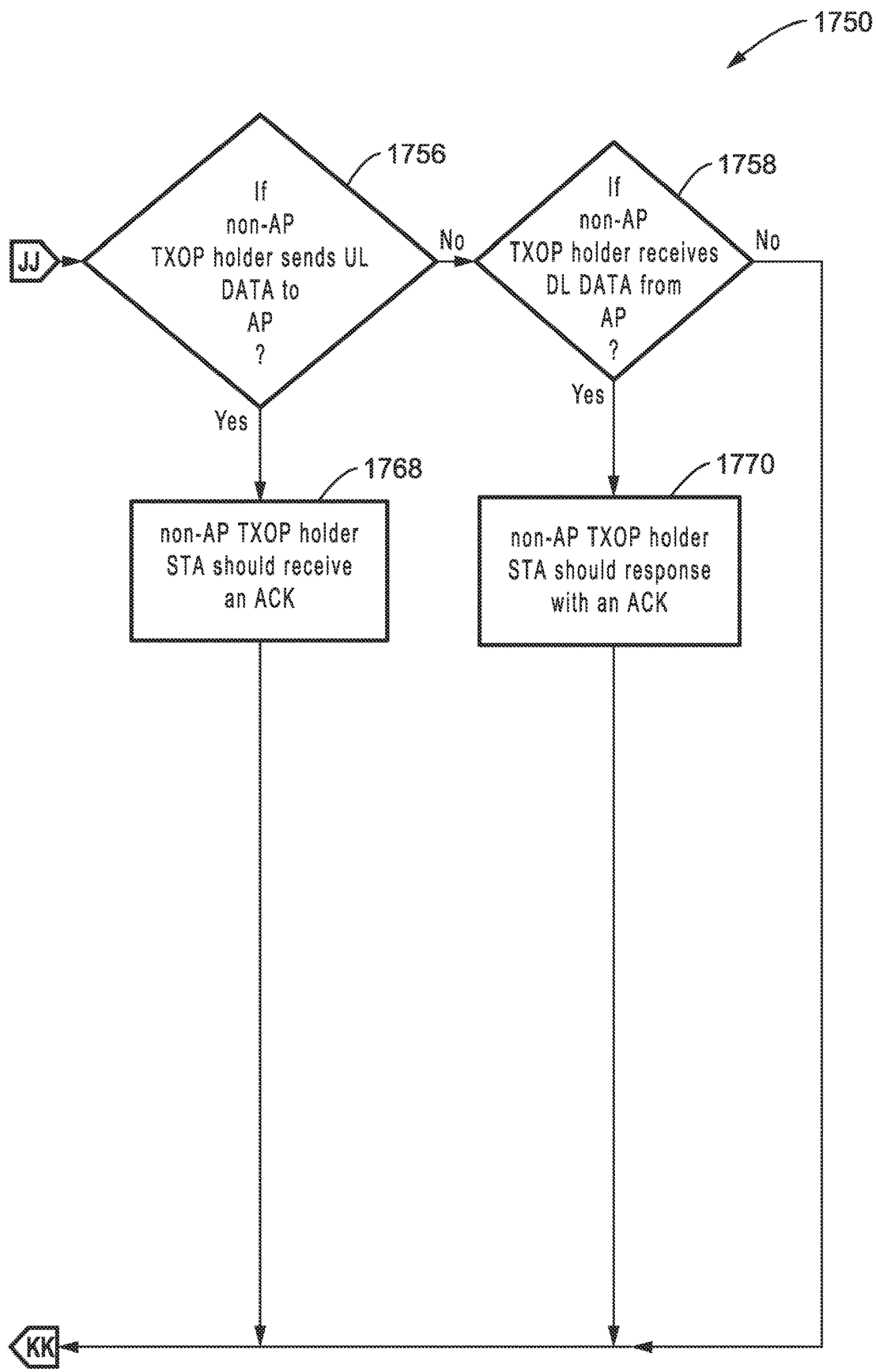

FIG. 50A and FIG. 50B illustrates an example embodiment 1750 of a UL initiated TXOP schedule and access stage, processed at the non-AP TXOP holder STA level (with AP as the coordinator).

A check 1752 to determine if the non-AP TXOP holder STA has sent a Request TXOP Offer frame which has the TX Duration field specified. If the Request TXOP Offer was sent, then at block 1760 after the specified TX duration and one TXOP Offer frame transmission duration, the non-AP TXOP holder STA can send a Request TXOP Offer frame to the AP to poll the next non-AP shared TXOP participant STA.

Check 1762 determines if there are more TXOP participant STAs to poll. If there are more participants, then execution returns to block 1760 so that the non-AP TXOP holder STA will keep sending Request TXOP Offer frames to the AP. Once all the TXOP participant STAs and TXOP durations available have been processed, then at block 1764 the non-AP TXOP holder STA unicasts another TXOP Offer frame to the AP, after which processing ends.

Otherwise, if at block 1752 it is determined that the non-AP TXOP holder STA has not sent a Request TXOP Offer, then at block 1754 it is determined if the non-AP TXOP holder STA has unicast a Request TXOP Access Scheduler frame to the AP. If the scheduler frame has been sent, then at block 1766 the non-AP shared TXOP holder STA indicates the TXOP access duration for the non-AP shared TXOP participant STA and for the AP in the Request TXOP access scheduler frame, before processing ends.

Figure 51A:
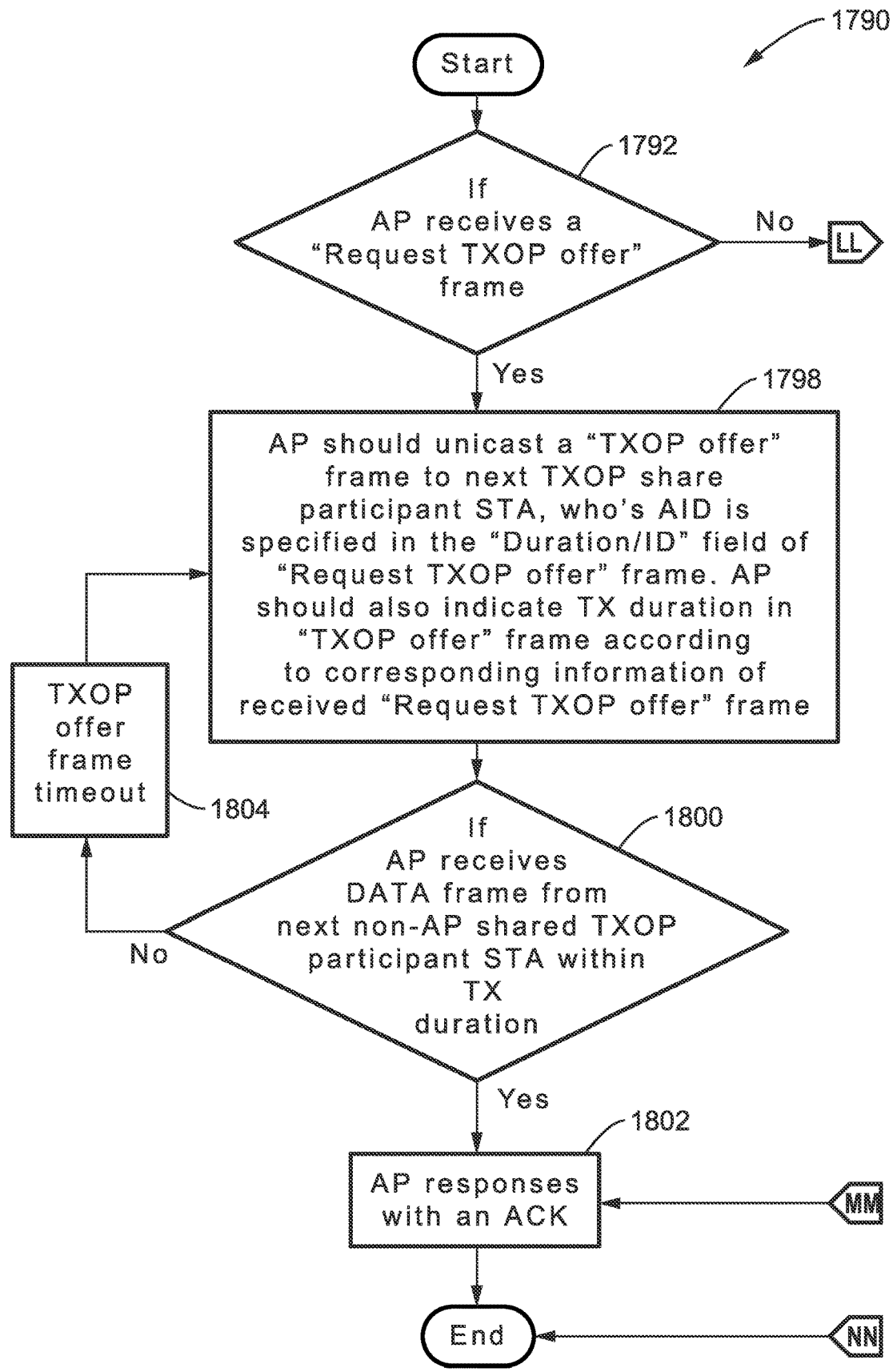
FIG. 51A through FIG. 51C is a flow diagram of a UL initiated TXOP schedule and access stage, processed at the AP with AP coordination, according to at least one embodiment of the present disclosure.
Figure 51B:
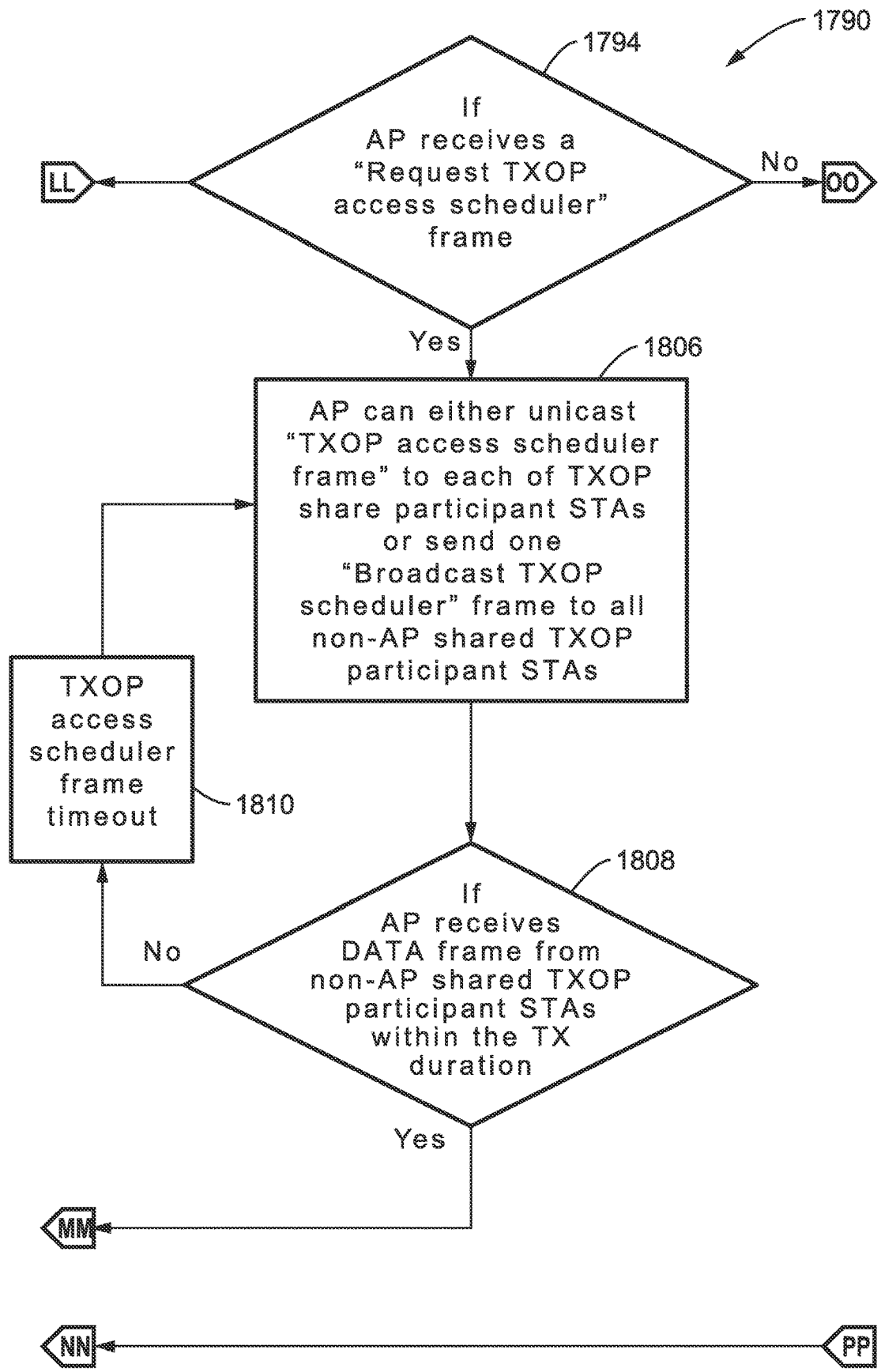

Otherwise, if at block 1754 the non-AP TXOP holder STA has not unicast a Request TXOP Access Scheduler frame to the AP, then execution reaches block 1756 in FIG. 51B which checks if the non-AP TXOP holder has sent UL Data to the AP. If the data has been sent, then at block 1768 the non-AP TXOP holder STA awaits an ACK.

Otherwise, if at block 1756 it is determined that the non-AP TXOP holder has not sent UL Data to the AP, then execution reaches block 1758 with a check to determine if the non-AP TXOP holder receives DL DATA from the AP. If it has not received the DL data then processing ends, otherwise at block 1770 the non-AP TXOP holder STA responds with an ACK.

7.3.5. UL Initiated TXOP Schedule and Access Stage, Processed at the AP (with AP as the Coordinator)

Figure 51C:
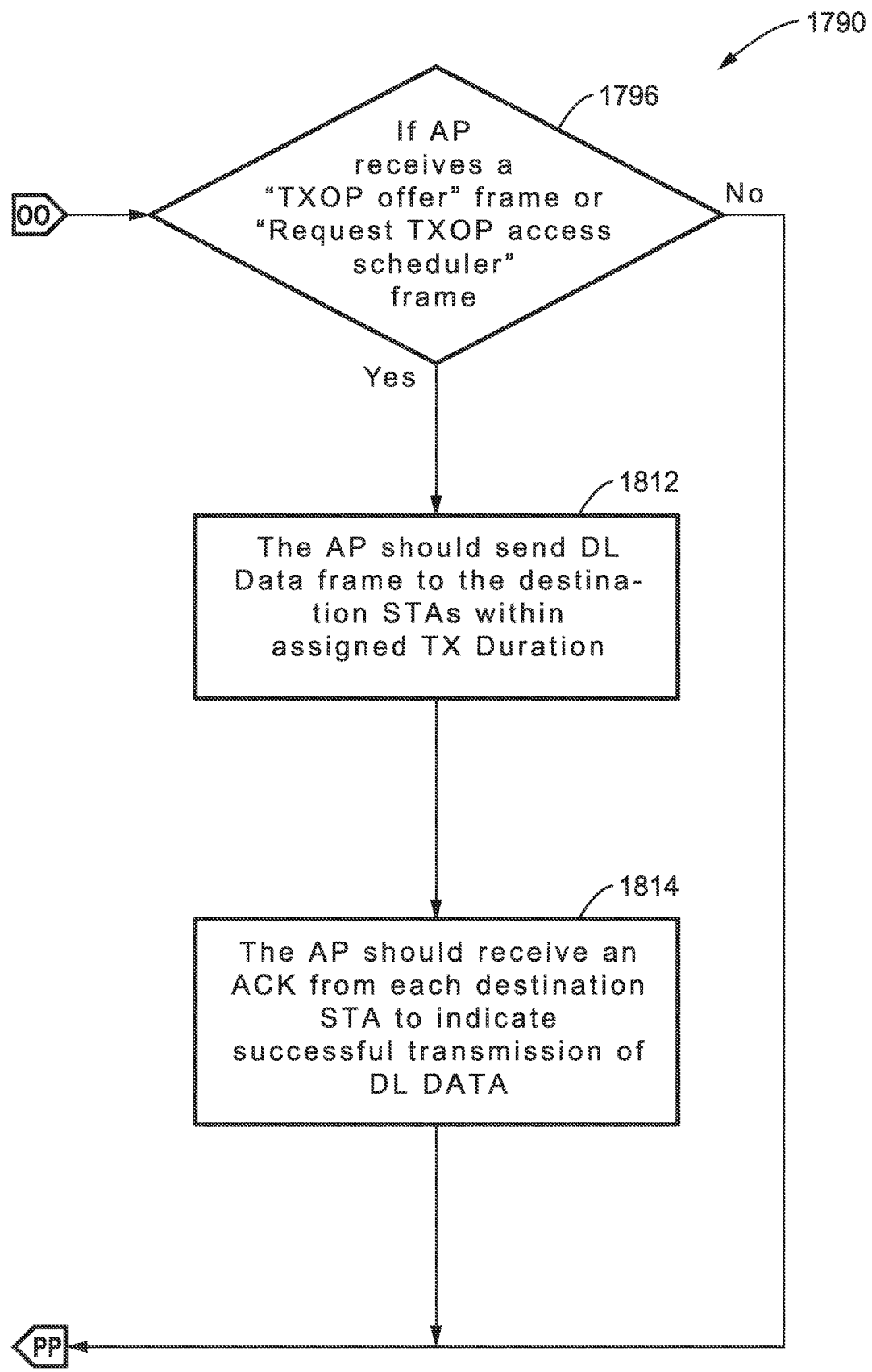

FIG. 51A through FIG. 51C illustrate an example embodiment 1790 of a UL initiated TXOP schedule and access stage, processed at the AP with AP coordination.

A check is made 1792 to determine if the AP has received a Request TXOP Offer frame. If the Request TXOP Offer is received, then at block 1798 the AP unicasts a TXOP Offer frame to the next TXOP share participant STA, having an AID specified in the Duration/ID field of the Request TXOP Offer frame. The AP should also indicate the TX duration in the TXOP Offer frame corresponding to the information from the received Request TXOP Offer frame.

A check 1800 determines if the AP received the Data frame from the next non-AP shared TXOP participant STA within the TX duration. If it does not receive the Data frame within the time limit, then the TXOP offer frame times out 1804, and the AP should retransmit 1798 the TXOP Offer frame.

However, if at block 1800 it has received the Data frame from the next non-AP shared TXOP participant STA, then the AP responds 1802 with an ACK before processing ends.

Otherwise, if at block 1792 it is determined that the AP did not receive a Request TXOP Offer frame, then block 1794 in FIG. 51B is reached which checks if the AP received a Request TXOP Access Scheduler frame. If it received the TXOP scheduler frame, then at block 1806 the AP can either unicast a TXOP Access Scheduler frame to each of the TXOP share participant STAs or send one Broadcast TXOP Scheduler frame to all of the non-AP shared TXOP participant STAs.

Check 1808 then determines if the AP has received the Data frame from the non-AP shared TXOP participant STAs within the transmit duration. If it has received the data frame then execution returns to block 1802 of FIG. 51A in which the AP responds with an ACK after which processing ends. Otherwise, if the frame was not received then execution reaches block 1810 with a TXOP access scheduler frame timeout with return made to block 1806.

Otherwise, if at block 1794 it is determined that the AP did not receive a Request TXOP Access Scheduler frame, then block 1796 of FIG. 51C is reached. Block 1796 performs a check to determine if the AP received a TXOP Offer frame or a Request TXOP access scheduler frame. If it did not receive either of these frames then execution ends. However, if one of these frames was received, then at block 1812 the AP sends a DL Data frame to the destination STAs within the assigned transmitter duration. The AP then awaits 1814 an ACK from each destination STA indicating the DL data was successfully received.

7.3.6. UL Initiated TXOP Schedule and Access Stage, Processed at the Non-AP Shared TXOP Participant STA (with AP as the Coordinator)

Figure 52A:
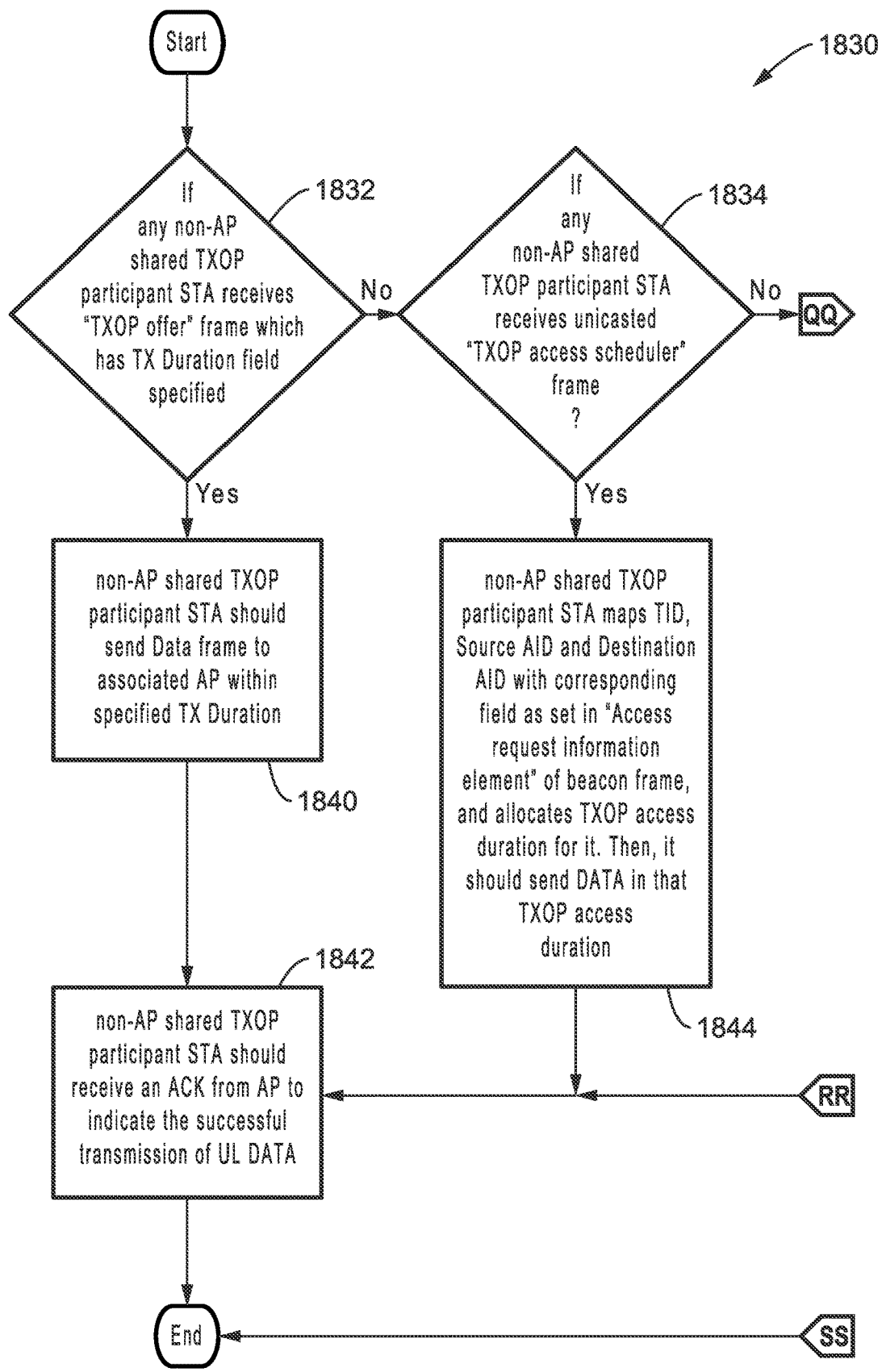
FIG. 52A through FIG. 52B is a flow diagram of a UL initiated TXOP schedule and access stage, processed at the non-AP shared TXOP participant STA with AP coordination, according to at least one embodiment of the present disclosure.
Figure 52B:
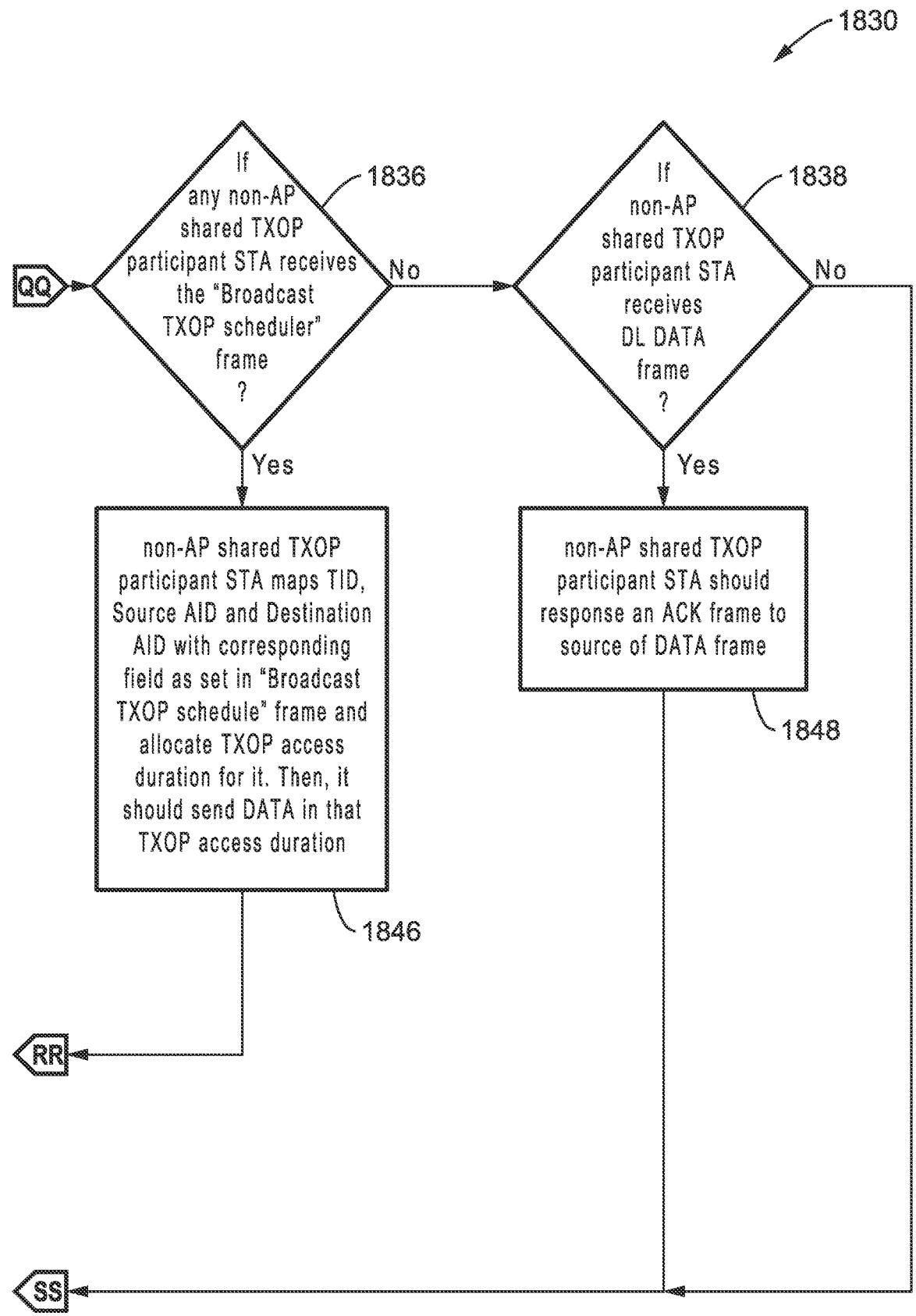

FIG. 52A and FIG. 52B illustrate an example embodiment 1830 of a UL initiated TXOP schedule and access stage, processed at the non-AP shared TXOP participant STA (with AP as the coordinator).

A check is made 1832 in FIG. 52A to determine if any non-AP shared TXOP participant STA receives a TXOP Offer frame which has the TX Duration field specified. If the TXOP Offer frame is received, then at block 1840 the non-AP shared TXOP participant STA sends a Data frame to the associated AP within the specified TX Duration. Then at block 1842 the non-AP shared TXOP participant STA awaits to receive an ACK from the AP indicating a successful transmission of UL Data, after which processing ends.

Otherwise, if the conditions are not met at block 1832, then execution moves to check 1834 which determines if any non-AP shared TXOP participant STA received the unicasted TXOP Access Scheduler frame. If the condition is met with the frame being received, then at block 1844 the non-AP shared TXOP participant STA maps the TID, Source AID and Destination AID with the corresponding field as set in the Access Request Information element of the beacon frame, and allocates the TXOP access duration for it. Then, it sends Data in that TXOP access duration. Execution then moves back to block 1842 before processing ends.

Otherwise, if the condition is not met at block 1834, then a check is performed 1836 in FIG. 52B to determine if any non-AP shared TXOP participant STAs have received the Broadcast TXOP Scheduler frame. If the condition was met, then at block 1846 the non-AP shared TXOP participant STA maps the TID, Source AID and Destination AID with the corresponding field as set in the Broadcast TXOP Schedule frame and allocates the TXOP access duration for it, after which it should send Data in that TXOP access duration, and execution moves to block 1842 of FIG. 52A before processing ends.

Otherwise, if the condition at block 1836 is not met, then execution reaches block 1838 with a check to determine if the non-AP shared TXOP participant STA has received a DL Data frame. If it has received the DL Data frame, then at block 1848 the non-AP shared TXOP participant STA responds with an ACK to the source STA of the DL Data frame, after which execution processing ends.

7.3.7. DL Initiated TXOP Schedule and Access Stage at the AP Level

Figure 53A:
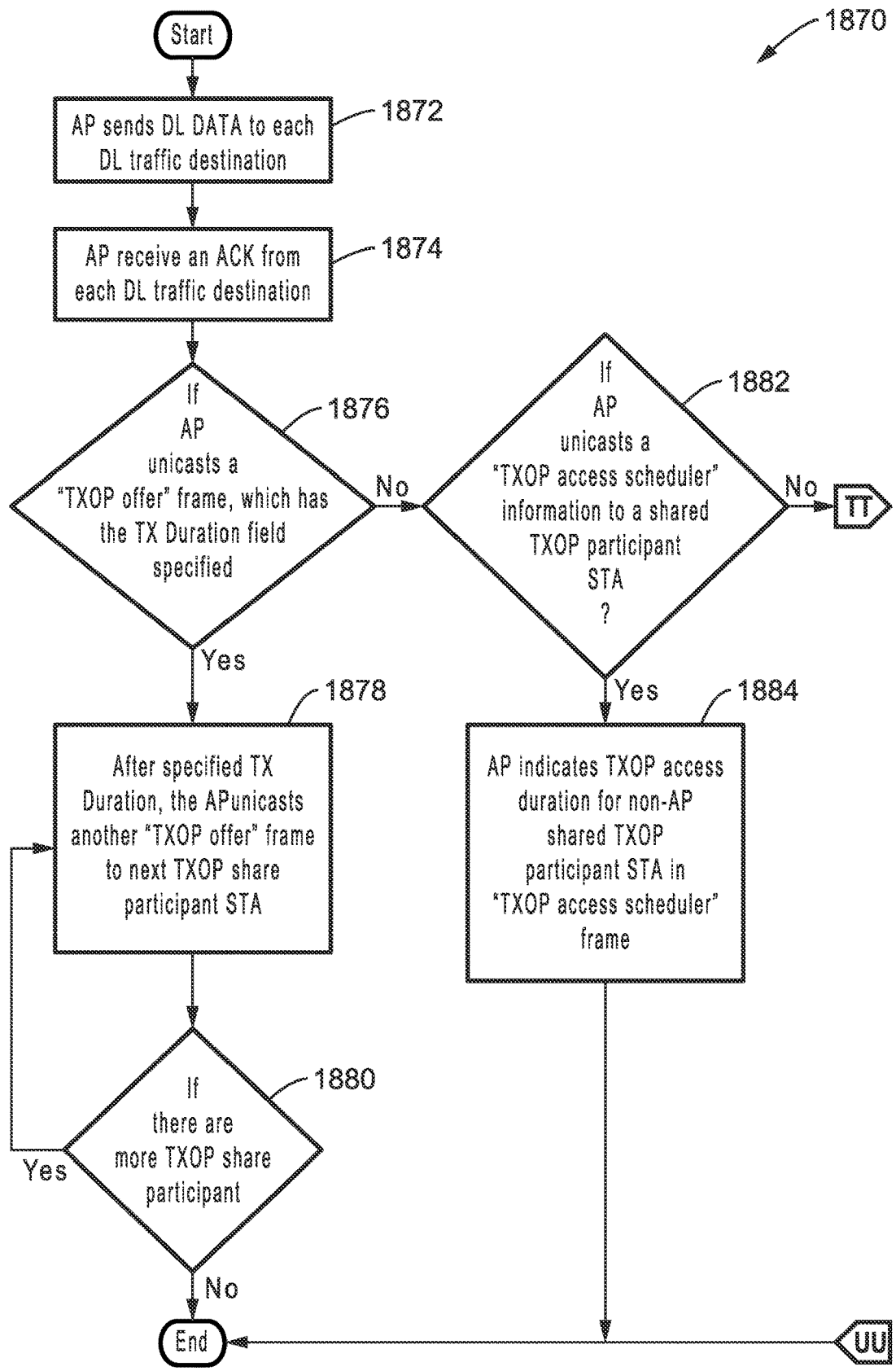
FIG. 53A through FIG. 53B is a flow diagram of a DL initiated TXOP schedule and access stage, processed at the AP level, according to at least one embodiment of the present disclosure.
Figure 53B:
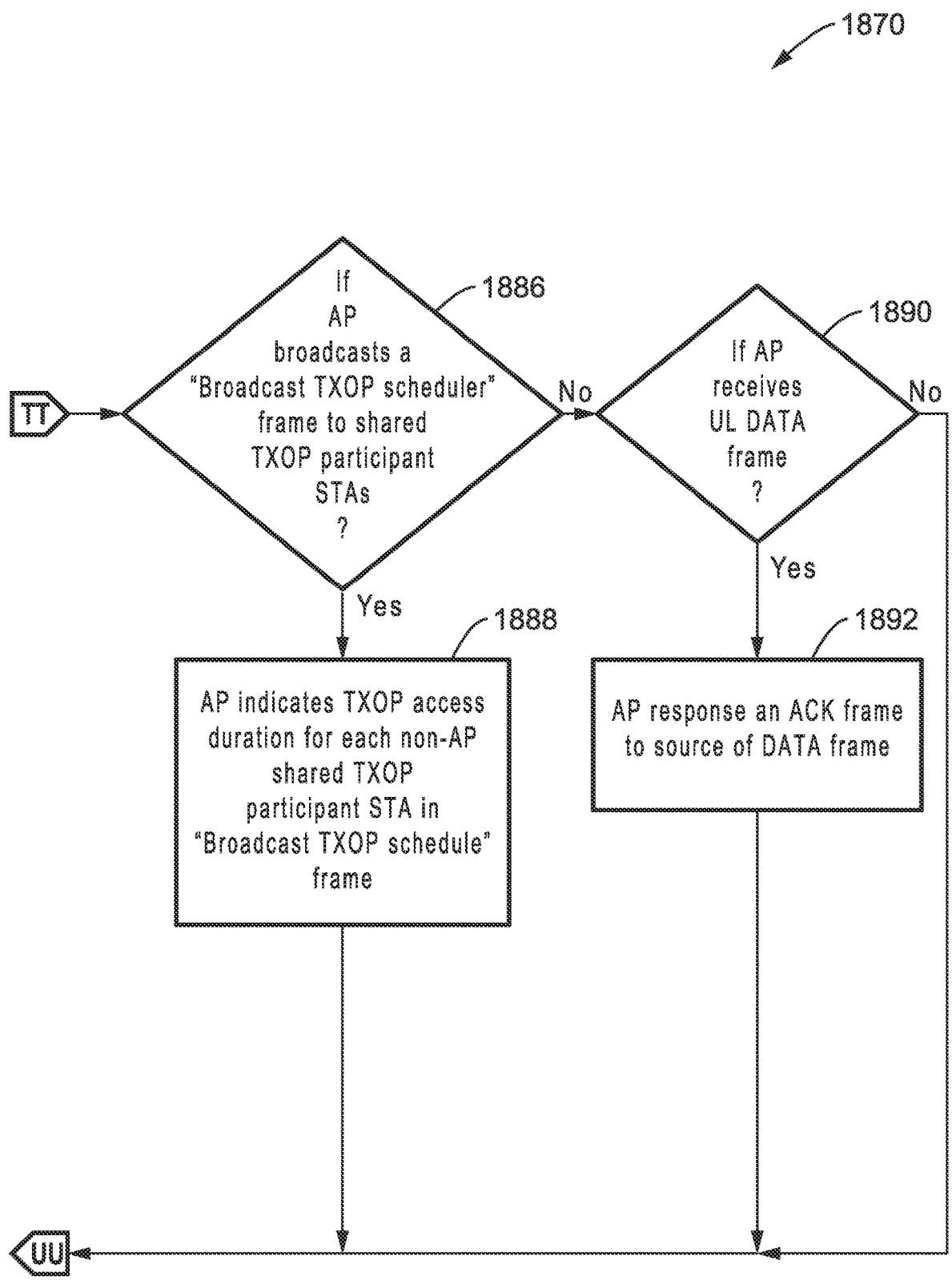

FIG. 53A and FIG. 53B illustrate an example embodiment 1870 of a DL initiated TXOP schedule and access stage, processed at the AP level. The AP sends 1872 DL Data to each DL traffic destination, and then the AP receives 1874 an ACK from each DL traffic destination.

A check is then made 1876 if the AP has unicast a TXOP Offer frame with the TX Duration field specified. If the AP has unicast the TXOP Offer frame, then execution reaches block 1878 wherein after a specified TX Duration, the AP unicasts another TXOP Offer frame to the next TXOP share participant STA.

A check 1880 determines if there are more TXOP share participants. If there are more participants then execution returns to block 1878 to continue processing, otherwise the process ends.

However, if it was determined at block 1876 that the AP did not unicast a TXOP Offer frame, then execution reaches block 1882 which checks to determine if the AP has unicast TXOP Access Scheduler information to a TXOP share participant STA. If it is determined that the scheduler information was unicast, then at block 1884 the AP indicates the TXOP access duration for the non-AP shared TXOP participant STA in the TXOP Access Scheduler frame before processing ends.

However, if at block 1882 it is determined that the AP did not unicast a TXOP Access Scheduler frame, then block 1886 of FIG. 53B is reached which checks if the AP has broadcast a Broadcast TXOP Scheduler frame to TXOP participant STAs. If it was determined that the broadcast was performed, then at block 1888 the AP indicates the TXOP access duration for each non-AP shared TXOP participant STA in the Broadcast TXOP schedule frame, prior to the process ending.

Otherwise, if it is determined at block 1886 that the AP did not broadcast a Broadcast TXOP scheduler frame, then block 1890 is reached which determines if the AP received a UL Data frame. If the UL data frame was received, then the AP responds by sending 1892 an ACK frame to the source of the Data frame before processing ends.

It should be noted that a flowchart for a DL initiated TXOP schedule and access stage, processed at the non-AP shared TXOP participant STA level is the same as in FIG. 30A through FIG. 30B.

7.4. Overview of Semi-Static Scenario

The TXOP holder STA/AP can set a configuration for TXOP sharing at some point through a setup procedure and every time that a TXOP is gained in the channel, the TXOP holder STA/AP shares this TXOP with a preset number of devices for a preset duration of time. The STA or AP can end this TXOP sharing configuration setup at some point in time through repeating the setup procedure.

Once the TXOP sharing setup is completed, each time the TXOP holder STA/AP shares its TXOP, the shared TXOP participant is informed through receiving RTS-share or CTS-share frames and accessing the channel according to the preset access rules.

The TXOP holder STA/AP sharing its TXOP can decide (determine) whether each TXOP it is gaining will be offered for sharing according to the preset rules or not (keeping the TXOP all to itself).

7.4.1. Semi Static TXOP Sharing Setup Procedure

Figure 54:
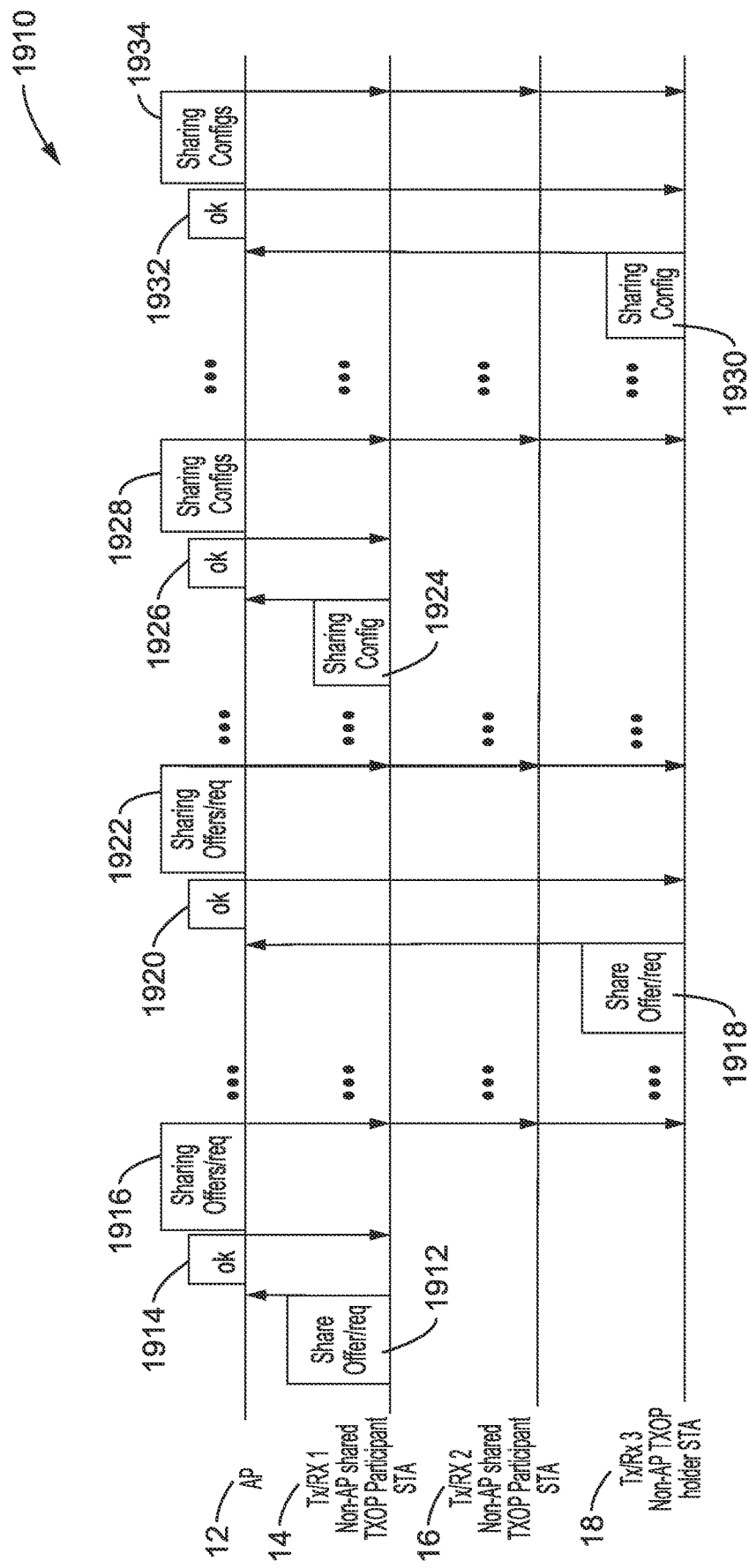
FIG. 54 is a communication sequence diagram of a semi static TXOP sharing setup stage, according to at least one embodiment of the present disclosure.

FIG. 54 illustrates an example embodiment 1910 of a semi static TXOP sharing setup stage with interactions depicted between AP 12, STA1 14, STA2 16 and STA3 18. Each STA can determine if it is willing to share its TXOP and for how long (what duration) and/or receive shared TXOP time from other STAs for the amount of time requested. The AP forwards information to the STAs. STAs decide on the configuration of their TXOP sharing and exchange it with other STAs through the AP.

In particular, the figure exemplifies STA1 generating a Share Offer/Request 1912 which is acknowledged 1914 by the AP, that takes the share offers/requests 1916 and sends them to the non-AP stations exemplified herein as STA1, STA2, and STA3. Similarly, STA3 is later shown as the TXOP holder generating a Sharing Offer/Request 1918 that is sent to the AP, which generates an acknowledgement 1920 and then the offers/requests 1922 are shared with the non-AP STAs.

In response to receiving the offers/requests 1922, the potential TXOP holder STA, STA1 in this example, sends a Sharing Configuration frame 1924 to indicate the distribution of the shared TXOP access schedule for each TXOP participant STA which is assigned by this TXOP holder STA. The AP receives and acknowledges 1926 the sharing configuration, and then the AP broadcasts 1928 sharing configurations to the non-AP STAs. This process is repeated, with STA3 sending 1930 a sharing configuration to the AP which acknowledges it 1932, and then the AP shares the configurations 1934 by broadcasting to the other STAs. The sharing configurations contain the distribution of shared TXOP access time information for all non-AP STAs, which is assigned by each potential TXOP holder STA.

7.4.2. Semi-Static TXOP Sharing (UL Initiated Shared TXOP)

Figure 55:
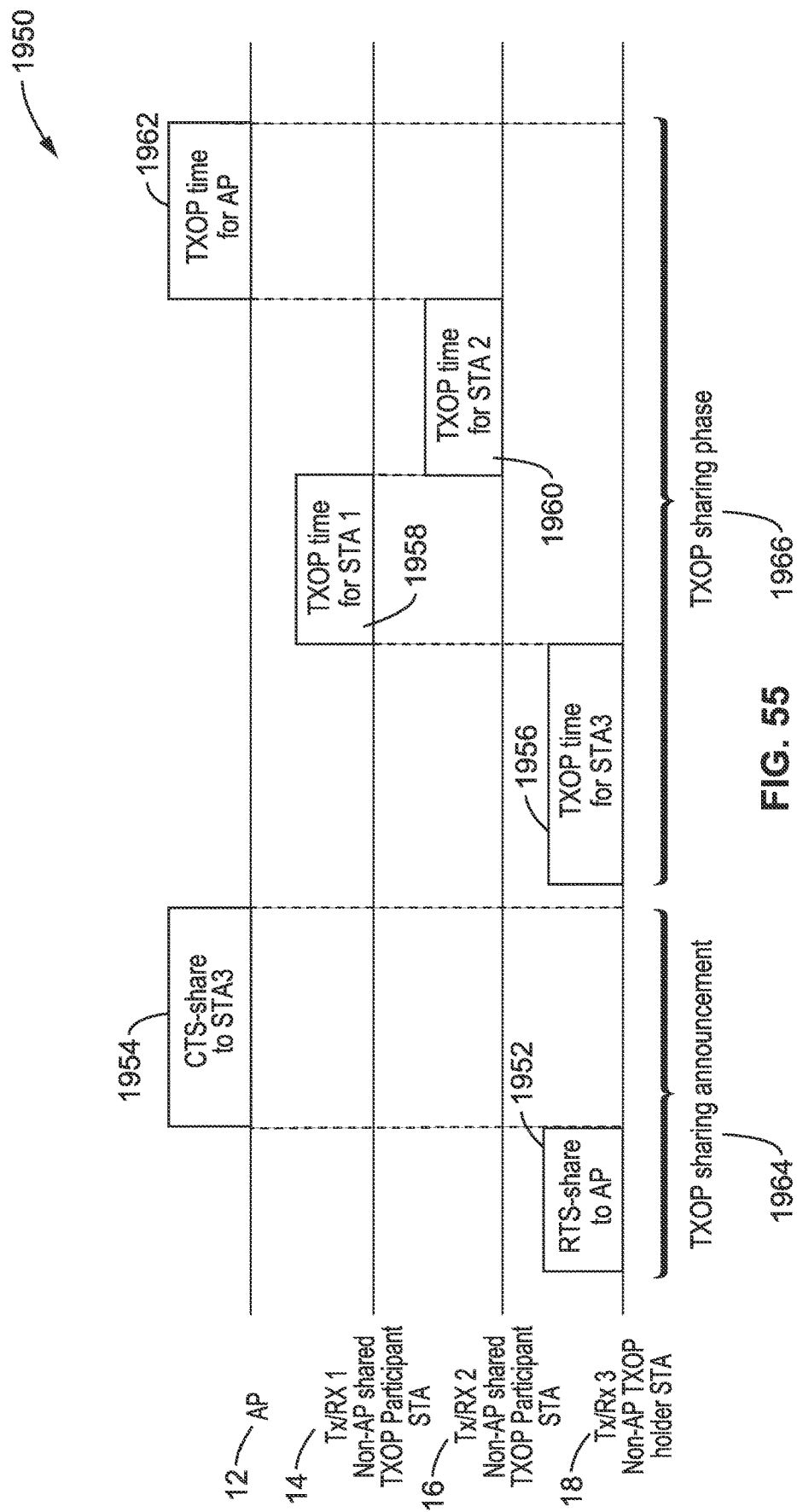
FIG. 55 is a communication sequence diagram of a UL initiated semi-static TXOP sharing stage, according to at least one embodiment of the present disclosure.

FIG. 55 illustrates an example embodiment 1950 of a UL initiated semi-static TXOP sharing stage.

The exchange of RTS-share and CTS-share between the sharing STA and the AP announce that the coming TXOP can be shared according to the agreed-on configuration. The figure depicts a STA performing a TXOP sharing announcement 1964, which in this example is depicted with TXOP holder STA3 sending an RTS-share 1952 to the AP, and the AP sending a CTS-share 1954 to STA3.

Once other STAs or the AP that are willing to join the following shared TXOP receive the RTS-share or the CTS-share which indicates the TXOP is to be shared and knowing that they are included in the sharing configuration, then in the TXOP sharing phase 1966 these STAs and the AP can determine when to access the channel and how long (duration) that they should transmit. The example depicts a TXOP time 1956 being used by the TXOP holder STA3, STA1 using TXOP time 1958, STA2 using TXOP time 1960 and the AP using TXOP time 1962.

It should be appreciated that the present disclosure can use different messages for exchanging between the STA sharing its TXOP and the AP while other STAs can receive it and obtain this information.

Figure 56:
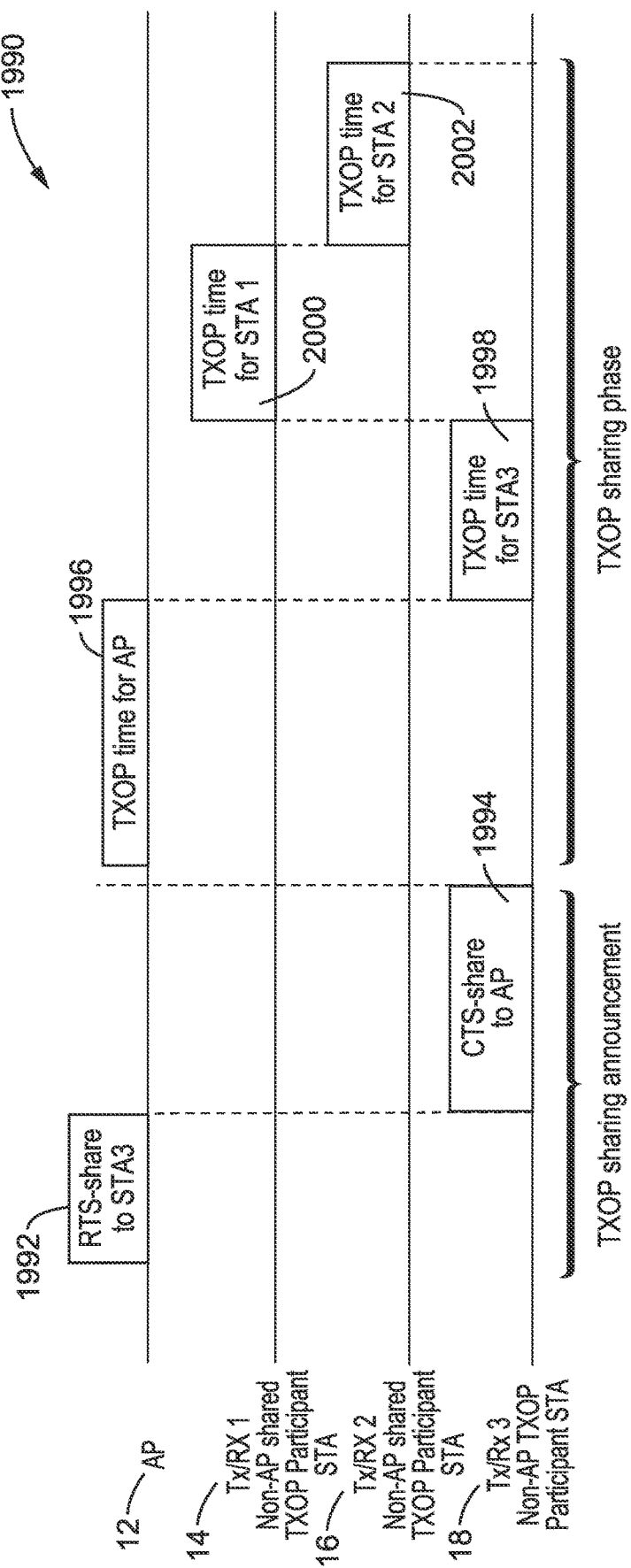
FIG. 56 is a communication sequence diagram of a DL initiated semi-static TXOP sharing stage, according to at least one embodiment of the present disclosure.

FIG. 56 illustrates an example embodiment 1990 of a DL initiated semi-static TXOP sharing stage.

The exchange of RTS-share and CTS-share between the sharing AP and the STA announces that the coming TXOP can be shared according to the agreed-on configuration. The figure depicts a TXOP sharing announcement exemplified with the AP sending an RTS-share 1992 to STA3 which responds with sending a CTS-share 1994 back to the AP.

Other STAs that are willing to join the following shared TXOP receive the RTS-share or the CTS-share which indicates the TXOP is to be shared and knowing that they are included in the sharing configuration. Then during a TXOP sharing phase these STAs can determine when to access the channel and how long to transmit. The example depicts the AP using TXOP time 1996, STA3 using TXOP time 1998, STA1 using TXOP time 2000, and STA2 using TXOP time 2002.

It should be appreciated that different message types may be utilized to perform this communication exchange between the AP sharing its TXOP and another STA, while the other STAs can receive this messaging as well and the sharing information.

7.5. Simplified UL Initiated TXOP Sharing Scheme

Figure 57A:
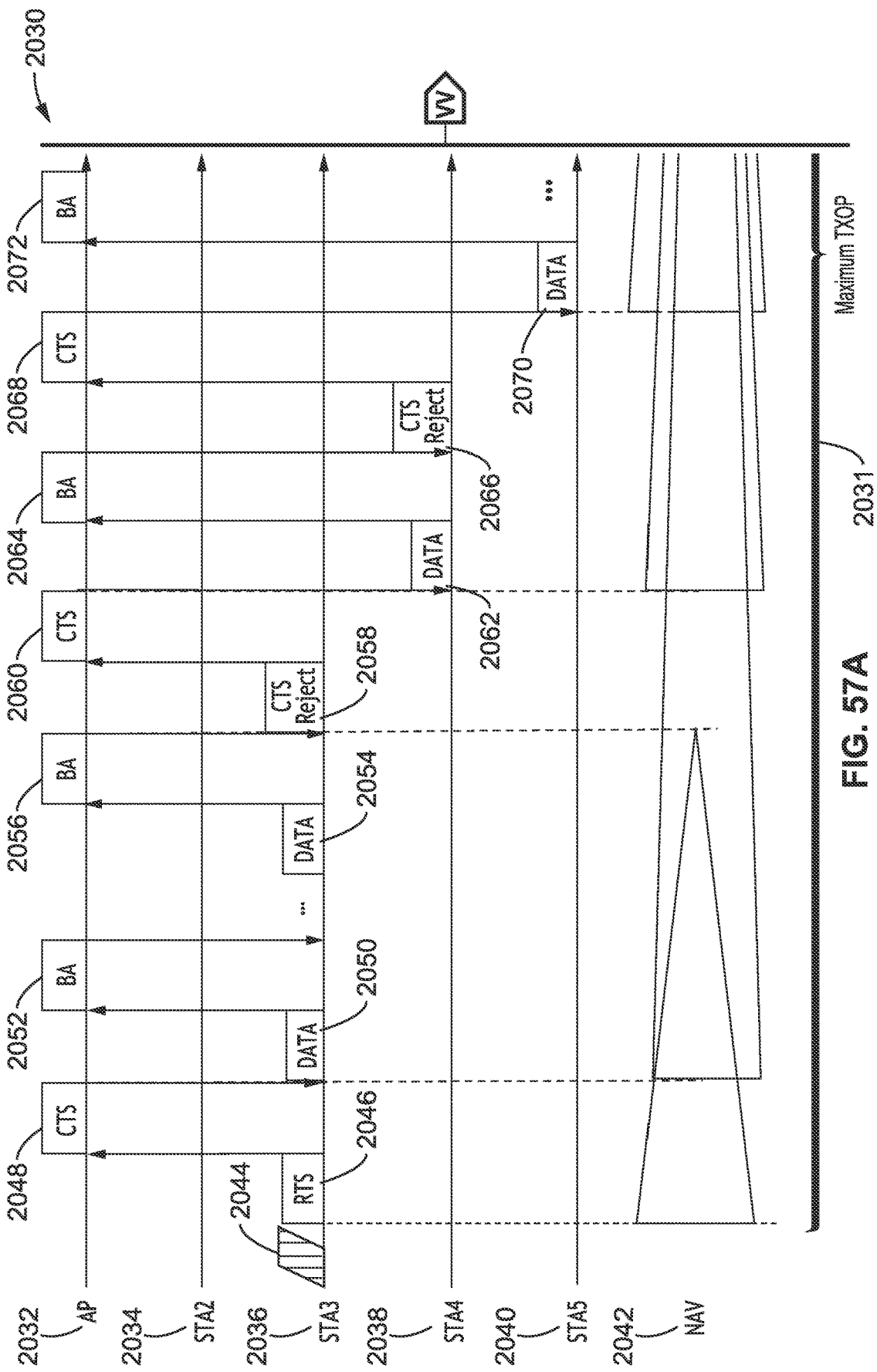
FIG. 57A through FIG. 57B is a communication sequence diagram of a UL initiated simplified TXOP sharing scheme, according to at least one embodiment of the present disclosure.
Figure 57B:
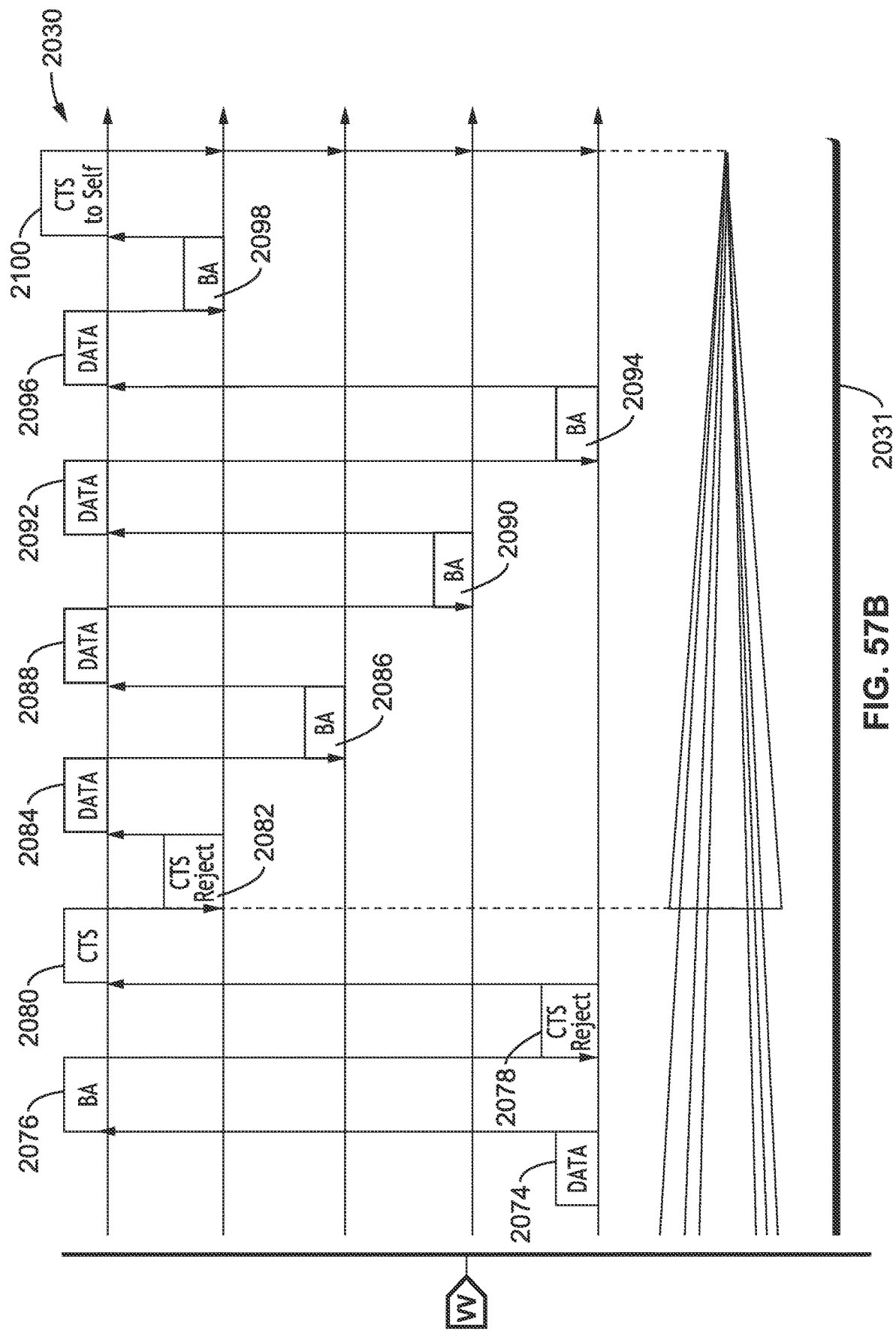

FIG. 57A and FIG. 57B illustrates an example embodiment 2030 of a UL initiated simplified TXOP sharing scheme.

The Interactions are depicted between AP 2032, STA2 2034, STA3 2036, STA4 2038, STA5 2040, and shows the NAVs 2042.

The simplified TXOP sharing scheme shares the TXOP duration 2031 by directly looping through all non-AP STAs and the AP. This scheme is simple to achieve since it skips the steps to identify the shared TXOP participant STAs and to assign the corresponding time resources to each of them.

In this example STA3 is seen contending 2044 for the channel. Once STA3 gains channel access it sends an RTS 2046 to the AP and receives a CTS 2048. STA3 is the shared TXOP holder STA. STA3 sends Data 2050 to the AP which responds by sending a block acknowledge 2052. The shared TXOP holder STA can use the shared TXOP time as much as required (the maximum TXOP duration is a configuration setting), and is shown transmitting one or more Data 2054, and receiving a BA 2056. After finishing transmission, STA3 sends a CTS-Reject 2058 to the AP.

If time allows in the TXOP period, the AP loops through the next STA (shared TXOP participant STA) by sending a CTS 2060 to STA 4. The AP assigns the limited shared TXOP time to each shared TXOP participant STA.

In this example STA4 is seen transmitting Data 2062, which is acknowledged 2064 by the AP, and then STA4 sends a CTS-Reject frame 2066 to the AP. It will be noted that the CTS reject frame is sent if: (a) the STA (e.g., STA4 as shown in this example) finishes transmission earlier than the assigned shared TXOP limitation; (b) the STA (e.g., STA5 as shown in this example) approaching to the end of the assigned shared TXOP limitation; and (c) the STA (e.g., STA2 as shown in this example) doesn't have DATA to send.

After CTS-reject 2066 from STA4, the AP sends a CTS 2068 to STA5, which transmits Data 2070 to the AP and receives a BA 2072, and may send additional Data 2074 as seen in FIG. 57B, which are acknowledged 2076. Then STA5 sends a CTS reject 2078 to the AP. The AP sends a CTS 2080 to STA2 which sends a CTS reject 2082.

Then, after looping through one round of the non-AP STAs, the AP starts DL DATA transmissions until the end of the current TXOP or until it finishes sending all the DL DATA. Data 2084, 2088, 2092 and 2096 is seen being transmitted to STA3, STA4, STA5 and STA2, with associated block acknowledgements 2086, 2090, 2094 and 2098.

After finishing the DL DATA transmissions, the AP broadcasts a CTS-to-self 2100 to clear NAV for all STAs if the current TXOP duration is not expired (i.e., current TXOP duration is less than the maximum TXOP limitation).

Figure 58:
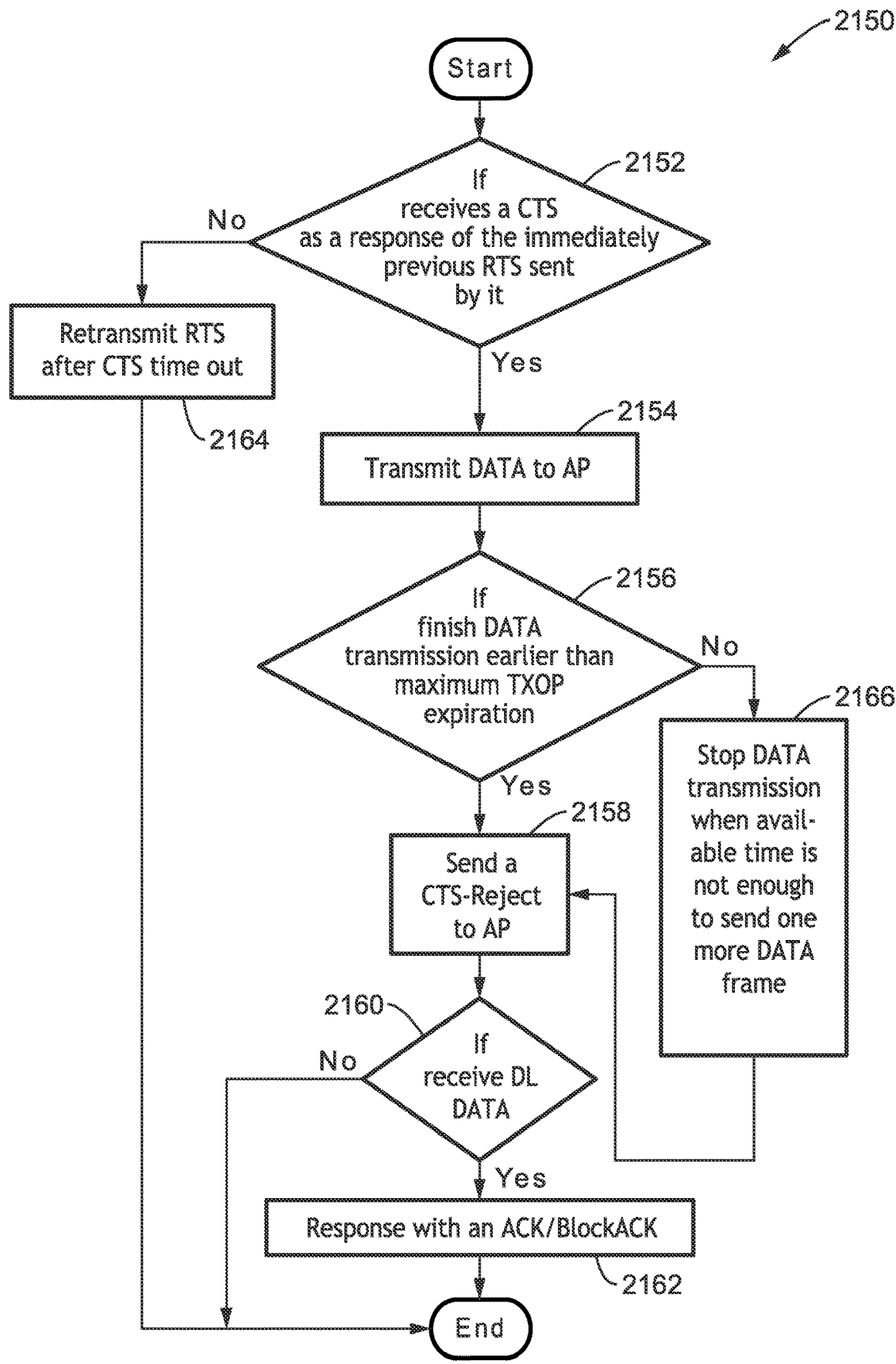
FIG. 58 is a flow diagram of a simplified shared TXOP schedule, processed at the non-AP TXOP holder STA, according to at least one embodiment of the present disclosure.

FIG. 58 illustrates an example embodiment 2150 of a flowchart of the simplified shared TXOP schedule, processed at the non-AP TXOP holder STA.

Check 2152 determines if a CTS was received as a response to the immediately previous RTS frame which was sent to the AP. If the STA received the CTS then it is the shared TXOP holder STA, and having obtained the channel successfully it starts transmitting data 2154 to the AP. Otherwise, if at block 2152 no CTS was received then at block 2164 another RTS is transmitted after CTS timeout and the process ends.

The shared TXOP holder STA can use the available TXOP duration (i.e., from 0 to a maximum TXOP limitation) to any extent required. A check is made 2156 on whether the shared TXOP holder STA has finished transmitting all its Data before the maximum TXOP limitation expires. If the STA has finished its Data transmissions before the end of TXOP, then it sends 2158 a CTS-Reject to the AP. Otherwise, if the STA still has more Data to send, then execution moves to block 2166 and it stops its data transmission if it determines there is insufficient time for it to send one more Data frame transmission, and execution moves to block 2158 to send a CTS-reject to the AP.

A check is made 2160 to determine if DL data has been received. If DL data has been received then a response is generated at block 2162 with a form of acknowledgement, such as an ACK or Block ACK (BA) before processing ends. Otherwise, if at block 2160 it is determined that DL data was not received, then the processing ends.

Figure 59:
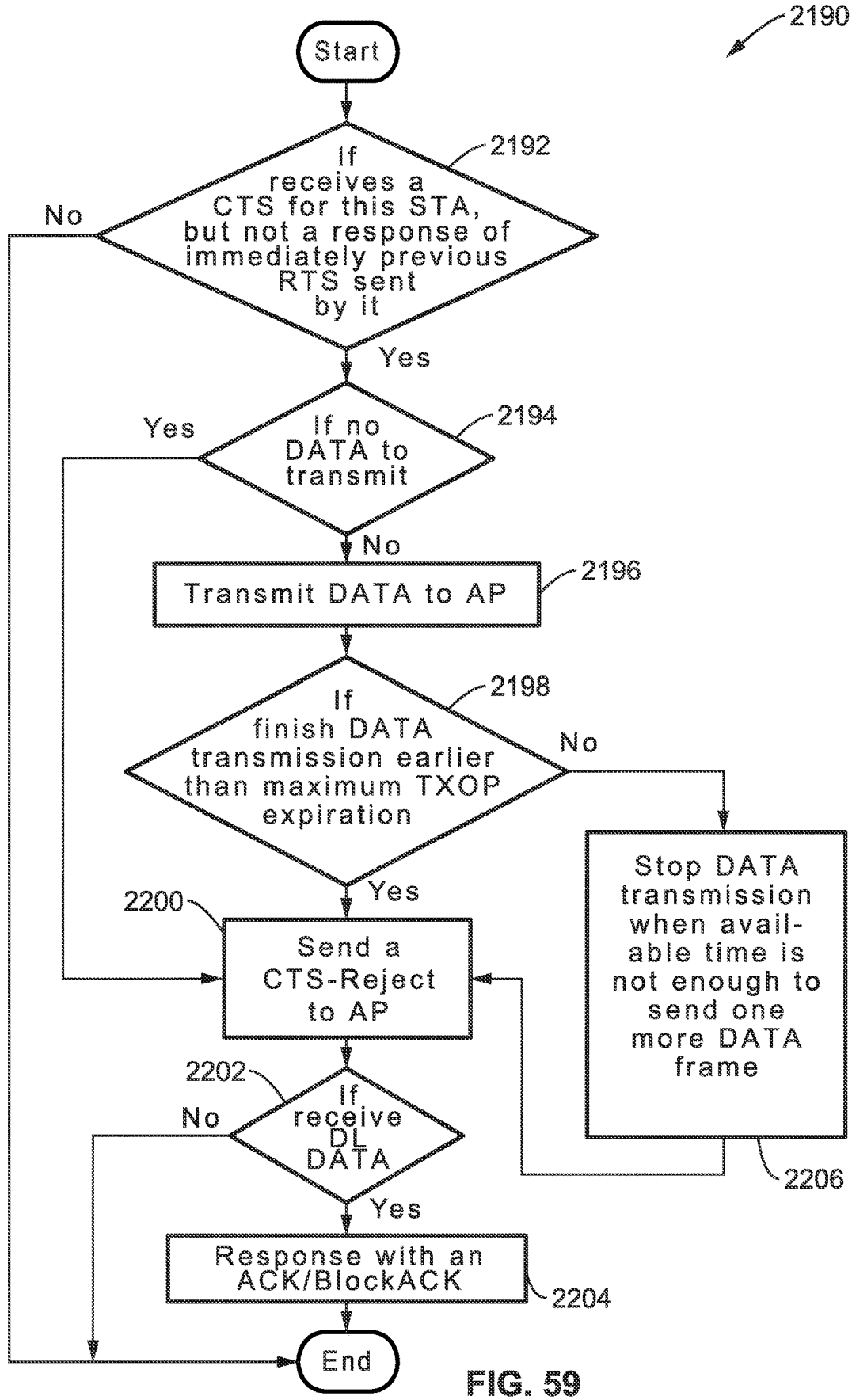
FIG. 59 is a flow diagram of a simplified shared TXOP schedule, processed at the non-AP TXOP participant STA, according to at least one embodiment of the present disclosure.

FIG. 59 illustrates an example embodiment 2190 of a simplified shared TXOP schedule, processed at the non-AP TXOP participant STA.

A check 2192 determines if the STA received a CTS for this STA which is not in response to an immediately prior RTS frame being sent from it. If the STA has not received the CTS, then processing ends.

Otherwise, having received a CTS as a shared TXOP participant STA, the STA gains channel access shared by the TXOP holder STA. A check is made 2194 to determine if the STA has Data to be sent. If there is no data to send, then execution moves to block 2200, with the STA sending a CTS-Reject to the AP.

Otherwise, if there is Data to send then the shared TXOP participant STA starts transmitting 2196 Data to the AP and can use the available TXOP duration as assigned in the configuration. A check is made 2198 if the STA will complete its Data transmissions earlier than the Maximum TXOP expiration time. If it will complete its data transmission before the TXOP ending, then at block 2200 a CTS-Reject is sent to the AP. Otherwise, if there is not sufficient time to complete its next Data frame transmission, it reaches block 2206 where it stops Data transmission and then moves to block 2200 to send a CTS-Reject to the AP.

After the CTS reject is sent to the AP, then a check 2202 is made to determine if DL Data has been received. If the DL Data was received, then the STA responds 2204 with a form of acknowledgement (e.g., ACK, or Block ACK), before processing is completed. If DL Data was not received, as determined at block 2202, then processing ends.

Figure 60A:
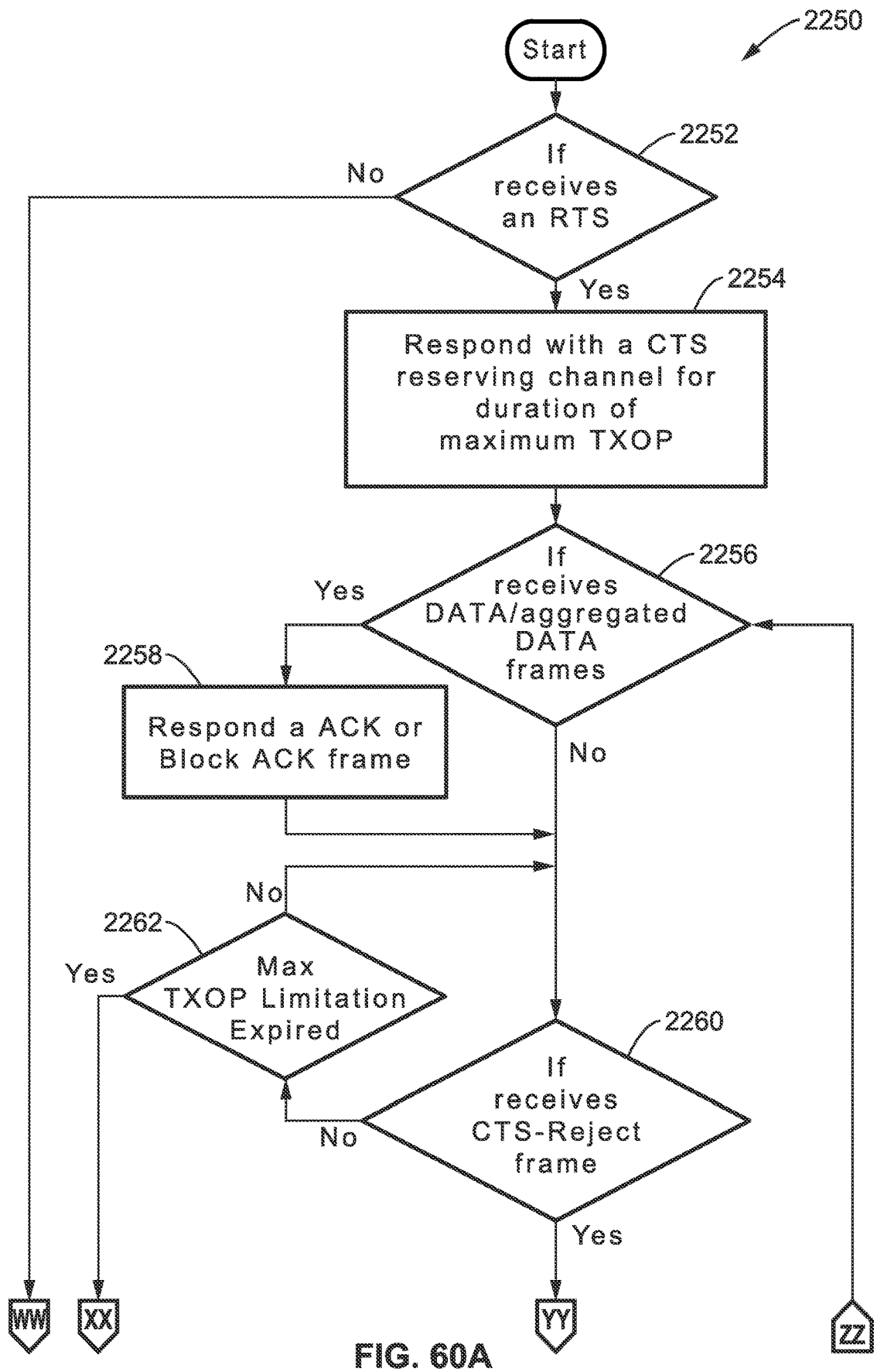
FIG. 60A through FIG. 60C is a flow diagram of a simplified shared TXOP schedule, processed at the AP, according to at least one embodiment of the present disclosure.
Figure 60B:
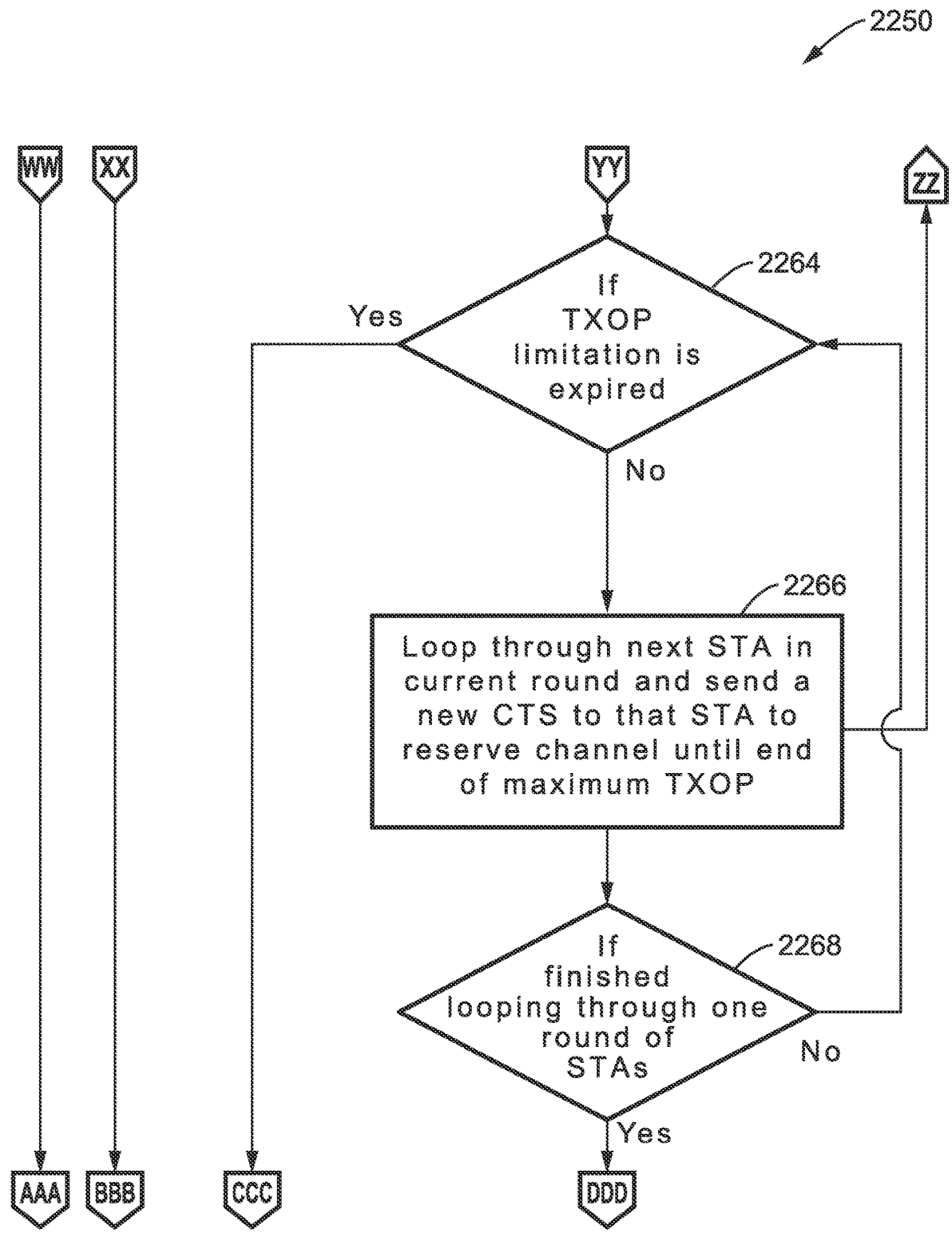
Figure 60C:
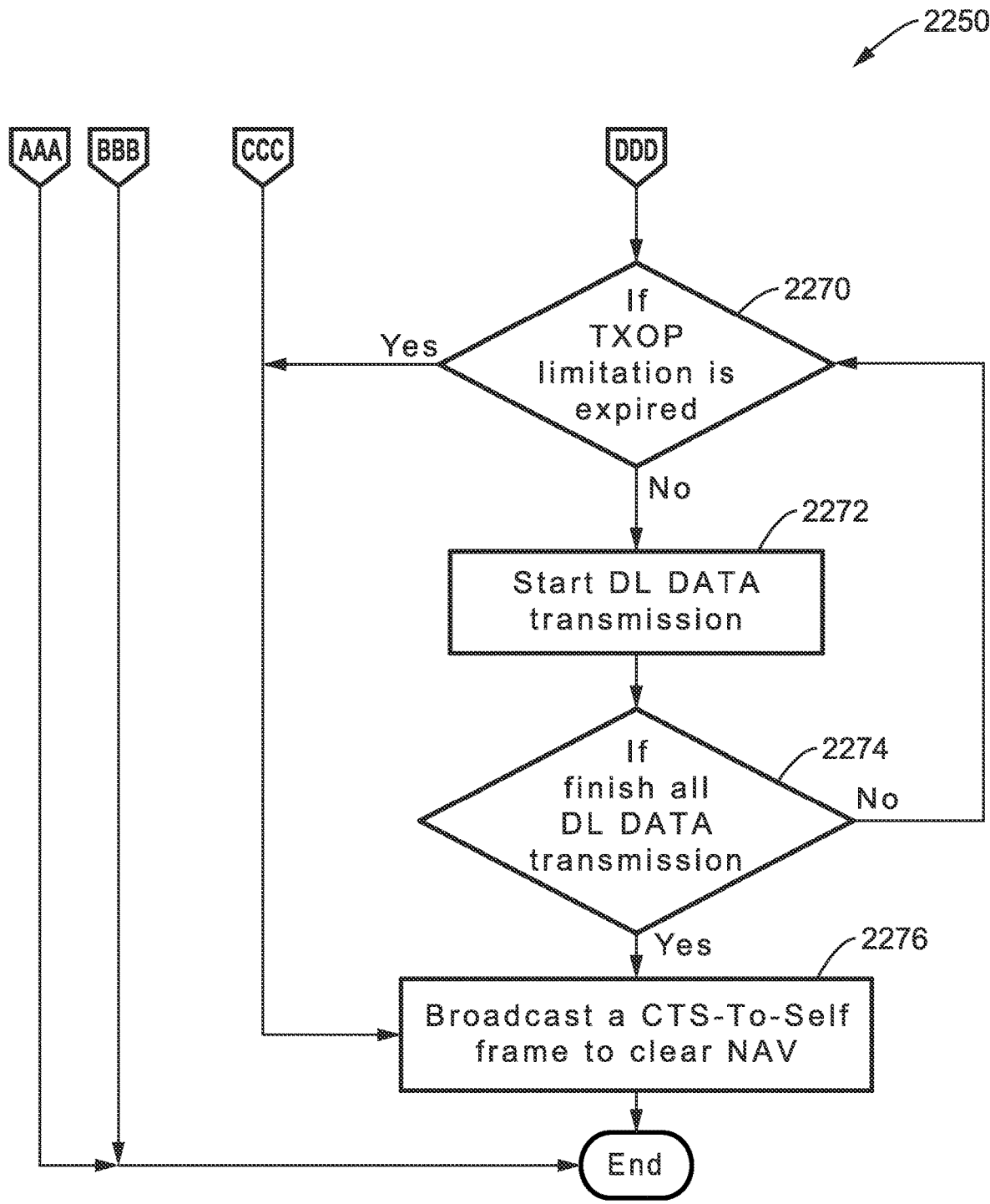

FIG. 60A through FIG. 60C illustrates an example embodiment 2250 of the simplified shared TXOP scheduling being processed at the AP.

A check 2252 determines if an RTS has been received from a STA. If no RTS was received, then this processing ends 1372.

Otherwise, if an RTS was received, then at block 2254 the AP responds by sending a CTS frame to that STA, which reserves the channel for that STA up to the duration of the maximum TXOP. A check 2256 determines if the AP received Data or aggregated Data frames. If Data/aggregated Data frames were received, then at block 2258 the AP responds with an acknowledgement, such as an ACK or Block ACK (BA), before it reaches block 2260. Otherwise, if it was determined at block 2256 that no Data/aggregated Data frames were received, then execution moves directly to block 2260. So regardless of whether the AP received Data/aggregated Data, execution reaches block 2260 which checks if the AP has received a CTS-Reject frame.

If the CTS-Reject frame has not been received, then a check 2262 determines if the maximum TXOP limitation has expired. If it has not expired, then execution returns to block 2260 and it continues waiting for the CTS-Reject. Otherwise, with the maximum TXOP limit having expired, execution ends.

If in block 2260 it is determined that a CTS-Reject frame is received, then this indicates that the TXOP holder has completed sending data, and execution reaches block 2264 in FIG. 60B which checks if the TXOP limitation has expired. If it has not expired, then at block 2266 the AP loops through the next STA in the current round and sends a new CTS to the next STA, which reserves the channel until the end of the current maximum TXOP limitation. A return is made to block 2256 in FIG. 60A as the AP needs to loop through all the STAs, for each STA. The looping terminates when the TXOP limitation is expired as determined in block 2264.

Then at block 2268 it is determined if the AP has finished looping through one round of all the STAs in one round. If the AP has not processed through one round, then execution returns to block 2264 to determine again if the TXOP limitation is expired. If however it is determined at block 2268 that the AP has finished looping through a round of stations, then execution reaches block 2270 in FIG. 60C which determines if the TXOP limitation has expired. If it has expired then execution moves to block 2276 with a CTS-to-self frame being broadcast to clear the NAV.

Otherwise, if it is determined at block 2270 that the TXOP limitation has not expired, then the AP starts DL Data transmissions at block 2272, after which check 2274 determines if all DL Data transmissions have been completed. If all DL Data transmissions are not completed, then execution returns to block 2270. Otherwise, with all transmissions completed the AP broadcasts a CTS-To-Self frame at block 2276 to reset the NAV to 0 for all the STAs, before processing ends.

Figure 61A:
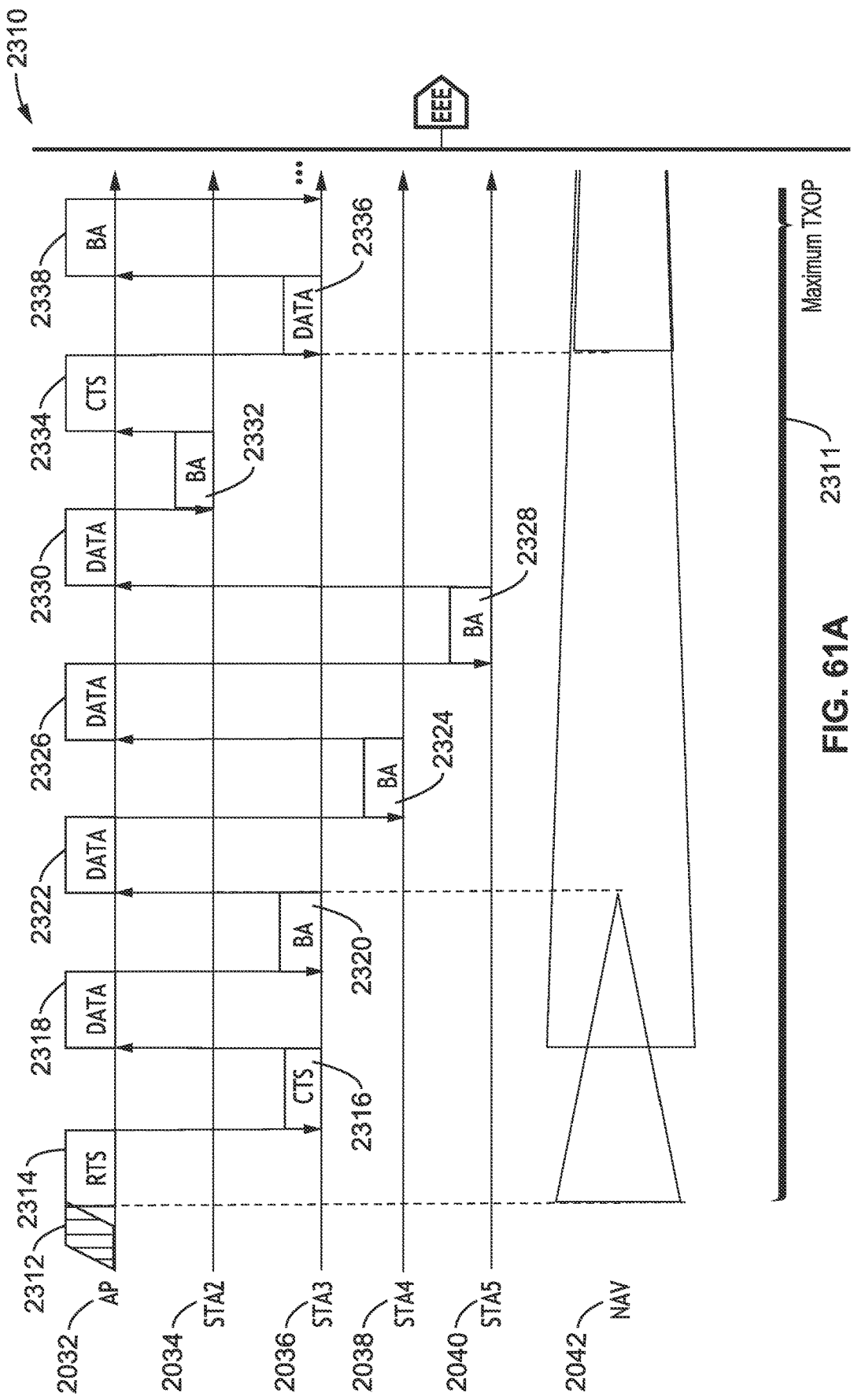
FIG. 61A through FIG. 61B is a communication sequence diagram of a DL initiated simplified TXOP sharing scheme, according to at least one embodiment of the present disclosure.
Figure 61B:
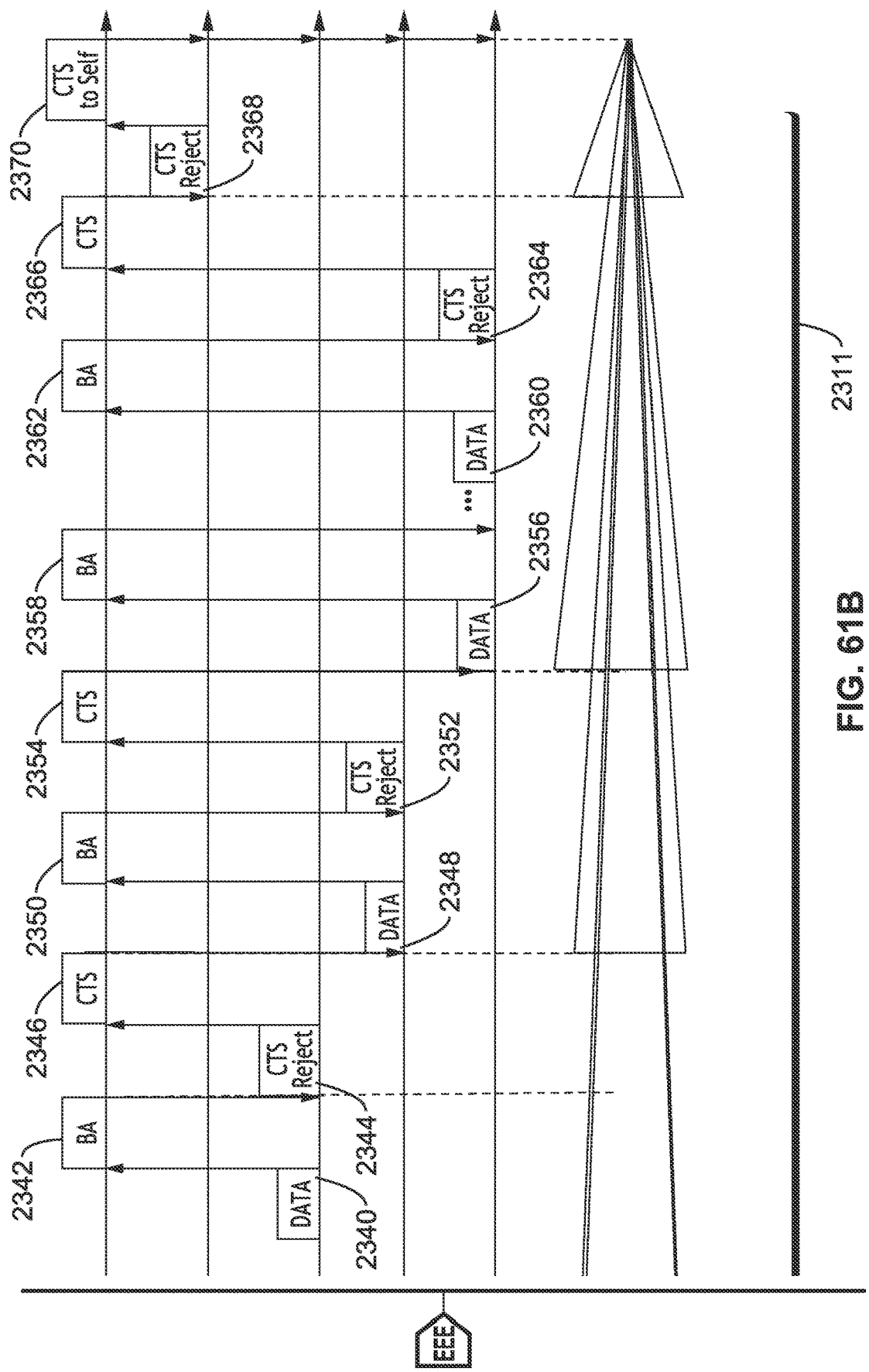

FIG. 61A and FIG. 61B illustrates an example embodiment 2310 of a DL initiated simplified TXOP sharing scheme.

Interactions are depicted between AP 2032, STA2 2034, STA3 2036, STA4 2038, STA5 2040, and shows NAVs 2042.

The AP contends 2312 for the channel. Once the AP gains channel access it sends an RTS 2314 and receives a CTS 2316 from the shared TXOP holder (STA3 in this example). The AP can use as much of the shared TXOP time as required (desired) for DL transmissions, up to the maximum TXOP duration, which is a configuration setting. The DATA transmissions are exemplified 2318, 2322, 2326 and 2330, with their respect acknowledgements 2320, 2324, 2328 and 2332, to STA3, STA4, STA5, and STA2, respectively. After finishing these transmissions, if time allows, the AP sends a CTS 2334 to the next STA for receiving UL DATA. In this case STA3 receives the CTS and send UL data 2336 to the AP which acknowledges it 2338 with a BA, and moving into FIG. 61B it is seen that STA3 continues sending data 2340 with BA 2342 until it is finished, at which time it sends a CTS reject 2344 to the AP.

If time allows, the AP loops through the next STA (shared TXOP participant STA) with sending a CTS to it. The AP assigns the limited shared TXOP time to each shared TXOP participant STA. The STA sends a CTS-Reject frame to AP if: (a) the STA (e.g., STA4) finishes transmission earlier than the assigned shared TXOP limitation; (b) the STA (e.g., STA5) approaching to the end of the assigned shared TXOP limitation; and (c) the STA (e.g., STA2) doesn't have DATA to send.

The example depicts the AP sending CTS 2346 to STA4 which sends UL Data 2348 to the AP and receives an acknowledgement 2350, then STA4 generates a CTS reject 2352. The AP moves to another STA and sends a CTS 2354 to STA5 which sends data 2356 through 2360, and receives acknowledgements on each 2358 through 2362, before it sends a CTS reject 2364. The AP then sends a CTS 2366 to STA2, and receives a CTS reject 2388.

If time allows, after looping through one round of the non-AP STAs, the AP broadcasts a CTS-to-Self 2370 to clear NAV for all STAs if the current TXOP duration is not expired (i.e., current TXOP duration is less than the maximum TXOP limitation).

Figure 62A:
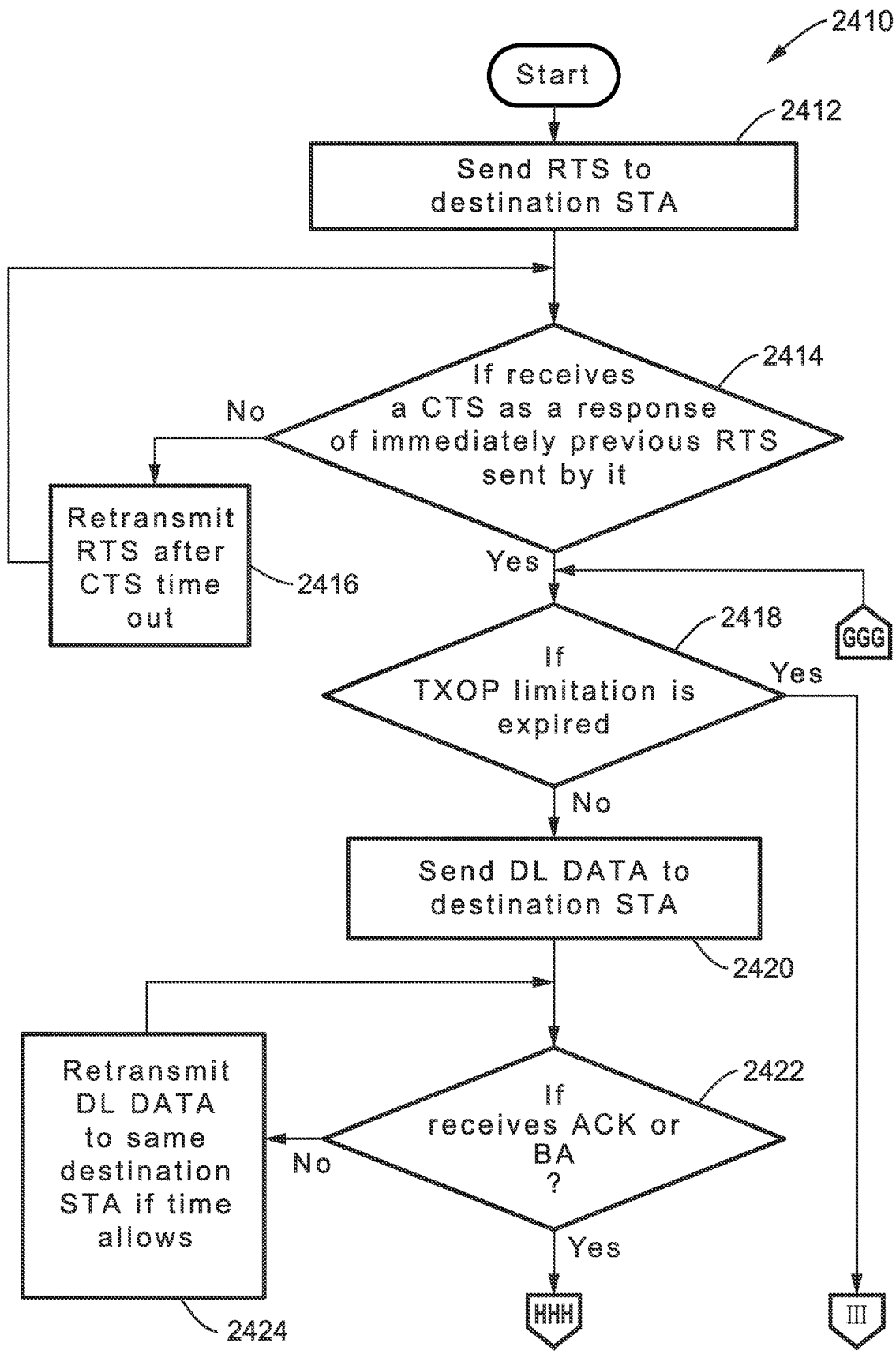
FIG. 62A through FIG. 62C is a flow of a simplified shared TXOP schedule, processed at the AP, according to at least one embodiment of the present disclosure.
Figure 62B:
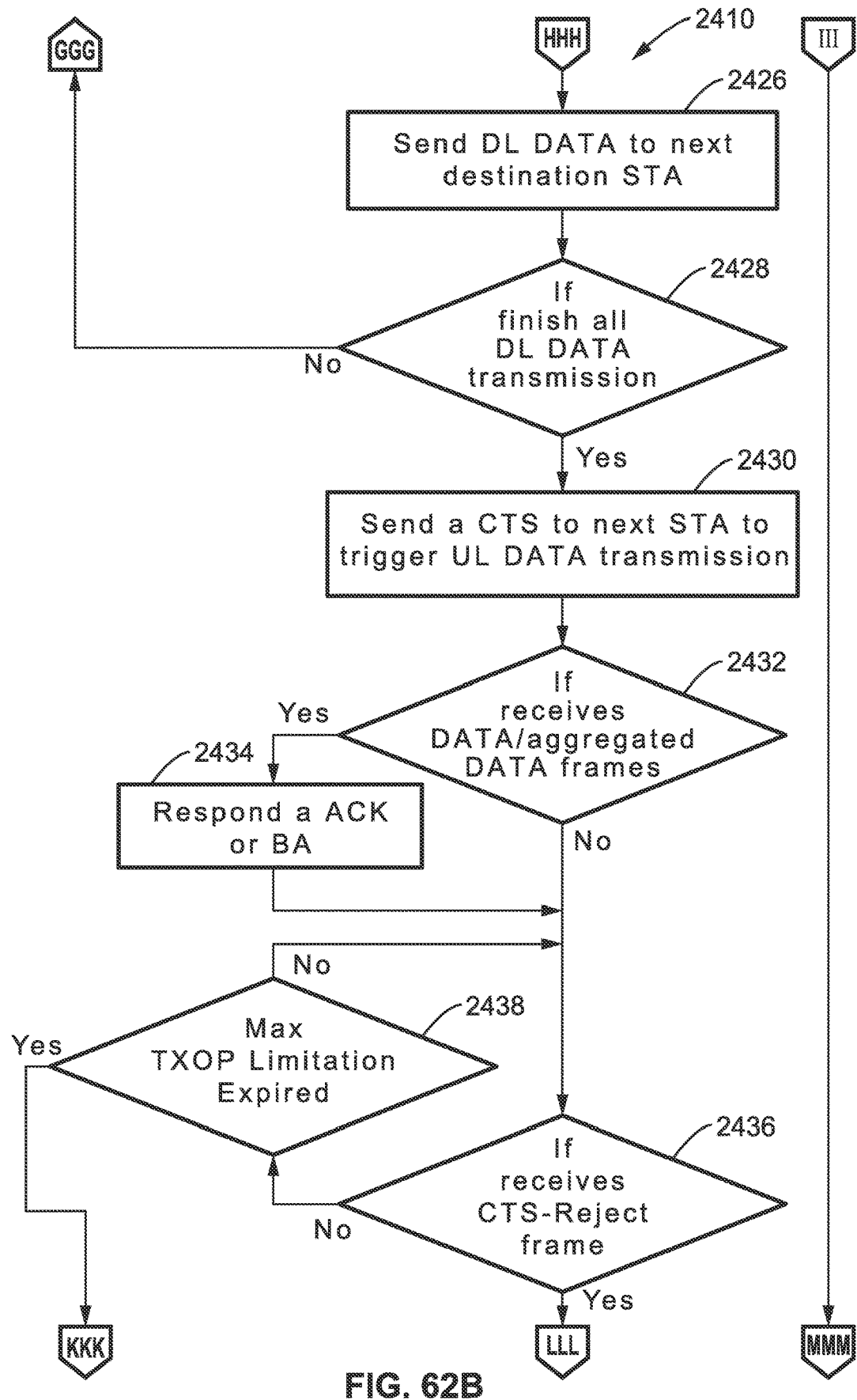
Figure 62C:
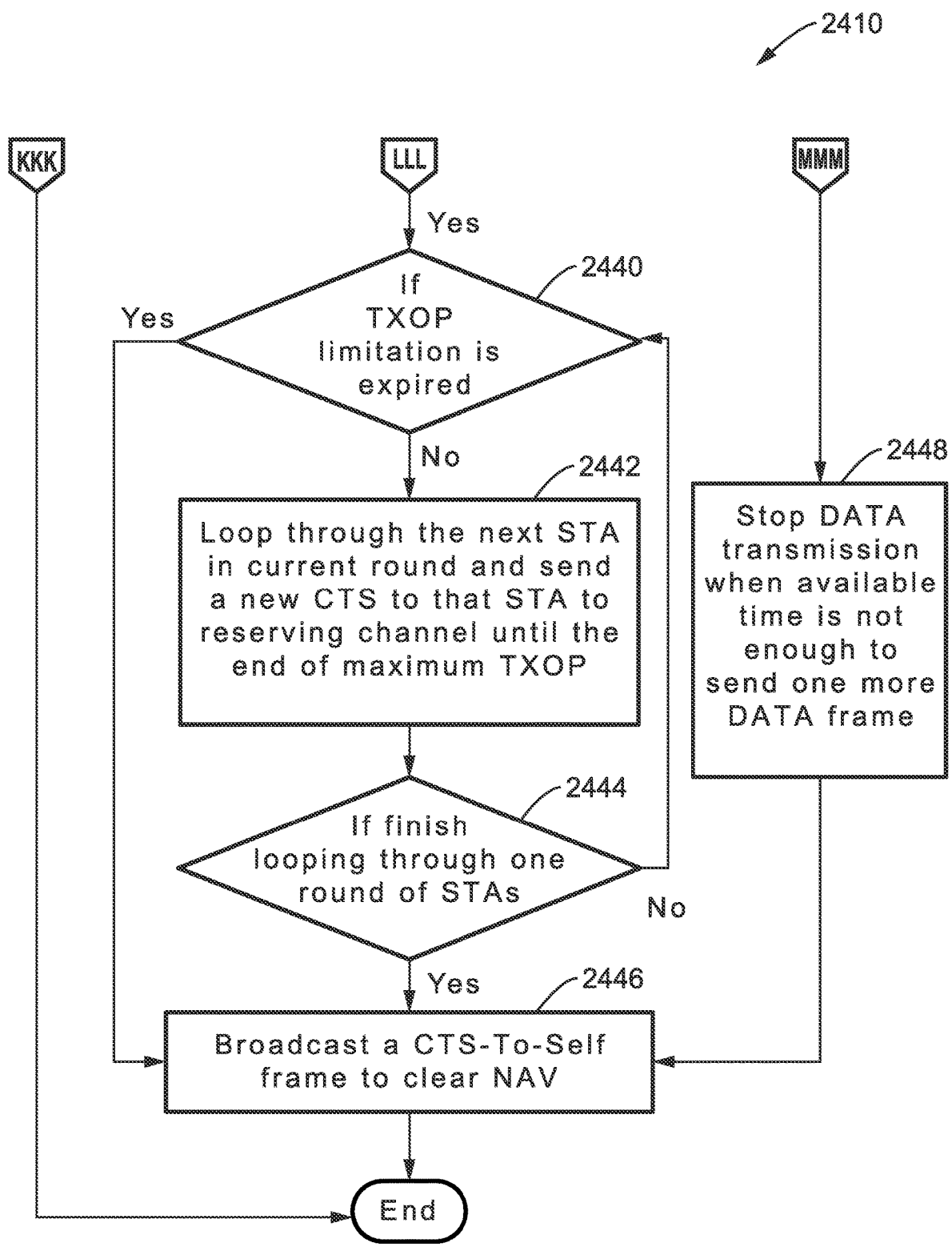

FIG. 62A through FIG. 62C illustrates an example embodiment 2410 of the simplified shared TXOP schedule, processed at the AP.

The AP sends 2412 an RTS to the destination STA. A check 2414 determines if the AP received a CTS as a response of the immediately previous RTS sent by it. If the condition is not true then at block 2416 the AP retransmits an RTS after the CTS timeout and execute back to block 2414.

Otherwise if the CTS was received, then check 2418 determines if the TXOP limitation is expired. If it has expired then execution moves to block 2448 of FIG. 62C, which stops Data transmission when the available TXOP time is insufficient to send one more Data frame. If at block 2418 it is determined that the TXOP limitation has not expired, then the AP sends 2420 DL Data to the destination STA, and a check 2422 determines if the AP received an ACK or BA. If the acknowledgement (e.g., ACK or BA) was not received, then at block 2424 the AP retransmits DL Data to the same destination STA if time allows. If the acknowledgement (e.g., ACK or BA) was received, then execution reaches block 2426 of FIG. 63B and the AP sends DL Data to the next destination STA.

A check 2428 determines if the AP has completed all DL Data transmissions. If all transmission have not been completed then execution moves back to block 2418 in FIG. 62A to check if the TXOP limitation has expired. Otherwise, with all DL Data transmissions completed, the AP sends 2430 a CTS to the next STA to trigger a UP Data transmission.

A check 2432 determines if the AP has received Data or aggregated Data frames. If it has received this Data, then the AP responds 2434 with an acknowledgement (e.g., ACK or BA), and execution moves to block 2436. Otherwise if the Data was not received, then execution moves to block 2436 with a check to determine if the AP received the CTS reject frame. If the AP has not received the CTS reject frame then execution moves to block 2438 to determine if the Maximum TXOP limitation has expired. If it has expired, then execution ends. Otherwise if the TXOP limitation has not expired then execution returns to block 2436.

If the CTS reject frame was received as determined in block 2436, then check 2440 of FIG. 62C determines if the TXOP limitation has expired. If the TXOP limitation has expired (been reached), then execution moves forward to block 2446. If the TXOP limitation has not yet expired then at block 2442 the AP loops through the next STA in the current round and sends a new CTS to that STA to reserve the channel until the end of the maximum TXOP.

Check 2444 determines if the AP finished looping through one round of STAs. If the AP was not finished, then execution returns to block 2440. If the AP has finished looping through the STAs, then at block 2446 the AP broadcasts a CTS-to-self frame to clear the NAV, and processing ends.

The flowchart of the simplified shared TXOP schedule, processed at the non-AP TXOP participant STA is the same as shown in FIG. 59.

8. Example Frame Formats

8.1. STA TXOP Shareability Element

FIG. 63 illustrates an example embodiment 2510 of a STA TXOP shareability element format. The STA TXOP shareability element is contained in the management frames, such as an authentication frame or association request frame, and is used by each non-AP STA to inform the associated AP about its TXOP shareability. An Element ID field identifies the element and in this instance indicates this is a STA TXOP shareability element. If an AP receives an authentication or association request frame with an Element ID field set to the STA TXOP Shareability element, then the AP records all the share offer/request information of each STA, as indicated in the STA Info field, and sends back an authentication or association response frame to indicate a successful reception. A Length field indicates the number of octets in the element excluding the Element ID and Length fields. STA Information fields (e.g., 1-n) provide information about the STAs, as illustrated in FIG. 64.

FIG. 64 illustrates an example embodiment 2530 of a STA Information Field format. The fields of this structure are as follows. The AID subfield contains the AID of the STA or AP for which TXOP shareability is indicated. The TXOP share holder subfield indicates the shareability of this STA/AP as the TXOP holder.

The TXOP share holder subfield is set to a first state (e.g., 1) to indicate that this STA/AP, operating as the TXOP holder, is willing to share its TXOP with other devices. The TXOP share holder subfield is set to a second state (e.g., 0) to indicate that this STA/AP, operating as the TXOP holder, is not willing to share its TXOP with other devices. The TXOP share participant subfield indicates the shareability of this STA/AP as the TXOP participant.

The TXOP share participant subfield is set to a first state (e.g., 1) to indicate this STA/AP, operating as the shared TXOP participant STA/AP, is willing to join the following TXOP being shared by the TXOP holder STA/AP. Otherwise, if the TXOP share participant subfield is set to a second state (e.g., 0), it indicates that this STA/AP, operating as the shared TXOP participant, is not willing to join the following TXOP that shared by the TXOP holder.

8.2. Access Request Information Element

FIG. 65 illustrates an example embodiment 2550 of an Access request information element format. The fields include an Element ID field which identifies the element, and in this example it indicates that this is an Access Request information element. A Length field indicates the number of octets in the element excluding the Element ID and Length fields. Allocation control fields are shown (1-n), with the subfields for one of these being illustrated in FIG. 66.

Figure 68:
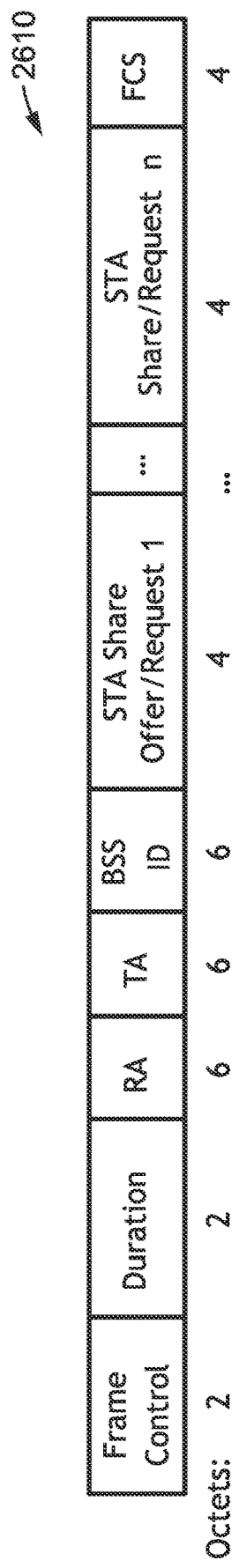
FIG. 68 is a data field diagram of a Sharing offer/request frame format, according to at least one embodiment of the present disclosure.

FIG. 66 illustrates an example embodiment 2570 of an Allocation Control subfield. An Allocation Control subfield indicates the TID and the Allocation Type, whose format is depicted in FIG. 68. A Source AID subfield is set to the AID of the STA/AP that initiates channel access during access allocation. A Destination AID subfield is set to the AID of the STA/AP that the source STA/AP targets during the allocation. A Random Access Counter subfield indicates a range of time, in microseconds, that can be selected to perform a random access count down. In the example embodiment, possible values range from 1 to 32,767. If a STA/AP receives a frame with the AccessRequestType subfield set as Random Access Slot Allocation and the Random Access Counter subfield is not zero, then the STA/AP should randomly access the channel and send the Access Request frame. An Allocation Start subfield indicates the access start time of the STA/AP, and for example contains the lower 4 octets of the TSF at the time the access starts. For Dedicated Access Slot Allocation type and Dedicated Transmission Access Allocation type the following holds.

Allocation Start$n$=Allocation Start1+($n$−1)*Allocation block duration.

Allocation Start1: the Allocation start time for the 1st allocation.

Allocation Startn: the Allocation start time for the nth allocation.

An Allocation Block Duration subfield indicates the duration, in microseconds, of a time block for which the access allocation is made. For a Dedicated Access Slot Allocation type, the block duration should be smaller, with a possible example value range of from 1 to 32,767.

For a Dedicated Transmission Access Allocation type, the block duration should be larger, with a possible example value range being from 1 to 65,535.

Figure 67:
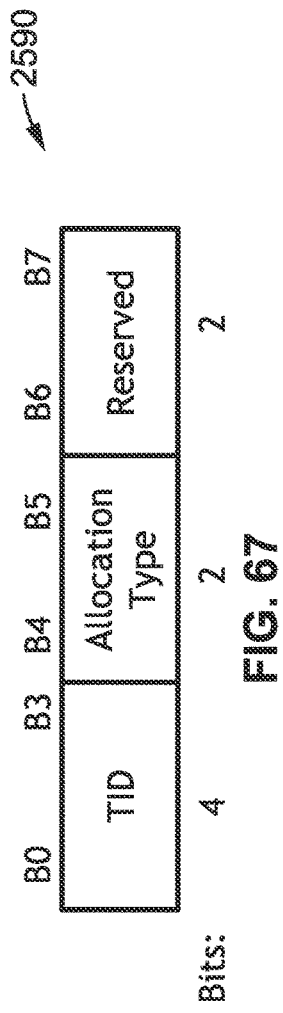
FIG. 67 is a data field diagram of an Allocation Control subfield format, according to at least one embodiment of the present disclosure.

FIG. 67 illustrates an example embodiment 2590 of an Allocation Control Subfield format. The Traffic Identifier (TID) subfield identifies the Traffic Class (TC) or Traffic Stream (TS) for the allocation request or grant. The Allocation Type subfield defines the access request type, with possible values listed in Table 1 titled AccessRequestType subfield Values. It should be appreciated that different values can be used to represent these states, and others exemplified herein, without departing from the present disclosure.

The TID subfield identifies the TC or TS for the allocation request or grant. The Allocation Type subfield defines the access request type, with possible values listed in Table 1.

8.3. Sharing Offer/Request Frame

FIG. 68 illustrates an example embodiment 2610 of a Sharing Offer/Request format. A Frame Control field indicates the type of frame. A Duration field contains NAV information used for CSMA/CA channel access. An RA field contains a MAC address for the recipient of the frame. A TA field contains a MAC address of the STA that transmitted the frame. A BasicServiceSet ID (BSSID) subfield is the MAC address of the AP that the non-AP STA is associated to. If the BSSID indicates the same MAC address as the TA, it means the sharing offer/request frame is delivering shareability information for the non-AP STAs from the internal BSS; otherwise, it means the sharing offer/request frame is delivering shareability information for a non-AP STAs from an inter BSS which ID is indicated by BSSID. One or more STA Share Offer/Request info fields are shown (e.g., 1-n) which indicate the TXOP share offer/request information of the non-AP STA/AP as seen in FIG. 69.

Figure 69:
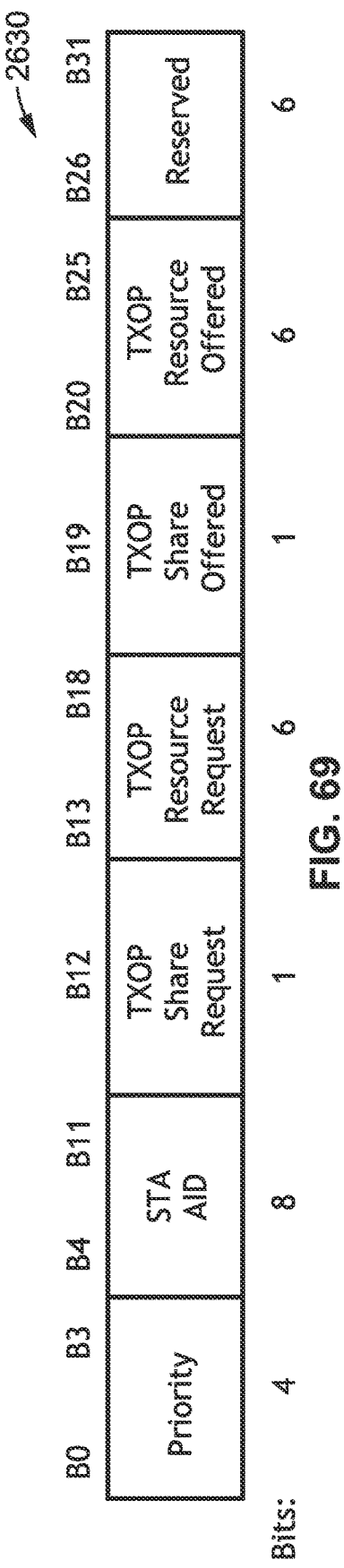
FIG. 69 is a data field diagram of a STA Share offer/request information field format, according to at least one embodiment of the present disclosure.

FIG. 69 illustrates an example embodiment 2630 of a Sharing Offer/Request Information field format. The STA Share Offer/Request field indicates the TXOP share offer/request information of the non-AP STA/AP.

The Priority field indicates the priority of the traffic stored in the STA/AP's buffer, which can be used by the TXOP holder for the TXOP access scheduler design.

The STA AID is the AID of the non-AP TXOP participant STA/AP. The TXOP Share Request subfield set to a first state (e.g., 1) means the STA/AP with AID indicated in the STA AID field is requesting for shared TXOP, and is set to a second state (e.g., 0) otherwise. When a device receives a Share offer/request frame that has the TXOP Share Request field set as a first state (e.g., 1), the device is aware that the STA/AP with AID indicated in the STA AID field is willing to participant in the shared TXOP.

If the TXOP Share offered subfield is set to a first state (e.g., 1), then this indicates that the STA/AP with AID indicated in the STA AID field is willing to be the TXOP holder and share its TXOP with other devices, and is set to a second state (e.g., 0) otherwise. When the device receives a Share offer/request frame that has the TXOP Share Offered field set as a first state (e.g., 1), the device is aware that the STA/AP with AID indicated in the STA AID field is willing to share its TXOP.

8.4. RTS-Share Frame and CTS-Share Frame

When the non-AP TXOP holder STA/AP senses the channel is free (not busy) and obtains the channel, it announces its willingness to share the TXOP by sending an RTS-share frame to the AP/destination STA. After the AP/destination STA receives an RTS-share frame from a non-AP TXOP holder STA/AP, it responds with a CTS-share frame to indicate successful reception and that it is aware that the TXOP is a shared TXOP.

Figure 70:
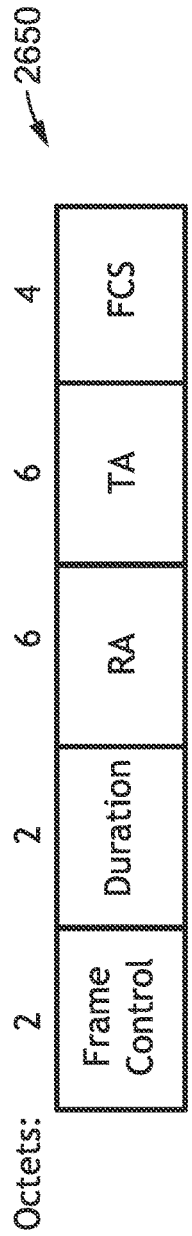
FIG. 70 is a data field diagram of an RTS-share frame, according to at least one embodiment of the present disclosure.

FIG. 70 illustrates an example embodiment 2650 of an RTS-share frame. A Frame Control field indicates the type of frame. A Duration field contains NAV information used for CSMA/CA channel access. By way of example and not limitation, the duration field is encoded with Bits 0-13 set up for a short NAV duration value, which cannot be equal to 0; Bits 14-15 are set as 01, which is a code indicating this as sharing information. If the sharing information is indicated in the duration value field in this RTS share frame then this indicates that the TXOP is shareable. Table 2 details this duration field encoding, with the present disclosure making use of the underlined reserve field.

An RA field contains an address for the recipient of the frame. A TA field contains an address for the STA transmitting the frame. These fields are in the MAC header.

Figure 71:
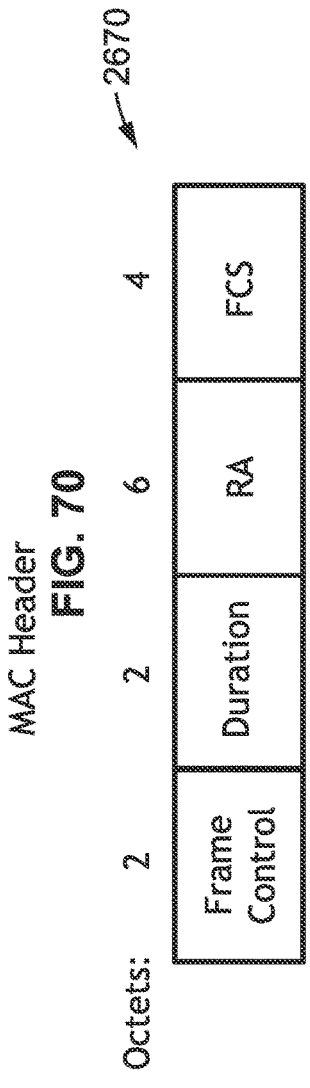
FIG. 71 is a data field diagram of a CTS-share frame, according to at least one embodiment of the present disclosure.

FIG. 71 illustrates an example embodiment 2670 of a CTS-share frame. A Frame Control field indicates the type of frame. A Duration field contains NAV information used for CSMA/CA channel access. Table 2 also provides duration field encoding for the CTS-share frame. An RA field contains an address for the recipient of the frame. These fields are in the MAC header.

8.5. TXOP Offer Frame

Figure 72:
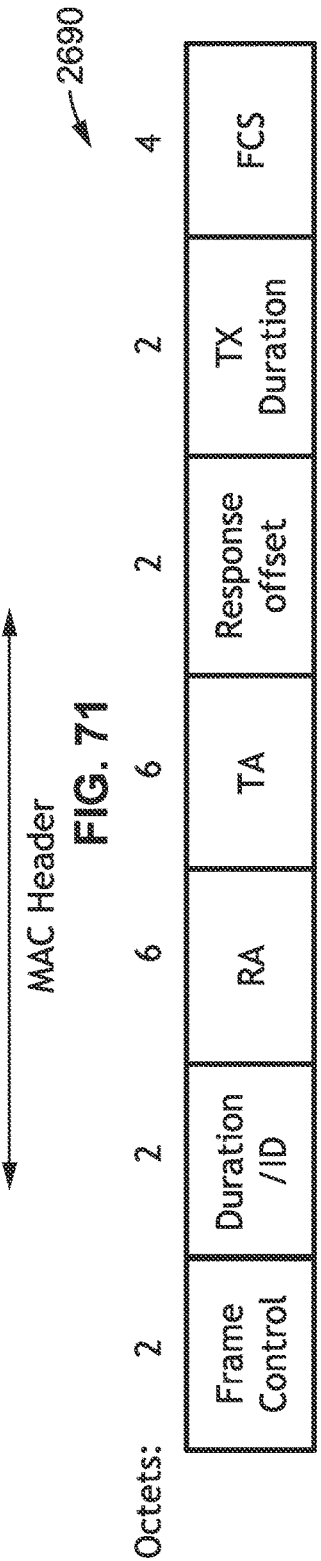
FIG. 72 is a data field diagram of a TXOP offer frame format, according to at least one embodiment of the present disclosure.

FIG. 72 illustrates an example embodiment 2690 of a TXOP Offer Frame format.

In the TXOP participant acquirement stage; the non-AP TXOP holder STA/AP broadcasts the TXOP offer frame to indicate that it is willing to share its TXOP and inquiring about other devices that are willing to join the shared TXOP. Once another device receives this TXOP offer frame, it responds with a new designed frame Access request frame to indicate it is willing to join the following shared TXOP with the non-AP TXOP holder.

In the TXOP schedule and access stage: after the TXOP holder successfully transmits UL/DL PPDU, it unicasts the TXOP offer frame to next TXOP share participant STA, indicating the transmission duration for the next TXOP share participant STA. Once receiving the unicast TXOP offer frame, the non-AP shared TXOP participant STA send UL Data to the associated AP within the transmission duration. Once receiving the unicast TXOP offer frame, the AP sends DL Data to the destination STA within the transmission duration.

The Duration/ID field contains the AID value assigned to the STA/AP transmitting the frame. The RA field is set to the address of the STA/AP receiving this frame. If this frame is broadcasted, the RA field should be set as broadcasting address, which should be FF:FF:FF:FF:FF:FF. The TA field value is the address of the STA/AP transmitting this frame. The Response Offset field indicates that the STA/AP should send an Access request frame to non-AP TXOP holder STA/AP within this time offset once received the TXOP offer frame. The TX Duration field value indicates that the STA/AP should not surpass the TX duration to complete the transmission sequence once it receives the TXOP offer frame.

8.6. Access Request Frame

Figure 73:
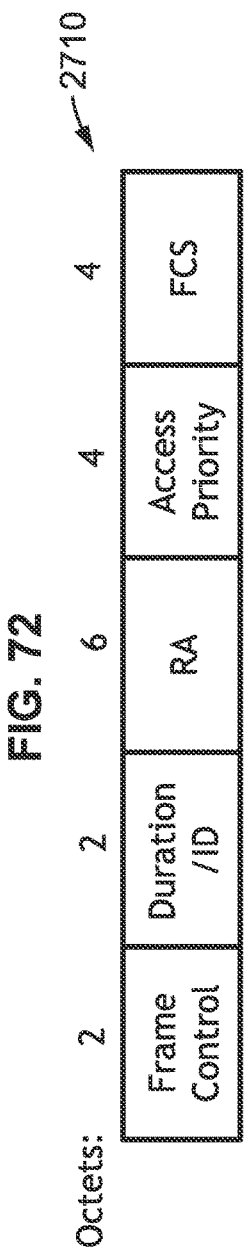
FIG. 73 is a data field diagram of an Access request frame format, according to at least one embodiment of the present disclosure.

FIG. 73 illustrates an example embodiment 2710 of an Access Request Frame having the following fields.

A Frame Control and Duration/ID field are shown as in previous message examples.

The value of the RA field of the Access request frame is different in two scenarios, without/with AP as coordinator, and should be set as follows. In the case without AP coordination the RA is set to the address of the shared TXOP holder STA/AP. In the case using AP coordination the RA is set to the address of the associated AP.

Figure 74:
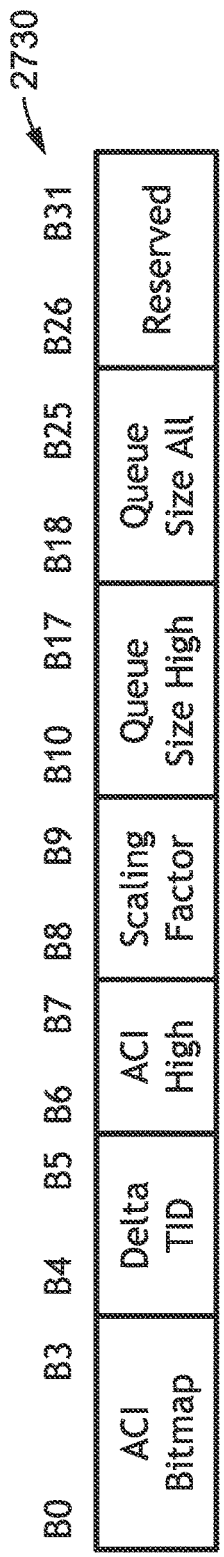
FIG. 74 is a data field diagram of an Access priority subfield format, according to at least one embodiment of the present disclosure.

An Access Priority subfield provides information on the priority of the access and is described in FIG. 74.

FIG. 74 illustrates an example embodiment 2730 of an Access Priority subfield format. An Access Category Information (ACI) Bitmap subfield indicates access categories for which the buffer status is reported. Each bit of the ACI Bitmap subfield is set to a first state (e.g., 1) to indicate that the buffer status of the corresponding AC is included in the Queue Size All subfield, and set to a second state (e.g., 0) otherwise (except if the ACI Bitmap subfield is set to a second state (e.g., 0) and the Delta TID subfield is 3) then it indicates the buffer status of all eight TIDs. A Delta TID subfield, used in combination with the values of the ACI Bitmap subfield, indicate the number of TIDs for which the STA is reporting the buffer status.

An Access Category Information (ACI) High subfield indicates the ACI of the Access Category (AC) for which the Access Request Frame is indicated in the Queue Size High subfield. A Scaling Factor (SF) subfield indicates the unit SF, in octets, of the Queue Size High and Queue Size All subfields. A Queue Size High subfield indicates the amount of buffered traffic, in units of SF octets, for the AC identified by the ACI High subfield. A Queue Size All subfield indicates the amount of buffered traffic, in units of SF octets, for all the ACs identified by the ACI Bitmap subfield.

8.7. TXOP Access Scheduler Frame

Figure 75:
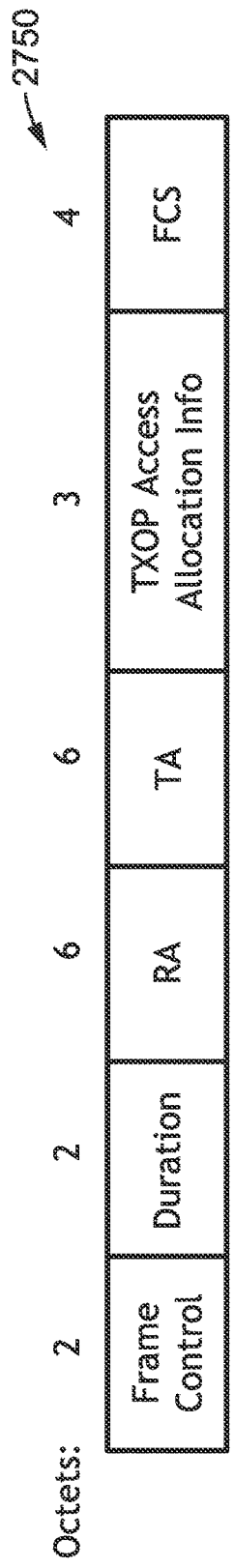
FIG. 75 is a data field diagram of a TXOP access scheduler frame format, according to at least one embodiment of the present disclosure.

FIG. 75 illustrates an example embodiment 2750 of a TXOP Access Scheduler Frame. The non-AP TXOP holder STA/AP unicasts a TXOP access scheduler frame to the non-AP shared TXOP participant STAs, indicating the TX Duration for each of the STAs. Once the STAs receive the TXOP access scheduler frame, they will send Data to the associated AP in different time slots as indicated in the Allocation Control field in the Access request information element as embedded in the beacon frame.

The RA field is set to the address of the STA/AP receiving this frame. The TA field value is the address of the STA/AP transmitting this frame. The TXOP Access Allocation Info field defines the TXOP allocation information for the Dedicated transmission access.

Figure 76:
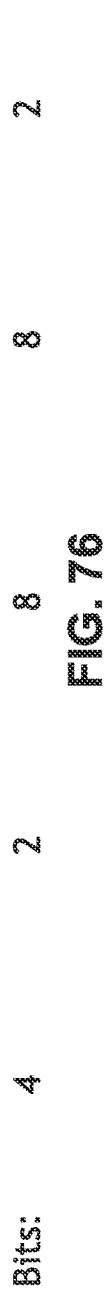
FIG. 76 is a data field diagram of a TXOP Access Allocation Info subfield format, according to at least one embodiment of the present disclosure.

FIG. 76 illustrates an example embodiment 2770 of a TXOP Access Allocation Information subfield format. The TID subfield: The TID subfield identifies the TC or TS for the TXOP access allocation. The Allocation Type subfield defines the TXOPs access scheduler type, with possible values listed in Table 1 (AccessRequestType subfield values), B4 and B5 are set as 1 and 0, respectively to indicate this is a dedicated transmission access allocation. The Source AID subfield is set to the AID of the STA/AP that initiates channel access during access allocation. The Destination AID subfield is set to the AID of the STA that the source STA/AP targets during the allocation.

8.8. Broadcast TXOP Schedule Frame

The non-AP TXOP holder device broadcasts a Broadcast TXOP scheduler frame to the TXOP share participant devices, indicating the TX Duration for each of the shared TXOP participant devices. Once the STAs receive the Broadcast TXOP scheduler frame, they each will send Data to the associated AP in different time slots as indicated in the Broadcast TXOP scheduler frame.

Figure 77:
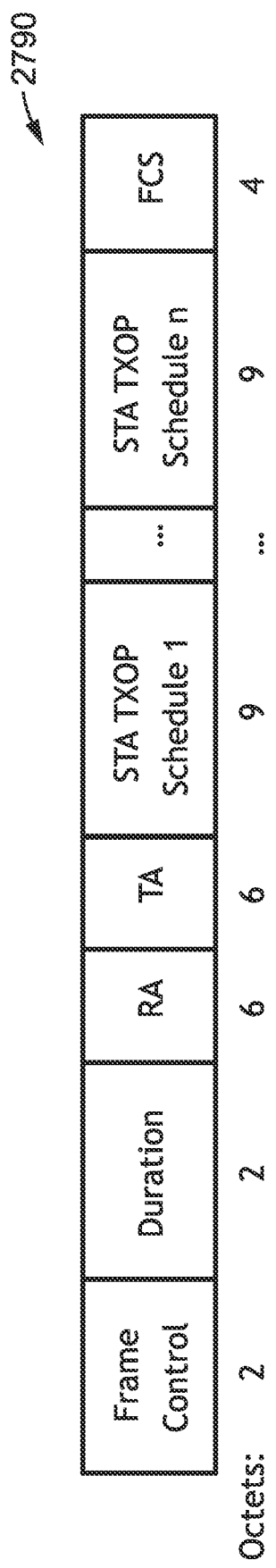
FIG. 77 is a data field diagram of a Broadcast TXOP schedule frame format, according to at least one embodiment of the present disclosure.

FIG. 77 illustrates an example embodiment 2790 of a Broadcast TXOP schedule frame format. A Frame Control and Duration/ID field are shown as in previous message examples. An RA field is set to an address for a recipient STA which is to receive this frame. A TA field contains the address for the STA transmitting this frame. One or more STA TXOP schedules (e.g., 1-n) are seen containing TXOP schedules, and having subfields shown in FIG. 78.

Figure 78:
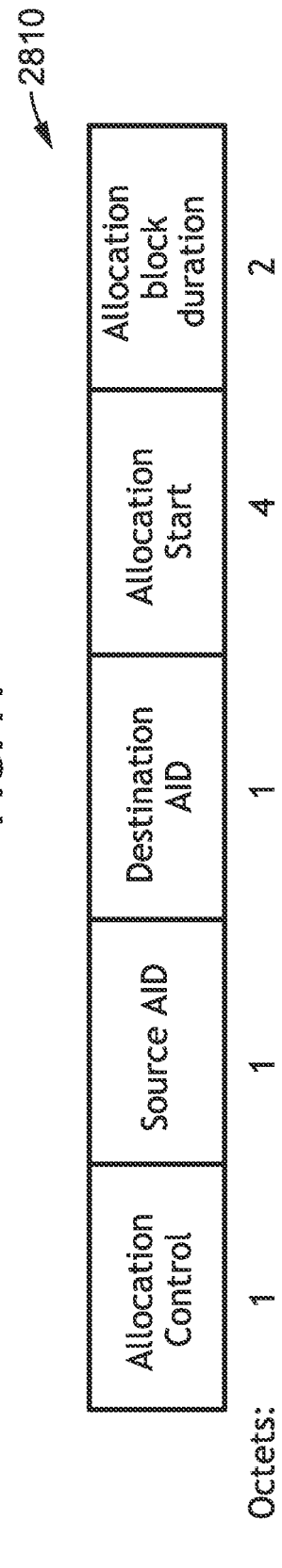
FIG. 78 is a data field diagram of a STA TXOP Schedule field format, according to at least one embodiment of the present disclosure.
Figure 79:
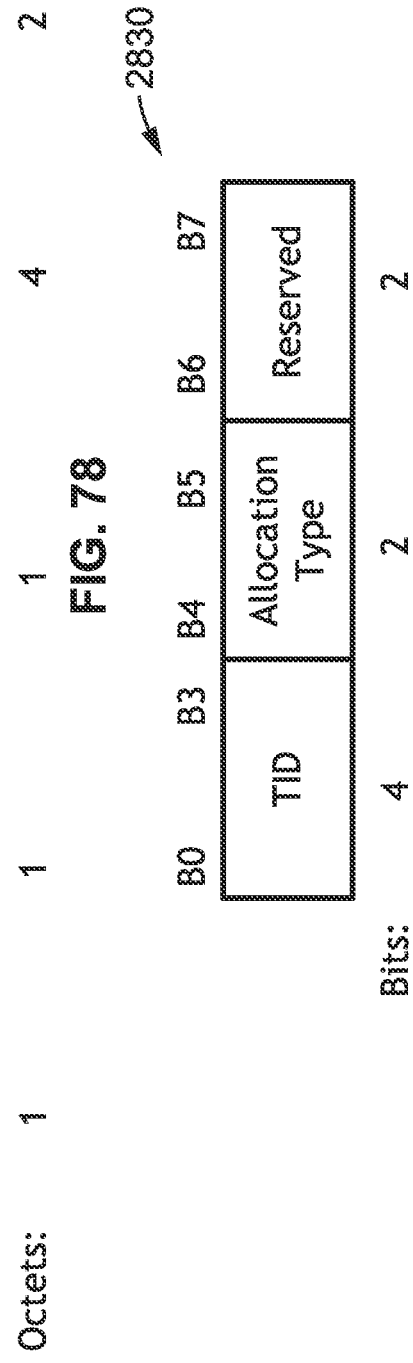
FIG. 79 is a data field diagram of an Allocation Control subfield format, according to at least one embodiment of the present disclosure.

FIG. 78 illustrates an example embodiment 2810 of a STA TXOP Schedule field format. An Allocation Control subfield indicates the TID and the Allocation Type as seen in FIG. 79. The Source AID subfield is set to the AID of the STA/AP that initiates channel access during access allocation. The Destination AID subfield is set to the AID of the STA/AP that the source STA/AP targets during the allocation. An Allocation Start subfield indicates the start time of the access, and by way of example contains the lower 4 octets of the TSF at the time the access starts. For a Dedicated Transmission Access Allocation type as defined in the Allocation Control subfield format, the following holds.

Allocation Start$n$=Allocation Start1+$(n-1)$*Allocation block duration.

Allocation Start1: the Allocation start time for the 1st STA TXOP schedule.

Allocation Start$n$: the Allocation start time for the nth STA TXOP schedule.

The Allocation Block Duration subfield indicates the duration, in microseconds, of a time block for which the access allocation is made.

For a Dedicated Access Slot Allocation type, the block duration should be smaller, by way of example and not limitation, having a possible value range of from 1 to 32,767. For a Dedicated Transmission Access Allocation type, the block duration should be larger (e.g., double the size) for example having a possible value range of from 1 to 65,535.

FIG. 79 illustrates an example embodiment 2830 of an Allocation Control subfield format indicating the TID and Allocation Type.

8.9. Shared TXOP Participant Announcement Frame

FIG. 80 illustrates an example embodiment 2850 of a Shared TXOP participant announcement frame format. A Frame Control and Duration/ID field are shown as in previous message examples, along with an RA field and TA field such as previously described. Fields are included for one or more STA TXOP participants, the example showing 1-n participants. The subfields within this participant field are seen in FIG. 81.

FIG. 81 illustrates an example embodiment 2870 of a STA TXOP participant field format. The Source AID subfield is set to the AID that initiates channel access during access allocation. The Destination AID subfield is set to the AID of the STA that the source STA targets during the allocation. An ACI Bitmap subfield indicates the access categories for which the buffer status is reported. A Delta TID subfield is used in combination with the values of the ACI Bitmap subfield, to indicate the number of TIDs for which the STA is reporting the buffer status.

An Access Category Information (ACI) High subfield indicates the ACI of the Access Category (AC) for which the Access Request frame is indicated in the Queue Size High subfield. A Scaling Factor (SF) subfield indicates the unit SF, in octets, of the Queue Size High and Queue Size All subfields. A Queue Size High subfield indicates the amount of buffered traffic, in units of SF octets, for the AC identified by the ACI High subfield. A Queue Size All subfield indicates the amount of buffered traffic, in units of SF octets, for all the ACs identified by the ACI Bitmap subfield.

8.10. Request TXOP Offer Frame

After the non-AP TXOP holder STA sends Data to the associated AP, it also sends a Request TXOP Offer frame to the associated AP, which indicates the start of the shared TXOP access for the next TXOP share participant STA. After receiving the Request TXOP Offer frame, the AP unicasts a TXOP Offer frame to the next TXOP share participant STA, and indicates the TX Duration for the next STA.

FIG. 82 illustrates an example embodiment 2890 of a Request TXOP Offer frame format. A frame control field, Duration/ID field, RA field and TA field are shown as in previous message examples. The Duration/ID field indicates the AID of the STA that the AP should send the TXOP Offer frame to, while the TX duration field indicates to the next STA what the maximum transmission duration is.

8.11. Request TXOP Access Scheduler Frame

Before a non-AP TXOP holder sends Data to the associated AP, it first sends a Request TXOP Access Scheduler frame to the AP, which indicates the shared TXOP access for all other non-AP shared TXOP participant STAs. After receiving the Request TXOP Access Scheduler frame, the AP either unicasts a TXOP Access Scheduler frame to the non-AP shared TXOP participant STAs, and indicates the TX Duration for each of them or broadcasts a Broadcast TXOP Scheduler frame to all the non-AP shared TXOP participant STAs, and indicates the TX Duration for each of them.

FIG. 83 illustrates an example embodiment 2910 of a Request TXOP access scheduler frame format. A Frame Control field, Duration field, RA field and TA field are shown as in previous message examples. At least one STA TXOP Access Request field is included, the example is shown with TXOP Access Requests 1 through n. Subfields within the TXOP Access Request field are described in FIG. 85.

FIG. 84 illustrates an example embodiment 2930 of a TA TXOP Access Request field format. An Allocation Control field indicates the number of time slots requested. The Source AID subfield is set to the AID of the STA that initiates channel access during access allocation. A Destination AID subfield is set to the AID of the STA that the source STA targets during the allocation. An Allocation Start subfield indicates the start time of the access, and in at least one embodiment it contains the lower four octets of the TSF at the time the access starts. For a Dedicated Transmission Access Allocation type as defined in the Allocation Control subfield format, the following holds.

$$\text{Allocation Start}_n = \text{Allocation Start}_1 + (n-1)*\text{Allocation block duration.}$$

Allocation Start$_1$: the Allocation start time for the 1st allocation.

Allocation Start$_n$: the Allocation start time for the nth allocation.

An Allocation Block Duration subfield indicates the duration, in microseconds, of a time block for which the access allocation is made. For a Dedicated Access Slot Allocation type, the block duration is exemplified here with possible values ranging from 1 to 32,767. For a Dedicated Transmission Access Allocation type, the block duration should be larger, such as exemplified with possible values ranging from 1 to 65,535.

FIG. 85 illustrates an example embodiment 2950 of an Allocation Control subfield format having a TID subfield and an Allocation Type subfield.

8.12. Share Offer/Request Frame

FIG. 86 illustrates an example embodiment 2970 of a Share offer/request frame format. The Share Offer/Request frame has a Frame Control field, Duration/ID field, RA field and TA field as in some previous message examples. A Share Offer/Request field indicates the TXOP share offer/request information of the non-AP STA, and is described in FIG. 88.

FIG. 87 illustrates an example embodiment 2990 of a Share offer/request info field format. A Priority field indicates the priority of the traffic stored in the buffer of the STA, which can be used by the TXOP holder for the TXOP access scheduler. A TXOP Share Request is set to a first state (e.g., 1) to indicate that this STA is requesting a shared TXOP time; otherwise TXOP Share Request is set to a second state (e.g., 0). When the AP receives a Share Offer/Request frame that has the TXOP Share Request field set to the first state, the AP is made aware (can determine) that the STA which sent this frame is willing to participant in the shared TXOP. A TXOP Duration Request indicates the amount of time in microseconds that the STA requests in the shared TXOP. The AP will broadcast this information in the Sharing Offers/Request frame. A TXOP Share Offered value is set to a first state (e.g., 1) indicating that this STA is willing to be the TXOP holder and share its TXOP with other STAs; otherwise the value is set to a second state (e.g., 0). When the AP receives a Share Offer/Request frame that has the TXOP Share Offered field set to the first state, the AP is made aware that the STA who sent this frame is willing to share the TXOP with other STAs. A TXOP Duration Offered subfield indicates the amount of time in microseconds that the TXOP holder STA is willing to share with other STAs, and the AP will broadcast this information in the Sharing Offers/Request frame.

8.13. Sharing Offers/Request Frame

AP broadcast the sharing offers/request frame to all the STAs, for each STA, it has a specific STA Share Offer/Request field designed for it, which indicates the TXOP share/request information of the specific STA and AP.

FIG. 88 illustrates an example embodiment 3010 of a Sharing offers/request frame format. The Share Offers/Request frame has a Frame Control field, Duration field, RA field and TA field as in some previous message examples. Multiple STA Share Offer/Requests may be contained in the frame, depicted here as STA Share/Requests 1 through n. The format of a STA Share Offer/Request is seen in FIG. 89.

Figure 89:
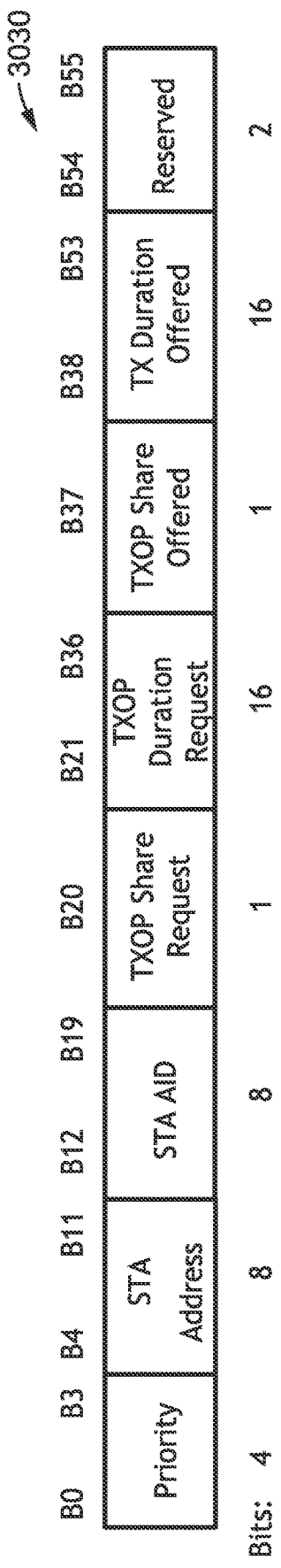
FIG. 89 is a data field diagram of a STA Share offer/request info field format, according to at least one embodiment of the present disclosure.

FIG. 89 illustrates an example embodiment 3030 of a STA Share offer/request info field format. The Priority field indicates the priority of the traffic that storage in the STA/AP's buffer, which can be used by the TXOP holder for the TXOP access scheduler design. The STA Address is the MAC address of the TXOP participant STA/AP, which can be used by the TXOP holder to assign the TXOP access start time and duration for the specific STA/AP. STA AID is the AID of the TXOP participant STA/AP. The remaining fields of TXOP Share Request, TXOP Duration Request, TXOP Share Offered and TX Duration Offered were described in regard to FIG. 86.

8.14. Sharing Configuration Frame

Figure 90:
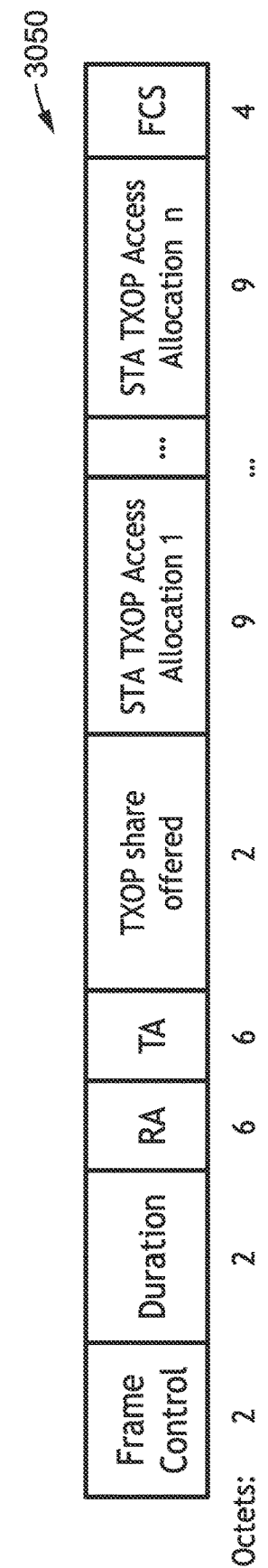
FIG. 90 is a data field diagram of a Sharing configuration frame format, according to at least one embodiment of the present disclosure.
Figure 93:
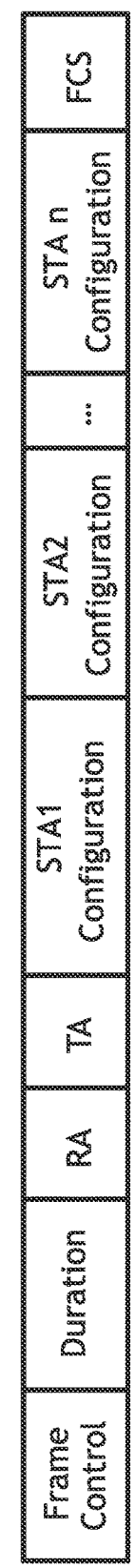
FIG. 93 is a data field diagram of a Sharing configurations frame format, according to at least one embodiment of the present disclosure.

FIG. 90 illustrates an example embodiment 3050 of a Sharing configuration frame format. The Sharing Configuration frame has a Frame Control field, Duration field, RA field and TA field as in some previous message examples. A TXOP share offered field indicates the overall TXOP duration that the TXOP holder STA is willing to share with other STAs and the AP. STA TXOP Access Allocation fields indicate TXOP access start time and duration for each specific STA and AP; the example shows n fields. After the AP receives the Sharing configuration frame, the AP will record this STA TXOP Access Allocation information and broadcast it with the sharing configurations frame as seen in FIG. 93.

Figure 91:
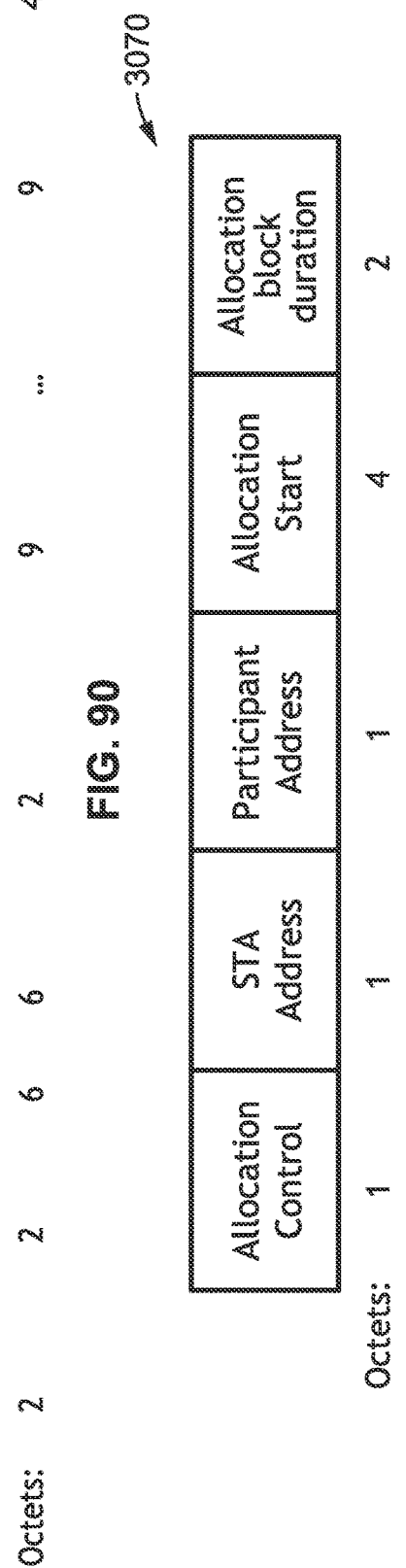
FIG. 91 is a data field diagram of a STA TXOP Access Allocation field format, according to at least one embodiment of the present disclosure.

FIG. 91 illustrates an example embodiment 3070 of a STA TXOP Access Allocation field format.

A STA Address field indicates the MAC address of the TXOP holder. This information will be used by AP to set the TXOP Holder MAC address in the sharing configurations frame seen in FIG. 94. A participant Address indicates the MAC address of the TXOP participant. The AP will use this information to set the Participant Address subfield in the STA Configuration field of FIG. 94. An Allocation Start field indicates the start time of TXOP transmission of the participant STA or AP. An Allocation block duration field indicates the duration of the TXOP transmission of the participant STA or AP.

Figure 92:
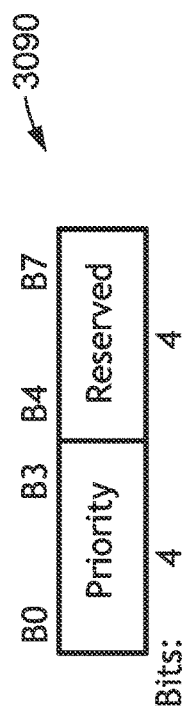
FIG. 92 is a data field diagram of an Allocation Control subfield, according to at least one embodiment of the present disclosure.

FIG. 92 illustrates an example embodiment 3090 of an Allocation Control subfield format, showing a priority and reserved field.

8.15. Sharing Configurations Frame

FIG. 93 illustrates an example embodiment 3110 of a Sharing Configurations frame format. AP broadcasts the Sharing Configurations frame to all the STAs with indicating the configuration for each STA and the AP in the STA Configuration field. The Sharing Configuration frame has a Frame Control field, Duration field, RA field and TA field as in some previous message examples. The frame contains one or more configurations for specific stations, depicted as STA1 through to STA n. The STA Configuration subfield is described in FIG. 94.

Figure 94:
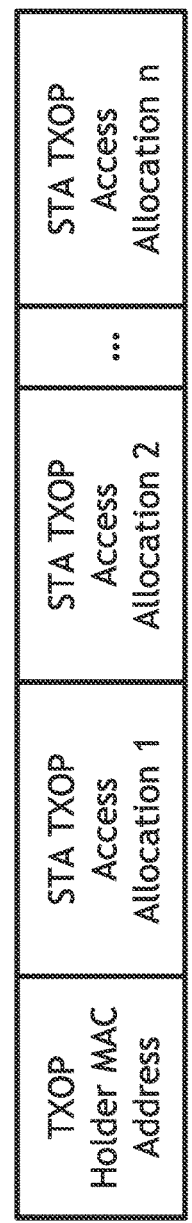
FIG. 94 is a data field diagram of a STA Configuration field format, according to at least one embodiment of the present disclosure.

FIG. 94 illustrates an example embodiment 3130 of a STA Configuration field format.

TXOP Holder MAC Address indicates the MAC address of the TXOP holder STA or AP. For any TXOP holder STAs: after receiving the CTS-share frame, the STA maps the RA info indicated in the CTS-share frame with the TXOP Holder MAC Address info. Thus, the STA can be aware of the TXOP holder, and thus gain access to the corresponding STA Configuration information.

One or more STA TXOP Access Allocation fields (e.g., 1-n) is the same as defined in FIG. 90. For non-TXOP holder STAs: after mapping to a specific STA Configuration field, the STA maps its MAC address with the Participant Address subfield to further obtain the TXOP access start (as indicated in the Allocation Start subfield) and duration (as indicated in the Allocation block duration subfield) information scheduled for it.

8.16. CTS-Reject and CTS-To-Self frame

Figure 95:
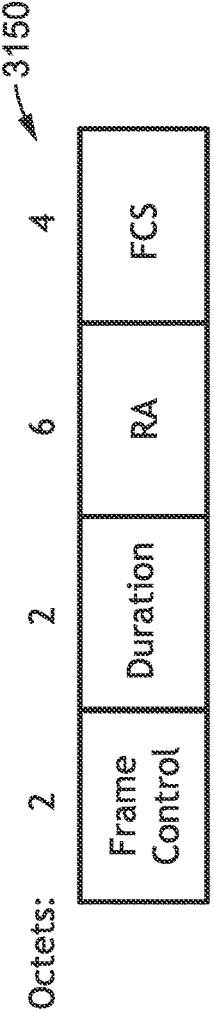
FIG. 95 is a data field diagram of a CTS frame utilized for CTS-reject, CTS-to-self and CTS, according to at least one embodiment of the present disclosure.

FIG. 95 illustrates an example embodiment 3150 of a frame format which is used for a CTS-reject frame, a CTS-to-self frame, and a CTS frame.

When used as a CTS-Reject frame in the simplified shared TXOP scheme, the non-AP STA sends a CTS-Reject frame to AP to indicate it has finished Data transmission or it doesn't have any Data to transmit. After receiving the CTS-Reject frame, the AP will loop through the next STA by sending a new CTS frame to the next STA. In the CTS-Reject frame the Duration field is the time required to transmit the CTS frame plus one SIFS (in microseconds) and the RA field is set to the MAC address of the AP.

As a CTS-to-self frame in the simplified shared TXOP scheme, the AP broadcasts a CTS-To-Self frame after it finishes looping through all UL and DL transmissions before the current maximum TXOP expires. After receiving the CTS-To-Self frame, the non-AP STAs reset the NAV to 0 and start channel access following a random backoff. The CTS-To-Self frame has a Duration field set to the time required to transmit the CTS-To-Self frame plus one SIFS (in microseconds), and an RA field equal to the transmitter's MAC address, which is the AP's MAC address in the simplified shared TXOP scheme. After receiving the CTS-To-Self frame, the non-AP STAs reset the NAV to 0 and starts channel access following a random backoff.

As a CTS frame the simplified shared TXOP scheme, the AP sends a CTS frame to loop through all non-AP STAs, which indicate the start of the shared TXOP time slot for the non-AP STA. After receiving the CTS frame, the non-AP STA should start UL Data transmission. In the CTS frame the Duration field is the time set to the end of the current maximum TXOP limitation, while the RA field is equal to the next non-AP STA's MAC address that the AP loops through.

9. General Scope of Implementations

The enhancements described in the presented technology can be readily implemented within various wireless network communication stations. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

The present disclosure describes in its most generic sense how any non-AP STA or AP obtaining a TXOP in a wireless LAN network can share its TXOP with others in the same BSS; the TXOP can be shared among both UL and DL transmissions in the time domain.

Different solutions are provided to achieve this performance in different scenarios, which can be classified as following:

Dynamic scenarios: (a) Scheduling without AP as coordinator in a UL initiated sharing scheme; (b) Scheduling with AP as coordinator, in either a UL initiated sharing scheme or a DL initiated sharing scheme.

Semi-static scenarios which are either UL or DL initiated sharing schemes.

Simplified scenarios which are either UL or DL initiated sharing schemes.

In UL initiated dynamic scenarios: different conditions are considered including with/without the AP as coordinator; shareability information of the AP should also be exchanged with other non-AP STAs; the AP should also respond to the TXOP holder if an inquiry has been made for shared TXOP participation; the TXOP holder STA should also assign corresponding time to the AP for DL transmission if AP also requests time for DL transmission in the shared TXOP; and the AP should send DL DATA to the destination STAs in the assigned time slot and for a specified duration during shared TXOP.

In DL initiated dynamic scenarios: the AP is the TXOP holder and operates as the coordinator.

An AP obtaining a TXOP in a wireless LAN network sharing its TXOP with other non-AP STAs in the same BSS achieves a shared TXOP among DL and UL transmissions by performing the following steps: shareability information is exchanged between AP and non-AP STAs to inform and/or gain approval of AP's sharing TXOP with non-AP STAs; upon gaining access to the channel, the AP announces it is willing to share the TXOP by broadcasting a message to other non-AP STAs; the AP receives messages from other STAs to know (determine) which STAs are requesting time in the TXOP; the AP broadcasts the shareability information of all the shared TXOP participants; and the AP makes inquiry of non-AP STAs to know (determine) which STA is requesting time in the shared TXOP and assigns the corresponding time slot for them.

AP and STAs exchange information of TXOP shareability and TXOP access time allocation through the exchange of management frames (such as authentication request/response, association request/response and beacon frames).

The RTS-share and the CTS-share frames are implemented to indicate that the coming TXOP is available to be shared.

The AP receives access request frames from STAs indicating they are requesting time in the shared TXOP; in which the access request sent from the STAs requesting to share the TXOP can be sent through randomly accessing the channel at a predefined slot times or in a dedicated time slot; alternatively or additionally, the AP might poll the STAs to get their responses.

The AP sends DL DATA to each destination STA for a specified duration; once finished with the DL transmission, the AP sends a TXOP access scheduler frame (such as TXOP offer frame, TXOP access scheduler frame and broadcast TXOP scheduler frame) to STAs; following this schedule, other STAs transmit UL DATA to the AP in the scheduled time and for the specified duration.

In a semi-static scenario, the TXOP holder (STA or AP) can decide on the shared TXOP participants accessing its TXOP and the duration and order of access in a semi-static way through exchanging messages with these participants; the TXOP holder (STA or AP) runs a setup procedure to setup the semi-static configurations; the TXOP holder (STA or AP) exchanges share/request information with other shared TXOP participants through the AP; the TXOP holders (STA or AP) exchange the configuration information about semi-static TXOP sharing schedule with all shared TXOP participants through the AP;

A TXOP holder (STA or AP) sharing its TXOP with other devices follows the advertised allocation schedule.

A TXOP holder (STA or AP) assigns some time to the STA sharing its TXOP, upon detecting a TXOP, that device start using the TXOP at the advertised time for the advertised duration.

In a simplified scenario, the AP can loop through all non-AP STAs, share the TXOP among UL and DL transmissions and enable channel access according to the simplified shared TXOP scheme.

For a UL initiated case: the non-AP TXOP holder STA grabs (obtains) the channel and use the shared TXOP as much as needed; after the non-AP TXOP holder STA finishes DATA transmission, the AP loops (sequences) through the rest (remainder) of the non-AP STAs and starts the shared TXOP slot for each of them; after looping through one round of the non-STAs, the AP starts DL transmissions if TXOP time allows; if the AP finishes its DL transmissions, or if the TXOP time expires, then the AP broadcasts a CTS-To-Self frame to clear the channel reservation for all non-AP STAs, in which case, a new shared TXOP procedure can be started.

For the DL initiated case: the AP grabs the channel and uses the shared TXOP for DL transmission as much as it is needed; after the AP finishes its DL transmission, if time allows, it loops (sequences) through the non-AP STAs and starts the shared TXOP slot for each of them for UL transmissions; after looping through one round of the non-STAs or if the TXOP time expires, the AP broadcasts a CTS-To-Self frame to clear the channel reservation for all non-AP STAs. In this case, a new shared TXOP procedure can be start; and the shared TXOP time slots are preconfigured.

An apparatus for wireless communication in a network, the apparatus comprising: (a) a wireless communication circuit, as a wireless station (STA), configured for wirelessly communicating over at least one channel with other wireless stations (STAs) on a local area network (WLAN); (b) a processor coupled to said wireless communication circuit within a station configured for operating on the WLAN as a station configured to support communicating using a shared Transmit Opportunity (TXOP) protocol; (c) a non-transitory memory storing instructions executable by the processor for the STA in the same Basic Service Set (BSS); and (d) wherein said instructions, when executed by the processor, perform steps comprising: (d)(i) gaining access to the channel and communicating that an upcoming TXOP is available to be shared by broadcasting a message from the STA as TXOP holder, which may be an AP STA or a non-AP STA, to other STAs in the BSS, or by communicating to the AP indicating that the STA as TXOP holder is willing to share the TXOP with other STAs, with A STA operating as an AP further broadcasting this message on behalf of the STA as TXOP holder; (d)(ii) sharing a TXOP, by said STA operating as a non-AP STA or an AP STA, with other stations on the network in the same BSS; (d) (iii) wherein said sharing of the TXOP is performed for both Up Link (UL) physical layer protocol data unit (PPDU) transmissions and Down Link (DL) PPDU transmissions in the time domain; and (d)(iv) sending messages from the TXOP holder, or through the AP when AP is not the TXOP holder, to STAs that will share the TXOP with the STA informing them of the duration and time of channel access for the upcoming TXOP which is being shared.

An apparatus for wireless communication in a network, the apparatus comprising: (a) a wireless communication circuit, as a wireless station (STA), configured for wirelessly communicating over at least one channel with other wireless stations (STAs) on a local area network (WLAN); (b) a processor coupled to said wireless communication circuit within a station configured for operating on the WLAN as a station; (c) a non-transitory memory storing instructions executable by the processor for the STA in the same Basic Service Set (BSS); and (d) wherein said instructions, when executed by the processor, perform steps comprising: (d)(i) transmitting a message indicating an ability to perform transmit opportunity (TXOP) sharing; (d)(ii) transmitting a frame from an access point (AP) STA, which has obtained the TXOP, to a non-AP STA indicating an allocated portion of the time within an obtained TXOP to be shared with the non-AP STA; (d)(iii) wherein a station configured to operate as said non-AP STA transmits PPDUs in the time allocated to it within the frame to be shared; (d)(iv) wherein the non-AP STA receives the frame from its associated AP which is addressed to it, and transmits one or more non-trigger-based (non-TB) PPDUs within the allocated shared TXOP time duration as indicated in the frame, while ensuring that that its physical layer protocol data unit (PPDU) transmission(s) and any expected responses can be performed entirely within the allocated time; (d)(v) responding with an acknowledgement (ACK), by the AP STA to the PPDU transmitted by the non-AP STA, if an ACK is solicited by the non-AP STA; and (d)(vi) transmitting one or more PPDUs, by said AP STA, after the end of the allocated time and before the obtained TXOP NAV has expired, if the AP STA has PPDUs to be transmitted.

An apparatus for wireless communication in a network, the apparatus comprising: (a) a wireless communication circuit, as a wireless station (STA), configured for wirelessly communicating over at least one channel with other wireless stations (STAs) on a local area network (WLAN) in its reception area; (b) a processor coupled to said wireless communication circuit within a station configured for operating on the WLAN as a station configured to support communicating using a shared Transmit Opportunity (TXOP) protocol; (c) a non-transitory memory storing instructions executable by the processor for the STA; and (d) wherein said instructions, when executed by the processor, perform steps comprising: (d)(i) wherein said STA is operating as an AP STA for the BSS; (d)(ii) exchanging shareability information with non-AP STAs on the network for this BSS and broadcasting the obtained shareability information on the network for this BSS; (d)(iii) gaining access to the channel and becoming TXOP holder as the AP STA; (d)(iv) announcing to non-AP STAs that the TXOP is available to be shared; (d)(v) receiving messages from other STAs requesting to share the TXOP; and (d)(vi) sending DL DATA to destination STAs using obtained TXOP; and (d)(vii) broadcasting shareability information to all the shared TXOP participants, when shared TXOP time allows, and assigning time slots and duration for each shared TXOP participant.

An apparatus for wireless communication in a network, the apparatus comprising: (a) a wireless communication circuit, as a wireless station (STA), configured for wirelessly communicating over at least one channel with other wireless stations (STAs) on a local area network (WLAN); (b) a processor coupled to said wireless communication circuit within a station configured for operating on the WLAN as a station configured to support communicating using a shared Transmit Opportunity (TXOP) protocol; (c) a non-transitory memory storing instructions executable by the processor for the STA; and (d) wherein said instructions, when executed by the processor, perform steps comprising: (d)(i) wherein said STA operating as an AP STA or a non-AP STA, and has gained TXOP as TXOP holder; (d)(ii) said TXOP holder determines the shared TXOP participants accessing its TXOP and assigning time slots and duration in a semi-static way to shared TXOP participants through exchanging messages with these participants through the coordination of the AP; and (d)(ii) said STA performs a setup procedure to setup the semi-static configurations: (A) said STA exchanges share/request information with other STA through an AP STA; then (B) said STA perform semi-static shared TXOP schedule and exchanges the schedule configuration with all other STAs through an AP STA.

An apparatus for wireless communication in a network, the apparatus comprising: (a) a wireless communication circuit, as a wireless station (STA) operating as an AP STA within its Basic Service Set (BSS), configured for wirelessly communicating over at least one channel with other wireless stations (STAs) on a local area network (WLAN); (b) a processor coupled to said wireless communication circuit within a station configured for operating on the WLAN as a station configured to support communicating using a shared Transmit Opportunity (TXOP) protocol. Non-AP TXOP holder STA obtains channel access and is configured to use the shared TXOP time as much as is needed for UL DATA transmission, and for said AP STA to sequence through all non-AP STAs and share the TXOP among Up Link (UL) DATA transmissions and Down Link (DL) DATA transmissions and enable channel access according to the simplified shared TXOP scheme; (c) wherein an STA operating as a non-AP STA sends a message to the AP after it finishes UL transmission and indicates that said AP STA can loop through the next non-AP STA; (d) a non-transitory memory storing instructions executable by the processor for the STA; and (e) wherein said instructions, when executed by the processor, perform steps comprising: (e)(i) detecting that a non-AP TXOP has completed its use of the TXOP; (e)(ii) said AP STA sequences through the remaining non-AP STAs and provides at least one shared TXOP slot for each of them for UL transmissions; (e)(iii) determining that sufficient TXOP time remains, wherein said AP STA commences DL transmissions to the non-AP STA on the network; and (e)(iv) after said AP STA completes the DL transmissions, or if the TXOP time expires, then said AP STA broadcasts a CTS-To-Self frame to clear the channel reservation for all non-AP STAs, whereby a new TXOP procedure can be started.

An apparatus for wireless communication in a network, the apparatus comprising: (a) a wireless communication circuit, as a wireless station (STA), operating as an AP STA within its Basic Service Set (BSS), is configured for wirelessly communicating over at least one channel with other wireless stations (STAs) on a local area network (WLAN) in its reception area; (b) a processor coupled to said wireless communication circuit within a station configured for operating on the WLAN as a station configured to support communicating using a shared Transmit Opportunity (TXOP) protocol and for said AP STA to sequence through all non-AP STAs and share the TXOP among Up Link (UL) DATA transmissions and Down Link (DL) DATA transmissions and enable channel access according to the simplified shared TXOP scheme; (c) a non-transitory memory storing instructions executable by the processor for the STA; and (d) wherein said instructions, when executed by the processor, perform steps comprising: (d)(i) said AP STA obtains the channel and utilizes the obtained TXOP for performing DL physical layer protocol data unit (PPDU) transmissions, said AP STA, as TXOP holder, is configured to use the obtained TXOP time as much as it requires for sending the DL transmissions; (d)(ii) completing its DL transmissions, and determining that sufficient time remains in the TXOP to commence sharing the TXOP with non-AP STAs; (d)(iii) said AP STA loops through the non-AP STAs sharing at least one TXOP slot for each of them for performing UL transmissions; (d)(iv) upon completing one loop of the sequence for sharing with the non-AP STAs, or if the TXOP time expires, the AP broadcasts a CTS-To-Self frame to clear the channel reservation for all non-AP STAs, whereby a new shared TXOP procedure can be started.

The apparatus of any preceding implementation, wherein the STA exchanges information of TXOP sharing capability through the exchange of management frames with STAs on the network operating as the AP STA or non-AP STAs.

The apparatus of any preceding implementation, wherein said management frames are selected from the group of frames consisting of authentication request frames, authentication response frames, association request frames, association response frames and beacon frames.

The apparatus of any preceding implementation, wherein said STA has a communication range which is based on the type of STA: (i) if the STA is a non-AP STA, then said communication range may not cover all other STAs in same Basic Service Set (BSS), which could communicate with other non-AP STAs with the coordination of the AP STA or can directly communicate with other non-AP STAs if in its communication range; and (ii) if the STA is an AP STA, the communication range covers all other STAs in the same Basic Service Set (BSS).

The apparatus of any preceding implementation, further comprising exchanging messages with other STAs in the BSS, either directly to the other STAs or indirectly through the associated AP, in determining which STAs that are either non-AP STAs or AP STAs in the BSS that are requesting time in the upcoming TXOP which is available to be shared.

The apparatus of any preceding implementation, wherein said UL transmissions in the time domain comprise a dynamic scenario for scheduling TXOP sharing which is UL initiated, and utilizes AP coordination.

The apparatus of any preceding implementation, wherein the STA operating as the AP STA performs steps comprising: receiving a message indicating share offer/request information from non-AP STAs on the network; exchanging obtained share offer/request information with other non-AP STAs on the network; sending a response after receiving a frame indicating a non-AP STA has obtained the TXOP and started the shared TXOP; may sending inquiry messages to identify the non-AP STAs request to join an upcoming shared TXOP on behave of the TXOP holder; collecting the requests to join upcoming shared TXOP from non-AP STAs on behalf of the TXOP holder; and sending the collected share request information to a STA operating at the TXOP holder; receiving a frame from the TXOP holder indicating the allocated time and durations for STAs that request to join an upcoming shared TXOP; sharing a portion of the obtained TXOP time on behalf of the TXOP holder STA with other non-AP STAs, by transmitting frame indicating the allocated start time and duration for each or all of the shared non-AP STAs; receiving allocated start time and duration for TXOP sharing from the TXOP holder if the STA operating as the AP STA has requested participation in the shared TXOP for DL transmission; and transmitting a downlink (DL) PPDU to destination STAs on the network within the allocated shared TXOP duration assigned by the TXOP holder STA.

The apparatus of any preceding implementation, wherein said UL transmissions in the time domain comprise a dynamic scenario for scheduling TXOP sharing which is UL initiated, without need of AP coordination.

The apparatus of any preceding implementation, wherein the STA operating as the non-AP STA performs steps comprising: sending a frame to the associated AP to obtain the channel if said non-AP STA detects that the medium is idle based on a carrier sense (CS) mechanism; and indicating in the transmitted frame that this channel access attempt is for obtaining a shared TXOP; receiving a response from the associated AP indicating a successful reception of the previous transmitted frame and indicating that said non-AP STA has obtained the TXOP and can commence using the shared TXOP; sending of inquiry messages to identify other STAs requesting to join an upcoming shared TXOP, if said non-AP STA is operating as the TXOP holder; sending a message containing a request to join an upcoming shared TXOP if the said STA is not operating as the TXOP holder; collecting the requests to join an upcoming shared TXOP from other STAs if said non-AP STA is operating as the TXOP holder; and allocating time and durations for shared STAs that request to join a portion of the obtained TXOP time; transmitting a frame indicating the allocated start time and duration to each or all of the shared non-AP STAs; receiving allocated start time and duration for TXOP sharing from the TXOP holder if the non-AP STA is not the TXOP holder, has requested participation in the shared TXOP for UL transmission; and transmitting UL PPDU to associated AP on the network within the allocated shared TXOP duration assigned by the TXOP holder STA.

The apparatus of any preceding implementation, wherein said UL and DL transmissions in the time domain comprise a semi-static scenario utilizing an AP STA as coordinator when scheduling TXOP sharing which is either UL initiated or DL initiated.

The apparatus of any preceding implementation, wherein said UL and DL transmissions in the time domain comprise a simplified scenario when starting TXOP sharing which is either UL initiated or DL initiated, in which the STA operating as the AP doesn't identify the shared TXOP participants but sequences through all STAs one-by-one for participation.

The apparatus of any preceding implementation, wherein the STA exchanges information of TXOP share offer/request capability and TXOP access time allocation through the exchange of management frames with STAs on the network operating as the AP STA or non-AP STAs.

The apparatus of any preceding implementation, wherein said management frame are selected from the group of frames consisting of authentication request frames, authentication response frames, association request frames, association response frames and beacon frames.

The apparatus of any preceding implementation, wherein RTS-share and CTS-share frames comprise modified Ready-To-Send (RTS) and Clear-To-Send (CTS) frames incorporating information fields indicating about the obtained TXOP to be shared and the shared TXOP is started.

The apparatus of any preceding implementation, wherein the exchanging of messages, in which other STAs are requesting access time in the upcoming TXOP, may be sent through randomly accessing said at least one channel at predefined slot times or in a dedicated time slot.

The apparatus of any preceding implementation, wherein said STA as TXOP holder, when operating as an AP STA, may poll non-AP STAs to determine if they are requesting time in the upcoming TXOP.

The apparatus of any preceding implementation, wherein said STA as TXOP holder, when operating as a non-AP STA, may poll non-AP STAs by itself or through the coordination of AP to determine if they are requesting transmission time in the upcoming TXOP.

The apparatus of any preceding implementation, wherein the shared TXOP holder STA, which may be the AP STA or a non-AP STA, transmits the shared TXOP access scheduler frame, with or without the coordination of an AP STA, to STAs that are requesting time in the upcoming TXOP, to which these STAs are to respond in transmitting UL DATA to the AP STA or DL DATA to non-AP STA in the scheduled time and for a specified duration.

The apparatus of any preceding implementation, wherein said TXOP access scheduler frame is selected from the group of message frames consisting of TXOP offer frames, TXOP access scheduler frames and broadcast TXOP scheduler frames.

The apparatus of any preceding implementation, wherein said TXOP holder shares its TXOP with other STAs on the network according to an advertised resource (channel access) allocation schedule, which is configured during the setup procedure.

The apparatus of any preceding implementation, wherein said shared TXOP participants are configured for detecting the start of the TXOP and commencing to use the shared TXOP at the assigned time slots and duration.

The apparatus of any preceding implementation, wherein said shared TXOP time slots are preconfigured.

It will also be noted that each of the above apparatus implementations can also be described in the context of a computer-implemented protocol for wireless communications between stations (STAs) on a network.

As used herein, term "implementation" is intended to include, without limitation, embodiments, examples, protocols or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

AccessRequestType subfield values

| Bit 4 | Bit 5 | Meaning |
|---|---|---|
| 0 | 0 | Random access slot allocation |
| 0 | 1 | Dedicated access slot allocation |
| 1 | 0 | Dedicated transmission access allocation |
| 1 | 1 | Reserved |

TABLE 2

RTS/CTS Share Frame Duration Field Encoding

| Bits 0-13 | Bit 14 | Bit 15 | Usage |
|---|---|---|---|
| 0-32,767 | 0 | 0 | Duration (uS) of all frames* |
| 0 | 0 | 1 | Fixed value under point coordination function (PCF) within frames transmitted during CFP |
| 1-16,383 | 0 | 1 | Reserved |
| 0 | 1 | 1 | Reserved |
| 1-2007 | 1 | 1 | AID in PS-Poll Frames |
| 2008-16,383 | 1 | 1 | Reserved |

*Except PS-Poll frame transmitted during CP, or frames transmitted during CFP using HCF

What is claimed is:

1. An apparatus for wireless communication in a network, the apparatus comprising:
   (a) a wireless communication circuit, as a wireless station (STA), configured for wirelessly communicating over at least one channel with other wireless stations (STAs) on a local area network (WLAN);
   (b) a processor coupled to said wireless communication circuit within a station configured for operating on the WLAN as a station configured to support communicating using a shared Transmit Opportunity (TXOP) protocol;
   (c) a non-transitory memory storing instructions executable by the processor for the STA in the same Basic Service Set (BSS); and
   (d) wherein said instructions, when executed by the processor, perform steps comprising:
      (i) gaining access to the channel and communicating that an upcoming TXOP is available to be shared by broadcasting a message from the STA as TXOP holder, which may be an AP STA or a non-AP STA, to other STAs in the BSS, or by communicating to the AP indicating that the STA as TXOP holder is willing to share the TXOP with other STAs, with a STA operating as an AP further broadcasting this message on behalf of the STA as TXOP holder;
      (ii) sharing a TXOP, by said STA operating as a non-AP STA or an AP STA, with other stations on the network in the same BSS;
      (iii) wherein said sharing of the TXOP is performed for both Up Link (UL) physical layer protocol data unit (PPDU) transmissions and Down Link (DL) PPDU transmissions in the time domain;

(iv) sending messages from the TXOP holder, or through the AP when the AP is not the TXOP holder, to STAs that will share the TXOP with the STA informing them of the duration and time of channel access for the upcoming TXOP which is being shared; and
(v) wherein said UL transmissions in the time domain comprise a dynamic scenario for scheduling TXOP sharing which is UL initiated, and utilizes AP coordination, comprising:
(A) receiving a message indicating share offer/request information from non-AP STAs on the network;
(B) exchanging obtained share offer/request information with other non-AP STAs on the network;
(C) sending a response after receiving a frame indicating a non-AP STA has obtained the TXOP and started the shared TXOP;
(D) sending inquiry messages to identify the non-AP STAs request to join an upcoming shared TXOP on behave of the TXOP holder;
(E) collecting the requests to join upcoming shared TXOP from non-AP STAs on behalf of the TXOP holder;
(F) sending the collected share request information to a STA operating at the TXOP holder;
(G) receiving a frame from the TXOP holder indicating the allocated time and durations for STAs that request to join an upcoming shared TXOP;
(H) sharing a portion of the obtained TXOP time on behalf of the TXOP holder STA with other non-AP STAs, by transmitting frame indicating the allocated start time and duration for each or all of the shared non-AP STAs;
(I) receiving allocated start time and duration for TXOP sharing from the TXOP holder if the STA operating as the AP STA has requested participation in the shared TXOP for DL transmission; and
(J) transmitting a downlink (DL) PPDU to destination STAs on the network within the allocated shared TXOP duration assigned by the TXOP holder STA.

2. The apparatus of claim 1, wherein said STA has a communication range which is based on the type of STA:
(i) if the STA is a non-AP STA, then said communication range may not cover all other STAs in same Basic Service Set (BSS), which could communicate with other non-AP STAs with the coordination of the AP STA or can directly communicate with other non-AP STAs if in its communication range; and
(ii) if the STA is an AP STA, the communication range covers all other STAs in the same Basic Service Set (BSS).

3. The apparatus of claim 1, wherein after performing sharing of the TXOP for both Up Link (UL) physical layer protocol data unit (PPDU) transmissions and Down Link (DL) PPDU transmissions in the time domain, the instructions further comprise exchanging messages with other STAs in the BSS, either directly to the other STAs or indirectly through the associated AP, in determining which STAs that are either non-AP STAs or AP STAs in the BSS that are requesting time in the upcoming TXOP which is available to be shared.

4. The apparatus of claim 1, wherein said UL transmissions in the time domain comprise a dynamic scenario for scheduling TXOP sharing which is UL initiated, without need of AP coordination.

5. The apparatus of claim 4, wherein the STA operating as the non-AP STA performs steps comprising:
(i) sending a frame to the associated AP to obtain the channel if said non-AP STA detects that the medium is idle based on a carrier sense (CS) mechanism; and
(ii) indicating in the transmitted frame that this channel access attempt is for obtaining a shared TXOP;
(iii) receiving a response from the associated AP indicating a successful reception of the previous transmitted frame and indicating that said non-AP STA has obtained the TXOP and can commence using the shared TXOP;
(iv) sending of inquiry messages to identify other STAs requesting to join an upcoming shared TXOP, if said non-AP STA is operating as the TXOP holder;
(v) sending a message containing a request to join an upcoming shared TXOP if the said STA is not operating as the TXOP holder;
(vi) collecting the requests to join an upcoming shared TXOP from other STAs if said non-AP STA is operating as the TXOP holder; and
(vii) allocating time and durations for shared STAs that request to join a portion of the obtained TXOP time;
(viii) transmitting a frame indicating the allocated start time and duration to each or all of the shared non-AP STAs;
(ix) receiving allocated start time and duration for TXOP sharing from the TXOP holder if the non-AP STA is not the TXOP holder, has requested participation in the shared TXOP for UL transmission; and
(x) transmitting UL PPDU to associated AP on the network within the allocated shared TXOP duration assigned by the TXOP holder STA.

6. The apparatus of claim 1, wherein said UL and DL transmissions in the time domain comprise a semi-static scenario utilizing an AP STA as coordinator when scheduling TXOP sharing which is either UL initiated or DL initiated.

7. The apparatus of claim 1, wherein said UL and DL transmissions in the time domain comprise a simplified scenario when starting TXOP sharing which is either UL initiated or DL initiated, in which the STA operating as the AP doesn't identify the shared TXOP participants but sequences through all STAs one-by-one for participation.

8. The apparatus of claim 1, wherein the STA exchanges information of TXOP share offer/request capability and TXOP access time allocation through the exchange of management frames with STAs on the network operating as the AP STA or non-AP STAs.

9. The apparatus of claim 8, wherein said management frame is selected from the group of frames consisting of authentication request frames, authentication response frames, association request frames, association response frames and beacon frames.

10. The apparatus of claim 1, wherein RTS-share and CTS-share frames comprise modified Ready-To-Send (RTS) and Clear-To-Send (CTS) frames incorporating information fields indicating about the obtained TXOP to be shared and the shared TXOP is started.

11. The apparatus of claim 1, wherein the exchanging of messages, in which other STAs are requesting access time in the upcoming TXOP, may be sent through randomly accessing said at least one channel at predefined slot times or in a dedicated time slot.

12. The apparatus of claim 1, wherein said STA as TXOP holder, when operating as an AP STA, may poll non-AP STAs to determine if they are requesting time in the upcoming TXOP.

13. The apparatus of claim 1, wherein said STA as TXOP holder, when operating as a non-AP STA, may poll non-AP STAs by itself or through the coordination of the AP STA to determine if they are requesting transmission time in the upcoming TXOP.

14. The apparatus of claim 1, wherein the shared TXOP holder STA, which may be the AP STA or a non-AP STA, transmits the shared TXOP access scheduler frame, with or without the coordination of an AP STA, to STAs that are requesting time in the upcoming TXOP, to which these STAs are to respond in transmitting UL DATA to the AP STA or DL DATA to non-AP STA in the scheduled time and for a specified duration.

15. The apparatus of claim 14, wherein said TXOP access scheduler frame is selected from the group of message frames consisting of TXOP offer frames, TXOP access scheduler frames and broadcast TXOP scheduler frames.

16. An apparatus for wireless communication in a network, the apparatus comprising:
  (a) a wireless communication circuit, as a wireless station (STA) operating as an AP STA within its Basic Service Set (BSS), configured for wirelessly communicating over at least one channel with other wireless stations (STAs) on a local area network (WLAN);
  (b) a processor coupled to said wireless communication circuit within a station configured for operating on the WLAN as a station configured to support communicating using a Shared Transmit Opportunity (TXOP) protocol in which a Non-AP TXOP holder STA obtains channel access and is configured to use the shared TXOP time as much as is needed for UL DATA transmission, and for said AP STA to sequence through all non-AP STAs and share the TXOP among Up Link (UL) DATA transmissions and Down Link (DL) DATA transmissions and enable channel access according to the simplified shared TXOP scheme;
  (c) wherein a STA operating as a non-AP STA sends a message to the AP STA after it finishes UL transmission and indicates that said AP STA can loop through the next non-AP STA;
  (d) a non-transitory memory storing instructions executable by the processor for the STA; and
  (e) wherein said instructions, when executed by the processor, perform steps comprising:
    (i) detecting that a non-AP TXOP has completed its use of the TXOP;
    (ii) said AP STA sequences through the remaining non-AP STAs and provides at least one shared TXOP slot for each of them for UL transmissions;
    (iii) determining that sufficient TXOP time remains, wherein said AP STA commences DL transmissions to the non-AP STA on the network; and
    (iv) after said AP STA completes the DL transmissions, or if the TXOP time expires, then said AP STA broadcasts a CTS-To-Self frame to clear the channel reservation for all non-AP STAs, whereby a new TXOP procedure can be started.

17. The apparatus of claim 16, wherein said at least one shared TXOP slot is preconfigured.

18. An apparatus for wireless communication in a network, the apparatus comprising:
  (a) a wireless communication circuit, as a wireless station (STA), operating as an AP STA within its Basic Service Set (BSS), is configured for wirelessly communicating over at least one channel with other wireless stations (STAs) on a local area network (WLAN) in its reception area;
  (b) a processor coupled to said wireless communication circuit within a station configured for operating on the WLAN as a station configured to support communicating using a shared Transmit Opportunity (TXOP) protocol and for said AP STA to sequence through all non-AP STAs and share the TXOP among Up Link (UL) DATA transmissions and Down Link (DL) DATA transmissions and enable channel access according to the simplified shared TXOP scheme;
  (c) a non-transitory memory storing instructions executable by the processor for the STA; and
  (d) wherein said instructions, when executed by the processor, perform steps comprising:
    (i) said AP STA obtains the channel and utilizes the obtained TXOP for performing DL physical layer protocol data unit (PPDU) transmissions, said AP STA, as TXOP holder, is configured to use the obtained TXOP time as much as it requires for sending the DL transmissions;
    (ii) completing its DL transmissions, and determining that sufficient time remains in the TXOP to commence sharing the TXOP with non-AP STAs;
    (iii) said AP STA loops through the non-AP STAs sharing at least one TXOP slot for each of them for performing UL transmissions;
    (iv) upon completing one loop of the sequence for sharing with the non-AP STAs, or if the TXOP time expires, the AP broadcasts a CTS-To-Self frame to clear the channel reservation for all non-AP STAs, whereby a new shared TXOP procedure can be started.

19. The apparatus of claim 18, wherein said at least one shared TXOP slot is preconfigured.

20. An apparatus for wireless communication in a network, the apparatus comprising:
  (a) a wireless communication circuit, as a wireless station (STA), configured for wirelessly communicating over at least one channel with other wireless stations (STAs) on a local area network (WLAN);
  (b) a processor coupled to said wireless communication circuit within a station configured for operating on the WLAN as a station configured to support communicating using a shared Transmit Opportunity (TXOP) protocol;
  (c) a non-transitory memory storing instructions executable by the processor for the STA in the same Basic Service Set (BSS); and
  (d) wherein said instructions, when executed by the processor, perform steps comprising:
    (i) gaining access to the channel and communicating that an upcoming TXOP is available to be shared by broadcasting a message from the STA as TXOP holder, which may be an AP STA or a non-AP STA, to other STAs in the BSS, or by communicating to the AP indicating that the STA as TXOP holder is willing to share the TXOP with other STAs, with a STA operating as an AP further broadcasting this message on behalf of the STA as TXOP holder;
    (ii) sharing a TXOP, by said STA operating as a non-AP STA or an AP STA, with other stations on the network in the same BSS;
    (iii) wherein said sharing of the TXOP is performed for both Up Link (UL) physical layer protocol data unit (PPDU) transmissions and Down Link (DL) PPDU transmissions in the time domain; and (iv) sending messages from the TXOP holder, or through the AP when the AP is not the TXOP holder, to STAs that will share the TXOP with the STA informing them of the duration and time of channel access for the upcoming TXOP which is being shared; and (v) wherein said UL transmissions in the time domain comprise a dynamic scenario for scheduling TXOP sharing which is UL initiated, without need of AP coordination, wherein the STA operating as the non-AP STA performs steps comprising:

(A) sending a frame to the associated AP to obtain the channel if said non-AP STA detects that the medium is idle based on a carrier sense (CS) mechanism;

(B) indicating in the transmitted frame that this channel access attempt is for obtaining a shared TXOP;

(C) receiving a response from the associated AP indicating a successful reception of the previous transmitted frame and indicating that said non-AP STA has obtained the TXOP and can commence using the shared TXOP;

(D) sending of inquiry messages to identify other STAs requesting to join an upcoming shared TXOP, if said non-AP STA is operating as the TXOP holder;

(E) sending a message containing a request to join an upcoming shared TXOP if the said STA is not operating as the TXOP holder;

(F) collecting the requests to join an upcoming shared TXOP from other STAs if said non-AP STA is operating as the TXOP holder;

(G) allocating time and durations for shared STAs that request to join a portion of the obtained TXOP time;

(H) transmitting a frame indicating the allocated start time and duration to each or all of the shared non-AP STAs;

(I) receiving allocated start time and duration for TXOP sharing from the TXOP holder if the non-AP STA is not the TXOP holder, has requested participation in the shared TXOP for UL transmission; and (J) transmitting UL PPDU to associated AP on the network within the allocated shared TXOP duration assigned by the TXOP holder STA.

21. The apparatus of claim 20, wherein said STA has a communication range which is based on the type of STA:

(i) if the STA is a non-AP STA, then said communication range may not cover all other STAs in same Basic Service Set (BSS), which could communicate with other non-AP STAs with the coordination of the AP STA or can directly communicate with other non-AP STAs if in its communication range; and (ii) if the STA is an AP STA, the communication range covers all other STAs in the same Basic Service Set (BSS).

22. The apparatus of claim 20, wherein after performing sharing of the TXOP for both Up Link (UL) physical layer protocol data unit (PPDU) transmissions and Down Link (DL) PPDU transmissions in the time domain, the instructions further comprise exchanging messages with other STAs in the BSS, either directly to the other STAs or indirectly through the associated AP, in determining which STAs that are either non-AP STAs or AP STAs in the BSS that are requesting time in the upcoming TXOP which is available to be shared.

23. The apparatus of claim 20, wherein said UL transmissions in the time domain comprise a dynamic scenario for scheduling TXOP sharing which is UL initiated, and utilizes AP coordination.

24. The apparatus of claim 23, wherein the STA operating as the AP STA performs steps comprising:

(i) receiving a message indicating share offer/request information from non-AP STAs on the network;

(ii) exchanging obtained share offer/request information with other non-AP STAs on the network;

sending a response after receiving a frame indicating a non-AP STA has obtained the TXOP and started the shared TXOP;

(iv) sending inquiry messages to identify the non-AP STAs request to join an upcoming shared TXOP on behave of the TXOP holder;

(v) collecting the requests to join upcoming shared TXOP from non-AP STAs on behalf of the TXOP holder;

(vi) sending the collected share request information to a STA operating at the TXOP holder;

(vii) receiving a frame from the TXOP holder indicating the allocated time and durations for STAs that request to join an upcoming shared TXOP;

(viii) sharing a portion of the obtained TXOP time on behalf of the TXOP holder STA with other non-AP STAs, by transmitting frame indicating the allocated start time and duration for each or all of the shared non-AP STAs;

(ix) receiving allocated start time and duration for TXOP sharing from the TXOP holder if the STA operating as the AP STA has requested participation in the shared TXOP for DL transmission; and (x) transmitting a downlink (DL) PPDU to destination STAs on the network within the allocated shared TXOP duration assigned by the TXOP holder STA.

25. The apparatus of claim 20, wherein said UL and DL transmissions in the time domain comprise a semi-static scenario utilizing an AP STA as coordinator when scheduling TXOP sharing which is either UL initiated or DL initiated.

26. The apparatus of claim 20, wherein said UL and DL transmissions in the time domain comprise a simplified scenario when starting TXOP sharing which is either UL initiated or DL initiated, in which the STA operating as the AP doesn't identify the shared TXOP participants but sequences through all STAs one-by-one for participation.

27. The apparatus of claim 20, wherein the STA exchanges information of TXOP share offer/request capability and TXOP access time allocation through the exchange of management frames with STAs on the network operating as the AP STA or non-AP STAs.

28. The apparatus of claim 27, wherein said management frame is selected from the group of frames consisting of authentication request frames, authentication response frames, association request frames, association response frames and beacon frames.

29. The apparatus of claim 20, wherein RTS-share and CTS-share frames comprise modified Ready-To-Send (RTS) and Clear-To-Send (CTS) frames incorporating information fields indicating about the obtained TXOP to be shared and the shared TXOP is started.

30. The apparatus of claim 20, wherein the exchanging of messages, in which other STAs are requesting access time in the upcoming TXOP, may be sent through randomly accessing said at least one channel at predefined slot times or in a dedicated time slot.

31. The apparatus of claim 20, wherein said STA as TXOP holder, when operating as an AP STA, may poll non-AP STAs to determine if they are requesting time in the upcoming TXOP.

32. The apparatus of claim 20, wherein said STA as TXOP holder, when operating as a non-AP STA, may poll non-AP STAs by itself or through the coordination of the AP STA to determine if they are requesting transmission time in the upcoming TXOP.

33. The apparatus of claim 20, wherein the shared TXOP holder STA, which may be the AP STA or a non-AP STA, transmits the shared TXOP access scheduler frame, with or without the coordination of an AP STA, to STAs that are requesting time in the upcoming TXOP, to which these STAs are to respond in transmitting UL DATA to the AP STA or DL DATA to non-AP STA in the scheduled time and for a specified duration.

34. The apparatus of claim 33, wherein said TXOP access scheduler frame is selected from the group of message frames consisting of TXOP offer frames, TXOP access scheduler frames and broadcast TXOP scheduler frames.

\* \* \* \* \*